United States Patent
Cataldo

(12) 
(10) Patent No.: US 7,109,911 B1
(45) Date of Patent: Sep. 19, 2006

(54) DUAL SYNTHETIC APERTURE RADAR SYSTEM

(76) Inventor: Thomas J. Cataldo, 19 Ramita La., Commack, NY (US) 11725

( * ) Notice: Subject to any disclaimer, the term of this patent is extended or adjusted under 35 U.S.C. 154(b) by 0 days.

(21) Appl. No.: 10/637,294

(22) Filed: Aug. 11, 2003

Related U.S. Application Data

(63) Continuation of application No. 10/114,156, filed on Apr. 1, 2002, now Pat. No. 6,633,253.

(51) Int. Cl.
   *G01S 13/90* (2006.01)
(52) U.S. Cl. ............... 342/25 R; 342/25 A; 342/25 B; 342/25 F; 342/159; 342/160
(58) Field of Classification Search .............. 342/25, 342/159, 160, 195, 196, 25 R, 25 A, 25 B, 342/25 D, 25 F
   See application file for complete search history.

(56) References Cited

U.S. PATENT DOCUMENTS

| | | | |
|---|---|---|---|
| 4,885,590 A | 12/1989 | Hasan | 342/196 |
| 5,563,601 A | 10/1996 | Cataldo | 342/25 |
| 5,579,011 A | 11/1996 | Smrek | 342/113 |
| 5,959,566 A | 9/1999 | Petty | 342/25 |
| 6,441,772 B1 * | 8/2002 | Hellsten et al. | 342/25 |
| 6,518,914 B1 * | 2/2003 | Peterson et al. | 342/25 |
| 6,633,253 B1 * | 10/2003 | Cataldo | 342/25 |

OTHER PUBLICATIONS

Coe et al., "Moving Target Detection in SAR Imagery : Experimental Results," Radar Conference, 1995., Record of the IEEE 1995 International ., May 1995, pp. 644-649.*

Ng et al., "Simulated DPCA performance for dual-channel SAR Processing," Geoscience and Remote Sensing Symposium, 1999, IGARSS '99 Proceedings. IEEE, vol. 1, Jun. 1999, pp. 547-549.*

Mileshosky, Brian, Sandia National Laboratories, "What is Synthetic Radar?", Document No. SAND99-0018, 1999, 3 pages, www.sandia.gov/radar/whatis.

Mileshosky, Brian, Sandia National Laboratories, "Synthetic Aperture Radar Applications", Document No. SAND99-0018, 1999, 3 pages, www.sandia.gov/radar/whatis.

* cited by examiner

*Primary Examiner*—Ian J. Lobo
(74) *Attorney, Agent, or Firm*—Alfred M. Walker; Frank Tolin

(57) ABSTRACT

The dual synthetic aperture array system processes returns from the receiving arrays. The two identical receiving arrays employing displaced phase center antenna techniques subtract the corresponding spectrally processed data to cancel clutter. It is further processed that a moving target is detected and its velocity, angular position and range is measured, in or out of the presence of clutter. There are many techniques presented in the disclosure. These techniques are basically independent but are related based on common set of fundamental set of mathematical equations, understanding of radar principles and the implementations involved. These many techniques may be employed singly and/or in combination depending on the application and accuracy required. They are supported by a system that includes, optimization of the number of apertures, pulse repetition frequencies, DPCA techniques to cancel clutter, adaptive techniques to cancel clutter, motion compensation, weighting function for clutter and target, and controlling the system in most optimum fashion to attain the objective of the disclosure.

5 Claims, 35 Drawing Sheets

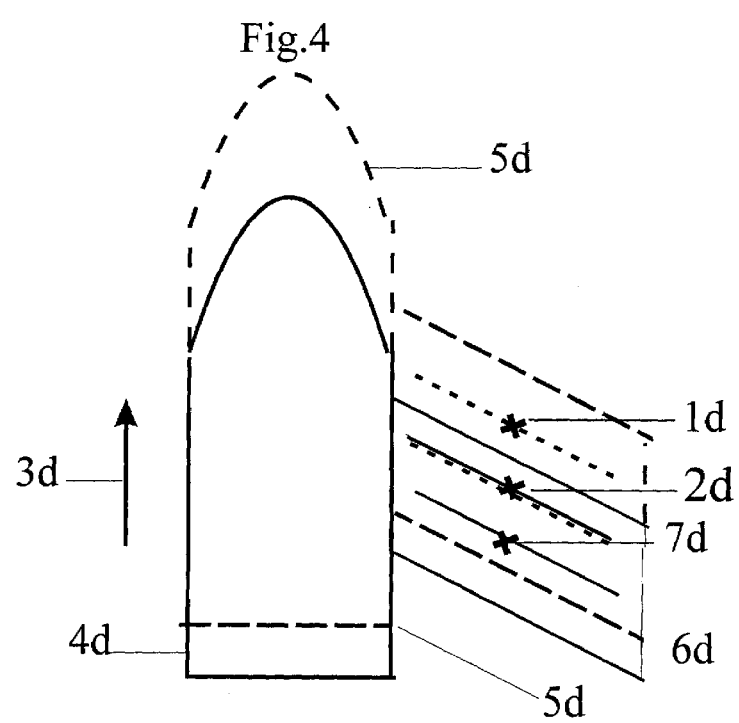

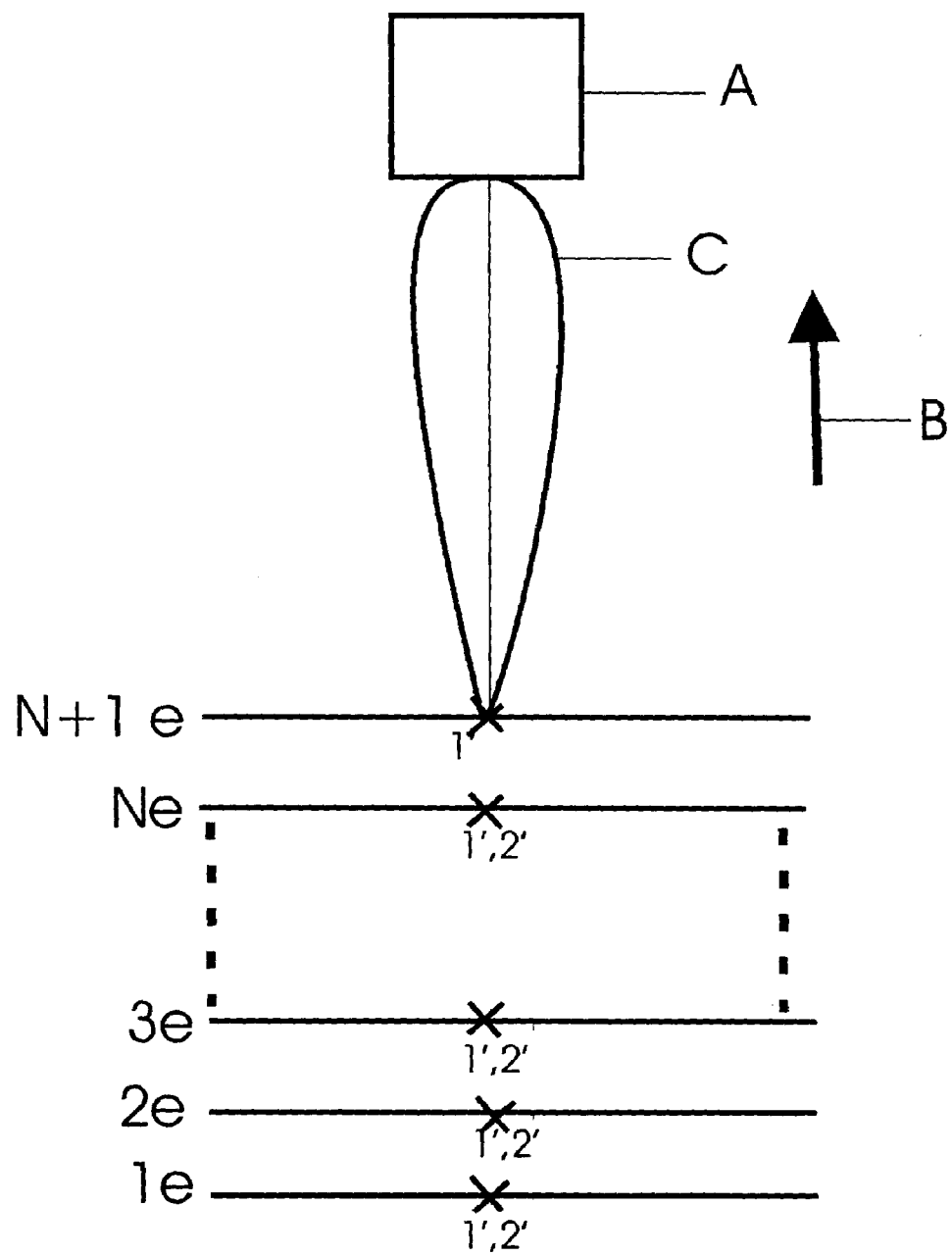

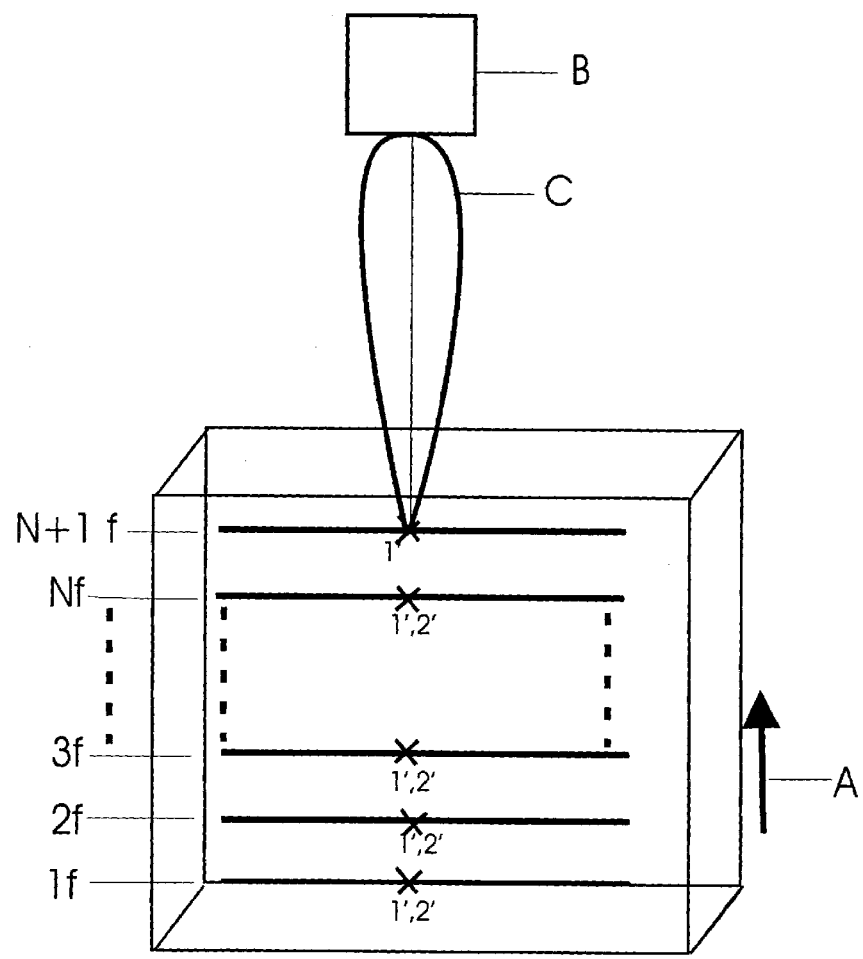

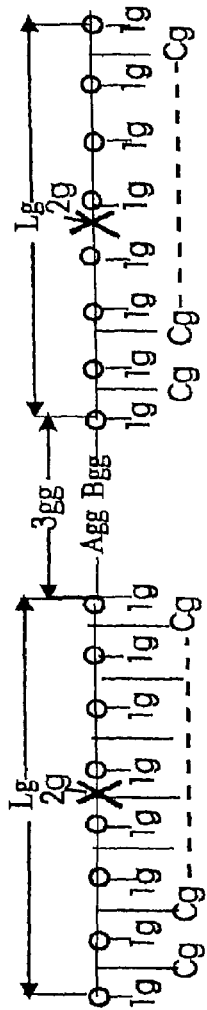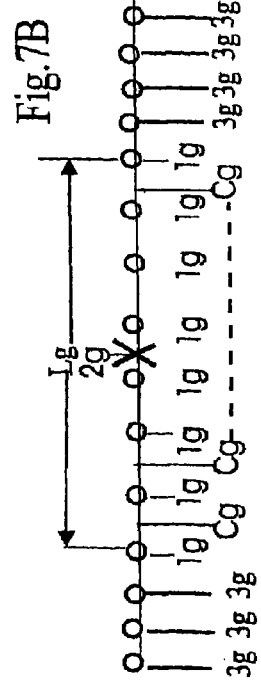
Fig. 7A
Fig. 7B
Fig. 7C

BATCH PROCESSING

Fig.8

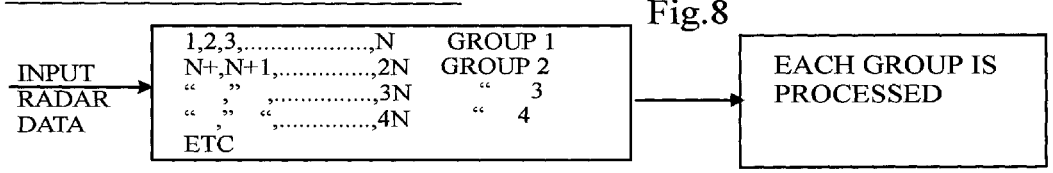

INPUT RADAR DATA → | 1,2,3,....................,N   GROUP 1<br>N+,N+1,..............,2N  GROUP 2<br>"  ",   ,.................,3N    "   3<br>"  ",  " ,.................,4N    "   4<br>ETC | → EACH GROUP IS PROCESSED

SLIDING WINDOW PROCESSING

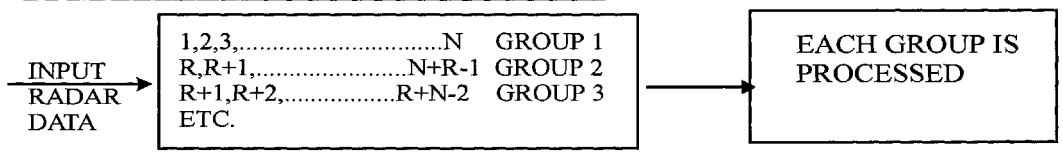

INPUT RADAR DATA → | 1,2,3,..............................N    GROUP 1<br>R,R+1,........................N+R-1  GROUP 2<br>R+1,R+2,.................R+N-2  GROUP 3<br>ETC. | → EACH GROUP IS PROCESSED

CIRCULARLY CORRELATED PROCESSING

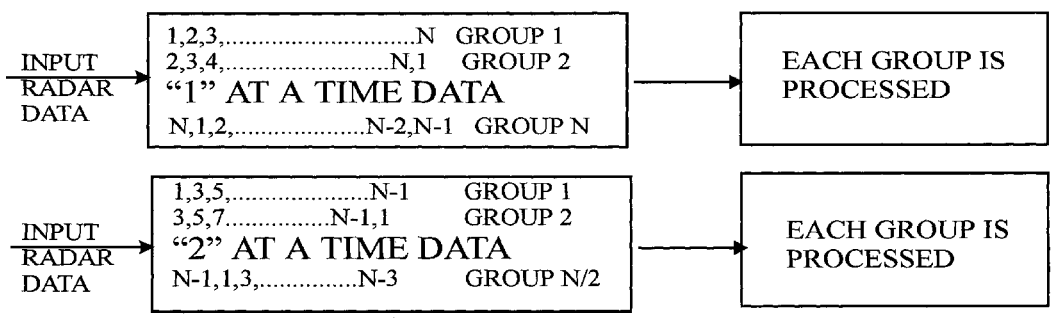

INPUT RADAR DATA → | 1,2,3,............................N     GROUP 1<br>2,3,4,...........................N,1   GROUP 2<br>"1" AT A TIME DATA<br>N,1,2,....................N-2,N-1  GROUP N | → EACH GROUP IS PROCESSED

INPUT RADAR DATA → | 1,3,5,.....................N-1       GROUP 1<br>3,5,7,................N-1,1         GROUP 2<br>"2" AT A TIME DATA<br>N-1,1,3,...............N-3         GROUP N/2 | → EACH GROUP IS PROCESSED

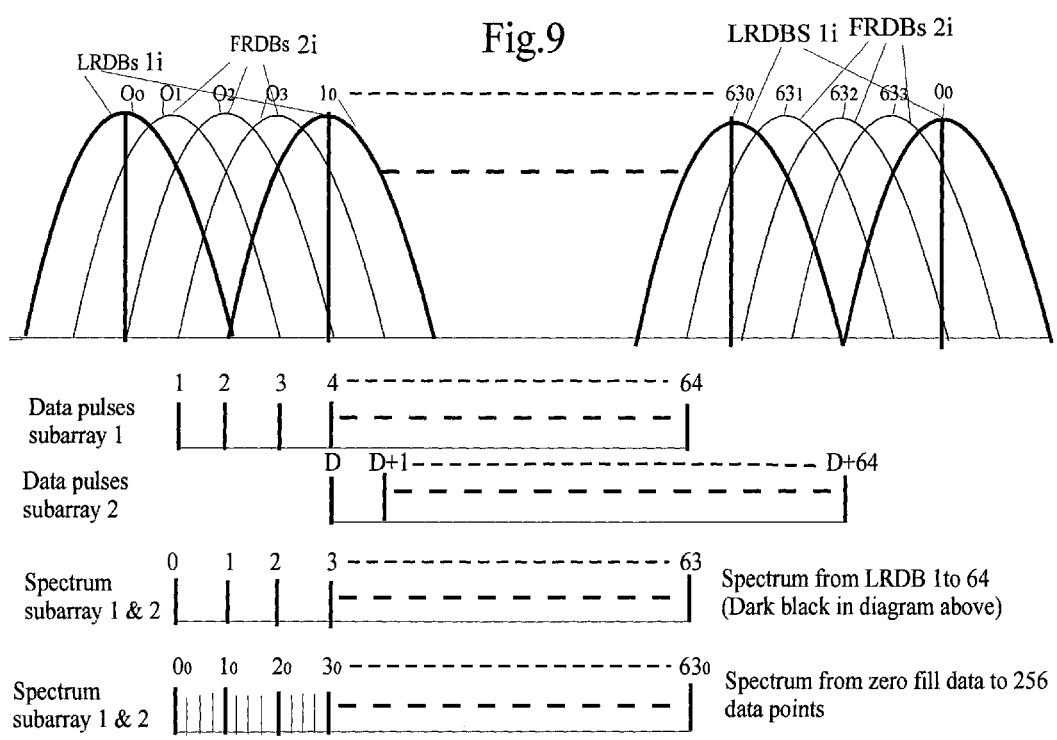

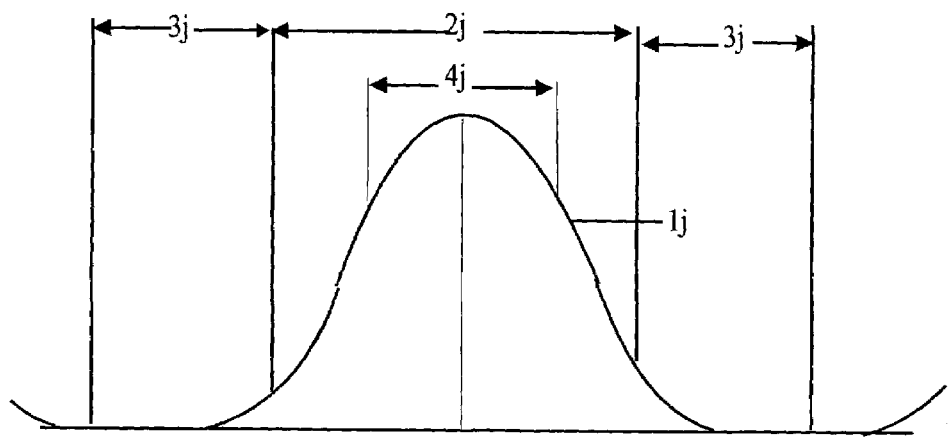
Fig.10
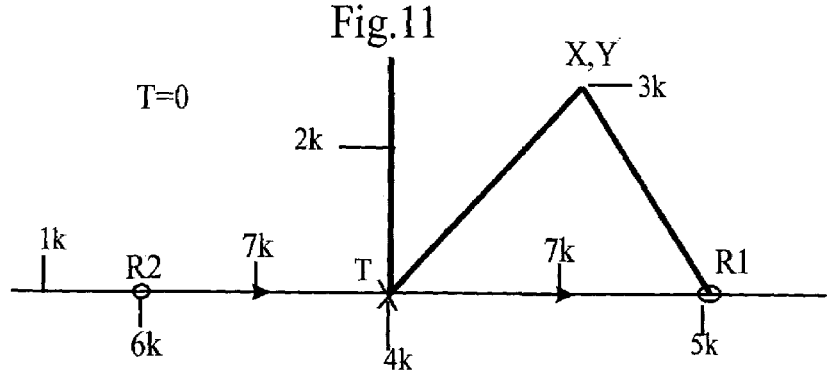
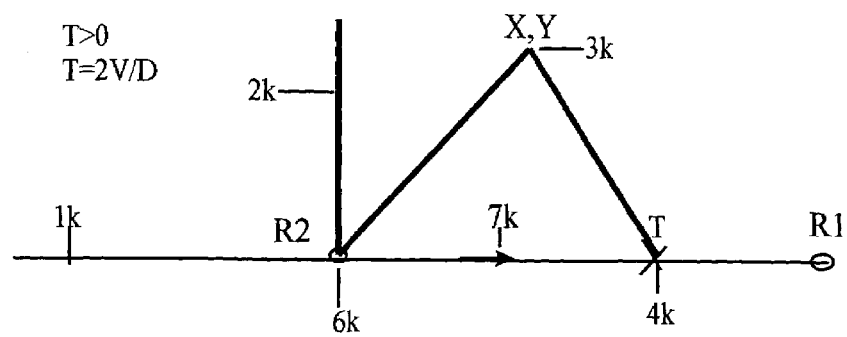
Fig.11

Target peak detection($\phi_D$) at $0_{-0}$ FRDB
Clutter peak detection at $0_1$ FRDB
Target azimuth location($\phi_A$) $-3_0$ LRDB $=-12$FRDB
Target relative radial velocity ($\phi_R$)$=\phi_D-\phi_A=0_0-(-3_0)$
  Proportional To phase         $=3$ LRDB $=12$FRDB
D$\phi_R=\phi_R$X$5=12$FRDBX$5=60$FRDB$=15$LRDB$=337.5$deg phase Shift Fig.22A
A) ODD AND EVEN PULSE SEQUENCES---DELAY(D)=1
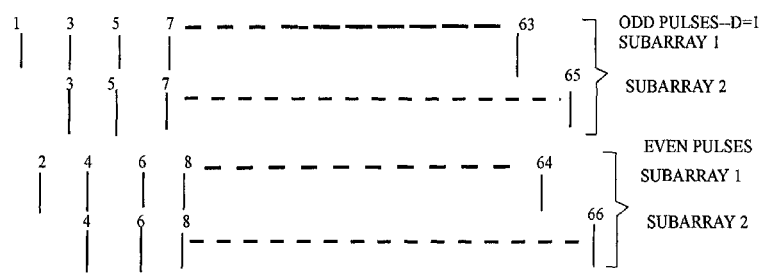
B) ANTENNA-DOPPLER DIAGRAM ODD AND EVEN PULSES D=1
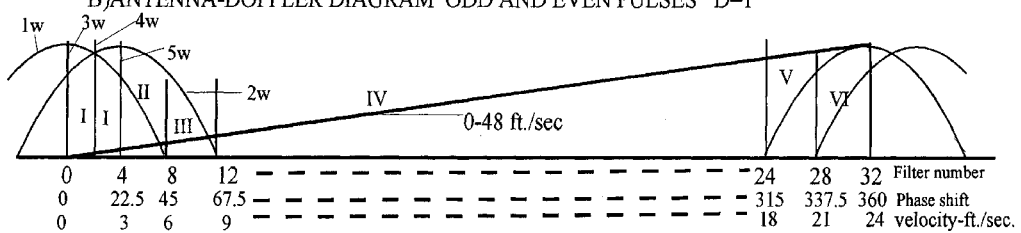

Fig.22B
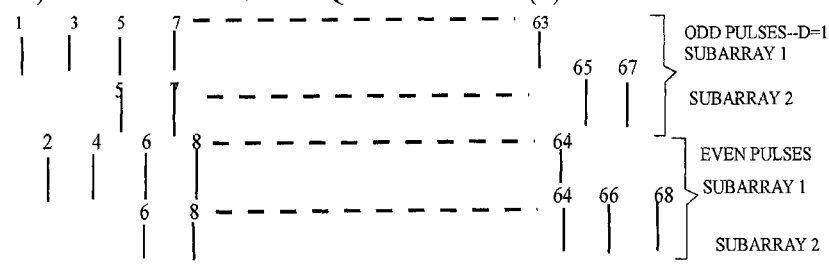
C) ODD AND EVEN PULSE SEQUENCES---DELAY(D)=2
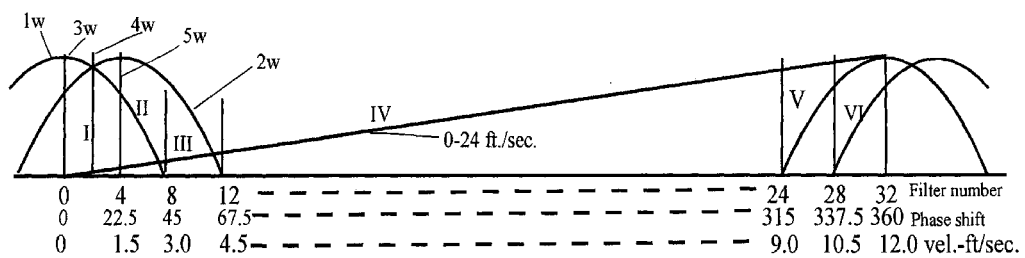
D) ANTENNA DOPPLER DIAGRAM D=2

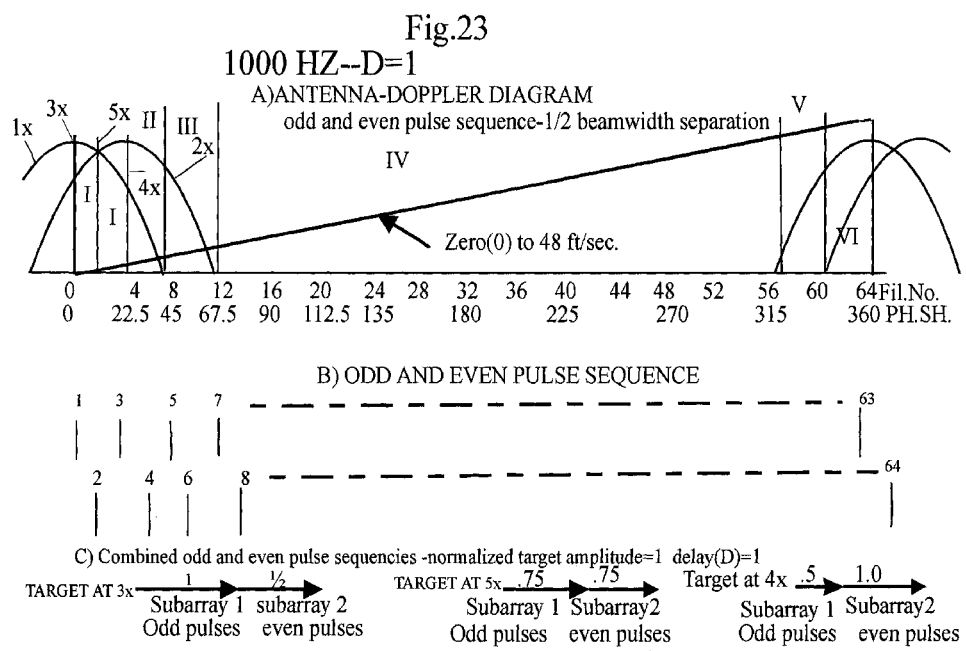

Fig.25
Table I

REFERENCE-FIGURE 16

RESPONSE REFERENCED TO FINE RANGE DOPPLER BIN (FRDB)-$X_o$

| FRDB RESPONSE | Wc PHASE RESPONSE | | RELATIVE CLUTTER FILTER RESPONSE | | X-TIME CHANGE OF CLUTTER=$K \exp j\alpha$ | | |
|---|---|---|---|---|---|---|---|
| | P-DCA | T-DPCA | AMPLITUDE | PHASE | AMPLITUDE | | PHASE |
| | | | $K_F$ | $\alpha_F$ | K | 1-K | $\alpha$ |
| $X_{-3}$ | $Wco-3=-3Kcm$ | $Wco-3=-3Kcm$ | $Aco-3=0.55$ | -135° | 0.96 | 0.04 | -0.075 |
| $X_{-2}$ | $Wco-2=-2Kcm$ | $Wco-2=-2Kcm$ | $Aco-2=0.70$ | -90° | 0.98 | 0.02 | -0.050 |
| $X_{-1}$ | $Wco-1=-Kcm$ | $Wco-1=-Kcm$ | $Aco-1=0.85$ | -45° | 0.99 | 0.01 | -0.025 |
| $X_0$ | $Wco-o=0$ | $Wco-o=0$ | $Aco-o=1.0$ | 0° | 1.00 | 0.00 | 0.000 |
| $X_1$ | $Wco+1=Kcm$ | $Wco+1=Kcm$ | $Aco+1=0.85$ | 45° | 1.01 | -0.01 | 0.025 |
| $X_2$ | $Wco+2=2Kcm$ | $Wco+2=2Kcm$ | $Aco+2=0.70$ | 90° | 1.02 | -0.02 | 0.050 |
| $X_1$ | $Wco+3=3Kcm$ | $Wco+3=3Kcm$ | $Aco+3=0.55$ | 135° | 1.04 | -0.04 | 0.075 |

Fig.26

Table II

REFERENCE-FIGURE 17

REFERENCED TO FRDB-$X_0$

| FRDB RESPONSE | RELATIVE TARGET FILTER RESPONSE | | Y-TIME CHANGE OF TARGET $=K \exp j\beta$ | | |
|---|---|---|---|---|---|
| | AMPLITUDE $K_F$ | PHASE $B_F$ | AMPLITUDE | | PHASE $\beta$ |
| | | | K | 1-K | |
| $X_{-3}$ | $A_{TO-3}=0.55$ | -135° | 0.96 | 0.04 | -0.075 |
| $X_{-2}$ | $A_{TO-2}=0.70$ | -90° | 0.98 | 0.02 | -0.050 |
| $X_{-1}$ | $A_{TO-1}=0.85$ | -45° | 0.99 | 0.01 | -0.025 |
| $X_0$ | $A_{TO-0}=1.00$ | 0° | 1.00 | 0.00 | 0.000 |
| $X_1$ | $A_{TO+1}=0.85$ | 45° | 1.01 | -0.01 | 0.025 |
| $X_2$ | $A_{TO+2}=0.70$ | 90° | 1.02 | -0.02 | 0.050 |
| $X_3$ | $A_{TO+3}=0.55$ | 135° | 1.04 | -0.04 | 0.075 |

Fig.27
Table III
REFERENCE - FIGURE 16

| FRDB | WM P-DPCA | WM T-DPCA |
|---|---|---|
| $(X+Y-3)_{-3}$ | -3Kcm | -3Kcm |
| $(X+Y-3)_{-2}$ | -2Kcm | -2Kcm |
| $(X+Y-3)_{-1}$ | -1Kcm | -1Kcm |
| $(X+Y-3)_{0}$ | -0Kcm | -0Kcm |
| $(X+Y-3)_{1}$ | 1Kcm | 1Kcm |
| $(X+Y-3)_{2}$ | 2Kcm | 2Kcm |
| $(X+Y-3)_{3}$ | 3Kcm | 3Kcm |

Fig.28 Table IV

| | | V<sub>UA</sub>=50'/SEC→ V<sub>UI</sub>=10'/SEC 1000 HZ - D=5 | | | | | V<sub>UA</sub>=37.5'/SEC→ V<sub>UI</sub>=9.375'/SEC 750HZ - D=4 | | | | |
|---|---|---|---|---|---|---|---|---|---|---|---|
| FILTER NUMBER | FRDB NUMBER | CENTER FREQ OF FILTER HZ | PHASE CHANGE OF FILTER BEFORE "D" DEG. | TARGET PHASE CHANGE AFTER "D" D=5,DEG. | TARGET RADIAL VELOCITY AT D=5 FT/SEC | TARGET RADIAL VELOCITY AT D=1 FT/SEC | CENTER FREQ OF FILTER HZ | PHASE CHANGE OF FILTER BEFORE "D" DEG. | TARGET PHASE CHANGE OF FILTER AFTER "D" DEG. | TARGET RADIAL VELOCITY AT D=4 FT/SEC | TARGET RADIAL VELOCITY AT D=1 FT/SEC |
| 1 | $0_0$ | 0.00 | 0.00 | 0.00 | 0.00 | 0.00 | 0.00 | 0.00 | 0.00 | 0.00 | 0.00 |
| 2 | $0_1$ | 4.00 | 1.40 | 7.00 | 0.20 | 0.98 | 3.00 | 1.40 | 5.60 | 0.15 | 0.58 |
| 3 | $0_2$ | 8.00 | 2.81 | 14.05 | 0.39 | 1.95 | 6.00 | 2.81 | 11.24 | 0.29 | 1.17 |
| 4 | $0_3$ | 12.00 | 4.22 | 21.10 | 0.59 | 2.93 | 9.00 | 4.22 | 16.88 | 0.04 | 0.18 |
| 5 | $1_0$ | 16.00 | 5.60 | 28.00 | 0.78 | 3.91 | 12.00 | 5.60 | 22.40 | 0.59 | 2.34 |
| 6 | $1_1$ | 20.00 | 7.00 | 35.00 | 0.98 | 4.88 | 15.00 | 7.00 | 28.00 | 0.73 | 2.93 |
| 7 | $1_2$ | 24.00 | 8.40 | 42.00 | 1.17 | 5.86 | 18.00 | 8.40 | 33.60 | 0.88 | 3.52 |
| 8 | $1_3$ | 28.00 | 9.80 | 49.00 | 1.37 | 6.83 | 21.00 | 9.80 | 39.20 | 1.03 | 4.10 |
| 9 | $2_0$ | 32.00 | 11.20 | 56.00 | 1.56 | 7.81 | 24.00 | 11.20 | 44.80 | 1.17 | 4.69 |
| 10 | $2_1$ | 36.00 | 12.60 | 63.00 | 1.76 | 8.79 | 27.00 | 12.60 | 50.40 | 1.32 | 5.27 |
| 11 | $2_2$ | 40.00 | 14.10 | 70.50 | 1.95 | 9.76 | 30.00 | 14.10 | 56.40 | 1.47 | 5.86 |
| 12 | $2_3$ | 44.00 | 15.40 | 77.00 | 2.15 | 10.74 | 33.00 | 15.40 | 61.60 | 1.61 | 6.44 |
| 13 | $3_0$ | 48.00 | 16.80 | 84.00 | 2.34 | 11.71 | 36.00 | 16.80 | 67.20 | 1.76 | 7.03 |
| 14 | $3_1$ | 52.00 | 18.20 | 91.00 | 2.54 | 12.69 | 39.00 | 18.20 | 72.80 | 1.90 | 7.62 |
| 15 | $3_2$ | 56.00 | 19.60 | 98.00 | 2.73 | 13.67 | 42.00 | 19.60 | 78.40 | 2.05 | 8.20 |
| 16 | $3_3$ | 60.00 | 21.00 | 105.00 | 2.93 | 14.64 | 45.00 | 21.00 | 84.00 | 2.20 | 8.79 |
| 17 | $4_0$ | 64.00 | 22.40 | 112.00 | 3.12 | 15.62 | 48.00 | 22.40 | 89.60 | 2.39 | 9.580 |
| 18 | $4_1$ | 68.00 | 23.80 | 119.00 | 3.32 | 16.59 | 51.00 | 23.80 | 95.20 | 2.49 | 9.960 |
| 19 | $4_2$ | 72.00 | 25.20 | 126.00 | 3.51 | 17.57 | 54.00 | 25.20 | 100.80 | 2.14 | 10.560 |
| 20 | $4_3$ | 76.00 | 26.60 | 133.00 | 3.71 | 18.54 | 57.00 | 26.60 | 106.40 | 2.78 | 11.130 |
| 21 | $5_0$ | 80.00 | 28.10 | 140.50 | 3.90 | 19.52 | 60.00 | 28.10 | 112.40 | 2.93 | 11.720 |

Fig.29
Table V

| FRDB | 1000 HZ | | 750 HZ | | RELATIVE FILTER RESPONSE | | CHANGES IN | CHANGES IN |
|---|---|---|---|---|---|---|---|---|
| | TIME PLUS PULSE DPCA 0 ERROR | TIME ONLY DPCA ERROR 0 IN DEG. | TIME PLUS PULSE DPCA 0 ERROR | TIME ONLY DPCA ERROR 0 IN DEG. | $\alpha_F$ OR $B_F$ | $K_F$ OR $K_F$ | TARGET OR CLUTTER PHASE $\alpha$ OR B | TARGET OR CLUTTER AMPLITUDE K OR K |
| $-1_3$ | -4.9 | 50.96 | -2.52 | -81.16 | | | | |
| $-1_2$ | -4.2 | 43.68 | -2.16 | -69.28 | | | | |
| $-1_1$ | -3.5 | -36.40 | -1.80 | -57.40 | | | | |
| $-1_0$ | -2.8 | -29.12 | -1.44 | -47.52 | -180 | 0.40 | -0.10 | 0.92 |
| $0_{-3}$ | -2.1 | -21.87 | -1.08 | -35.64 | -135 | 0.55 | -0.06 | 0.96 |
| $0_{-2}$ | -1.4 | -14.56 | -0.72 | -23.76 | -90 | 0.70 | -0.04 | 0.98 |
| $0_{-1}$ | -0.7 | -7.28 | -0.04 | -11.88 | -45 | 0.85 | -0.02 | 0.99 |
| $0_0$ | 0.0 | 0.00 | 0.00 | 0.00 | 0 | 1.00 | 0.00 | 1.00 |
| $0_1$ | 0.7 | 7.28 | 0.36 | 11.88 | 45 | 0.85 | 0.02 | 0.99 |
| $0_2$ | 1.4 | 14.56 | 0.72 | 23.76 | 90 | 0.70 | 0.04 | 0.98 |
| $0_3$ | 2.1 | 21.84 | 1.08 | 35.64 | 135 | 0.55 | 0.06 | 0.96 |
| $1_0$ | 2.8 | 29.12 | 1.44 | 47.52 | 180 | 0.40 | 0.10 | 0.92 |
| $1_1$ | 3.5 | 36.40 | 1.80 | 57.40 | | | | |
| $1_2$ | 4.2 | 43.68 | 2.16 | 69.28 | | | | |

Fig. 30

TABLE VI

| θ_D Total Phase Detected LRDB | DO_R Equivalent LRDB | θ_A Equivalent LRDB | θ_D Total Phase Detected LRDB | DO_R Equivalent LRDB | θ_A Equivalent LRDB | θ_D Total Phase Detected LRDB | DO_R Equivalent LRDB | θ_A Equivalent LRDB |
|---|---|---|---|---|---|---|---|---|
| 4 | 0 | 4 | 3 | -1 | 4 | 2 | -2 | 4 |
| 4 | 1 | 3 | 3 | 0 | 3 | 2 | -1 | 3 |
| 4 | 2 | 2 | 3 | 1 | 2 | 2 | 0 | 2 |
| 4 | 3 | 1 | 3 | 2 | 1 | 2 | 1 | 1 |
| 4 | 4 | 0 | 3 | 3 | 0 | 2 | 2 | 0 |
| 4 | 5 | -1 | 3 | 4 | -1 | 2 | 3 | -1 |
| 4 | 6 | -2 | 3 | 5 | -2 | 2 | 4 | -2 |
| 4 | 7 | -3 | 3 | 6 | -3 | 2 | 5 | -3 |
| 4 | 8 | -4 | 3 | 7 | -4 | 2 | 6 | -4 |
| 1 | -3 | 4 | 0 | -4 | 4 | -1 | -5 | 4 |
| 1 | -2 | 3 | 0 | -3 | 3 | -1 | -4 | 3 |
| 1 | -1 | 2 | 0 | -2 | 2 | -1 | -3 | 2 |
| 1 | 0 | 1 | 0 | -1 | 1 | -1 | -2 | 1 |
| 1 | 1 | 0 | 0 | 0 | 0 | -1 | -1 | 0 |
| 1 | 2 | -1 | 0 | 1 | -1 | -1 | 0 | -1 |
| 1 | 3 | -2 | 0 | 2 | -2 | -1 | 1 | -2 |
| 1 | 4 | -3 | 0 | 3 | -3 | -1 | 2 | -3 |
| 1 | 5 | -4 | 0 | 4 | -4 | -1 | 3 | -4 |
| -2 | -6 | 4 | -3 | -7 | 4 | -4 | -8 | 4 |
| -2 | -5 | 3 | -3 | -6 | 3 | -4 | -7 | 3 |
| -2 | -4 | 2 | -3 | -5 | 2 | -4 | -6 | 2 |
| -2 | -3 | 1 | -3 | -4 | 1 | -4 | -5 | 1 |
| -2 | -2 | 0 | -3 | -3 | 0 | -4 | -4 | 0 |
| -2 | -1 | -1 | -3 | -2 | -1 | -4 | -3 | -1 |
| -2 | 0 | -2 | -3 | -1 | -2 | -4 | -2 | -2 |
| -2 | 1 | -3 | -3 | 0 | -3 | -4 | -1 | -3 |
| -2 | 2 | -4 | -3 | 1 | -4 | -4 | 0 | -4 |

Fig.31
TableVII
REFERENCE-Fig.18

| Candidate $D\phi_R$ | | Candidate $\phi_R=D\phi_R/D$ | | Candidate $\phi_A$ | | Candidate Solution | | Comment |
|---|---|---|---|---|---|---|---|---|
| FRDB | Phase shift | FRDB | Phase shift | FRDB | Phase shift | FRDB | Phase shift | |
| 15 | 21.0 | 3 | 4.2 | -3 | -4.2 | INC | INC | |
| 30 | 42.0 | 6 | 8.4 | -6 | -8.4 | INC | INC | |
| 45 | 63.0 | 9 | 12.6 | -9 | -12.6 | INC | INC | |
| 60 | 84 | 12 | 16.8 | -12 | -16.8 | INC | INC | |
| 75 | 105 | 15 | 21.0 | -15 | -21.0 | CORR. | CORR. | Correct solution for K-A |
| 90 | 120 | 18 | 25.2 | -18 | -25.2 | INC | INC | |
| 105 | 135 | 21 | 29.4 | -21 | -29.4 | INC | INC | |
| 120 | 150 | 24 | 33.6 | -24 | -33.6 | INC | INC | |

*INC-Incorrect
$\phi_D=0$ Phase Shift and $\phi_0$ FRDB  $\phi_D=\phi_R+\phi_A$
D=5
Correct solution for $D\phi_R$ Gives correct K-A solution
Only one correct solution Fig.32
Table VIII

| GCR | $K_{PH}$ | 180 PHI(D$\phi_R$) THM=0 | 150 PHI(D$\phi_R$) THM=0 | 120 PHI(D$\phi_R$) THM=0 | 90 PHI(D$\phi_R$) THM=0 | 60 PHI(D$\phi_R$) THM=0 | 30 PHI(D$\phi_R$) THM=0 | RATIO PHI-180 TO PHI-30 |
|---|---|---|---|---|---|---|---|---|
| 20 | 6 | 5.5 | 5.2 | 4.5 | 3.8 | 2.5 | 1.5 | 3.7 |
| 10 | 12 | 11.0 | 10.5 | 9.0 | 7.5 | 5.0 | 3.0 | 3.7 |
| 5 | 24 | 23.0 | 22.0 | 20.0 | 16.0 | 12.0 | 5.5 | 4.2 |
| 2.5 | 48 | 45.0 | 42.0 | 39.0 | 34.0 | 25.0 | 14.0 | 3.2 |

PHI(D$\phi_R$) ERROR=(GCR=2.5)=4.5 SIN(THM)
PHI(D$\phi_R$) ERROR=(GCR=5.0)=24 SIN(THM)
PHI(D$\phi_R$) ERROR=(GCR=10.0)=12 SIN(THM)
PHI(D$\phi_R$) ERROR=(GCR=20.0)=6.0 SIN(THM)

$K_{PH}$ Is a constant that represents the average curve between the high and low errorcurves for each GCR at a particular D$\phi_R$.

Fig.33
Table IX

| Regions of clutter | Velocity in feet/sec. | Antenna 1 Doppler filter range | Antenna 2 Doppler filter range | COMMENTS |
|---|---|---|---|---|
| I | 0-3.0 ft/sec. | 0-4 (high clutter) | 0-4 (high clutter) | Area of high clutter In antenna 1 and 2 |
| II | 3.0-6.0 ft./sec | 5-7 Intermediate cluter | 5-7 (high clutter) | Different clutter in each antenna |
| III | 6.0-9.0 ft/sec. | 8-11 Low clutter | 8-11 Intermediate clutter | Different clutter in each antenna |
| IV | 9.0-18 ft/sec | 12-55 Low clutter | 12-55 Low clutter | Area of low clutter in each antenna |
| V | 18.0-21.0 ft/sec | 56-60 Intermediate clutter | 56-60 Low clutter | Different clutter in each antenna |
| VI | 21.0-24.0 ft/sec | 61-64 (high clutter) | 61-64 Intermediate clutter | Different clutter in each antenna |

Fig.34

Table X

| Regions Of Clutter | Target Velocity in feet/sec. D=1 | Target Velocity in feet/sec. D=2 | Antenna 1 Doppler filter range (Doppler no.) | Antenna 2 Doppler filter range (Doppler no.) | Target phase shift for doppler filter rannge D=1(Degrees) | Target phase shift for doppler filter rannge D=2 (Degrees) |
|---|---|---|---|---|---|---|
| I | 0-3.0 | 0-1.5 | 0-4 High clutter | 0-4 High clutter | 0-22.5 | 0-22.5 |
| II | 3.0-6.0 | 1.5-3.0 | 5-8 Inter. Clutter | 5-8 High clutter | 22.5-45.0 | 22.5-45 |
| III | 6.0-9.0 | 3.0-4.5 | 9-12 Low clutter | 9-12 Inter. Clutter | 45.0-67.5 | 45.0-67.5 |
| IV | 9.0-18.0 | 4.5-9.0 | 13-24 Low clutter | 13-24 Low clutter | 67.5-315 | 67.5-315 |
| V | 18-21 | 9.0-10.5 | 25-28 Inter. Clutter | 25-28 Low clutter | 315-337.5 | 315-337.5 |
| VI | 21-24 | 10.5-12.0 | 29-32 High clutter | 29-32 Inter. Clutter | 337.5-360 | 337.5-360 |

DUAL SYNTHETIC APERTURE RADAR SYSTEM

This application is a continuation of application Ser. No. 10/114,156, filed Apr. 1, 2002 now U.S. Pat. No. 6,633,253.

RELATED APPLICATIONS

This is based on provisional application Ser. No. 60/280,779 for Dual Synthetic Aperture Radar System of Apr. 2, 2001 and upon provisional application Ser. No. 60/282,915 for Dual Synthetic Aperture Radar System of Apr. 10, 2001

FIELD OF INVENTION

The field of the invention is an airborne radar employing electronic scanned array with a transmission array and a dual receive arrays employing diplaced center antenna (DPCA) methodology to detect moving targets in and out of clutter and measure there speed and azimuth very accurately

BACKGROUND OF THE INVENTION

In the field of this invention clutter has been a major impediment. Clutter being the unwanted signals from stationary ground that mixes with moving targets that makes it very difficult to obtain the objective of this invention.

The background in the state of the art, in airborne radars that detect moving targets in the presence of ground clutter and measuring their range, radial velocity and azimuth, consists of the following:

1. Delay line cancellor Systems
2. Monopulse Systems
3. Two subarray DPCA radar
4. Three Subarray DPCA Radar 1. The Delay Line cancellor subtracts the inputs from the radar of two consecutive pulses. If the moving target is in the presence of Main Beam clutter it looks just like clutter and cannot be detected and therefore cannot measure its parameters. The E2C Hawkeye-Grumman is an example of this system where a double delay line cancellor plus special filtering is implemented.
2. Monopulse System Utilizing delay line cancellor at the input because of the system cannot determine the radial velocity and azimuth in the presence of clutter. It utilizes two subarrays, a sum (ΔΣ) array and a difference (Δ) array to process the data. The accuracy is limited by the ratio of the noise of the difference channel and ten to one ratio is about the limit. It has better accuracy than delay line cancellor but more processing and its notable to detect and process moving targets. Like the delay line cancellor it can not detect targets in main lobe clutter.
3. The DPCA Radar with two subarrays using system in classical theory a moving targets precise angle and radial velocity can not be determined. The detection of the moving target may be obtained only. This is the reason for three segment antenna to attain the precise velocity and azimuth.
4. The DPCA Radar with three subarrays attains the objective of detecting a moving target in the presence of clutter and measuring its radial velocity and azimuth position but takes three subarrays (large amount of hardware and processing since it has three subarrays it has to process and must perfom many logic and mathematical operations)
Example: Northrop Grumman JSTARS System.

Description of Prior Art

Patent Serial Number: 766,309 Filed 8-16-85—Abandoned
  Entitled: Two Port Clutter Suppression Interfernometry System For Radar Detection of Targets
  Inventor: Thomas J. Cataldo
  Grumman Reference: 388-GAC; P-1(3783)
  This patent has the same objective and the same inventor as the aforementioned invention. This invention is not obvious from the previous patent stated above with one of ordinary skill in the art. This invention has many essentially independent techniques to attain the objective.

The patent above discloses a vague geometric technique which takes advantage of the first order change in target relative to clutter (which was considered changing very slowly).

Patent Serial Number: 5,563,601 Filed 10-8-96
  Entitled: Two Port Clutter Synthetic Aperture Radar System For Radar Detection of Targets
  Inventor: Thomas J. Cataldo
  Northrup-Grumman
  The patent above has the same objective and inventor as in contrast to existing dual array radar systems, the present invention employs a different principle. The principle is that it depends on a moving target creating a black hole (lack of signal) behind it, as well as when the target moves it both suppresses clutter at where its moved and exposes clutter (increased signal) from where it has moved.

The range doppler bins, with this technique have to be relatively small to be an effective technique.

Patent Serial Number: 4885590 Filed 4-14-89 Issued—12-5-89
  Entitled: Blind Speed Elimination For Dual Displaced Phase Center Antenna Radar Processor Mounted on a Moving Platform
  Inventor: Hassan; Moh'd A
  General Electric Company (Moorestown, N.J.)
  The patent above employs the dual displaced phase center antenna to eliminate blind speeds of targets but not to not to attain precisely there relative radial velocity and azimuth position in the presence of main lobe clutter.

SUMMARY OF INVENTION AND OBJECTIVE

This patent develops the mathematical basis and the physical radar principles and computer simulation results are the basis for the many techniques developed.

This invention considers the whole system from the application and mode of operation for all the essential elements of the system and the many possible implementations. Each part of the system is analyzed and optimized as much as possible to aid any techniques to attain the objective of the invention. The following are essential parts of the system (there are a number of supporting depending implementations for the optimization of the system) as follows:
  (a) Antenna Look Angle
  (b) Antenna Configuration
  (c) RF Frequency
  (d) PRF
  (e) Apertures
  (f) Beamwidth of antenna arrays
  (g) Groups of radar data to process
  (h) Weighting functions for clutter and target
  (i) Error reduction techniques
  (j) Antenna match considerations
  (k) Adaptive techniques for the cancellation of clutter (l) Management, control and optimization of implementation (m) Others The many techniques developed to attain the objective are unique and based on extensive mathematical development and computer simulation of radar principles and employing real radar data.

This invention is special synthetic aperture radar. It is a dual synthetic aperture radar. It is implemented in a special array (which may be formed by combining the two identical receiving arrays). The motion of the platform carrying the receiving arrays is such that on some number of succeeding radar pulses, the second antenna travels ½ distance between two receiving (displaced phase center antenna) the same space as the first antenna array (FIGS. 1 to 3—Basic Concept of DSARS). This is continued until the two synthetic arrays are formed. When the radar data is spectrally processed and subtracted from each other, the clutter in both arrays being identical are cancelled and the target being different is detected (FIGS. 1 and 2). The target parameters are such as the relative radial velocity and angular position are not yet determined. There is not enough processing at this point.

The object of this invention is to further process the radar data from two synthetic arrays and determine very accurately the range, relative radial velocity and angular position of the target (within the resolution of a doppler bin or better). The target may be in the presence of clutter or out of clutter. The essential contribution of this radar system is to be more cost effective than the more hardware system such as those using three or more receive arrays and much more capable and accurate than the delay line or monopulse systems

BRIEF DESCRIPTION OF DRAWINGS

FIG. 4 shows Slant Looking$\theta$ Antenna Arrays

FIG. 5 shows a Forward Looking Array

FIG. 6 shows an Upward or Downward Looking System

FIG. 7 shows different Antenna Configurations

FIG. 8 illustrates Techniques in Processing

FIG. 9 illustrates Zero-Fill Spectrum Analysis

FIG. 10 illustrates Low Clutter, Intermediate Clutter and High Clutter Processing Areas FIG. 11 illustrates Ideal displaced phase center antenna (DPCA) Depiction

FIG. 22A is a 32 Point Doppler Filter Diagram-1000 Hz where a) Odd and Even Pulse Sequences D=1 and b) Antenna-Doppler Diagram-Odd and Even Sequences D=1 and FIG. 22B where c) Odd and Even Pulse Sequences D=2 and d) Antenna-Doppler Diagram-Odd and Even Sequences D=2

FIG. 23 is a 64 Point Filter Diagram at 1000 Hz where:

a) Antenna Doppler Diagram-odd and even pulse sequences b) Odd and Even Pulse Sequence c) Combined Odd and Even Pulse Sequences-64 Pulse Sequences

FIG. 29 identified as TABLE V shows fine range Doppler bin (FRDB)-Vs-$\theta$ Error for Time Only displaced phase compensation antenna (DPCA) compensation (1000 Hz & 750 Hz)

fine range Doppler bin (FRDB)-Vs-$\theta$ Error for Pulse plus Time DPCA compensation (1000 Hz & 750 Hz)

fine range Doppler bin (FRDB)-Vs-Phase and Amplitude Response fine range Doppler bin (FRDB)-Vs-Change in Filter Amplitude and Phase Response FIG. 30 identified as TABLE VI shows Target Detection in High Clutter Area FIG. 31 identified as TABLE VII shows Possible $D\phi_R$-vs-Processing fine range Doppler bin (FRDB)

FIG. 32 identified as TABLE VIII shows GCR $$(|M/C|(\Delta \overline{K}^2 + \beta^2)/(\Delta K^2 + K^2)) - vs -$$

$$D\Phi_R \text{ and } (D\Phi_R)PHI \text{ ERROR} - vs - D\Phi_R$$

Figure 35:
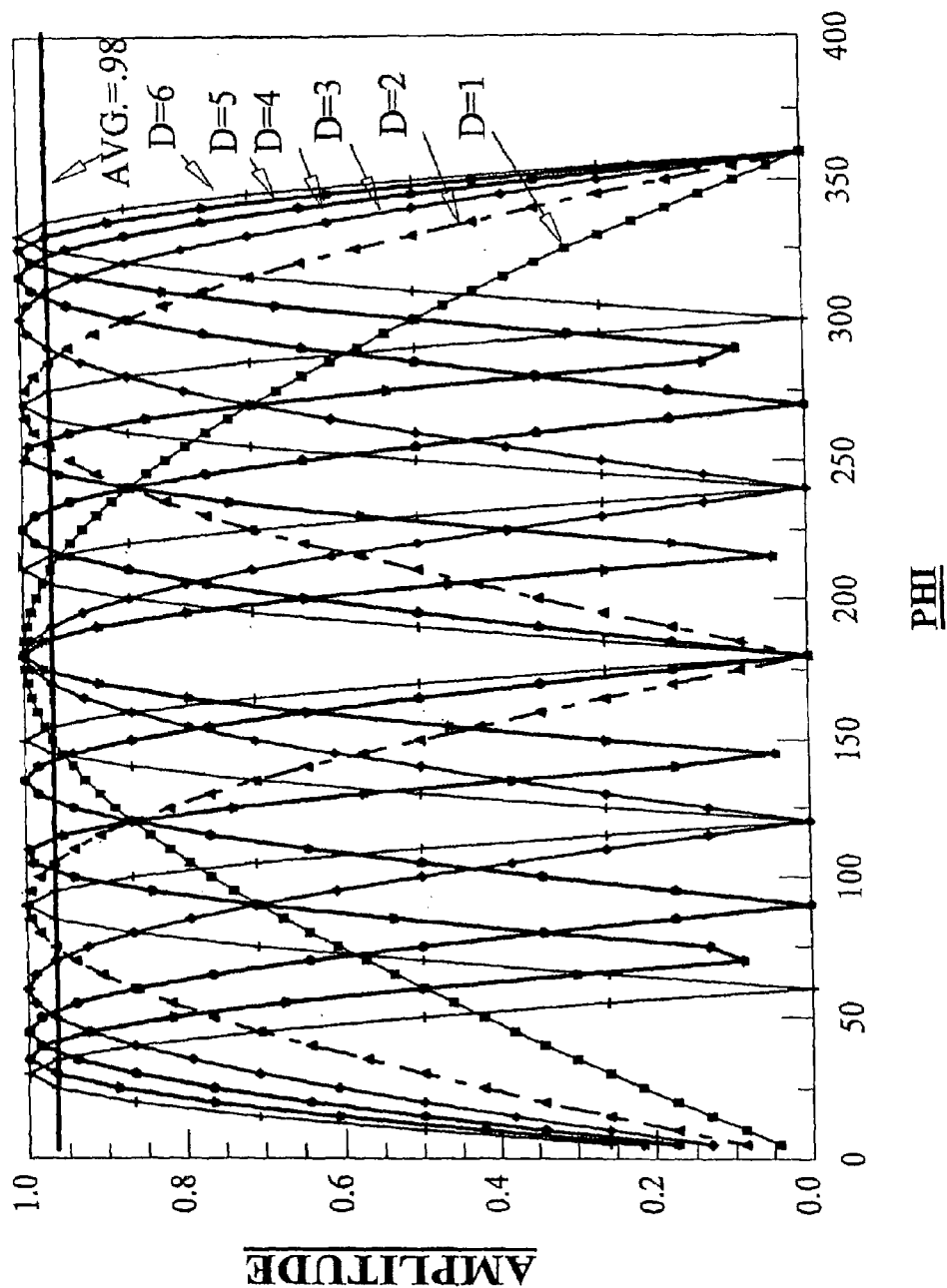

FIG. 33 identified as TABLE IX shows 64 Point Data-1000 Hz D=1 Regions of Clutter FIG. 34 identified as TABLE X shows 32 Point Data-1000 Hz D=1 Regions of Clutter for Odd and Even Sequence Data FIG. 35 shows Amplitude as function of $D\Phi_R$ for Multiple D (D=1 To D=6)

Figure 36:
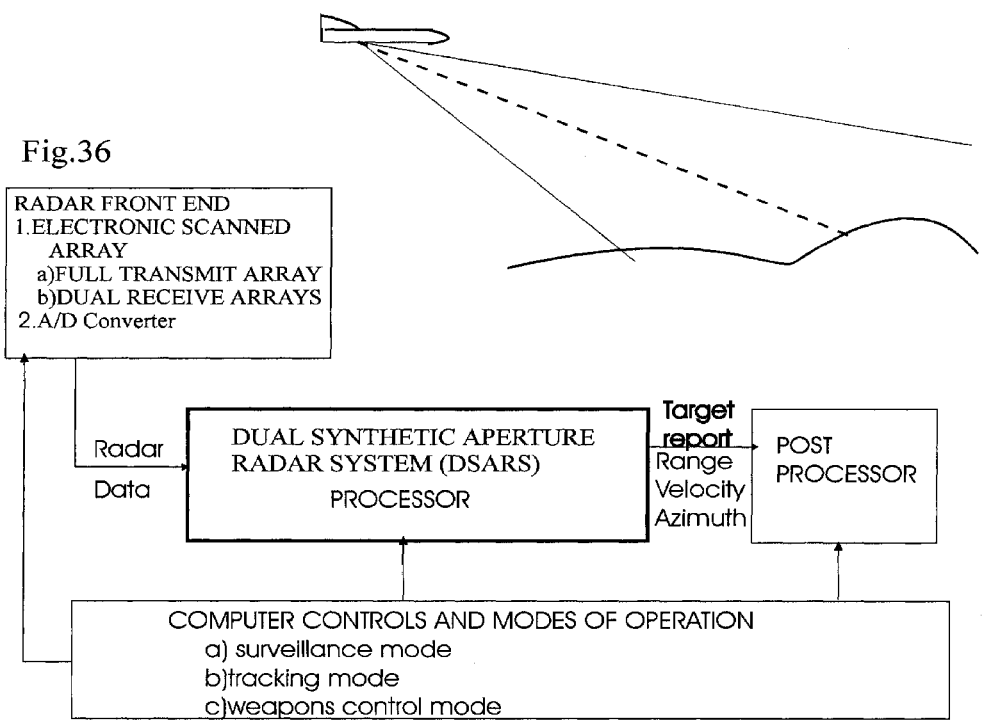

FIG. 36 shows a pictorial and system representation of the whole radar and the DUAL SYNTHETIC RADAR SYTEM (DSARS) portion.

DETAILED DESCRIPTION OF INVENTION

The present invention has broad applications to many technical fields for a variety of articles. For illustrative purposes only, a preferred mode for carrying out the invention is described herein, wherein a radar utilizes the platform to obtain vital detection of moving targets and there speed and azimuth.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

It is to be noted that the description of this disclosure are illustrative and cannot show all possible implementations that may be employed from the information in the disclosure by a person of ordinary skill in the state of the art. Therefore this disclosure is illustrative and not limited of the scope of the proposed invention and not limited in the scope of the role in obtaining the objective of this disclosure.

I. Basic Concept of a Dual Subarry DPCA Radar System

A. Ideal System

Classical DPCA technique takes advantage of the fact that the doppler shift in the frequency of the returns received from the ground is due entirely to the aircraft's velocity. Specifically, this shift which is manifest as a progressive pulse-to-pulse shift in the phase of the returns from any one range is the result of the forward displacement of the radar antenna's phase center from one interpulse period to the next.

For any two successive pulses, therefore, the shift can be eliminated by displacing the antenna phase center by an equal amount in the opposite direction before the second pulse of the pair is transmitted. The second pulse will then be transmitted from the same point in space as the first.

And how does one displace an antenna's phase center? Generally, the radar is provided with a two-segment sidelooking electronically steered antenna. The aircraft's velocity and the radar's PRF are adjusted so that during each inter-pulse period the aircraft will advance a distance precisely equal to that between the phase centers of the two antenna segments.

Successive pulses then are alternately transmitted by the two segments:

Pulse (n) by the forward segment, pulse (n+1) by the aft segment;

Pulse (n+2) by the forward segment, pulse (n+3) by the aft segment, and so on.

As a result, the pulses of every pair—e.g., (n) and (n+1)—are transmitted from exactly the same point in space.

The returns of each pulse are received by the antenna segment which transmitted the pulse. When the return from any one range, R, is received, of course, the phase center of that segment will have advanced a distance equal to the aircraft velocity, V, times the round-trip transit time, $t_r$, for the range R.

There is a wide clutter-free region in which to detect moving targets. Moreover, any target whose apparent doppler frequency falls within the mainlobe clutter can be periodically moved into this region by switching the PRF among several different widely separated values.

However, if the radial component of a target's velocity is so low that its true doppler frequency lies within the mainlobe clutter, no amount of PRF switching will move the target's returns out of the clutter. Consequently, in many applications a special "slow-moving-target' indication capability is needed. Conceptually, the simplest is Classical DPCA.

FIG. 36 shows a pictorial and system representation of the whole radar and the DUAL SYNTHETIC RADAR SYTEM (DSARS) portion. As indicated the front end of the radar is the electronic scanned arrays. This array consists of a full array on transmit and two half-length receive subarrays. The receive array data is amplified and converted to digital data and sent to the DUAL SYNTHETIC ARRAY SYSTEM which is the invention. It is processed there and moving targets are detected and there range, velocity and azimuth are measured very accurately. This target report is further processed for surveillance, tracking and weapons control mode. All these operation are computer controlled.

Figure 1:
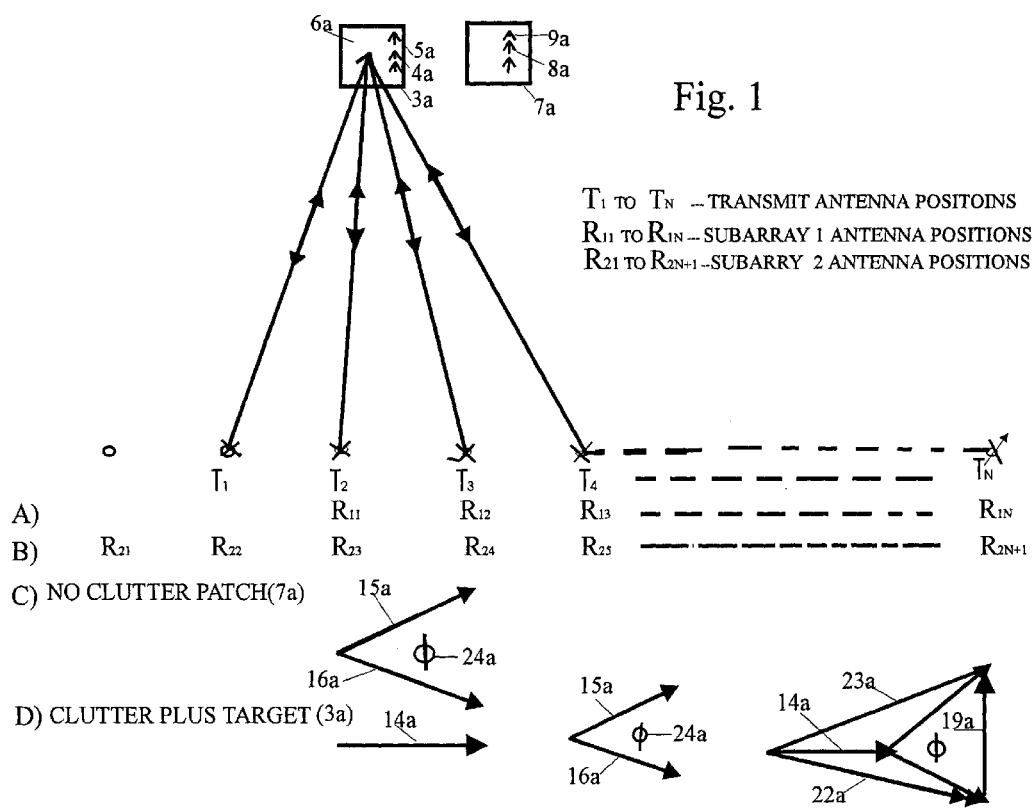
FIG. 1 shows an Ideal Dual Sub array displaced phase center (DPCA) Radar System
Figure 2:
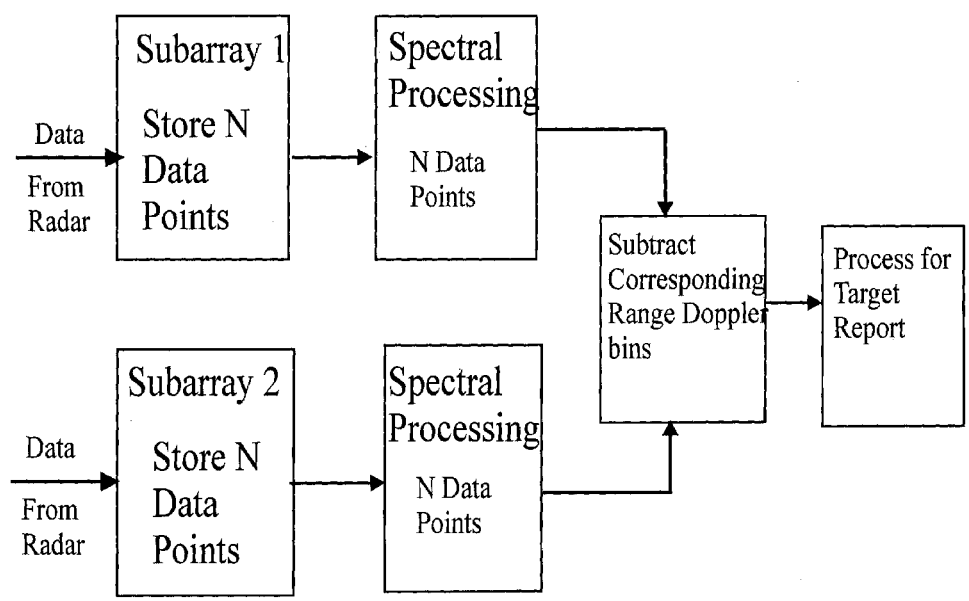
FIG. 2 is a Block Diagram of Ideal System

The ideal system as illustrated in FIG. 1 and FIG. 2 is a displaced phase center antenna (DPCA) radar system with a transmit antenna and two identical receiving subarrays. This is a modified DPCA system as will be described.

One of the basic concepts is a sidelooking radar antenna system where the antennas are mounted in line with the platform motion as shown in FIG. 1. The antenna arrays are moving with the platform motion. The antenna arrays move half the distance between the phase centers of the receiving arrays in one pulse repetition period (PRF).

In FIG. 1 the radar returns from patch 3a and patch 7a is a patch of ground returns observed by the radar receiver in a particular range doppler bin (RDB).

In radar patch 3a we have clutter 6a and a target moving from position to position 4a. In radar patch 7a we have no clutter and a target moving from position 8a to position 9a.

As shown in FIG. 1 the subarray 1 moves from position R1,1 to R1,N from time 1 to time N as subarray 2 moves from position R2, 1 to position R2,N from time 2 to time (N+1). Both subarrays move half the distance between subarrays for each pulse. This is the distance required to cancel clutter in a modified classical DPCA system.

After "N" pulses have been filtered for each range doppler bin (RDB) for subarray 1 and 2 and the corresponding range doppler bins, RDBs, are subtracted where the targets are detected as in patch 3a and patch 7a.

After the subtraction the clutter cancels but the target is moving, but remains in the same RDB, the amplitude of the target is the same but the phase changes allowing for the detection of the target as shown in FIG. 1, 1C and 1D. This phase change is proportional to the relative radial velocity of the target (Φ) and the target does not cancel. The objective of this disclosure is to find this relative radial velocity and from this the angular position of the target is determined. The returns from the no clutter patch 7a of FIG. 1 is represented by vectors 15a and 16a. This is the result of subarray 2 subtracted from subarray 1, vectors 15a and 16a represents the target vectors separated by a phase Φ (24a) which is proportional to the relative radial velocity of the target (target does not cancel; it has phase shift per pulse). This phase is measured and consequently the relative radial velocity and azimuth of the target is determined.

The returns from patch 3a contains clutter 6a and a target moving from position 5a to position 4a. The vector 14a shows the clutter return and vectors 7a and 8a indicating the target returns. The next diagram illustrates the addition of clutter vector 14a and the target vectors 17a and 18a since the clutter and target appear in the same range doppler bin. The angle (Φ)-24a cannot be measured directly because the clutter vector appears with the target vectors 17a and 18a. What is detected, vector 19a, is the resultant vector of vector 22a and 23a. Therefore (Φ)-24a is indeterminate from this simple analysis.

The object of this patent is to determine the angle (Φ) and thereby determine the azimuth of the target in the presence of significant clutter.

FIG. 2, Block Diagram of Ideal System, illustrates the ideal system processing required.

B Non-Ideal System

The non-ideal system will have many factors which will make it more difficult to determine the angle (Φ).

The two receiving antenna subarrays will in many cases not be in the ideal positions to cancel clutter. The conditions will not be ideal; in fact, there may be a significant difference from the ideal position. When this occurs, a phase correction is required for each doppler bin where the target is detected to make the clutter cancel.

Figure 3:
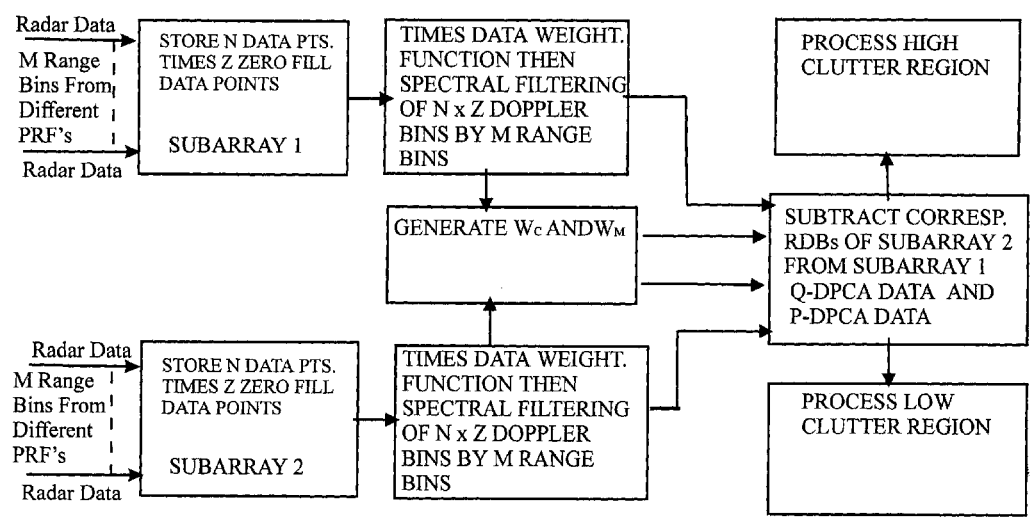
FIG. 3 is a Block Diagram of Non-Ideal System

The real system will have a number of sources or errors that have to be considered to at least reduce the errors. In the system, to have the required accuracy, the following is what has to be considered:

1. Antenna subarray positional error
2. Antenna subarray 1 and 2 not matched exactly
3. Sidelobes of Filters
4. Sidelobes of Antennas
5. Processing errors
6. Non-Ideal Clutter Returns (slightly moving clutter)
7. Non-Ideal Target returns
8. Motion Compensation
9. Isodop Correction
10. Others FIG. 3 illustrates the simplified processing for the non-ideal system showing the amplitude and phase correction role for the error sources.

Section III and IV will give a great deal more attention to the non-ideal system.

II. Systhetic Aperture Processing System Applicable Implementations

A. All Frequencies

1. The system is able to utilize all radio frequencies limited on the low end by the size of the antennas and on the high end by the practical limitations of short waves.

B. Employing Different Antenna Looking Capabilities

1. Sidelooking Dual Synthetic Aperture Processing System—

This is explained in Section IA, FIG. 1, where T1 to TN is the positions of transmission at time 1 to N, while R11 to R1N and R21 to R2N are the array 1 and array 2 receiver points respectively. This is the modified classical system, the thought of best mode of operation.

2. Slant Looking System

The angle looking antenna arrays are defined as the two receiving antenna arrays are mounted at an angle greater than zero to the motion of the platform and less than plus or minus ninety (90) degrees. Ninety (90) degrees being a sidelooking system and zero and 180 degrees is a front and rear looking system. The angle looking antenna arrays is illustrated for only one angle in FIG. 4. When the motion of platform 3d moves the platform from position 4d to position 5d, there the antenna array 2 moves from position 7d, and antenna array 1 moves from position 7d to position 1d. There is a distance. The system operation is similar as far as the sidelooking classical DPCA system where the second antenna is at the first antenna position on transmission and receiving. At the first position the first array transmits and receives and at second position the second array transmits and receives. At each position the clutter looks identical while a moving target does not since it moved between transmissions.

3. Forward Looking Antenna Array

The forward looking antenna arrays when the motion is forward as illustrated in FIG. 5. The antenna array 1 at position 1 is the same as antenna 2 at position 2. Therefore, this is the feature that keeps repeating itself at succeeding antenna positions. The clutter in these positions in the two receiving antenna cancel each other and target does not. If the antennas as can be seen in forward direction antenna 1 shadows antenna 2, they can be displaced in the height direction so this does not happen and a phase error correction performed as described in the previous paragraph.

Looking at radar patch A, and having the same antenna pattern C in all succeeding positions from 2 to (n+1), with the forward motion B, the clutter is seen as the same in these positions, the target is different as explained previously.

4. Forward Looking Antenna Arrays—Motion Upward

This is a forward looking antenna system with the motion as upward as illustrated in FIG. 5. The antenna array 2, position 2e, is the same as antenna array 1 when the platform motion A is upward as shown in Figure Therefore, in all succeeding positions from position 2e on, we have the conditions for the receiving antenna arrays having occupied the same position in space in two succeeding positions of the platform. Therefore, the clutter will cancel in the two receiving arrays and the target will not.

The platform motion A is upward and the radar patch B will be illuminated by antenna pattern C which will be the same for the antenna arrays 1 and 2 for every antenna position from 2f to (n+2)f as illustrated in FIG. 6. This is the synthetic aperture affect for the effective operation of the system.

C. Different Antenna Configurations

All Antenna Configurations, of course, have the transmitting antenna as part of the system. The transmitting antenna may be the two receiving antenna arrays added together. But whatever transmitting antenna system such as is utilized, it must be calculated into the whole system.

1. Two Equal Receiving Antenna Arrays

Arrays (FIG. 7A) A and B are built to be as exact as possible. Therefore, the elements 1g and the spacing Cg and the length Lg of each array should all be the same to give the best results for this application. The motion of the antenna arrays should be so that in some number of radar pulses the phase centers 2g of antenna array 3g and 4g obey the DPCA laws for canceling clutter as stated in Section IA. Spacing is determined by the application.

2. Two Receiving Antenna Arrays with Trim Antenna Elements (FIG. 7B)

The equal receiving antennas with trim antenna elements 3g are implements where the various possible motions of the platform is such that the antenna trim elements 3g are employed for a better match. Both receiving antennas always have to be kept the same length L with all trim elements. The trim elements 3g plus the antenna arrangement would make the phase centers 2g of the two equal receiving antenna arrays more closely occupy the same space on a number of succeeding radar pulses. The technique may be utilized to make the two equal receiving antennas of different length L.

3. Two Equal Receiving Arrays Formed Within an Adaptive Array (FIG. 7C). A few examples are illustrated in FIG. 7C (Antenna Configurations). The two equal receiving antenna arrays are formed from the large adaptive array 1gg to 3gg. This is determined in any way that your application is best implemented. But it is generally determined by the speed of the platform (Carrying the array) so that the phase center of antenna arrays will nearly coincide in some number of succeeding pulses. Overlapped arrays share the same antenna elements by forming digital adaptive arrays. With two receiving adaptive arrays much more flexibility and capability are able to be implemented on the two antenna arrays simultaneously. Anti-jamming techniques may be performed.

Shape antenna arrays in any way desired such as:

a) low sidelobes b) preferential sidelobes c) increase target change, decrease clutter change d) space time processing may be performed e) other The angle looking system was illustrated to the rights (FIG. 4); of course it just as well could have been to the left. The forward looking system was shown as forward looking; it just as well could have been rear looking.

The basic comment the two receiving antenna arrays may be mounted at any angle and a system may be formulated as indicated.

The implementation may also be with two dimensional arrays as well as a one dimensional array.

4. A Rotatable Scanned Electronically Array

This would make all azimuths accessible in one or a few antenna array systems.

5. Comments on Array Configurations

Many types of antenna configurations are possible. The basic idea is to formulate two equal receiving antenna arrays and operate the system as described. This is also possible with two dimensional arrays where the two dimensional arrays follow similar rules as described previously for the one dimensional array.

D. Single or Multiple Pulse Repetition Frequency (PRF)

The utilization of multiple pulse repetition frequency has the ability to resolve Doppler and/or range ambiguity which in many cases helps the process of obtaining the value of $\Phi$ the relative radial of the target. This will later be described in detail. In this disclosure only doppler ambiguity was used as an example but range and/or doppler ambiguity may be handled E. Single or Multiple Pulses of Different Transmission Frequencies or Add "D" Plus "E"

This is basically for the same reason as Section III(D). It is harder to implement than the method in Section III(D) but has an additional advantage of helping to overcome jamming and for resolving Doppler ambiguity as in Section III(D).

Combining "D" and "E" meaning both PRF and transmisson frequency may be changed between apertures for its associated advantages.

F. Range and Velocity Ambiguity Considerations

All pulse repetition frequency (PRF) radar systems have a limitation on determining range and velocity unambiguously. Single PRF radar systems are always ambiguous in range and velocity. If they are acceptable, one PRF may be employed, if not two or more PRFs have to be implemented to have an acceptable system.

The following [are] the equations in determining range and velocity ambiguity:

$$Ru = Ru1[(Ru2/Ru1 - Ru2)][Ru3/Ru3 - Ru2)] \ldots ]$$

$Ru$—Unambiguous Range of the System $Ru1$—Ambiguous Range of PRF1

$Ru2$—Ambiguous Range of PRF2

... —""""""

$Run$—Ambiguous Range of PRFn $Ru1-Ru2$—Difference in Ambiguous Range $Ru2-Ru3$—Difference in Ambiguous Range

... —""""""

$Ru(n-1)-Run$—Difference in Ambiguous Range $$Vu = Vu1[(Vu2/Vu1 - Vu2)][Vu3/Vu3 - Vu2)] \ldots ]$$

$Vu$—Unambiguous Velocity of the System $Vu1$—Ambiguous Velocity of PRF1

$Vu2$—Ambiguous Velocity of PRF2

... —""""""

$Vun$—Ambiguous Velocity of PRFn $Vu1-Vu2$—Difference in Ambiguous Velocity $Vu2-Vu3$—Difference in Ambiguous Velocity

... —""""""

$Vu(n-1)-Vun$—Difference in Ambiguous Velocity

Examples:

Vu1=50 feet/sec. Vu2=37.5 feet/sec.

$Vu = Vu1[Vu2/(Vu1 - Vu2)]$

Vu=50 feet/sec. [37.5 feet/sec/(50 feet/sec.−37.5 feet/sec.)]

Vu=150 feet/sec.

The ambiguous velocity of one PRF system went from 50 feet/sec. to 150 feet/sec. with a second PRF. As more PRFs are employed the unambiguous get larger (in general) until it is acceptable.

For the same PRFs chosen for the velocity example:

Ru1=80 miles Ru2=106 miles

Ru=Ru1×Ru2/(Ru2−Ru1)

Ru=80×106/(106−80)

Ru=328 miles

The ambiguous range increased significantly from a one PRF system to a two (2) PRF system.

G. Processing of Radar Data

When radar data is received, it is converted to digital data, stored and processed.

It is grouped together in various ways and processed. Here are a few ways, but by no means limited by these stated techniques. It is just meant to indicate some methods of grouping data and processing them. These methods of grouping and processing data are determined by the following:

Ease of processing

Aid in attaining objective of disclosure

Application

Others

1. Group Processing

This takes the radar data in groups, some subdivision of the total number of data points received and processes it in groups as indicated in FIG. 8

2. Sliding Window Processing

Sliding window processing is also illustrated in FIG. 8. The data in one aperture is taken in one group and processed. The next group to be processed is a number of data consecutive points to be added to the end of the first group and the same number of consecutive data points are dropped at the beginning. This is performed until all the data points are processed.

3. Circularly Correlated Data

Circularly correlated data is shown in FIG. 8. This is where the first set of data is processed and the data is shifted and first data point is replaced by the last data point and processed again. This continued until all "n" data groups are processed.

This data may be processed one data shift at a time. The second set shows data shifted two data points at a time and processed (FIG. 8).

Also as inferred, a number of data points may be shifted at a time and processed until all data is processed.

4. Comments on Processing Radar Data

As shown, all groups of data were taken from left to right (start to end) but just as well taken from right to left (end to start) in all processing techniques.

Combinations of batch, sliding window and Circularly correlated data may be performed to get the desired results of obtaining Φ relative radial velocity. Data may be taken in any kinds of groups and processed. Data does not have to be in any logical sequence. According to your application, you may process in any way desired to attain the objective since all data may be in storage before processing.

H. Data Weighting Function

In FIGS. 1 and 2, as illustrated, in processing data for the system, a spectral processing of the stored radar data is performed. Before spectral processing is performed a weighting function is applied to the data. This is a common technique in processing data to reduce spectral leakage and enhances other characteristics. Weighting functions may be used to reduce sidelobes of spectral filters (which is analogous to the sidelobes of the Antennas). Weighting functions may be used to enhance target energy and/or to reduce clutter energy.

One or a number of successively different weighting functions are applied to the basic radar data for aiding in the technique in finding a solution for Φ. The weighting function may be to obtain the following characteristics or trade offs in the following characteristics:

Reduce amplitude of clutter

Reduce mth order change in clutter where m=1 to 4

Increase amplitude of target

Increase mth order change in target where m−1 to 4

Reduce sidelobes of filters especially in the region of high clutter

Reduce the affects effects of clutter in sidelobes of antennas

Reduce the affects effects of mainlobe clutter in filter sidelobes

The above characteristics are most desirable for the figure of merit and least mean square technique and the other techniques.

The characteristics that would be most desirable for clutter and/or target correlation technique between apertures would be to have between apertures the target and clutter the ability to correlate as much as possible. This would involve making the filter in both apertures the same size (performed by weighting function) and reduce the time between processing of both apertures. This may be performed by shifting the data one quarter of the data points to the left (assuming Circularly correlated data) in the first aperture and processing and shifting the data in the second aperture one quarter of the data points to the right and processing. This would cut the time in half between the processing of data in both apertures since weighting functions reduce the affect about one quarter of data points at the beginning and end of the total number of data points as least significant in processing.

The weighting function required for the aperture to aperture clutter and/or target correlation technique should have the following characteristics:

Make filters in both apertures same size

Reduce filter sidelobes for clutter reduction

Reduce time between adjacent data in both apertures to as small as possible for best correlation Reduce change in target and clutter change from aperture to aperture for the best correlation possible.

I. Target Bandwidth Characteristics

Ground targets have bandwidth and not line frequencies and are approximately fifteen (15) hertz wide at the half power point which represents reality. Targets do not appear as single line frequencies for a number of reasons such as the following:

targets do not travel at uniform velocity for the total dwell time of the aperture acceleration or deceleration of targets motor vibrations tangential velocity aspect angle change radar beam bounce rough roads others Therefore when the target is detected according to how closely spaced the spectrum filters are the target is detected in one or a number of doppler filters.

The number of outer doppler filters the target detected therefore depends on the filter width, how closely spaced the spectrum filters are and the spectrum width of the target.

An example is a ground target turning (accelerating or decelerating) changing doppler bins within an aperture time. The number of doppler filters the target is detected are many.

J. Calculate Max-Max Amplitude of Target for Target Correlation Technique

Calculate maximum target amplitude in the range-axis by detecting the amplitude of target in the two or more range bins the target is detected in, and the maximum amplitude of target in the range-doppler bin where detected.

Based on the assumed parabolic shape of the pulse in the range axis interpolate the maximum amplitude of the target in the range axis. Of course any assumed shape of the target that best fits the application that may be implemented or other interpolation techniques.

Also calculate the maximum interpolated target amplitude in the doppler axis by detecting the amplitude of the target in the two or more doppler bins the target is detected from the maximum amplitude of the target in the range doppler bins where detected.

Based on the assumed parabolic shape of the frequency spectrum of the return from the target in the doppler axis, interpolate the maximum amplitude of the target in the doppler axis. Of course, any assumed shape of the spectrum of the target that best fits the application may be implemented.

To calculate the max-max of the target in both the Doppler and range axis, multiply the interpolated maximum value in the Doppler axis by the interpolated maximum in the range axis.

This will tend to reduce the error of calculating the ratio of the amplitude of the target in two different apertures for moving targets in range or doppler changes.

K. The Effect of Detecting the same Target in Different Range Bins and Different Doppler Bins 1. Detecting a Target in the Same Doppler Bins but Different Range Bins:

If there is no significant movement in the range for the target throughout the aperture time, target characteristics should be very similar such as doppler characteristics, amplitude and phase change for the different range bins. The clutter in each range bin will be different and the amplitude of the target is different in each range bin.

2. Detecting a Target in the Same Range Bin but Different Doppler Bins

If the range of the target is changing only slightly, then the frequency components of the target will be detected in two or more doppler bins. The target characteristics will vary according to the spectrum of the frequency components of the target, the center frequency of the filter and the width of the filter. If the filters are a filter away from the central frequency of the target, there will be a phase shift proportional to how far the filter is away and an amplitude attenuation.

If the filter is one filter away in the high frequency direction, the target phase shift will be phase shift equivalent to a positive phase shift of one doppler bin giving the target the appearance of having a larger relative radial velocity and the same angular position. This is to be dealt with in the processing.

Also, if the filter is one filter away on the low side, analogously, the target will appear to have a lower relative radial velocity and the same angular position.

L. Alignment of Antenna Patterns in a Multi-Aperture System

In a two or more aperture system where the antenna pattern is moved as well as the pulse repetition frequency is changed, it may be beneficial to have precise control of where the antenna pattern is moved so that the spectrum filters in both apertures are overlapping as much as possible. This would be most desirable in the clutter and/or correlation technique.

M. Computer Generated Radar Mapping

An aid to determining where and how the targets may be located and the nature and measure of clutter detected in the real radar will be correlated to the computer generated clutter. An example may be ground clutter cannot be low in mountainous areas. Clutter of large amplitude cannot be in a desert, etc.

N. Histographic Mapping

Computer generated map of where the radar shadows would occur is called a histographic map. Of course, no ground targets can ever originate from a radar shadow and of course if a target appeared in a radar shadow there would be no clutter to compete with the target and relative radial velocity can easily be determined O. Cartographic Mapping Computer generated map of the area illuminated by the radar to indicate where all the roads are located. For ground targets, it will aid in locating where targets are positioned. For ground targets cannot appear in water, mountains or areas in dense trees, etc. Where there is targets that are traveling at high speed they must be on roads and not in terrain not support such speeds.

P. Comments on Section II

Sections II A to P are dependent characteristics that apply to implementation of the system and aid greatly in attaining the objective when employed efficiently. Sections II M, N, and O are aids in the implementation of the system and are not necessary in obtaining the desired results.

III. Basic Operations, Equations and Methodology Fundamental to all of the Systems Employed in this Invention The mathematical fundamental equations, the radar analysis and the computer simulation for all many systems to obtain the objective of the invention are presented. The many techniques are as follows:

1) Basic System is with one aperture, one PRF and one transmission frequency. If the ambiguous range and or velocity is to be increased another PRF and/or transmission frequency is implemented in the second aperture. The basic techniques that are employed are the following:

a) Change in time ($\Delta T$)
   b) Change in frequency ($\Delta F$)
   c) Change in delay ($\Delta D$)
   d) Interleaved pulses
   e) And/or any combinations of the techniques above and correlated 2) Figure of merit system (FM) is employed with the basic system especially with $\Delta T$ and $\Delta F$ techniques.

3) Least Mean Square System (LMS) is employed with the basic system especially with $\Delta T$ and $\Delta F$ techniques.

4) Same as basic system but with dividing up the input set of of pulses of data into a number of interleaved data sets.

5) Same as 4) except that with each set of interleaved pulse the aperture is changed, the same PRF and transmission frequency. The second aperture overlaps the first aperture.

6) Same as 5) except the transmission frequency is changed with each aperture change. The second aperture overlaps the first aperture.

7) Same as system 1 except with same PRF and same transmission with a different aperture and antenna position. The second aperture overlaps the first aperture.

8) Same as 7) except in the second aperture the PRF is changed.

9) Same as 7) except in the second aperture the transmission frequency is changed.

10) Same as 7) except in the second aperture the PRF and the transmission frequency is changed.

A. Basic System Parameters

The system is best understood and explained by taking a specific example to illustrate the principles, equations and processing involved but is not limited to this example. The following is a sidelooking radar with the following radar parameters are taken as the specific example:

1) Operational Radar Frequency is 10,000 Megahertz
2) Wavelength is 0.1 foot
3) First Pulse Repetition Frequency (PRF) is 1000 Hertz
4) Second Pulse Repetition Frequency (PRF) is 750 Hertz
5) Beamwidth of Transmit Antenna is ⅔ degree
6) Beamwidth of First and Second Subarray ⁴⁄₃ degree
7) Length of Transmit Antenna is eleven (11) feet
8) Length of First and Second Subarray is 5.5 feet
9) Velocity of the platform is 500 feet/second
10) Nominal antenna pointing angle is 90 degrees from direction of motion
11) Electronic Scanned Array (One Dimensional)
12) Ambiguous Velocity of First PRF—48 miles/hr
13) Ambiguous Velocity of Second PRF—32 miles/hr
14) Unambiguous Velocity—160 ft/sec.—96 miles/hr
15) Unambiguous range of first PRF—83.3 miles
16) Unambiguous range of second PRF—100 miles
17) Unambiguous range of system—320 miles
18) Basic 64 Pulse Operation
19) Detecting ground targets and measuring their relative radial velocity and angular position and range very accurately.

B. Clutter Real Bandwidth Considerations with an Electronic Scanned Array (Mounted In-Line with the Platform Motion)

The transmitting antenna beamwidth together with the receiving antenna beamwidth determines the overall resulting beamwidth of the radar antenna system. The system performs well with many beam-widths as long as there is no significant clutter frequency fold over in the main lobe of the antenna system.

The antenna beam-width of the antenna system, the velocity of the platform (antenna mounted on) and the pointing angle of the antenna system are the main factors that affect the bandwidth of the main beam clutter pattern. The equation that governs it, is as follows:

$$C_{BW} = [2V_P(\text{COS}(\ )+ \overset{.}{\text{C}})) - \text{COS}(\ ) - \overset{.}{\text{C}}))] / (9\text{SIN}\Psi)$$

$$C_{BW} \approx (2V_P/\lambda)(2\Delta\Psi)$$

Where $2\Delta\Psi = (\Psi + \Delta\Psi) + (\Psi - \Delta\Psi)$ $\Psi$—pointing angle of antenna from the direction of the platform in radians $V_p$—Velocity of the platform $\lambda$—Wavelength of transmission frequency Substituting in the equation for CBW we have the clutter bandwidth equal to 116 HZ.

For sixty-four data points at 1000 HZ the number of large range Doppler bins (LRDBs) per beamwidth is 7.4. The number of fine range doppler bins FRDBs is $(7.4 \times 4 \approx 30)$ thirty in the main beam of the antenna.

For thirty-two data points at 500 HZ the number of LRDBs per beamwidth is 7.4, since the filters are the same width as the sixty-four data point case. The phase shift per filter is twice that of 64 data point case.

C. Zero Fill Spectrum Analysis

The zero fill spectrum processing allows for the basic sixty-four (64) data points (I and Q data) that would normally be processed and yield 64 spectrum lines to yield more spectrum lines. One way to perform this spectrum processing is by Fast Fourier Transfer (FFT). If a greater number of spectrum lines were required or desired then the method of obtaining this would be to take the 64 data points and filling or adding zeros (0), the number added would be equivalent to the number of spectrum lines required plus 64 (original data points).

For example, if 256 spectrum lines were desired then 192 zeros would be tagged onto the 64 original data points to make a total of 256 data points. Spectrum processing would be performed on all 256 data points and the result would be 256 spectral lines.

As shown in FIG. 9, "$1i$," shows the spectrum lines due to the original 64 data points and $2i$ shows all other lines are due to the add zero fill data. As observed in the diagram the number of spectrum lines corresponds to the number of zero fill data. The resolution of each doppler filter has not changed but spacing of the filters has decreased to one-quarter, inversely proportional to the total number of data points. The 64 data points of the data is shown and the spectrum of the original 64 data points plus that of that of the 192 additional spectrum lines.

The significance of this operation is the spacing of the doppler filters has decreased by a factor of four. The application and usefulness of this operation will be evident in the following write up in this disclosure.

D. DPCA Theory and Application and Example

1. Detecting A Moving Target (MT) Signal Processing and Measuring its Velocity in the Low Clutter Region.

FIG. 11 shows a conceptual diagram of the basic approach used in this technique. On transmit, the full phased array is used to illuminate the target area of interest, but the signal echoes are received through two adjacent sub-arrays into which the full array is subdivided. These sub-arrays are shown as nominally aligned with the platform's velocity vector, although actually significant crab and pitch angle generally exits between the array axis and the direction of motion. The clutter spectrum as seen through any one of the two sub-arrays is virtually identical, and is determined by the product of the full array pattern on transmit multiplied by the broader sub array pattern on receive. A typical spectrum is sketched in FIG. 10.

Looking at FIG. 10, notice that the primary (i.e., non-aliased) clutter spectrum is divided into two multiply connected regions. In the low frequency region "$2j$," the clutter energy within a single range-doppler cell is large enough to mask or seriously degrade the detection of moving targets, whereas in the region labeled "$3j$" the clutter is sufficiently small so as to be virtually indistinguishable from system receiver noise. One of the basic moving target detection philosophy employed is to perform simple envelope and threshold detections on those range-doppler cells falling in the pulse doppler region, while more sophisticated interferometry techniques are employed in the clutter region. In the pulse doppler region phase ($\Phi$) can be measured directly as the phase difference between the two target vectors.

2. Detecting Targets in Clutter Region (Region $2j$ of FIG. 10 and $4j$ is the Region within the Bandwidth of the Antenna)

Normal Pulse Doppler processing is not able to reliably detect moving targets in the clutter region. For those filters within the clutter subvector output of the spectrum processing (FFT), the unique phase relationship between clutter returns in adjacent phase centers is exploited to cancel these signals while permitting moving ground target echoes to persist. In order to understand this process, consider the nature of echoes from motionless ground clutter as received through any pair of subarrays. FIG. 11 shows a two-dimensional simplification of the ideas involved. FIG. 11 illustrates a two dimensional simplification of the Displaced Phase Center Antenna (DPCA) ideas involved, "$1_k$" being the X-axis and "$2_k$" the Y-axis. Since "$4_k$" is transmit phase center for the full array at t=0, the forward receive phase center is (R1) "$5_k$".

3. DPCA Principle Involved in the Dual Receiving Array System

The path length is the following:

L (R1, t=0) equals the path length of discrete clutter from point "$4k$" to "$5k$" through point "$3k$" which is located at point (X,Y) from origin "$4k$".

The path length of the same discrete clutter from "$4_k$", the transmit phase center, at t>0 where "$7k$" is the velocity of the platform is such that the array travels the distance between points "$4_k$" and "$5_k$" (half the length between receiver sub arrays). We have the following path length to the second receive sub array (R2) "$6_k$".

$L(R2, t>0)=L(R1, t=0)$ The same path length.

This may be seen easily in FIG. 11. Hence we have:

L(R1, t=0)=L(R2, t=D/2V) The same path length

D=the distance between the receive sub-arrays ("$5_k$" and "$6_k$")
V=the velocity of the platform
The time (t) is to travel the distance D/(2V).

Figure 14:
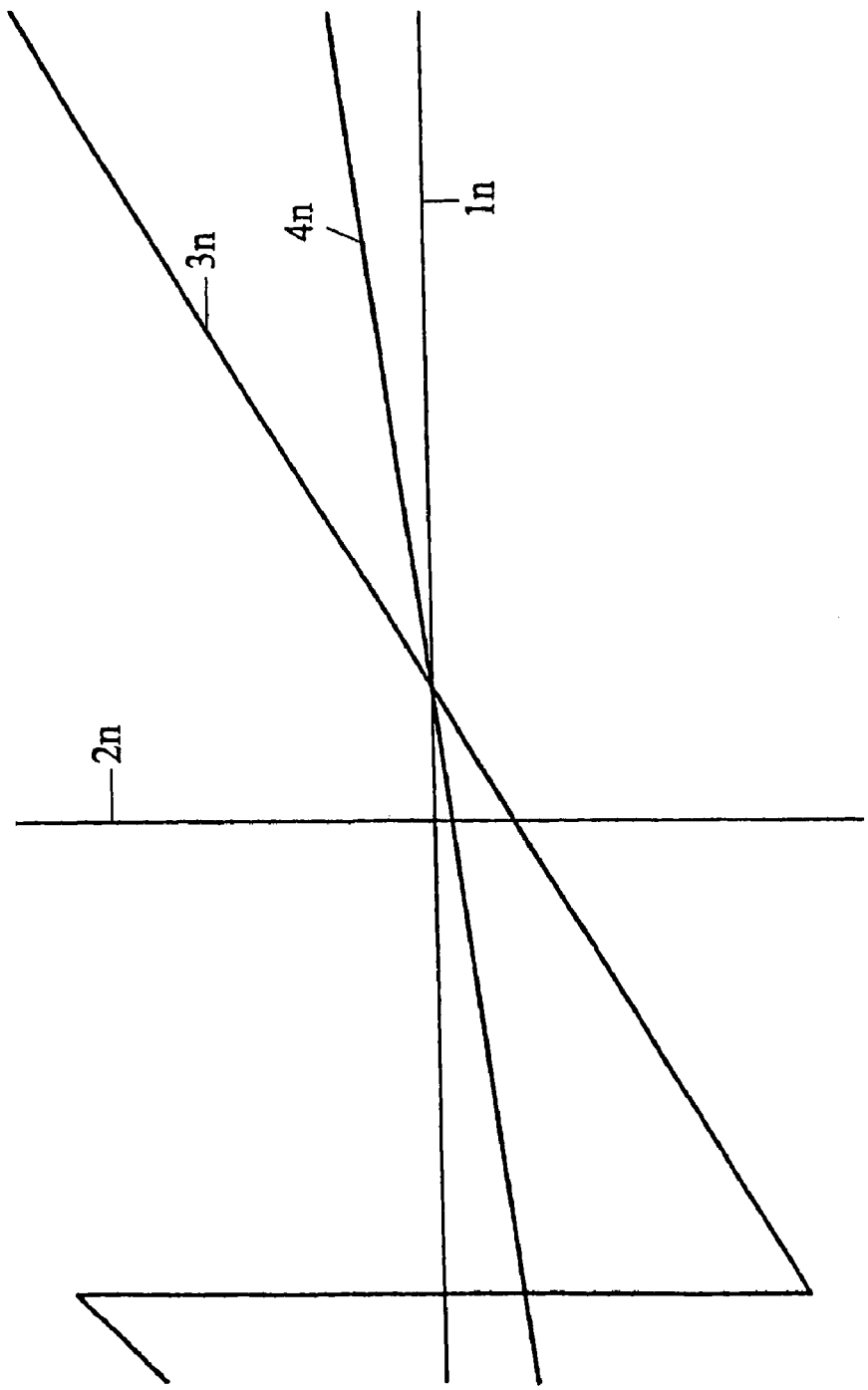
FIG. 14 shows Time Only and Pulse Plus Time DPCA Compensation
Figure 15:
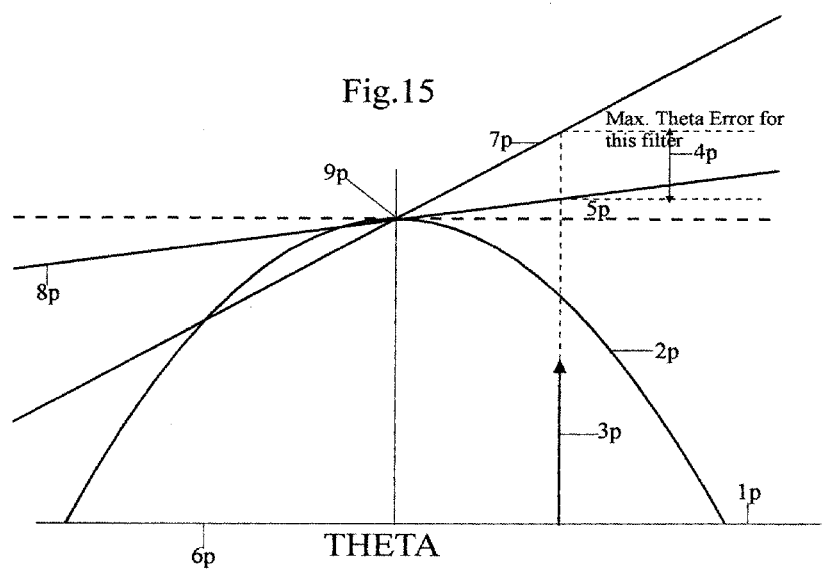
FIG. 15 shows Time only and Pulse Plus Time DPCA Compensation Aligned With the Filter Response of Clutter

FIG. 15 illustrates the filters with the phase slopes "7p" (T1=D/2v) and "4n" (T1−k/fr) from FIG. 14 superimposed (8p of FIG. 15). With or without the time domain correction, the correction is exact at the center of the filter "2p". Also shown is the difference in error as "4p" for T1=D/2V and "5p" for T1−k/fr. A relatively large difference in error for a discrete clutter "3p" which making the combination of time domain and phase compensation more effective. 9p is the center of filter where the error is zero (0) regardless of what delay is implemented. 6p is the theta axis and the vertical axis is the amplitude of the filter response.

This relationship is the fundamental basis for all displace phase center processing techniques, of which this is one example. It says that the signal received from a scatterer at (X,Y) through the trailing phase center R2 is simply a time-lagged version of the signal received through phase center R1, with the lag equal to the time it takes the aircraft to fly one half the distance between phase centers. Furthermore, since the value of the lag does not depend on the location (X,Y) of the scatterer, this relationship holds for all scatterers, which includes all main lobe clutter for a low PRF radar. Conceptually then, we could cancel all stationary clutter echoes by simply sampling the outputs of R1 and R2 at times t and t+(D/2V) respectively, then subtracting the one signal from the other. A true moving vehicle target, on the other hand will change its (X,Y) position during the elapsed time D/2V, thereby changing its round-trip path length relative to that of a fixed scatterer. Most such motions will cause the relative phase between the R1 and R2 receptions to be non-zero, hence complete cancellation will not occur. In fact, if the path length changes by an odd integer multiple of one-half wavelength, constructive interference will actually double the amplitude of the signal and four times the power of the "canceled" target signal.

The previous discussion suggests that the way to implement a displace phase center concept is to choose a radar PRF whose interpulse period is equal to the ideal lag D/2V, that is, PRF=fr=2V/D. For this case, we simply combine consecutive pulse returns from phase centers R1 and R2 in order to cancel clutter, and then follow up with sufficient coherent integration to achieve the desired signal-to-noise ratio. Unfortunately, such an approach imposes severe limitations on the overall system design. In the first place, it may result in a highly inefficient utilization of a peak power limited transmitter whose optimal PRF may be several times higher than the "matched" PRF. Although this may be circumvented to some extent by choosing a higher PRF whose interpulse period divides the value D/2V, the basic problem still remains that the allowable PRF values are determined by relatively uncontrollable parameters of the platform and antenna. This fact clashes directly with the need to choose multiple PRFs according to some pattern that leads to the resolution of doppler (and in some systems, range) ambiguities or both.

4. P-DPCA Compensation (P-DPCA) Operation

The approach taken in this technique is to ignore the "matched" PRF requirement, choosing PRFs only on the basis of efficient transmitter utilization and ambiguity constraints. The displaced phase center clutter cancellation is achieved under these conditions using signal processing techniques, which will now be described. The basic idea is to "synthesize" the desired lag compensation between phase centers by a combination of time and frequency domain processing. The PRFs for this technique are generally several times as large as the ideal matched PRF, 2V/D. Consequently, several radar pulses will be transmitted and received during the time period D/2V. Dividing this time by the radar inter pulse period fr gives frD/2V, the number of actual radar pulse repetition intervals (PRIs) during one desired lag time. If this number turns out to be an integer such as 2, then a simple way to achieve the DPCA condition is simply to "skip over" the first 2 pulses in the output from the trailing phase center R2. This is trivially accomplished in the programmable signal processor by simply offsetting the addresses of data memory references by two locations. In order to preserve the batch size for subsequent spectrum processing (FFT), 2 extra pulses would be added to each data processing interval. In this technique, this number of inter pulse periods is almost never a pure integer. Whatever the value might be, it is computed in real time by the system and rounded to the nearest integer value. This integer is then used to offset the memory addresses on the leading phase center, as described earlier. This process leads to a residual uncompensated lag whose process leads to a magnitude which is less than or equal to half the radar inter pulse period. The technique used to compensate for the remaining fractional inter pulse lag is based on the fact that a time domain lag "t" is equivalent to a linear phase versus frequency exp (j2Πft) superimposed on the Fourier Transform of the lagged signal. The actual implementation of the compensation involves first performing an N point FFT on each of the received phase centers after the integer time slip on the trailing channel. This gives us access to the Fourier transform of the signal at a discrete set of frequencies spaced by fr/N. Let $f_k$=Kfr/N be the center frequency of the $K^{th}$ doppler filter. Then the relative phase between receiver channels from main lobe clutter lying within this filter will be exp (jkfrT/N) at the center of the filter. The basic idea then is to multiply the filter output in one of the channels by the conjugate of the predicted phase value for that filter. The two channels are then subtracted, leading to excellent cancellation of the clutter.

5. Q-DPCA Compensation (Q-DPCA)

Figure 12:
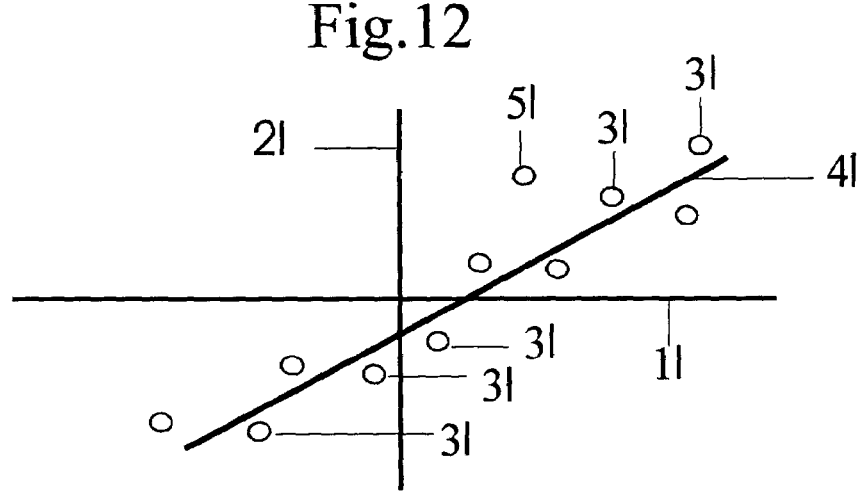
FIG. 12 illustrates Clutter and Mover Definition

FIGS. 12 through 15 illustrate some of the ideas discussed above. FIG. 12 shows what the phase relationship between receiver channels would look like if no attempt were made to correct for the lag, either by pulse reindexing or by doppler filter corrections. The slope of the ("4*l*") linear phase-versus-frequency, where 1*l* is the frequency and 2*l* is the phase, locus is proportional to the lag value D/2V between channels. Note also in FIG. 12, "3*l*" that individual clutter cells are represented as scattered about the line rather than lying right on it. This is due to the uncorrelated noise that also lies within each range/doppler cell and perturbs the phase of the clutter signals. It is interesting to note that the larger the clutter cross-section within the cell, the more closely the relative phase will conform to the line. Since distance from the line determines the residual phase error that will remain after pre-filter compensation, and this error determines cancellation ratio, this illustrates the fact that the larger a scatterer is, the greater will be its cancellation. In fact, if hardware imperfections in the radar are neglected, the cancellation ratio would be in direct proportion to the size of the scatterer, and all clutter would cancel to the same residue level. As will be shown later, the previous statement also neglects the effect of non-zero filter width, since exact phase compensation holds only at the center of the filter.

Figure 13:
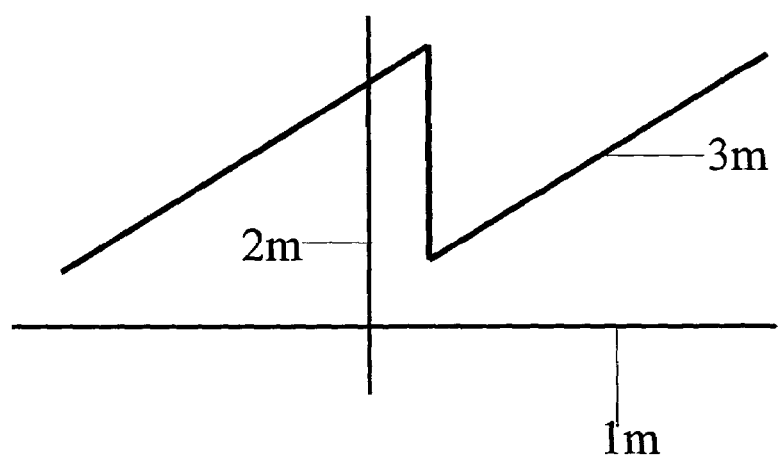
FIG. 13 illustrates Non-Ideal Spectrum

FIG. 12, "5l", also illustrates the interchannel phase for a typical moving target signal. Since it lies well off the clutter phase line, it will not cancel like clutter will when phase-compensated subtractions are performed in each doppler filter. FIG. 13 shows actual data for uncompensated mainlobe clutter data. Averaging the phase in each filter over a number range cells so that the linear nature of the lag induced phase is evident so that the scatter about the straight line has been drastically reduced. FIG. 12 and FIG. 13 indicate another typical characteristic of real world data in the fact that the phase-versus-frequency line does not pass through the origin. This non-zero intercept is not predicted by the simplified theoretical development here, but is due to the somewhat imperfect nature of platform motion compensation. Such imperfections are estimated on the signal processor from range averaged ensembles of clutter data such as that shown in FIG. 13, 2m is the amplitude and 1m is the frequency and 3m is the response, and are accounted for in the compensation weights applied to each filter prior to cancellation.

6. Results Of Q-DPCA Compensation versus (P-DPCA). In looking at FIGS. 12 and 13, it might seem as though we could cancel clutter using phase corrections alone without having to time slip the trailing phase center by several pulses. It will now be shown that such an approach results in severe limitations on the cancellation ratio that can be achieved. To see this, first examine FIG. 14, which illustrates the effect of slipping the trailing phase center by $k^{th}$ interpulse period. The initial phase slope is proportional to T1=D/2V, whereas that of the time slipped signal is proportional to T1−k/fr. Now zero-in on a single doppler filter for which the phase has been corrected to the value at the line of the filter center frequency. FIG. 15, where 1m is the phase response and 2m is the amplitude response, illustrates the filter with the two phase slopes from FIG. 14 superimposed. With or without the time domain correction, the phase correction is "perfect" at the filter center ("9p"). Notice, however, away from this center we begin to build up a small but measurable phase error. Consider a discrete piece of clutter ("3p"), whose doppler frequency places it a significant fraction of the filter's width away from the center. Without pulse delay ("7p"), compensation prior to the FFT, the phase error between channels after phase correction will be proportional to the original lag T1=D/2V (FIG. 15 "4p") between phase centers. For a displacement of one half the filter spacing and lag T1=k/fr (FIG. 15 "5p" the resulting phase error will have a value $\Phi_O$, given by $\Phi_O=\Pi D f_r/2NV$.

For typical parameter values, TDPCA—FIG. 15 "7p", this error would limit cancellation of the scatterer to somewhere between 15 and 20 db. The signal that has been pulse plus time-domain corrected, FIG. 15 "5p"—P-DPCA however, suffers a much smaller uncompensated phase error (T1−D/2V). In fact, the worst possible case in which the fractional portion of the lag is exactly one-half the interpulse period lead to a phase error $\Phi_1$ given by: $\Phi_1=2\Pi/N$ Typical values of the improvement factor 4v/(frD) in the above equation imply a reduction of as much as five to one in phase error, which equates to an increase of 14 db in cancellation ratio. The increase will be even more dramatic for lag values that are closer to being integer values, so that the fractional lag is less than 0.5 interpulse periods. By this analysis we can conclude that the pulse plus time domain lag correction is an essential precursor to post FFT frequency domain compensation. This will be especially true for large discrete clutter, where large cancellation ratios are required.

The analysis presented so far has been based on the idea of a simple lag correction using a combination of time domain and pulse "slipping" and post-FFT implementation of this technique involves estimation of the slope and intercept of the interchannel phase line. This is accomplished by a combination of micro-navigation or motion compensation calculations and regression techniques based on range averaged cross-correlations between main lobe clutter in adjacent phase centers. Having estimated the mean clutter phase line, cancellation phase values are picked off this line for frequencies corresponding to the center of each Doppler filter. A separate amplitude imbalance estimation is performed to derive a relative gain correction to be applied uniformly across all filters in one of the channels. This latter correction accounts for uncertainties in the precise gain of each receiver channel.

7. Weighting Function for Clutter ($W_C$) and Weighting Function for Target Analysis ($W_M$)

The actual approach used in this technique differs in one significant aspect from that described above, and that is in the method used to determine the phase and amplitude weights to be applied to each doppler filter. The motivation for departing from the simple theory presented is the fact that small imperfections may exist in the hardware used which leads to small but significant departures from the linear phase, constant gain model assumed. For example, suppose that the nominally identical antenna amplitude and phase patterns of adjacent sub arrays show small variations from one another due to manufacturing tolerances, differential radome effects, failed phase shifters, etc. This lack of a perfect "template match" between channels will manifest itself as an amplitude and phase "ripple" in azimuth, which by virtue of the one-to-one correspondence of azimuth with doppler for main lobe clutter will result in a superposition of this ripple on the nominally linear inter channel phase and constant gain ratio per filter. To account for such real world effects, a more robust approach to weight estimation has been employed. Basically, we remove the "apriori" assumption of a known model for filter-to-filter variation in the phase and amplitude of mainlobe clutter between channels. Instead, we seek an independent solution in each filter for the "best" complex weight unique to that filter which maximizes clutter cancellation. A separate solution is then obtained for each Doppler filter, which intersects a significant portion of the main lobe clutter spectrum. The optimality criterion employed is the minimization of the mean squares residues after cancellation when averaged over all range bins within a range swath.

In general, small range modes will utilize the entire swath as the range ensemble, while large range mode swaths are subdivided into contiguous sub-swaths each of which leads to an independent solution for cancellation weights.

Consider such an ensemble consisting of M consecutive range bins and N Doppler filters. Let Unk and Vnk be the complex signals at the output of the $k^{th}$ Doppler filter in the $N^{th}$ range bin for the leading and trailing phase centers respectively. The goal of weight estimation then is to find a complex number Wc unique to the kth Doppler filter that satisfies the following complex least mean squares condition:

$$W_C = \left(\sum_M^{M=1} |Vnk|^2\right)^{-1} \sum_M^{M=1} u_{nk} V_{nk}^*$$

$$\sum_M^{M=1} |u_{nk} - W_C V_{nk}|^2 = \min(W_C) \sum_M^{M=1} |u_{nk} - W_K Vnk|^2$$

-continued $$\sum_{M}^{M=1} |u_{nk} - W_C V_{nk}|^2 = \min(W_C) \sum_{M}^{M=1} |u_{nk} - W_K V_{nk}|^2$$

The well-known solution to this problem is given by:

$$W_C = \left(\sum_{M}^{M=1} |Vnk|^2\right)^{-1} \sum_{M}^{M=1} u_{nk} V_{nk}^*$$

Equation for Wc represents the solution to be implemented in a programmable signal processor for note that it is optimal from a phase and an amplitude point of view, and so replaces both the linear phase regression and the gain imbalance estimation of the previously described approach.

The nature of the least mean squares solution described above necessitates two passes through the data. In the first pass, the two statistics are generated cumulatively for each doppler filter lying in mainlobe clutter. The ratio of the statistics is calculated between passes to determine the optimum weight Wc for each filter, after which the second data pass proceeds to use these weights to perform clutter cancellation. Since weight estimation is performed on the very same data set on which the weights will be used, there is no question of the optimality of these weights in a range averaged sense.

The above equations may be employed for the optimization of weights for targets (Wm) as well as for clutter. The solution of system equations will give a solution for the azimuth angle for the target, and the corresponding clutter filter ($W_C$) that is at this same azimuth will be the weight for the target Wm. This will be utilized in the system objective.

As indicated by the previous discussion on DPCA techniques and evaluation, the importance of getting close to a matched PRF and to detect the target and/or clutter as close to the center of the filter as possible to reduce the effect of mismatch. This will be manifest in the subsequent development of system solutions. A tradeoff of PRF for match as close as possible with other factors as discussed previously should be attempted.

8. DPCA Calculations Based on Basic Parameters for the Radar Assumed for the Purpose of Illustration The basic radar assumed for the purpose of illustration is tabulated in section III A. Basic System. The length of transmit antenna is eleven (11) feet and the length of the two receive antenna sub arrays are five and one-half feet (5.5') each. Therefore the travel length for ideal cancellation of clutter is two and three quarter feet (2¾ feet).

Assuming the platform has a velocity of 500'/sec. and the first PRF is 1000 HZ, the number of pulses for best cancellation of clutter will be calculated as follows:

$$V_p N(1/PRF) = Dist$$

$$V_p \times 5 \times 1/1000 \text{ HZ} = 500 \times 10^{-3} \times 5 = 2.5 \text{ feet}$$

Vp—Velocity of platform
N="5"—number of pulses of 1000 HZ=PRF
Dist—Distance Travelled 2.75' feet is the ideal distance to travel to cancel clutter and is therefore 0.25' short which is half the distance between the fifth (5) and sixth (6) pulse.

The calculation for the T-DPCA of half the distance error (maximum error on each side of center frequency as described in the previous paragraphs is the following):
fr—Pulse Repetition Frequency—PRF-1000 HZ
D—Distance between sub arrays-5.5 feet
$V_p$—500 feet/second
N—5 pulses Substituting in this basic equation derived in the previous paragraphs we have the following:

MAX Phase Error $= \Pi D f_r / 2NV = 3.14 * 5.5 * 1000 / 2 * 64 * 500$ $M_{PT} = 0.270$ Radians $= 15.4°$ Performing the calculation of the maximum phase error for the P-DPCA we have the following:

Mpp – Maximum Phase Error =
$\Pi / 2N = 3.14159 / (2 * 64) = 1.4$ degrees $= .0245$ radians The ratio of $(M_{PT}/M_{PP})=11.0$. The significance of this ratio is that the P-DPCA technique has less than one-tenth the error of T-DPCA technique.

The calculations for Q-DPCA at D=6 is the same as for P-DPCA but is opposite in sign since it is on other side of the pulse midway between the pulses.

$M_{PQ}$–Maximum Phase Error=–1.4 degrees=–0.0245 radians

The same calculations will now be performed for the PRF of 750 HZ. The number of pulses for the P-DPCA is four (4) instead of (5) as in the 1000 HZ case. The results of this calculation are as follows:

T-DPCA–$M_{PT}$=($\Pi f_r D$)/($2NV_P$)=0.202 radians=11.6 degrees

The factor of "≈¼" in the P-DPCA equation is determined from the following:

Distance traveled per pulse–$D_p$=500'/sec×1.333 MS per=0.665'/pulse

"4" pulses=0.665×4=2.66'

2.75'–2.66'=0.09'

0.09'/0.665 pulse=0.135≈⅛ or ⅛ distance between two pulses or ¼ of ½distance between pulses or 0.270.

Therefore P-DPCA is as follows:

$M_{PP}$=(3.14/(2*64))*0.270)=0.006 radians=0.38 degrees

The ratio of $(M_{PT}/M_{PP})$=11.6o/0.38=30.5

The significance is that the P-DPCA technique has less than ⅟30 of the phase error of the T-DPCA technique at 750 HZ.

The Q-DPCA at 750 HZ at D=5 error is the following:

$M_{PQ}$–Maximum Phase Error=1.03 degrees=0.017 radians $M_{PQ}/M_{PP}$=1.03/0.38=2.71

9. Comments on the DPCA Example

As can be readily seen in previous section "8" that the DPCA error due the PRF mismatch is considerably less in the PRF=750 HZ. At 750 HZ, PRF the Mpp=0.38° and at 1000 HZ-PRF, it is 1.4°, this is ¼ of the error. The processing may be performed at 750 HZ with the $W_C$ and $W_M$ terms (since the other term is very small) employed with only their offset values of amplitude and phase and simplifying the equation and the processing required to obtain the desired results.

E. Basic Radar Doppler Equations

The systems consist of two equal receiving sub arrays and a transmit array. The two receiving sub arrays will receive radar data that will have clutter only, target only and target plus clutter. The system is employed to detect targets and measure its relative radial velocity and angular position and range. Since range is easily measured from the range bin the target is detected, the other two parameters are the objective of this invention in and out of the presence of clutter.

The basic system endeavors to measure the moving targets relative radial velocity and angular position. A moving target which changes its position in space relative to the radar each PRF and relative to the transmission frequency and the PRF given by the equation as follows:

$$\Phi_R = 2\Pi D / (\lambda/2 * PRF)$$

$\Phi_R$—Phase change per PRF of target
D—Distance traveled per PRF relative radial to the radar
PRF—Pulse Repetition Frequency of the Radar
$\lambda$—Wavelength of transmission frequency $\Phi_R$ is proportional to the relative radial velocity of the target. The radar has motion compensation (since it is moving itself) to make the bore sight of its antenna look like it has zero ("0") velocity (no motion), targets or clutter appearing at some angle will have an apparent motion relative to the radar proportional to the cosine of the angle off bore sight.

The equation that represents this phase change due to the angular position of the clutter or target off bore sight is the following:

$$\Phi_R = 2\Pi D / (\lambda/2 * PRF)$$
$$\text{Where } D = (V_p \times \sin(BW)) \times (1/PRF)$$
$V_p$ – Velocity of the platform
$BW$ – Beamwidth of the transmit antenna Other parameters defined in previous equation.

Taking an example for illustration. Let $V_P$=500 feet/sec and BW=⅔° and λ=0.1 and the PRF=1000 HZ, solving the above equation we have the phase change $\Phi_R$=41.76° (0.728 radians).

Solving for the bandwidth of clutter in a beamwidth as follows:

$$CBW=(\Phi_R/360)PRF$$

Substituting the values we obtained above:

$$CBW=(41.76/360)\times 1000=116 \text{ HZ}$$

$CBW$–clutter bandwidth

F. Differentiating Target Doppler from Clutter Doppler

Since the objective of this invention is to measure target doppler in the presence of clutter doppler an analysis of this situation will help in attaining the objective of this invention.

The concept is of differentiating the doppler of the target and the doppler of the clutter into their respective component parts and as distinct and independent doppler. The system is analyzed and employed in that manner.

When clutter and target occur in the same LRDBs (Large Range Doppler Bins), careful attention must be made to find their individual characteristics and employ this to advantage. This will be further explored.

At the beginning of Section E both clutter and target have a doppler due to their position in the main beam of the antenna proportional to their angular position off bore sight of the antenna.

With clutter this is the only component of doppler. This doppler may be detected in the same LRDB as a target and hence difficulty obtaining doppler of the target due to its relative radial velocity.

Targets on the other hand have two doppler components. One component of target doppler like clutter has a component due to its angular position in the main beam of the antenna. The other component of the target doppler is due to its radial velocity relative to the radar.

This will be now expressed in equation form as follows:

$$\Phi_D = \Phi_A + \Phi_R$$

$\Phi_D$—Phase change of the target proportional due to its angular position plus its relative radial velocity in each receive antenna array.

$\Phi_A$—Phase change of the target proportional to its angular position off bore sight of the antenna in each receive antenna array.

$\Phi_R$—Phase change of target due to its relative radial velocity in in each receive antenna array.

Therefore, the target when detected in any receive array, its doppler bin or change in phase is due to two components; it's own azimuth position and that due to its relative radial velocity. This is the object of the invention, to determine the relative radial velocity. Once the relative radial velocity is determined, the target's azimuth position is determined and its doppler and change in phase is calculated.

The "D"—delay between the two receive antenna arrays where the second receive array, the "D" delay of pulse returns is implemented. The phase change of the target at the second receive array from the first receive array is $D\Phi_R$. When "$D\Phi_R$" is solved for it must be divided by "D" to determine $\Phi_R$.

The determination of $\Phi_A$ is therefore and as explained previously, this is the phase change due to the targets azimuth position and is fixed and does not change within the limited time of the target being illuminated.

Therefore when $W_M$ is measured, it is measured at the doppler bin or filter at this azimuth position as explained previously as if clutter resided at this position. The $W_M$ measure at this position is the following:

$$W_M = A_{CM} e^{j(\Psi_{CM} + K_{CM}(s-y))}$$
$$W_M = A_{CM} e^{j(\Psi_{CM} + K_{CM}(s-y))}$$

$Acm$ – Offset Amplitude
$\Psi_{CM}$ – Offset Angle
$y$ – actual angular position of target
$s$ – estimated angular position of target s−y—difference between actual and estimated angular position of target $W_M$ is dependent on s−y since the targets angular position does not change in the limited amount of time on target. The offset angle and offset amplitude is known dependent on angular position.

$D\Phi_R$—Phase change of target due to its relative radial velocity between sub arrays (antenna 1 and antenna 2) and delay D.

If the target is not detected at its peak (FRDB) but $D\Phi_R$ is determined by processing, in order to solve the previous equation for $\Phi_A$ and $\Phi_D$, the target has to be measured at the position where the target is detected at its peak. The $D\Phi_R$ parameter is measured from the peak detection of the target. This term is divided by D to determine $\Phi_R$ and consequently determine $\Phi_A$, the azimuth position of the target.

$\Phi_C = \Phi_C$ and $\Phi_C = \Phi_D$ with no target present $\Phi_C$—Phase change of clutter due to its angular position in the beam of the antenna As illustrated the spectrum analysis for the 64 data points received from the radar would be 64 frequency components spaced equally apart 15.625 HZ with the same frequency resolution. These frequency components will be called ($0_0$, $1_0$, . . . ,$63_0$) the large frequency components—the large range doppler bins (LRDB).

The frequency components performed on the zero filled data up to 256 data points and a spectrum analysis performed would be $0_0$, $1_0$ . . . ,$63_0$ to $0_1$,$1_1$, . . . , $63_1$ to $0_3$, $1_3$, . . . , $63_3$. These frequency components would be called (FRDB) the fine frequency doppler bins components due to the zero filled operation.

As a result of the zero fill operation all the filters will have a resolution of 15.625 HZ and a spacing of 3.90625 HZ.

The number of filters have been increased by a factor of four (4).

The delayed data (256 points) spectrum analysis of sub-array 2 subtracted from the corresponding FRDBs in the sub-array 1 there is a resultant vector when target is present as shown in FIG. 1–19a. The FRDB that has the maximum resultant amplitude is where the target is at that frequency response of the filter.

The FRDB of clutter maximum amplitude is most probably in another position within plus or minus two (2) FRDB from where the target is detected at its peak.

Target and clutter are completely independent and consequently where the target amplitude is peak (frequency response) will be most probably different than the peak of clutter even though they are detected in the same LRDB but do not peak in the same position.

FIG. 3, BLOCK DIAGRAM OF NON IDEAL SYSTEM, may be implemented by a hardwired or general purpose or general purpose plus signal processor computer.

The target detection has one peak detection in a particular or near a particular FRDB and its affect is detected in adjacent FRDBs and LRDBs in range and doppler. There is assumed only one target. The target's angular position most of the time will be in some other position.

Clutter on the other hand is essentially independent in every LRDB. Its angular position is determined by where its peak is detected as mentioned in the previous paragraphs. It's independent from LRDB to LRDB but detected at its peak for its angular position.

G. Basic Mathematical Equations Developed for Processing a Target Detected in the Same Filter at Two Sequential Times As illustrated in FIGS. 1 to 3 and FIG. 9, the vector diagram of the target and target plus mover, block diagram of the system and the large range doppler bins (LRDBs) in each sub-array, there is a fundamental set of equations that are to be developed and to be employed in all techniques in the following sections to attain the objective.

For each sub-array the radar data is stored and a weighting function applied to the data and a spectrum analysis obtained for "N" data points and produces "N" doppler bins for each of the "M" range bins. Sub-array #2 the data points are delayed "D" pulses for effective DPCA processing. (FIG. 10 to FIG. 17), For ×4 radar data there is "N×4" doppler bins for each of "M" range bins.

FIG. 9 illustrates this, it is performed by adding (256–64) zeros before doing the spectrum processing.

The sub-array 2 processed FRDBs are subtracted from the corresponding FRDBs of sub-array 1 and the vector diagram results as in FIG. 1. Illustrated in FIG. 1 are the conditions of target only and also with target plus clutter where a target is detected.

Where there is target only the angle $D\Phi_R$ is measured between the two target vectors and determines the relative radial velocity and the angular positioned is also determined from $\Phi_D$ and $D\Phi_R$. There is no problem in attaining the objective when clutter is not present with the target.

When the target is detected in the presence of clutter, at this point, $D\Phi_R$ cannot be measured directly and a technique has to be developed to measure $D\Phi_R$ and hence the objective of the invention. The following section will develop the mathematical equations, which in Section IV will be utilized to solve this problem.

1. Ideal System

Sub-array 1 equation when the target is detected in a particular FRDB is as follows:

$$V'_{11} = C + M \qquad (1)$$

$V'_{11}$ − Measured vector in sub-array 1 at time 1

$C$ − Clutter vector in sub-array 1 at time 1

$M$ − Mover vector in sub-array 1 at time 1

Sub-array 2 equation for ideal system when the target is detected in the same corresponding FRDB as in sub-array 1 at a delayed "D" number of pulses is as follows:

$$V'_{12} = C + M EXP(JD\Phi_R) \qquad (2)$$

$V'_{12}$ −

Measured vector in sub-array 2 at time "$D$"

$C$ − Clutter vector in sub-array 2 at time "$D$"

$M$ − Mover vector in sub-array 2 at time "$D$"

$D\Phi_R$—The phase shift due to the motion of the target from pulse "1" in sub-array 1 to pulse "D" in sub-array 2

This equation is ideally almost the same as in sub-array 1 but due to the delay "D" and the phase shift of the target as stated in the aforementioned paragraphs.

For data point "2" in sub-array 1 delayed one pulse and phase shifted in value corresponding to the conjugate of the phase shift of the filter processed we have the following equation:

$$V'_{11} = XC + YM \quad (3)$$

$V'_{11}$ – Measured vector in sub-array 1 for data point "2"

$X$ – Change in clutter from data point "1" to data point "2"

$C$ – Clutter vector of data point "1"

$Y$ – Change in target from data point "1" to data point "2"

$M$ – Mover vector of data point "1"

$$V''_{12} = XC + YM \operatorname{EXP}(JD\Phi_R) \quad (4)$$

$V''_{12}$ – Measured vector in sub-array 2 for data point "$D+1$"
$C$ – Clutter vector of data point "1"
$Y$ – Change in target from data point "1" to data point "2"
$M$ – Mover vector of data point "1"

Subtracting equation (2) from equation (1) we have the following $$M = (V'_{11} - V'_{12})/(1 - \operatorname{EXP}(JD\Phi_R)) \quad (5)$$

Similarly subtracting equation (4) from equation (3) we have the following:

$$YM = (V''_{11} - V''_{12})/(1 - \operatorname{EXP}(JD\Phi_R)) \quad (6)$$

Taking equation (6) and dividing by equation (5) it follows:

$$Y = \overline{K}e^{jB} = (V''_{11} - V''_{12})/(V'_{11} - V'_{12}) \quad (7)$$

$\overline{K}$ - Amplitude ratio change in target $B$ - Phase change in target

Multiplying equation (1) by $\operatorname{EXP}(JD\Phi_R)$ and subtracting equation (2) and solving for clutter (C) we have the following:

$$C = (V'_{11}\operatorname{EXP}(JD\Phi_R) - V'_{12})/(1 - \operatorname{EXP}(JD\Phi_R)) \quad (8)$$

Similarly multiplying equation (3) by $\operatorname{EXP}(JD\Phi_R)$ and subtracting equation (4) and solving for (XC) changed clutter we have the following:

$$XC = (V''_{11}\operatorname{EXP}(JD\Phi_R) - V''_{12})/(1 - \operatorname{EXP}(JD\Phi_R)) \quad (9)$$

Taking equation (9) and dividing by equation (8) we have:

$$X = (V''_{11}\operatorname{EXP}(JD\Phi_R) - V''_{12})/(V'_{11}\operatorname{EXP}(JD\Phi_R) - V'_{12}) \quad (10)$$

We see by equation (7) we have solved for the change in target and it is independent of $D\Phi_R$. In equation (10) solving for the change in clutter, it is dependent on $D\Phi_R$.

If we take equation (10) and solve for $D\Phi_R$ we have the following:

$$\operatorname{EXP}(JD\Phi_R) = (XV'_{12} - V''_{12})/(XV'_{11} - V''_{11}) \quad (11)$$

As previously developed was a set of equations where the clutter cancels ideally but as discussed previously ideal conditions of canceling clutter rarely is present and so consequently a set of equations will be developed for the non-ideal case. In section III-D-DPCA Theory and application of the practical implementation of the ideal case is rarely attained. There is almost never clutter that cancels completely.

This set of equations is for the P-DPCA compensation of section IIID.

2. Non-Ideal System

The next set of equations will be for the non-ideal case where the clutter and target have to be corrected for. The sub-array 1 equation for the non-ideal case is the following:

$$V'_{11} = C + M \quad (12)$$

The same as equation (1).

Sub-array 2 for data point D equations are the following:

$$V'_{12} = C/W_{C1} + (M/W_{M1})\operatorname{EXP}(JD\Phi_R) \quad (13)$$

$W_{C1}$—The factor that relates to clutter in both arrays which makes clutter cancel.

$W_{M1}$—The factor that relates to target in both arrays, which make a target correction in both arrays to make them the same amplitude and phase.

For data point "2" in sub-array 1 we have the following equation:

$$V''_{11} = XC + YM \quad (14)$$

The same as equation (3).

The equation for sub-array 2 at data point (D+1) is the following:

$$V''_{12} = XC/W_{C2} + (YM/W_{M2})\operatorname{EXP}(JD\Phi_R) \quad (15)$$

Similar to equation (4) but with the factors $W_{C2}$ and $W_{M2}$ added $W_{C2}$ factor that relates the clutter in both arrays which makes $\overline{K}$ and B correct.

$W_{M2}$ factor that relates to the target in both arrays which makes K and $\alpha$ correct.

Multiplying equation (13) by $W_{C1}$ and subtracting it from equation (12) and solving we attain:

$$M = (V'_{11} - W_{C1}V'_{12})/(1 - (W_{C1}W_{M1})EXP(JD\Phi_R)) \quad (16)$$

Similar with equation (14) and (15) we get the following:

$$YM = (V''_{11} - W_{C2}V''_{12})/(1 - (W_{C2}W_{M2})EXP(JD\Phi_R)) \quad (17)$$

Solving for Y employing equation (16) and (17) we have:

$$Y = (V''_{11} - W_{C2}V''_{12})/(V'_{11} - W_{C1}V'_{12}) \quad (18)$$

Where $$(1 - (W_{C1}/W_{M1})EXP(JD\Phi_R)) = (1 - (W_{C2}/W_{M2})EXP(JD\Phi_R))$$

Assuming $W_{C1} \approx W_{C2} \approx W_C$ and $W_{M1} \approx W_{M2} \approx W_M$ we have:

$$Y = \overline{K}e^{jB} = (V''_{11} - W_{C1}V''_{12})/(V'_{11} - W_{C1}V'_{12}) \quad (19)$$

Multiplying equation (12) by $(EXP(JD\Phi_R)/W_{M1}$ and subtracting equation (13) from (12) we have:

$$V'_{11}EXP(JD\Phi_R)/W_{M1} - V'_{12} = C(EXP(JD\Phi_R))/W_{M1} - 1/W_{C1} \quad (20)$$

Similarly multiplying equation (14) by $(EXP(JDJ_R)/W_{M2})$ and subtracting equation (15) from (14) we have: (EXP$(JDJ_R)/W_{M2}$ $$(V''_{11}EXP(JD\Phi_R)/W_{M2} - V''_{12} = XC(EXP(JD\Phi_R))/W_{M2} - 1/W_{C2} \quad (21)$$

(22) Solving for X employing equation (20) and (21) we have:

$$X = ((V''_{11}EXP(JD\Phi_R)/W_{M2}) - V''_{12})/(V'_{11}EXP(JD\Phi_R)/W_{M1} - V'_{12})$$
$$(EXP(JD\Phi_R)/W_{M1} - 1/W_{C1})/((EXP(JD\Phi_R)/W_{M2}) - 1/W_{C2})$$

Assuming $W_{C1} \approx W_{C2} \approx W_C$ and $W_{M1} \approx W_{M2} \approx W_M$ we obtain:

$$X = K\exp(j\alpha) \quad (22)$$
$$= (V''_{11}EXP(JD\Phi_R) - W_M V''_{12})/(V'_{11}EXP(JD\Phi_R) - W_M V'_{12})$$

Solving for $EXP(JD\Phi_R)$ in equation (22) we have the following:

$$(EXP(JD\Phi R))/W_M = (XV'_{12} - V''_{12})/(XV'_{11} - V''_{11}) \quad (23)$$

Looking at the assumption $W_{C1} \approx W_{C2}$ and $W_{M1} \approx W_{M2}$, $W_C$ and $W_M$ is the LMS average (Section IIID) of the same FRDB between sub-arrays 1 and 2. $W_C$ and $W_M$ is in effect a ratio. When the next measurement taken is ≈one millisecond later that ratio $W_C$ and $W_M$ will remain essentially equal, Summarizing the assumption why $W_{C1} \approx W_{C2} \approx W_C$ and $W_{M1} \approx W_{M2} \approx W_M$ is correct.

ssame FRDBs are measured
same measurement from sub-array 1 and 2
an effective ratio taken (diminishes changes)
only millisecond later in time taken (very little change)
data points are the same just shifted in time The assumption is well founded in the facts and the conditions involved.

The next set of equations will be the condition different from the previous where the P-DPCA compensation will be utilizing time only (Section IIID). The development is very analogous to the P-DPCA compensation employing Q-DPCA. The basic equations will be stated and explained and then the important resultant equations given:

Sub array 1 for data point 1:

$$V'_{11} = C + M \quad (12)$$

The same as equation (12) and the same definition of terms

Sub array 2 for data point (D+1):

$$\underline{V'}12 = C/\underline{W_{C1}} + M/\underline{W_{M1}} \quad (13)$$

$\underline{W_{C1}}$—the factor that relates to clutter in both arrays which cancels clutter in the mode where Q-DPCA compensation is used, This is different from $W_{C1}$ for P-DPCA compensation (Section III-D).

$\underline{W_{M1}}$—the factor that relates to the target in both arrays, which makes the target, vector the same. This is different from $W_{M1}$ for the same reason as stated in previous paragraphs for $\underline{W_{C1}}$ (Section III-D).

$V'_{12}$—The measured vector in sub-array 2 for data point using Q-DPCA compensation.

For data point 2 in sub array 1 we have the following equation:

$$V''_{11} = XC + YM \quad (14)$$

The same as equation (3) and the same definition of terms.

The equation or sub-array 2 at data point (D+1) is the following:

$$\underline{V''}12 = XC/\underline{W_{C2}} + (YM/\underline{W_{M2}})EXP(J(D+1)\Phi_R) \quad (15)$$

$V''_{12}$ Similar to equation (15) but with the factors $\underline{W_{C2}}$ substituted for $W_{C2}$ and $\underline{W_{M2}}$ substituted for $W_{M2}$ and $\underline{V''}_{12}$ substituted for $V''_{12}$ XC and YM same definition as stated previously $\underline{W_{C2}}$—the same as $W_{C2}$ except this term is for the Q-DPCA $\underline{W_{M2}}$—the same as $W_{M2}$ except this term is for the Q-DPCA $V'''_{12}$—similar to $V''_{12}$ but for Q-DPCA instead of P-DPCA Employing all the same algebraic manipulations as in the previous derivation, we have all analogous results as previously except the following terms are different as follows:

$\underline{W_{C1}}$ substitutes for $W_{C1}$
$\underline{W_{C2}}$ substitutes for $W_{C2}$
$V'_{12}$ substitutes for $V'_{12}$
$V'''_{12}$ substitutes for $V''_{12}$
$\underline{W_{M1}}$ substitutes for $W_{M1}$
$\underline{W_{M2}}$ substitutes for $W_{M2}$
$(D+1)\Phi_R$ substitutes for $D\Phi_R$ All other terms are the same. Some key equations to illustrate this we have the following:

$$M = (V'_{11} - \underline{W_{CI}}V'_{12})/(1 - (\underline{W_{CI}}/\underline{W_{MI}})\text{EXP}J((D+1)\Phi_R)) \quad (16)$$

$$Y = \overline{K}\exp(j\beta) = (V''_{11} - \underline{W_{CI}}V''_{12})/(V'_{11} - \underline{W_{CI}}V'_{12}) \quad (19)$$

$$X = K\exp(jK) = (V''_{11}\text{EXP}(J(D+1)J_R)/\underline{W_{MI}} - V'_{12})/ \quad (22)$$
$$(V'_{11}\text{EXP}(J(D+1)J_R)/\underline{W_{MI}} - V'_{12})$$

$$e^{j(D+1)\Phi_R}/W_{MI} = (X\underline{V'_{12}} - V''_{12})/(X\underline{V'_{11}} - V''_{11}) \quad (23)$$

Observing the set of equations developed on the same set of data employing P-DPCA and Q-DPCA compensation and equating equation (19) with equation (19) we have the following $$(V''_{11} - \underline{W_{C2}}V''_{12}) = (V'_{11} - \underline{W_{CI}}V'_{12}) = (V''_{11} - W_{C2}V''_{12})/(V'_{11} - W_{CI}V'_{12}) \quad (24)$$

Taking the assumption $\underline{W_{C1}} = \underline{W_{C2}}$ and $W_{C1} = W_{C2}$ and the following definition of $W_C$ terms:

$$W_{C1} = W_{C2} = A_{CM}\text{EXP}(J(\Psi_{CM} + K_{CM}(s-x))) \quad (25)$$

$$\underline{W_{C1}} = \underline{W_{C2}} = e^{j(\underline{\Psi} + \underline{K_{CM}}(s+x))} \quad (26)$$

$$(V''_{11} - \underline{W_{CI}}V''_{12})/(V'_{11} - \underline{W_{CI}}V'_{12}) = (V''_{11} - W_{CI}V''_{12})/(V'_{11} - W_{CI}V'_{12}) \quad (26A)$$

$$((V''_{11} - A_{CM}\text{EXP}(J(\Psi_{CM} + \underline{K_{CM}}(s-x))V''_{12})/ \quad (26B)$$
$$((V'_{11} - A_{CM}\text{EXP}(J(\Psi_{CM} + \underline{K_{CM}}(s-x))V'_{12}) =$$
$$((V''_{11} - A_{CM}\text{EXP}(J(\Psi_{CM} + K_{CM}(s-x))V''_{12})/$$
$$((V'_{11} - A_{CM}\text{EXP}(J(\Psi_{CM} + K_{CM}(s-x))V'_{12})$$

Acm=$\underline{A_{CM}}$ where Acm or $\underline{A_{CM}}$ is the offset amplitude of the term that makes the amplitude of the clutter in both arrays equal. This is assumed to be equal, which should be equal regardless of the type of DPCA compensation employed. This term is calculated on the same filter.

$\Psi_{CM} = \underline{\Psi_{CM}}$ where $\underline{\Psi_{CM}}$ or $\Psi_{CM}$ is offset angle that makes the phase of the clutter in both arrays equal. The reasoning is the same as in the previous paragraph for Acm.

"s" is the FRDB processed and is known.

x is the FRDB in which the clutter amplitude is at its peak (at the center of the filter response—FIG. 16—3q)—which is unknown.

Figure 16:
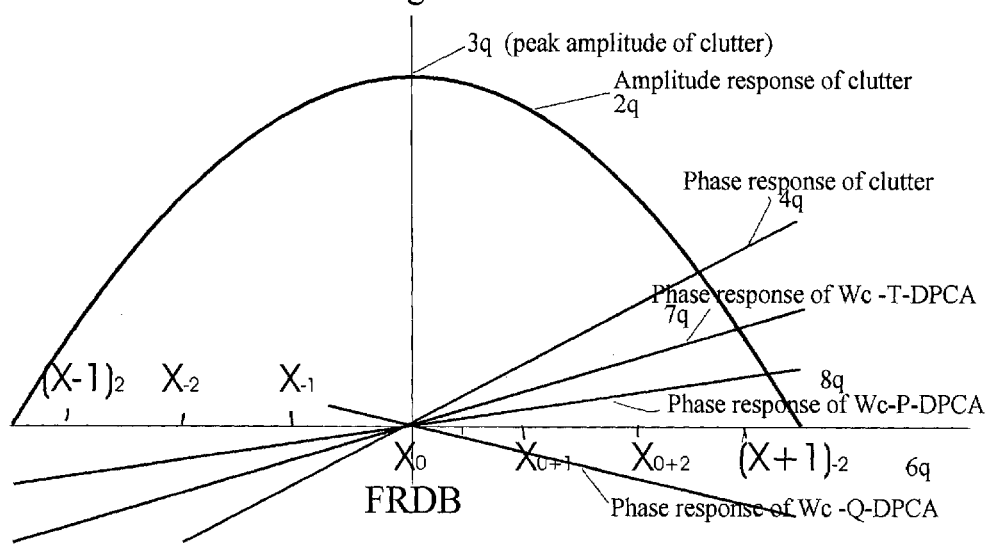
FIG. 16 depicts the Relationship of Ideal Clutter Filter and Ideal $W_c$ Response

All the "V" terms are as defined in the previous paragraphs and all are measured known terms $K_{CM}$ is the slope of the phase compensation term for clutter for "D" delay P-DPCA compensation (FIG. 16). This is known and calculated a shown in Section III-D.

Making $A_{CM} = \underline{A_{CM}}$ and is known because it is measured in the clutter FRDB at or near the FRDB of where the clutter resides. The amplitude of the offset should remain approximately equal over a number of FRDBs.

Making $\Psi_{CM} = \underline{\Psi_{CM}}$ and is known for the reasons as stated in the previous paragraph.

$K_{CM}$ and $\underline{K_{CM}}$ are known and are calculated as stated in the section III D on DPCA compensation.

Taking equation (26B) and substituting $W_{C1}$ and $\underline{W_{C1}}$ as in equations (25) and (26) the only unknown is x and therefore solvable in x. This determines the FRDB where clutter is at its maximum amplitude. Since x is closely the same for both sets of equations. The value x determines where the peak of clutter is located corresponding to "3q" in FIG. 16, Ideal Clutter Filter and Ideal $W_C$ Response. The value "s" is the FRDB processed and according to this value, the distance from the peak of clutter on "8q", the phase response of clutter is the phase. The corresponding clutter change is X=K$\alpha$EXP(J$\alpha$) in time. FIG. 16 indicates 2q as the amplitude response of clutter and the ideal phase response of clutter and 4q,2q,3q and 10q for the respective delays. The X axis depicts the FRDB and the Y axis the amplitude.

Figure 17:
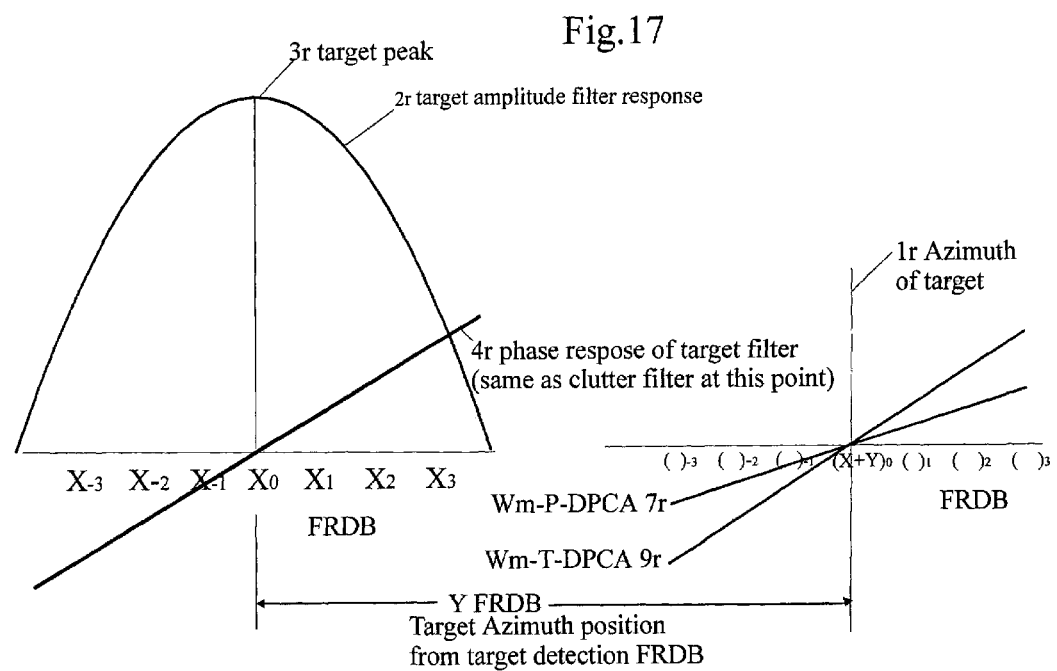
FIG. 17 depicts Target Ideal Filter and $W_M$ Response

$X_F = K\alpha_F\text{EXP}(J\alpha_F)$ is the clutter response from filter to filter (FRDB to FRDB) in FIG. 26—Table I and FIG. 17 illustrates a similar set of components for target as in FIG. 16 for clutter. The amplitude response of target as a function of FRDB and the phase response as function of azimuth. 3r is the target peak and 2r is the target amplitude response, 4r is the phase response, 7r and 9r are phase responses for P-DPCA and Q-DPCA respectively. At 3r is the target peak amplitude response equal to one and phase response equal zero.

It is to be noted, in theory, by observing in FIG. 16, Ideal clutter filter response and clutter change in time and $W_C$ response are related. Once one factor is known (clutter change in time or clutter filter response or clutter response for P-DPCA or Q-DPCA) all other factors are estimated closely or known. This enables these techniques to be effective. Therefore a priori processing must be performed to establish the relationship between all these factors. A priori knowledge of the filter response and $K_{CM}$ and $\underline{K_{CM}}$ and other factors are calculated and known.

Also the factors $A_{CM}$ and $\Psi_{CM}$ may be determined by processing all the filters as in Section III D-7.

Equation (24) with $W_{C1} = W_{C2}$ and $\underline{W_{C1}} = \underline{W_{C2}}$ with $A_{CM} = \underline{A_{CM}}$ and $\Psi_{CM} = \underline{\Psi_{CM}}$ we have the following:

$$(V''_{11} - \underline{W_{CI}}V''_{12})/(V'_{11} - \underline{W_{CI}}V'_{12}) = (V''_{11} - W_{CI}V''_{12})/(V'_{11} - W_{CI}V'_{12}) \quad (24)$$

$$((V''_{11} - A_{CM}\text{EXP}(J(\Psi_{CM} + \underline{K_{CM}}(s-x)))V''_{12})/ \quad (24A)$$
$$((V'_{11} - A_{CM}\text{EXP}(J(\Psi_{CM} + \underline{K_{CM}}(s-x)))V'_{12}) =$$
$$((V''_{11} - A_{CM}\text{EXP}(J(\Psi_{CM} + K_{CM}(s-x)))V''_{12})/$$
$$((V'_{11} - A_{CM}\text{EXP}(J(\Psi_{CM} + K_{CM}(s-x)))V'_{12})$$

Taking equation (24A) and separating out all the known parameters from the unknown parameter, x, and taking all the known parameters and making constants out of them we have the following $$(V''_{11} - A_{CM}\text{EXP}(J(\Psi_{CM} + \underline{K_{CM}}(s-x))\text{EXP}(-J\underline{K_{CM}}))V''_{12}))/ \quad (25)$$
$$(V'_{11} - A_{CM}\text{EXP}(J(\Psi_{CM} + K_{CMS}))\text{EXP}(-J\underline{K_{CM}}X))\underline{V'_{12}}) =$$
$$(V''_{11} - A_{CM}\text{EXP}(J(\Psi_{CM} + K_{CM}(s-x))\text{EXP}(-JK_{CM}X))V''_{12}))$$
$$/(V'_{11} - A_{CM}\text{EXP}(J(\Psi_{CM} + K_{CM}S))\text{EXP}(-JK_{CM}X))V'_{12})$$

Taking all the known parameters and making them constants out of them we have the following:

$$K'_1 - K'_2\text{EXP}(-JK_{CM}X))/(K'_3 - K'_4\text{EXP}(-JK_{CM}X)) = \quad (26)$$
$$K_1 - K_2\text{EXP}(-JK_{CM}X))/(K_3 - K_4\text{EXP}(-JK_{CM}X))$$

$$K_{CM} = -\underline{K_{CM}} \quad (26A)$$

$$v = e^{jKCMX} \quad (26B)$$

Substituting equations (26A) and (26B) into equation (26) and making constants out of known terms we have the following:

$$K_A v^2 + K_B v + K_c = 0 \quad (26c)$$

This is a second order equation that is solvable in "v" and therefore solvable in "x". The "x" that is within plus or minus three FRDB (x) is the solution and those where the solution is other is not.

Another solution is the following:

Multiplying out equation (26) and taking all known parameters and making constants out of them we have the following:

$$K_A + K_B\text{EXP}(-J\underline{K_{CM}}X) + \quad (27)$$
$$K_C\text{EXP}(-JK_{CM}X) + K_D\text{EXP}(-JX(K_{CM} - \underline{K_{CM}}) = 0$$

$$K_A = K_{AX} + JK_{AY}{:}K_B =$$
$$K_{BX} + JK_{BY}{:}K_C = K_{CX} + JK_{CY}{:}K_D = K_{DX} + JK_{DY}$$

$$K_B\exp(-J\underline{K_{CM}}X) =$$
$$K_{BX}\cos(-\underline{K_{CM}}x) - K_{BY}\sin(-\underline{K_{CM}}x) + j((K_{BY}\cos(-\underline{K_{CM}}x) -$$
$$K_{BX}\sin(K_{BX}\sin(-K_{DX}\cos(-K_{cm}x + K_{CM}))\underline{K_{CM}}x) -$$
$$K_{DY}\sin(-K_{CM}x + \underline{K_{CM}}x) + K_{BX}\cos(-\underline{K_{CM}}x) -$$
$$K_{BY}\sin(-\underline{K_{cm}}x) + j((K_{BY}\cos(-\underline{K_{CM}}x) - K_{BX}\sin(-\underline{K_{CM}}x))$$

$$K_C\exp(-JK_{CM}x) = K_{CX}\cos(-K_{CM}x) -$$
$$K_{CY}\sin(-K_{CM}x) + j((K_{CY}\cos(-K_{CM}X) - K_{CX}\sin(-K_{CM}x))$$

$$K_D\exp(-J(K_{CM} - K_{CM})X) =$$
$$K_{DX}\cos(-K_{CM}x + \underline{K_{CM}}x) - \overline{K_{DY}}\sin(-K_{CM} + \underline{K_{CM}}x) +$$
$$K_{DX}\cos(-K_{CM}x + \underline{K_{CM}}x) - K_{DY}\sin(-K_{CM}x + \underline{K_{CM}}x) +$$
$$j((K_{DY}\cos(-K_{CM}x + \underline{K_{CM}}x) - K_{DX}\sin(-K_{CM}x + \underline{K_{CM}}x))$$
$$j((K_{DY}\cos(-K_{CM}x + \underline{K_{CM}}x) - K_{DX}\sin(-K_{CM}x + \underline{K_{CM}}x))$$
$$j((K_{DY}\cos(-K_{CM}x + \underline{K_{CM}}x) - K_{DX}\sin(-K_{CM}x + \underline{K_{CM}}x))$$

The sum of the x and components of equation (27) is the following:

$$\sum X = 0 \quad (27A)$$
$$K_{AX} + K_{BX}\cos(-\underline{K_{CM}}x) -$$
$$K_{BY}\sin(-\underline{K_{CM}}x) + K_{CX}\cos(-K_{CM}x) -$$
$$K_{CY}\sin(-K_{CM}x) + K_{DX}\cos(-K_{CM}x + \underline{K_{CM}}x) -$$
$$K_{DY}\sin(-K_{CM}x + \underline{K_{CM}}x) = 0$$

$$\sum Y = 0 \quad (27B)$$
$$K_{AY} + K_{BY}\cos(-\underline{K_{CM}}x) -$$
$$K_{BX}\sin(-\underline{K_{CM}}x) + K_{CY}\cos(-K_{CM}x) -$$
$$K_{CX}\sin(-K_{CM}x) + K_{DY}\cos(-K_{CM}x + \underline{K_{CM}}x) -$$
$$K_{DX}\sin(-K_{CM}x + \underline{K_{CM}}x) = 0$$

Since all parameters are known except x, the equations (27A) and (27B) give two solutions to x and the solution that is within plus or minus three (3) is the solution. As stated x is the location of the peak of clutter and hence $W_C$ is as indicated previously. Rather than solve (27A) and (27B) the all the possible locations of x can be substituted since there are only a limited number of locations are possible and consequently may solve for x.

Another method for attaining x is to detect the target at its peak where $Y = \overline{K}e^{jb} = |1|$ at phase angle=0. Therefore at P-DPCA and Q-DPCA we have the following:

$$Y = 1e^{j(0)} = (V''_{11} - W_{CI}V''_{12})/(V'_{11} - W_{CI}V'_{12})$$
$$Y = 1e^{j(0)} = (V''_{11} - \underline{W_{CI}}V''_{12})/(V'_{11} - \underline{W_{CI}}V'_{12})$$

Equating the above equations and solving for x we have the following:

$$\underline{W_{CI}}/W_{CI} = A_{CM}e^{j(\Psi_{CM} + \underline{K_{CM}}X)}/A_{CM}e^{j(\Psi_{CM} + K_{CM}X)}$$
$$= e^{j(\underline{K_{CM}} - K_{CM})x}$$
$$= (V''_{12} - V'_{12})/(\underline{V''_{12}} - \underline{V'_{12}})$$

From the above set of equations the only unknown parameter is x and easily solved. This will be the location of the peak of clutter.

From the solution for x or that from equation (24) x is solved for (the peak location of clutter and this leads to the solution of $W_{C1}$ and $\underline{W_{C1}}$ which give the $X = K\alpha\text{EXP}(J\alpha)$ from the FRDB distance from the FRDB processed. This is illustrated in FIG. 16 where $W_{C1}$ and $\underline{W_{C1}}$ are employed to obtain $X = K\alpha\text{EXP}(J\alpha)$.

H. Basic Mathematical Equations Developed for Processing a Target Detected at the Same Time for Two Different Filters—ΔF Technique 1. Ideal System Previous derivation of a set equations were performed between sub-array 1 and sub-array 2 with the same FRDB at two successive times. This derivation will be between sub-array 1 and 2 at the same time with two different filters. For examples we will take filter FRDB, $\mathbf{0}_0$, at time 1, data point 1 and also different filter FRDB, $\mathbf{0}_1$, at time 1 and derive a set of equations. Target is detected at FRDB $0_0$. (FIG. 18) illustrating the processing performed.

Taking filter FRDB, $0_0$, at time 1 in sub-array 1 we have the following $$V'_{11} = C_1 + M_1 \quad (1')$$

$V'_{11}$—measured vector in sub-array 1 at time 1 for filter $0_0$.

$C_1$—clutter vector in sub-array 1 at time 1 for filter $0_0$.

$M_1$—target vector in sub-array 1 at time 1 for filter $0_0$.

The sub-array 2 equation for the ideal system where the target is detected in the same corresponding FRDB as in sub-array 1 at a delayed (D) number of pulses is as follows:

$$V'_{12} = C_1 + M_1 \mathrm{EXP}(JD\Phi_R) \quad (2')$$

$V'_{12}$—measured vector in sub-array 2 at time "D" for filter $0_0$.

$C_1$—clutter vector in sub-array 2 at time "D" for filter $0_0$.

$M_1$—target vector in sub-array 2 at time "D" for filter $0_0$.

$D\Phi_R$—the phase shift due to this motion of the target from pulse "1" in sub-array 1 to pulse "D" in sub-array 2.

This equation is ideally almost the same as in sub-array 1 but due to delay "D" and the phase shift of the target as stated as in the aforementioned paragraphs.

For data point "1" and filter $0_1$, and time 1 we have the following equation:

$$T'_{11} = C_2 + M_2 \quad (3')$$

$T'_{11}$—measured vector in sub-array 1 at time "1" for filter $0_1$.

$C_2$—clutter vector in sub-array 1 at time "1" for filter $0_1$.

$M_2$—target vector in sub-array 1 at time "1" for filter $0_1$.

For data point "D" in sub-array 2 where the target is detected in the same corresponding FRDB $0_1$ as in sub-array 1 we have the following equation:

$$T'_{12} = C_2 + M_2 \mathrm{EXP}(JD\Phi_R) \quad (4')$$

$T'_{12}$—measured vector in sub-array "2" for pulse delay "D" at time "D" for filter $0_1$ $C_2$—clutter vector in sub-array "2" for pulse delay "D" at time "D" for filter $0_1$ $M_2$—target vector in sub-array "2" for pulse delay "D" at time "D" for filter $0_1$ Subtracting equation (2') from equation (1') we have the following:

$$M_1 = (V'_{12} - V'_{11})/(1 - \mathrm{EXP}(JD\Phi_R)) \quad (5')$$

Similarly subtracting equation (4') from equation (3') we have the following:

$$M_2 = (T'_{12} - T'_{11})/(1 - \mathrm{EXP}(JD\Phi_R)) \quad (6')$$

Taking equation (6') and dividing by equation (5') it follows:

$$M_2/M_1 = Y_F = K_F \mathrm{EXP}(J\beta_F) = (T'_{12} - T'_{11})/(V'_{12} - V'_{11}) \quad (7')$$

$Y_F$ is the filter response of target between FRDB $0_X(0_0)$ and FRDB $0_{(X+Y)}(0_1)$.

$K_F$ is the filter response of the target amplitude between FRDB $0_X(0_0)$ and FRDB $0_{(X+Y)}(0_1)$.

$B_F$ is the filter response of the phase between FRDB $0_X(0_0)$ and FRDB $0_{(X+Y)}(0_1)$.

Multiplying equation (1') by $\mathrm{EXP}(JD\Phi_R)$ and subtracting equation (2') and solving for $C_1$ we have the following:

$$C_1 = (V'_{11}\mathrm{EXP}(JD\Phi_R) - V'_{12})/(\mathrm{EXP}(JD\Phi_R) - 1) \quad (8')$$

Similarly multiplying equation (3') by $\mathrm{EXP}(JD\Phi_R)$ and subtracting equation (4') and solving for $C_2$ we have the following:

$$C_2 = (T'_{11}\mathrm{EXP}(JD\Phi_R) - T'_{12})/(\mathrm{EXP}(JD\Phi_R) - 1) \quad (9')$$

Taking equation (9') and dividing by equation (8') we have:

$$C_2/C_1 = X_F = \quad (10')$$
$$K_F \mathrm{EXP}(J\alpha_F) = (T'_{11}\mathrm{EXP}(JD\Phi_R) - T'_{12})/(V'_{11}\mathrm{EXP}(JD\Phi_R) - V'_{12})$$

$X_F$—is the filter response of clutter between FRDB $0_X(0_0)$ and FRDB $0_{(X+Y)(01)}$.

$K_F$—is the filter response of amplitude of clutter between FRDB $0_{X(00)}$ and FRDB $0_{(X+Y)}(0_1)$.

$\alpha_F$—is the filter response of phase of clutter between FRDB $0_X(0_0)$ and FRDB $0_{(X+Y)}(0_1)$.

We see by equation (7') we have solved for the target filter response between filters and it is independent of $D\Phi_R$. On the other hand equation (10') solving for the clutter filter response between filters is dependent on $D\Phi_R$.

If we take equation (10') and solve for $D\Phi_R$ we have:

$$\mathrm{EXP}(JD\Phi_R) = (X_F T'_{11} - T'_{12})/(X_F V'_{11} - V'_{12}) \quad (11')$$

2. Non-Ideal System

As previously developed was a set of equations where the clutter cancels ideally but as discussed previously ideal conditions do not exist for canceling clutter and so consequently a set of equation will be developed for the non-ideal case. In section III D-DPCA theory and application that the practical implementation of the ideal case is rarely attained and there is almost never a case where clutter cancels completely.

The next set of equations will be for the non-ideal case where the clutter and target have to be corrected for. The sub-array 1 equation for the non-ideal case is the following:

$$V'_{11} = C + M \quad (12')$$

The same as equation (1').

The sub-array 2 equation for the non-ideal case where the target is detected in the same corresponding FRDB as in sub-array 1 at a delay "D" number of pulses is as follows:

$$V'_{12} = C/W_{C1} + (M/W_{M1})\text{EXP}(JD\Phi_R) \quad (13')$$

This equation is the same as equation (2') except for $W_{C1}$ and $W_{M1}$.

$W_{C1}$—the factor that relates clutter in sub-array 1 to sub-array 2 to cancel clutter as effectively as possible (making $K_{\beta,F}$ and $B_F$ accurate).

$W_{M1}$—the factor that relates target in sub-array 1 to sub-array 2 to make the target as accurate as possible (making $K_F$ and $\alpha_F$ accurate).

For data point 1, sub-array 1 and a different filter where the target is detected we have the following equation:

$$T'_{11} = C_2 + M_2 \quad (14')$$

This is the same as equation (3').

The equation for sub-array 2, at data point "D" and the same filter as sub-array 1 is the following:

$$T'_{12} = C_2/W_{C2} + (M_2/W_{M2})\text{EXP}(JD\Phi_R) \quad (15')$$

Similarly to equation (4) but with the factors $W_{C2}$ and $W_{M2}$ added.

$W_{C2}$—the factor that relates clutter in sub-array 1 to sub-array 2 to cancel clutter as effectively as possible (making $K_F$ and $B_F$ accurate).

$W_{M2}$—the factor that relates the target in sub-array 1 to sub-array 2 to make the target vectors as accurate as possible (making $K_F$ and $\alpha_F$ accurate).

Multiplying equation (13') by $W_{C1}$ and subtracting it from equation (12') and solving for M we obtain the following:

$$M = (V'_{11} - W_{C1}V'_{12})/(1 - (W_{C1}/W_{M1})\text{EXP}(JD\Phi_R)) \quad (16')$$

Similarly with equation (14') and (15') we obtain the following:

$$M_2 = (T'_{11} - W_{C2}T'_{12})/(1 - (W_{C2}/W_{M2})\text{EXP}(JD\Phi_R)) \quad (17')$$

Solving for $Y_F$ employing equation (16') and (17') we have:

$$M_2/M = ((T'_{11} - W_{C2}T'_{12})/(1 - (W_{C2}/W_{M2})\text{EXP}(JD\Phi_R)))/ \quad (18')$$
$$(V'_{11} - W_{C1}V'_{12})/(1 - (W_{C1}/W_{M1})\text{EXP}(JD\Phi_R)))$$

Multiplying equation (12') by $\text{EXP}(JD\Phi_R)/W_{M1}$ and subtracting equation (13') from (12') we have:

$$V'_{11}\text{EXP}(JD\Phi_R)/W_{M1} - V'_{12} = C_1(\text{EXP}(JD\Phi_R)/W_{M1} - 1/W_{C1}) \quad (20')$$

Similarly multiplying equation (14') by $\text{EXP}(JD\Phi_R)/W_{M2}$ and subtracting equation (15') from (14') we have:

$$T'_{11}\text{EXP}(JD\Phi_R)/W_{M2} - T'_{12} = C_2(\text{EXP}(JD\Phi_R)/W_{M2} - 1/W_{C2}) \quad (21')$$

Solving for $C_2/C_1$ employing equation (20) and (21) we have:

$$X_F\text{EXP}(JpK_{CM}) = T'_{11}\text{EXP}(JpK_{CM})\text{EXP}(JDJ_R)/W_{M1} - T'_{12})/ \quad (21\text{ A}')$$
$$(V'_{11}\text{EXP}(JDJ_R)/W_{M1} - V'_{12})$$

$$C_2/C_1 = X_F = K_F\text{EXP}(J\alpha_F) = ((T'_{11}\text{EXP}(JD\Phi_R))/W_{M2} - T'_{12})/$$
$$(\text{EXP}(JD\Phi_R)/W_{M2} - 1/W_{C2}))/$$
$$((V'_{11}\text{EXP}(JDJ_R))/W_{M1} - V'_{12})/(\text{EXP}(JDJ_R)/W_{M1} - 1/W_{C1}))$$

Where $(e^{JD\Phi_R}/W_{M1} - 1/W_{C1})/(e^{JD\Phi_R}/W_{M1}e^{JpK_{CM}} - 1/W_{C1}) \approx 1$ since $e^{JpK_{CM}} \approx 1 X_F\text{EXP}(JpK_{CM}) =$
$$(T'_{11}\text{EXP}(JpK_{CM})\text{EXP}(JDJ_R)/W_{M1} - T'_{12})$$
$$/(V'_{11}\text{EXP}(JDJ_R)/W_{M1} - V'_{12})$$

The previous set of equations was developed with pulse plus time P-DPCA compensation. This set of equations will be developed for Q-DPCA compensation.

The equation for sub-array 1 for data point 1 is the following:

$$V'_{11} = C + M \quad (12')$$

(the same as equation (12') and the same definition of terms)

The equation for sub-array 2 for data point D+1 is the following:

$$V'_{12} = C/\underline{W_{C1}} + (M/\underline{W_{M1}})\text{EXP}(J(D+1)\Phi_R) \quad (13')$$

This equation is the same as equation (<u>13'</u>) except for $\underline{W_{C1}}$ and $\underline{W_{M1}}$ and $\underline{V'_{12}} \, \overline{K} \, \underline{V'_{12}} \, \overline{K} \, \underline{V'_{12}}$ which are the result of the Q-DPCA compensation.

$\overline{K} \, \underline{W_{C1}}$—the factor that relates clutter in sub-array 1 to sub-array 2 to cancel clutter as effectively as possible (making $\overline{K}_F$ and $\beta_F$ as accurate as possible)

$\underline{W_{M1}}$—the factor that relates target in sub-array 1 to sub-array 2 to cancel clutter as effectively as possible (making $K_F$ and $\alpha_F$ as accurate as possible)

$\underline{V_{12}}$—this is the the vector that is measured in sub-array 2.

For data point 1, sub-array 1, and a nearby filter where the target is detected, we have the following equation:

$$T'_{11} = C_2 + M_2 \qquad (14')$$

(the same as equation (14') and the same definition of terms)

The equation for sub-array 2, at data point D+1 and the same filter as in equation (14') sub-array 1 we have the following:

$$\underline{T'_{12}} = C_2/\underline{W_{C2}} + (YM/\underline{W_{M2}})\text{EXP}(J(D+1)\Phi_R) \qquad (15')$$

This is similar to equation (15') but with the factors $\underline{T_{12}}$, $\underline{W_{C2}}$ and $\underline{W_{M2}}$ as the result of the Q-DPCA compensation.

$\underline{W_{C2}}$—the factor that relates clutter in sub-array 1 to sub-array 2 to cancel clutter as effectively as possible.

$\underline{T_{12}}$—this is the sum of all the vectors, which is measured in sub-array 2

Employing all the same algebraic manipulations as in the previous derivation we have all analogous results as previously except the following analogous terms are different as follows:

$\underline{W_{C1}}$ substitutes for $W_{C1}$
$\underline{W_{C2}}$ substitutes for $W_{C2}$
$\underline{W_{M1}}$—substitutes for $W_{M1}$
$\underline{W_{M2}}$—substitutes for $W_{M2}$
$\underline{V_{12}}$—substitutes for $V_{12}$
$\underline{T'_{12}}$—substitutes for $T'_{12}$ All the other terms are the same. The following is a list of some of the analogous key equation to illustrate this:

$$M2/M_1 = \left((T'_{11} - \underline{W_{C2}T'_{12}})/(1 - \underline{W_{C2}}/\underline{W_{M2}})\text{EXP}(J(D+1)\Phi_R)\right)/ \qquad (18')$$
$$\left(V'_{11} - \underline{W_{C1}V'_{12}}\right)/(1 - (\underline{W_{C1}}/\underline{W_{M1}})\text{EXP}(J(D+1)\Phi_R))$$

$W_{C1} \approx \underline{W_{C2}}$ and $W_{M1} \approx \underline{W_{M2}}$ we have the following:

$W_{C1} \approx \underline{W_{C2}}$ and $W_{M1} \approx \underline{W_{M2}}$ we have the following:

$$Y_F = \overline{K_F}\text{EXP}(J\beta_F) = (T'_{11} - \underline{W_{C2}T'_{12}})/(V'_{11} - \underline{W_{C1}V'_{12}}) \qquad (19')$$

$$C_2/C_1 = X_F = K_F\text{EXP}(J\alpha_F) = \qquad (21A')$$
$$(T'_{11}\text{EXP}(J(D+1)\Phi_R))((V'_{11}\text{EXP}(J(D+1)\Phi_R))/\underline{W_{M1}} - V'_{12})/$$
$$\text{EXP}(J(D+1)\Phi_R)/\underline{W_{M1}}e^{jpK_{CM}} \approx 1$$

Therefore we have the following:

$$X_F = K_F\text{EXP}(J\alpha_F) = \qquad (22')$$
$$\text{EXP}(-Jp\underline{K_{CM}})\left(((T'_{11}\text{EXP}(J(D+1)\Phi_R)/\underline{W_{M1}}) - \underline{T'_{12}})\right)/$$
$$\left((V'_{11}\text{EXP}(J(D+1)\Phi_R)/\underline{W_{M1}}) - V'_{12}\right)$$

$$\text{EXP}(JD\Phi_R) = \left((X_F\text{EXP}(-Jp\underline{K_{CM}})\underline{V'_{12}} - \underline{T'_{12}})/\right. \qquad (23')$$
$$\left.((X_F\text{EXP}(Jp\underline{K_{CM}}))\underline{W_{M1}})V'_{11} - T'_{11}/\underline{W_{M2}}\right)$$

$$\text{EXP}(JD\Phi_R) = \underline{W_{M1}}\left((X_F\text{EXP}(Jp\underline{K_{CM}})\underline{V'_{12}} - \underline{T'_{12}})/\right. \qquad (24')$$
$$\left.((X_F\text{EXP}(Jp\underline{K_{CM}}))V'_{11} - T'_{11}\text{EXP}(-Jp\underline{K_{CM}})\right)$$

-continued $$M_1 = (V'_{11} - \underline{W_{C1}V'_{12}})/(1 - (\underline{W_{C1}}/\underline{W_{M1}})\text{EXP}(JD\Phi_R)) \qquad (16')$$

$$M_2 = (T'_{11} - \underline{W_{C2}V'_{12}})/(1 - (\underline{W_{C2}}/\underline{W_{M2}})\text{EXP}(JD\Phi_R)) \qquad (17')$$

Evaluation of the following assumptions:
The first assumption as follows:

$$(1 - (W_{C1}/W_{M1})) = (1 - (W_{C2}/W_{M2})\text{EXP}(JD\Phi_R)) \qquad (A)$$

$$W_{M1} = A_{CM}\text{EXP}(J(\Psi + K_{CM}(t - y));$$
$$\underline{W_{M1}} = A_{CM}\text{EXP}(J(\Psi + \underline{K_{CM}}(t - y))$$
$$\underline{W_{M2}} = W_{M2} = \underline{W_{M1}} = W_{M1}$$
$$\quad = A_{CM}\text{EXP}(J(\Psi) \text{ at the peak of mover}$$
$$W_{M2} = A_{CM}\text{EXP}(J(\Psi + K_{CM}(t + p - y));$$
$$\underline{W_{M2}} = A_{CM}\text{EXP}(J(\Psi + \underline{K_{CM}}(t + p - y))$$
$$W_{C1} = A_{CM}\text{EXP}(J(\Psi + K_{CM}(s - x)); \underline{W_{C1}}$$
$$\quad = A_{CM}\text{EXP}(J(\Psi + \underline{K_{CM}}(s - x))$$
$$W_{C2} = A_{CM}\text{EXP}(J(\Psi + K_{CM}(s + p - x))$$
$$\underline{W_{C2}} = A_{CM}\text{EXP}(J(\Psi + \underline{K_{CM}}(s + p - x))$$

s—is the FRDB processed
t—is the FRDB relative to where the target is processed
y—is the FRDB the targets angle position is relative to where target is processed
x—is the FRDB the clutter peak position is at It is assumed that the amplitude offset within the extent of FRDBs for target angle and clutter angle the change is very small. It is even more appropriate for the target angle alone or the clutter angle.

It is assumed that offset angle within the extent of the FRDBs for target angle and clutter angle the change is very small. It is ever more appropriate for target angle alone or clutter angle alone or clutter angle.

It is assume that slope of the angle is constant within the extent of the FRDBs for target and clutter. It is more appropriate for target alone or clutter alone. It is noted the factors above for P-DPCA or Q-DPCA compensation does not equal to the factors for time only DPCA compensation (reference section III D).

Looking at the terms $W_{C1}/W_{M1}$ and $W_{C2}/W_{M2}$ in equation (A) we have the following:

$$W_{C1}/W_{M1} = A_{CM}\text{EXP}(J(\Psi + K_{CM}(s - x))/$$
$$A_{CM}\text{EXP}(J(\Psi + K_{CM}(t - y))$$
$$= \text{EXP}(J(K_{CM}\{(s - t) + (y - x)\})$$

$$W_{C2}/W_{M2} = A_{CM}\text{EXP}(J(\Psi + K_{CM}(s + 1 - x))/$$
$$A_{CM}\text{EXP}(J(\Psi + K_{CM}(t + 1 - y))$$
$$= \text{EXP}(J(K_{CM}\{(s - t) + (y - x)\})$$

Therefore the assumption in equation (A) that the left side of the equation is equal to the right side of the equation is correct.

Looking at the two terms in equation (21A) as follows:

$$((EXP(JD\Phi_R)/W_{M1}) - 1/W_{C1})/$$
$$((EXP(JD\Phi_R)/W_{M2}) - 1/W_{C2}) =$$
$$W_{M1}/W_{M2}((EXP(JD\Phi_R) - W_{M1}/W_{C1})/$$
$$(EXP(JD\Phi_R) - W_{M2}/W_{C2}))$$

(B)

From the previous example $(W_{M1}/W_{C1})=W_{M2}/W_{C2})$ therefore equation (B) becomes the following:

$$(B) = W_{M1}/W_{M2}$$

and this is equal to the following:

$$W_{M2}/W_{M1} = (A_{CM}EXP(J(\Psi + K_{CM}(t-y)))/$$
$$(A_{CM}EXP(J(\Psi + K_{CM}(t+p-y))) = EXP(JpK_{CM})$$

p is the number of FRDBs that $W_{M1}$ and $W_{M2}$ is measured from each other or processed from each other. Therefore we have the following equation:

$$(B) = EXP(JpK_{CM})$$

if p=1 Then $$(B) = EXP(JK_{CM})$$

IV System Employed to Attain the Objective of the Disclosure

A. Basic System and Objectives

This disclosure presents the fundamental radar principles and from them the mathematically developed equations and methodology employed in attaining the object of the disclosure. It illustrates a number of possible implementations but not all possible implementations. It is therefore considered with people familiar in the state of the art, implementations in a different manner could be employed but with the same fundamental principles and basic equations.

This is an airborne system employing a one dimensional electronically scanned phased array implementing a transmit antenna and dual receive sub-arrays employing displaced phase center antenna (DPCA) techniques. The transmit beam, which may be the sum of the two (2) sub-arrays, and the receive sub-arrays are aligned along the same bore-sight of the antennas and are moved with the platform after each transmitted pulses. Pulse Doppler operation will be implemented in the low or near zero clutter area to detect targets and measure their relative radial velocity and angular position as well as range (Reference Section III, D, 1).

Targets detected in the significant clutter region where pulse doppler techniques are ineffective, DPCA techniques (as are described in Section III, D in the disclosure) will be implemented to detect targets and measure their relative radial velocity and angular position and range.

1. Specific System to Illustrate Principles, Equations and Objective

In the following disclosure a specific radar system will be employed as an example. This will be a real system, with real parameters that illustrate the system (Reference Section III, A).

A transmit and two receiving subarrays are aligned to have the same coverage. The boresights of the antennas are aligned. A number of "N" pulses illuminate the targets in the coverage. The "N" data points are processed in the two receiving subarrays to attain the objective of this disclosure. Range and Doppler ambiguity are resolved to the desired level by the transmission of additional one or more pulse repetition frequencies. Example is Section III A, radar parameters. Included in the example is the zero-fill spectrum of multiply by four (4) analyses as illustrated in FIG. 9.

FIG. 3 illustrates the basic block Diagram of the system.

Block Diagram of non-ideal system in FIG. 3. Subarray 1 processor receives the "N" radar data points (In phase & Quadrature data), which are equal to 64 I, &Q data points in our illustrative example. They are N×S zero fill that is ×4 in the illustrative example as shown in FIGS. 3 and 9. It processes the radar data by applying a weighting functions and then performing a spectrum analysis (such as fast fourier transform (FFT)). Obtaining (64×4) 256 doppler bins with a frequency resolution 1000 Hz/64=15,625 Hz spaced 3,9063 Hz apart. This is illustrated in FIG. 9. FIG. 9 the (large range Doppler bins) LRDBs are O$o$ to 63$o$ and the (fine range Doppler bins) FRDBs are $O_1$, $O_2$, $O_3$ to $63_1$, $63_2$, $63_3$. FIG. 9 also illustrates the spectrum for subarray 1 and subarray 2. Subarray 2 is processed in the same manner and starts with the "D" pulse (5 pulse delay) or delayed to pulse "6", or (6 pulse delay) or delayed to pulse "7" so that the distance subarray 2 travels is as close as possible to the distance (Section III, D) required to cancel clutter and to be able to detect a target, in any FRDB.

Target detected in the very low clutter region is discussed in Section III, D, 1 detecting the target and measuring its radial velocity and azimuth position in the low clutter region is simple and straightforward. This is also shown in FIG. 1.

2. Clutter Weighting Function ($W_c$) and Target Weighting Function ($W_m$) Analysis.

a) $W_c$ Weighting Function Analysis

The equation for $W_c$ represents the weighting function between subarray 1 and 2 that maximizes clutter cancellation. Based on the angular location of clutter, $W_c$ is calculated. $W_c$ is a least mean square vector that multiplied by the FRDB of subarray 2 and subtracted from the corresponding FRDB of subarray 1 makes the clutter equal in amplitude and phase so when subtracted the clutter is close to zero. This is the weighting function of clutter between corresponding FRDBs of subarray 1 and 2.

Similarly the target vectors detected in sub-array 1 and 2 for more precise results should be as accurate as possible.

If the precise angular position of the target were known in an analogous way the $W_M$ of the target would be calculated to make the target vectors of the correct amplitude and phase. The azimuth of the target is not known at this point and therefore this $W_M$ may not be calculated as yet but is a function of $\phi_A = \phi_D - \phi_R$.

Since the target has to be in the main beam of the antenna (assumed only targets within the 3 db points of the main beam are detected).

The $W_C$ may be calculated for every FRDB in the main beam and where ever clutter is of significant amplitude may apply to clutter or target at that particular angular position.

Usually $W_C$ is calculated at a particularly FRDB to cancel clutter, but in this case it is employed also to ascertain the filter response of clutter. If $W_c$ is ideally equal to one (1) at an angle "0", that is the term applied to the clutter in that particular FRDB processed to cancel clutter. If the $W_C$ is employed to determine target filter response ($K_F$ and $B_F$), it has a value set by equation (19) of Section III, E.

The $W_C$ term to cancel clutter, when clutter is detected at its peak ideally is equal to amplitude response "1" and phase response "0", Section II, D—depicts the error is proportional to where the clutter is detected in the clutter filter. The phase error is "0" at the center of the filter and larger as the clutter is detected toward the edge of the filter.

FIG. 16 and FIG. 25—Table I shows the phase response error as a function of where the peak response of clutter (filter response). FIG. 16 depicts the amplitude and phase response of clutter detected in a particular FRDB where $3q$ is the peak of clutter, $2q$ is the amplitude and $4q$ is the phase response. Also is shown the ideal phase response T-DPCA ($7q$) and $8q$ the phase response for P-DPCA and $10q$ for Q-DPCA. The X-axis is the FRDBs. FIG. 25—Table I shows the same information with numbers instead of graphical form as in FIG. 16. The amplitude and phase response of clutter within a filter is ($K_F$ and $K_F$). The amplitude and phase response of clutter due to a change in time of clutter is K and K. It also shows the ideal phase response for P-DPCA and Q-DPCA as a function of FRDB. It is essential to note the correlation between all these responses that if one is known all are known or estimated accurately. Therefore as shown $W_C$ is related to where in the clutter filter response curve is the peak of clutter located and the also determines the change in clutter $X=KEXP(J\alpha)$. If $W_C$ is known the clutter response and the change in clutter is known (FIG. 16).

Figure 18:
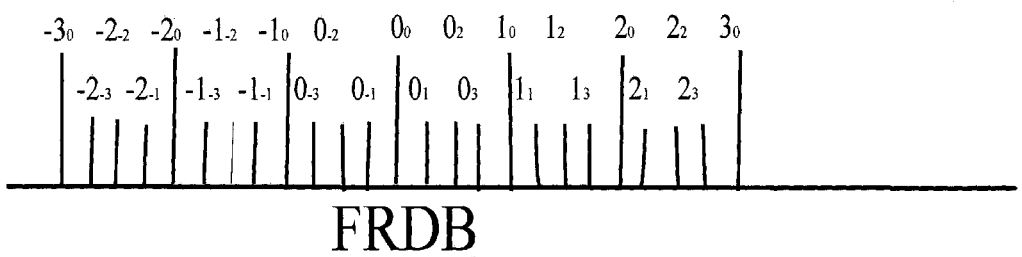
FIG. 18 depicts Clutter and Target Detection Diagram

It is also determined that the targets azimuth position decides the response rel6ated to target ($W_M$—amplitude and phase response and the change in target). (FIGS. 17 and 18 and FIG. 26—Table II and FIG. 27—Table III). FIG. 17 is analogous to that of FIG. 16 is for clutter, the same information is obtained, the difference is the target azimuth position is not where the target is detected as with clutter. As shown the target azimuth position is at different position. FIG. 17 $3r$ is the target peak, $2r$ is the amplitude response and $4r,7r$, and $9r$ are phase responses for their respective DPCA delays. The X-axis is FRDBs. FIG. 26—Table II shows the same information with numbers instead of graphical form as in FIG. 17. Analogous to clutter the amplitude and phase response of target within a filter is ($\mathbb{K}_F$ and $B_F$). The amplitude and phase response of target due to a change in time of target is ($\mathbb{K}$ and B). It also shows the ideal phase response for P-DPCA and Q-DPCA as a function of FRDB. It is essential to note the correlation between all these responses that if one is known all are known or estimated accurately. FIG. 27—Table III is a table of $W_M$ as a function of FRDB. FIG. 18 illustrates the example of target detection in clutter. Since the zero-fill employed in the implementation each LRDB filter has four (4) FRDB filter within its resolution (FIG. 9—Zero Fill Spectrum Analysis), the $W_M$ determination is so calculated. If the position of the target angle is determined the $W_M$ may be calculated and computed more precisely.

When the target is detected in a particular FRDB the angular position of the target ($\phi_A$—phase shift proportional to angular position) is unknown at this point and the $W_M$ in equation (2) in Section II, F. The angular position of the target may be determined relative to the detected target ($\phi_D$) and the relative radial velocity of the target ($D\phi_R$) as follows:

$\phi_A = \phi_D - \phi_R$.

Since the angular position of the target ($\phi_A$) from above is determined the filter (FRDB) is determined.

The weighting function of clutter measured at a particular FRDB is as follows:

$$W_C = A_{CM} e^{j(\Psi_{CM} + K_{CM}(s-x))} W_C = A_{CM} e^{j(\Psi_{CM} + K_{CM}(s-x))}$$

$W_c$=weighting function of clutter $A_{CM}$=Offset Amplitude of clutter (due to mismatch of receiving antennas and other affects)

$\Psi_{CM}$=Offset Angle of clutter (due to mismatch of receiving antennas and other affects)

$K_{CM}$=P-DPCA slope of phase error of clutter x=position of peak of clutter s=actual position of clutter processed relative to the peak of clutter The measurement of $W_C$ at any particular FRDB just measures the $A_{CM}$ and $\Psi_{CM}$ since the measurements obtains the least mean square of a number of range bins. What is to be determined is whether that particular piece of clutter is at its peak and (s-x), and from this term and the known $K_{CM}$ then $W_C$ is determined.

Therefore to summarize measuring a particular FRDB obtains the offset angle and offset amplitude of the clutter weighting function. Measuring all FRDBs, with clutter, would obtain all the offset angle and offset amplitude and would determine if there are any significant differences as a function of FRDB.

The other term $K_{cm}$ (s-x) is obtained by determining (s-x) since $K_{CM}$ is known. The (s-x) term is determined by knowing where the peak of clutter is relative to the FRDB processed or by calculation in an equation where it can be determined.

b) $W_M$—Weighting Function Analysis

The target is detected at a particular FRDB but the value of $W_M$ is determined at the targets angular position. The targets angular position is the position at which the target resides. Because the radar detects the target based on its phase shift change per pulse or frequency response, it will detect the target based on the total phase shift per pulse that due to angular position from the bore sight of the antenna plus that due to the relative radial velocity of the target. Clutter on the other hand has only one component of velocity (phase shift per pulse) due to its angular position from the bore sight of the antenna). If we had a perfect DPCA compensation between array 1 and array 2 clutter would cancel completely since it has no relative radial velocity of its own. This cancellation would be based on its angular position (filter response) would be identical in both arrays and therefore cancel.

The target on the other hand would not cancel due to the two components of filter response, the component of the target due to its angular position and the component due to its relative radial velocity are not known, but the sum of the two are known in the terms of $\Phi_D$ which has both components. If the target is stationary, it would be detected with its component of doppler proportional to off bore sight of the antenna and would act just like clutter and cancel when the outputs from both arrays are subtracted. When the target moves (moves radially), the component of target due to its angular position is the same and could be cancelled and its angular position was known and cancelled like if it were clutter at that angular position (therefore make the amplitude and phase of the two mover vectors equal), but the component of the target that moves radially would not cancel because this would produce a phase between the two mover vectors in both arrays proportional to the velocity of the target.

Therefore the target components of velocity due to its angular position would cancel if its angular position were known, and behaves like clutter at that position. The target components are not known at this point, therefore if the relative radial velocity is known the angular position could be calculated and the $W_M$ could be determined by measure of the $W_C$ of clutter at that angular position and this would be its value. Like the $W_C$ of clutter makes the amplitude and phase of clutter in array 1 and array 2 equal therefore cancel each other when array 2 is subtracted from array 1. The $W_M$ would make the target (mover vector) amplitude and phase equal, but due to the angular position, that is due to its relative radially velocity have a phase shift between the two mover vectors in array 1 and 2. Therefore this would make the two mover vectors equal in amplitude and phase due to its angular position and the difference in phase of the mover vectors would be only that due to the relative radial velocity.

c) Clutter and Target Weighting Function Analysis

The analysis of Section III the DPCA theory and the calculations for "(D+1)" time delay (Q-DPCA) error and the ("D") time delay (P-DPCA) (FIGS. 16–17 and FIGS. 25–27, Table I–III).

In the succeeding analysis of this system in this section the various systems will be treated as follows:

1) Ideal System
    a) Two receiving sub-arrays are matched perfectly ($W_C$ and $W_M$ are negligible).
    b) The target and clutter are detected at the peak of the filter response.
2) Non-Ideal System
    a) The two receiving subarrays are not exactly matched.
    b) $W_C$ and $W_M$ calculations must be performed and determined.
    c) $W_C$ and $W_M$ response has an ($A_{CM}$) gain offset that is at least constant for a few FRDBs.
    d) $W_C$ and $W_M$ response has ($K_{CM\ OR}\ \underline{K_{CM}}$) phase response that is linear but has a phase offset ($\overline{\Psi_{cm}}$) that is constant for at least a few FRDBs.
    e) Peak of the target is detected at the peak of the filter response and corresponds to $W_M = A_{CM} e^{j(\Psi_{CM} + K_{CM}(t-y))}$. This will be defined later in the section.
    f) Peak of the clutter is detected at the peak of the filter response and corresponds to $W_C = A_{CM} e^{j(\Psi_{CM} + K_{CM}(s-x))}$. This will be defined later in the section.

B. Processing a System where the Target is Detected in the Same FRDB at Two Sequential Times System Processing The Target In The Same Filter at Two Sequential Times ($\Delta T$ processing) Reference Section III, G.

As depicted in FIGS. 16 to 19 and FIG. 25—Table I to FIG. 29—Table VI, the various parameters that make up the system are illustrated. This assumes the radar parameters as stated in the previous paragraphs and the mathematical development of Section III.

The key role that makes the system amenable to a solution is the relationship between the clutter filter response, $K_F$ and $\alpha_F$, and the clutter change in time, K and $\alpha$, and the clutter weighting function, $W_C$. These relationships are fixed and illustrated in FIG. 16, "Ideal Clutter Filter Response and Time change and $W_C$ Response," and FIG. 25—Table I, "Ideal Clutter Response Correlated with Ideal Clutter Time change and Ideal $W_C$ Response." If any one of these parameters is known, the other two are known or estimated very closely. For instance if clutter weighting function, $W_C$, is measured ideally at amplitude "1" and phase shift "0" then the relative clutter response is the amplitude is a maximum and equals maximum and relative phase response is zero ("0"). The change in clutter from one data point to next in time is illustrated as $K_X = 1.0$ and $\alpha_X = 0.0$ FIG. 16 illustrates all other conditions and there values. Therefore if one knows one parameter it knows all others (shown in FIG. 16 and FIG. 25—Table I.)

The filter response is the spectrum analysis performed on the data.

The change in clutter with time is also performed for the filter response of clutter.

The weighting function of clutter ($W_C$) is performed on real data and determined as described in Section III.

Another key role that makes the system amenable to a solution is the relationship between the target filter response, the relative target filter response ($\overline{K_F}$, $B_F$), and the target change in time ($\underline{K}$, B) and the target weighting function ($W_M$). This relationship is fixed and illustrated in FIG. 17, "Target Ideal Filter Response," and FIG. 18, "Target Azimuth—$W_m$ Determination" as well as FIG. 26—Table II, "Table of Target Ideal Filter Response Correlated With Target Relative Filter Response and Relative Target Change with Time." This is analogous to that of clutter in the previous paragraphs.

The detection of the target at its peak amplitude is at its maximum and the filter response is proportional to the total velocity of the target. This velocity has a component due to its angular position and that due to its relative radial velocity. Clutter has a filter response only due to its angular position off bore-sight of the antenna. At this point the angular position of the target is unknown. The targets relative radial velocity is also unknown, only the total velocity of the target is known the sum of the velocity due to angular position and that due to its relative radial velocity. Since phase shift is proportional to velocity, the total phase shift (filter response) of the target is the addition of the phase shift due to angular position added to that due to the relative radial velocity of the target.

The target filter response as shown in FIG. 17 and FIG. 26—Table II determines the relative target filter response and the target change with time but doesn't determine the weighting function for target ($W_M$). $W_M$ is determined by the angular position of the target that is unknown from the detection of target only. Unlike clutter, the detection of target that has two components which at this time are undetermined and one being the angular location of the target.

The ($W_M$) weighting function of the target has to await the determination of the angular position of the target. Once the angular position of the target has been determined FIG. 18 and FIG. 26—Table II will give the weighting function ($W_M$) of the target. $W_M$ can be expressed in terms of $[(\phi_D - \phi_R) = \phi_A]$ which are the proportional to the angular position of the target where $\phi_A$ which is not known but is a function of $\phi_D$ that is known but that $\phi_R$ is unknown at this point.

The "y" position off the peak of target is determined by the difference in position of the peak of its maximum amplitude and the position where it's processed.

$$W_M = |A_{CM}| \text{EXP}(J(\Psi_{CM} + K_{CM}(s-y))) W_M = |A_{CM}| \text{EXP}(J(\Psi_{CM} + K_{CM}(s-y)))$$

The equation is as where $K_{CM}$ and $\Psi_{CM}$ and $|A_{CM}|$ are determined by azimuth position ($\Phi_A$) but assumed constant. If not an average value may be taken across the beamwidth of the antenna. When an estimate is close to the azimuth it will determine a closer estimate. A more accurate requirement will require an iterative process.

The other key element is the zero fill (×4) which four (4) times more Doppler bins where target and clutter are detected as illustrated and discussed in Section III, C. The four more doppler detections will be employed to determine the objective of the disclosure, to find the relative radial velocity of the target ($\phi_R$).

B1. Employing P-DPCA

With the aforementioned information on the weighting function of clutter ($W_C$) and the associated information as well as that for the weighting function of target ($W_M$) and its associated information and the derived equations and information of Section III, the object of the disclosure will be attained. The procedure will be set forth with an example as follows:

The target and clutter is as in FIG. 18, "Clutter and Target Detection Diagram".

Target Peak Amplitude Detection at FRDB-$O_0$
Clutter Peak Amplitude Detection at FRDB-$O_1$
Target Angular Position at FRDB $61_0$ ($-3_0$)

For Q-DPCA Compensation (P-DPCA) and employing equation (19)

$$Y = \underline{K} e^{jB} = \text{amplitude 1 and angle } 0 = (V_{1,1}{}^{11} - W_C V_{1,2}{}^1)/(V_{1,1}{}^1 - W_C V_{1,2}{}^1) \quad (19)$$

Detecting a target at its peak is performed by subtracting corresponding filters from array 1 and 2 and detecting a target (which does not cancel to near zero like clutter). Performing this operation on all corresponding filters where the target is detected determines the FRDB where is the peak amplitude of target.

Estimating $\underline{K}=1$ and $B=0$ since the target was detected at its peak and from Table II target time change $\underline{K}=1$ and $B=0$.

With $\underline{K}$ and B substituted in equation (19) of section III $$\underline{K} e^{jB} = (V''_{11} - \underline{W_{CI}} V''_{12}) / (V'_{11} - \underline{W_{CI}} V'_{12})$$

and solving for $W_c$. All other parameters are known. Solving for x where $W_{C1} = A_{CM} e^{j(\Psi_{CM} + K_{CM} X)}$ we have the following:

$$\underline{K} e^{jB} = (V''_{11} - \underline{W_{CI}} V''_{12})/(V'_{11} -$$

$$\underline{W_{CI}} V'_{12}) \text{ for P-}DPCA \text{ and } K e^{jB} = 1 \text{ and solve for } x$$

$$\underline{W_{CI}} = A_{CM} e^{j(\Psi_{CM} + K_{CM}(S-X))} = K_1 = (V''_{11} - V'_{11})/(V''_{12} - V'_{12})$$

$$e^{jK_{CM} X} = K_2 = K_1/A_{CM} e^{j(\Psi_{CM})} e^{jK_{CM} S}$$

$$|1| = |K_2| - K_{CM} X = K_2 \text{ angle}$$

$$x = K_2 \text{ angle}/(-K_{CM})$$

The above solution is the location of the peak of clutter for P-DPCA. An analogous solution is for Q-DPCA as follows:

$$\underline{K} e^{jB} = (V''_{11} - \underline{W_{CI}} V''_{12})/(V'_{11} - \underline{W_{CI}} V'_{12})$$

$$\text{for Q-}DPCA \text{ and } K e^{jB} = 1 \text{ and solve for } x$$

$$W_M = |A_{CM}| \text{EXP}(J(\Psi_{CM} + K_{CM} y))$$

$$W_M = |A_{CM}| \text{EXP}(J(\Psi_{CM} + K_{CM} y))$$

$$\underline{W_{C1}} = A_{CM} e^{j(\Psi_{CM} + \underline{K_{CM}}(S-X))}$$

$$= \underline{K'_1} = (V''_{11} - V'_{11})/\underline{V''_{12} - V'_{12}}$$

$$e^{j\underline{K_{CM}} X} = \underline{K'_2} = \underline{K'_1}/A_{CM} e^{j(\Psi_{CM})} e^{j\underline{K_{CM}} S}$$

$$|1| = |\underline{K'_2}| - \underline{K_{CM}} X = \underline{K'_2} \text{ angle}$$

$$x = \underline{K'_2} \text{ angle}/(-\underline{K_{CM}})$$

The solution "x" for P-DPCA and Q-DPCA should be the same or very close to each other.

The $W_c$ solution will be as shown on FIG. 16 and FIG. 26—Table I which on the same table the change in time $K=0.99$ and $\alpha=-0.02$ ($X = Ke^{j\alpha}$). Since the clutter is one FRDB ($O_1$) to the right of processed FRDB ($O_0$).

Employing equation (23) we have the following:

$$e^{jD\phi R}/W_m = (X V'_{1,2} - V''_{1,2})/(X V'_{1,1} - V''_{1,1}) \quad (23)$$

substituting X in right side of equation and its all known quantities will set that equal to $Ae^{jD\Phi'_R}$. Rewriting equation (23) hence the following.

$$e^{jD\phi R} = W_M |A| e^{jD\phi' R} \quad (24)$$

$$W_M = A_{CM} e^{j[\Psi_{CM} + K_{CM}(t-y)]} \quad (25)$$

Setting the exponentials or angles equal we have the following:

$$D\phi_R = \Psi_{cm} + K_{cm}(t-y) + D\phi'_R \quad (26)$$

$$\phi_A = \phi_D - \phi_R \quad (27)$$

t—is the FRDB processed relative to where the target is at its peak which is $-3_0$ y—is the FRDB of the target angular position, which is at FRDB $61_0$ ($-3_0$).

All other parameters have been defined previously. The $D\phi'_R$ term give the approximate location of the target, close enough to give a good estimate of $\Psi_{CM}$ and $A_{CM}$. From the first estimated $D\phi'_R$ is taken as the closest FRDB equal to $D\phi'_R$. In this case $D\phi'_R = D\phi_R$ and the ideal $W_M$ phase will equal $\Psi_{CM} + 0$. The term $K_{CM}(t-y)=0$, the ideal $W_M$ phase shift, since the angular position of target is FRDB $61_0(-3_0)$. The FRDB is at the same zero position so that (t-y)=0 ($\phi_A$—proportional to the angular position of the target). If this does not occur on first estimate and iterate until the solution is attained.

As indicated in FIG. 31—Table VII and FIG. 18, example 1, there is only one correct solution, which is at FRDB ($61_0$) where the $W_M$ and $D\phi_R$ are correct, in all other possible solutions where the $W_M$ and $D\phi_R$ are incorrect.

The second example indicated in FIG. 18, if the peak of the target is not at the peak of a FRDB but somewhere in between FRDBs. The detection of the peak of the target, the peak of clutter, the $D\phi_R$ and the $\phi_A$ probably will not be at the FRDB or somewhere in between and to get greater accuracy is the estimation of $D\phi_R$, this has to be taken into account.

Therefore an estimate of these parameters with an interpolation techniques and/or zero fill greater than (4) four could be employed. Also a specialized filter in the places where targets are detected to get as close an estimate of the parameters as necessary to the required accuracy. This would be true of example 2.

Performing the above operations determine the position of the peak of clutter. Performing the processing where the clutter is at its peak makes $Ke^{j\alpha}$ where $K=1$ and $\alpha=0$ for (FRDB=$0_1$ where processed) and an estimate of $Y=\underline{K}e^{jB}$ where $\underline{K}=0.99$ and $b=-0.02$ B2. Employing Q-DPCA Operation at D=6

The previous procedure was performed with the P-DPCA and this analogous procedure may be implemented with Q-DPCA and results compared.

B3. Employing P-DPCA and Q-DPCA (No Estimate of Y or X Necessary)

1. Operation to Attain X Equating Y to Attain X

The approach would to equate equations (19) and ($\underline{19}$) and solve as follows:

$$(V''_{1,1} - W_{c1}V''_{1,2})/(V'_{1,1} - W_{c1}V'_{1,2}) = (V''_{1,1} - \underline{W_{c1}}\underline{V''_{1,2}})/(V'_{1,1} - \underline{W_{c1}}V'_{1,2}) \quad A)$$

and since from the previous development we have the following:

$$W_{C1} = A_{CM}e^{j[\psi_{CM} + K_{CM}(s-x)]} \quad B)$$

$$\underline{W_{C1}} = A_{CM}e^{j[\psi_{CM} + \underline{K_{cm}}(s-x)]} \quad C)$$

Performing all the algebra for equation (A) and reducing all known quantities to constants ($K_1$, $K_2$ etc.) we have the following:

$$(K_1/W_{c1}) + (K_2/\underline{W_{C1}}) = 1 \quad D)$$

where $K_1=|K_{1m}|e^{jK_{1A}}$ and $K_2=|K_{2m}|e^{jK_{2A}}$

Substituting in equation (D) $K_1$, $K_2$, $W_{c1}$ and $\underline{W_{C1}}$ we have the following:

$$(|K_{1m}|/|A_{cm}|)e^{j[K_{1a} - [\psi_{CM} + K_{CM}(s-x)]]} +$$
$$(|K_{2m}|/|A_{cm}|)e^{j[K_{2A} - [\psi_{CM} + \underline{K_{cm}}(s-x)]]} = 1 \quad E)$$

Substituting new constants $K_A$ and $K_B$ for known quantities we have the following:

$$K_A e^{-jKcm\ x} + K_B e^{-j\underline{Kcm}\ x} = 1 \quad F)$$
$$e^{-jKcm\ x} = 1 - jK_{CM}\ x \text{ and } e^{-j\underline{Kcm}\ x} = 1 - j\underline{K_{CM}}\ x$$
$$K_A = K_{AX} + JK_{AY} \text{ and } K_{BX} + JK_{BY}$$

$$K_A e^{-jKcm\ x} + K_B e^{-j\underline{Kcm}\ x} = 1 \quad F)$$

where $K_{CM}$ x and Kcm x are small angles therefore we have the following:

$$e^{-jKcm\ x} = 1 - jK_{CM}\ x \text{ and } e^{-j\underline{Kcm}\ x} = 1 - j\underline{K_{CM}}x$$

Taking equation (F) and substituting for $K_A = K_{AX} + jK_{ay}$ and $K_B = K_{BX} + jK_{by}$ and equating the real and imaginary parts of the resulting equation we have the following:

$$K_{AX}\cos(-K_{CM}x) - K_{AY}\sin(K_{CM}x) + \quad (G)$$
$$K_{BX}\cos(-\underline{K_{CM}}x) - K_{BY}\sin(\underline{K_{CM}}x) = 1$$

$$K_{AX}\sin(-K_{CM}x) + \quad (H)$$
$$K_{AY}\cos(K_{CM}x) + K_{BX}\sin(-K_{CM}x) + K_{BY} = 0$$

Where $x = (K_{AY} + K_{BY})/(K_{AX}K_{CM} + K_{BX}\underline{K_{CM}})$

All quantities are known in equations (G) and (H) except x. There are two equations for the solution of x. They should both give the same value for x or very close or within the tolerance required to get a good solution.

Another approach to the solution is the following taken advantage of (F')$K_{CM}=-\underline{K_{CM}}$ and therefore (F''') $K_A e^{jK_{CM}x} + K_B e^{-jK_{CM}x} = 1$ and $y = e^{jK_{CM}x}$ we have $K_A y + K_B/y = 1$ and $K_A y^2 - y + K_B = 0$. The last equation is a quadratic solution which solves x as above The two solutions of x one may be eliminated by a reasonableness test (a possible solution) or a comparison with the P-DPCA or Q-DPCA solution.

This also should agree with the value of x in the previous solutions for P-DPCA and Q-DPCA. There are three (3) methods of attaining x. This method does not rely on an estimate of Y.

With the last method a more easily attained $W_c$ can be obtained with only a few FRDB candidates from the FRDB processed. With only a few candidates considered, if more accurate x is required an interpolation may be performed or more detailed values of FRDB candidates performed.

From this value of x and employing FIG. 16 and FIG. 26—Table I and the value of X may be obtained and employed in the equation for x in P-DPCA and Q-DPCA solution for $D\Phi_R$.

The procedure for Q-DPCA would be analogous to that of P-DPCA and the results should be the same as for P-DPCA (or be very close within the accuracy required).

2. Employing Q-DPCA and P-DPCA and Equating X and Solving for $\Phi_R$.

Another approach would be to equate equation (22) and ($\underline{22}$) and substitute $W_m$ and $\underline{W_m}$ as follows:

$$(V''_{1,1}e^{jD\Phi_R} - WmV''_{1,2})/(V'_{1,1}e^{jD\Phi_R} - WmV'_{1,2}) =$$
$$(V''_{1,1}e^{j(D+1)\Phi_R} - \underline{Wm}\underline{V''_{1,2}})/(V'_{1,1}e^{j(D+1)\Phi_R} - \underline{Wm}\underline{V'_{1,2}})$$

After performing all the algebra we obtain the following:

$$e^{j6\phi R}/W_M K_1 + e^{j5\phi R}/\underline{W_M} K_2 + K_3 = 0 \quad (A)$$

Everything is known in the above equation except $\phi_R$ and $W_M$ and $\underline{W_M}$. Notice the formula for $W_M$ and $\underline{W_M}$ is the following:

$$W_M = A_{CM}e^{j[\psi_{CM} + K_{CM}(t-y)]} \quad B)$$

$$\underline{W_M} = A_{cm}e^{j[\psi_{CM} + \underline{K_{cm}}(t-y)]} \quad (B')$$

t—is the processed FRDB relative to where the target peak position

Assuming the target processed at the peak angular position then $\underline{W}_m = W_m = A_{CM} e^{j[\Psi_{CM}]}$ Then equation (A) may incorporate $\underline{W}_M$ and $W_M$ and we have the following:

$$e^{j(D+1)\Phi_R} + e^{jD\Phi_R} K'_1 + K'_2 = 0 \qquad (AA)$$

when the new constants contain $\underline{W}_m$ and $W_m$.

$$\phi_R = \phi_D - \phi_A$$

$$\phi_R = D\phi_R/D$$

and t−y is at its angular position proportional to $(\phi_D - \phi_R) = \phi_A$ where t=y $\phi_R$ is not known therefore not determined. The value of $K_{cm}$(t−y=0) is determined by the azimuth position of the target.

When substituting $W_m$ and $\underline{W}_m$ in equation (A) we have only $\phi_R$ that is unknown.

The variable $\phi_R$ is complicated to solve for but is uniquely solvable. A solution would be to substitute all candidate $\phi_R$s that are a possible solution and the closest $\phi_R$ that fits the equation is the solution. Another way to approach the solution is to assume $W_{M1} = \underline{W}_{M1} = A_{CM} e^{j\Psi_{CM}}$ and solve. This will give a close enough solution to get an estimate of $\phi_R$ from which the $\Psi_{cm}$ and $A_{cm}$ can be estimated closely and the number of candidate solutions reduced quite significantly since $W_M$ and $\underline{W}_M$ do not add significant error at the correct $\Phi_R$.

If delay D=5 and delay D+1=6. Another solution is taking equation (AA) and substituting $z = e^{j\Phi_R}$ and $z^5 = e^{j5\Phi_R}$ and $z^6 = e^{j6\Phi_R}$ and therefore equation (AA) becomes (BB) $K'_1 z^6 + K'_2 z^5 + K'_3 = 0$ FIG. 17, FIG. 18 and FIG. 31—Table VII illustrate the principles stated.

Computer simulation has shown the multiple candidate approach employed as effective. Test all $\Phi_R$ and determine the solution.

3. Equating X and Solving for $\Phi_R$.

In the previous B1 system, the calculation of $\phi_R$ was be equations (19) and (<u>19</u>) and (22) and (<u>22</u>). This technique will estimate Y (change in target from data point 1, to data point 2) and also X (change in clutter from data point 1 to data point 2). By P-DPCA and/or Q-DPCA methodology as performed in the previous section an estimate of Y and X are obtained.

We will repeat the ΔT basic equations as follows:

| Data Point 1 P-DPCA | Data Point 2 P-DPCA |
|---|---|
| (1) $V'_{1,1} = X_F C + Y_F M$ | (12) $V''_{1,1} = XX_F C + YY_F M$ |
| (2) $V'_{1,2} = X_F C/W_{c1} + Y_F M/W_{m1} e^{j5\phi R}$ | (13) $V''_{1,2} = XX_F C/W_{c2} + YY_F M/W_{m2} e^{j5\phi R}$ |

| Data Point 1 Q-DPCA | Data Point Q-DPCA |
|---|---|
| (1) $V'_{1,1} = X_F C + Y_F M$ | (12) $V'''_{1,1} = XX_F C + YY_F M$ |
| (2) $V'_{1,2} = X_F C/w_{c1} + Y_F M/W_{m1} e^{j6\phi R}$ | (13) $V'''_{1,2} = XX_F C/W_{c2} + YY_F M/W_{m2} e^{j6\phi R}$ |

All terms are defined in Section III or IV or in the Glossary of Terms $$(EXP(J5\Phi_R))/W_M = (XV'_{12} - V''_{12})/(XV'_{11} - V''_{11}) \text{ for } P\text{-}DPCA \quad \text{A)}$$

$$(EXP(J6\Phi_R))/\underline{W_M} = (X\underline{V'_{12}} - \underline{V''_{12}})/(X\underline{V'_{11}} - \underline{V''_{11}}) \text{ for } Q\text{-}DPCA \quad \text{A')}$$

Since $\underline{W}_M$ and $W_M$ are known therefore equation (A') divided by equation (A) and solving for $e^{j\Phi_R}$ we have:

$$e^{j\Phi_R} = \qquad \text{A1)}$$
$$\left(X\underline{V'_{12}} - \underline{V''_{12}}\right)/(XV'_{12} - XV''_{12})W_M = \underline{W_M} \text{ at } y = 0 \ W_M = \underline{W_M}$$

All terms on the right side of equation A1) are measured quantities therefore $e^{j\Phi_R}$ is known.

Substituting X into equation (A) and (A') and substituting constants $K_1$, $K_2$, and $K_3$ solving for $EXP(JD\Phi'_R)$ we have:

$$(EXP(J5\Phi_R))/W_M = (EXP(J5\Phi'_R)) = |K_A|EXP(JK_A) \qquad \text{A2)}$$

$$EXP(J6\Phi'_R) = (EXP(J6\Phi'_R))/\underline{W_M} = |K'_A|EXP(JK'_A) \qquad \text{A3)}$$

$W_M$ and $\underline{W}_M$ are known and incorporated in right side of equation equating the amplitude and phase of vector equation A2) and A3) we have:

$$|1/A_{CM}| * |K_A| = 1 \qquad \text{A4)}$$

$$5\Phi_R = 5\Phi'_R - \Psi_{CM} = K_A \qquad \text{A5)}$$

$$|1/A_{CM}| * |K''_A| = 1 \qquad \text{A6)}$$

$$6\Phi_R = 6\Phi''_R - \Psi_{CM} = K''_A \qquad \text{A7)}$$

The assumption made the difference between $5\Phi_R$ and $5\Phi'_R$, $6\Phi_R$ and $6\Phi''_R$ the values of $\Psi_{CM}$ and $A_{CM}$ does not change. (This assumption is not necessary but thought true and simplifies the computations and the explanations).

4. Solving for X Above and Equating X in Equation (A) and (A')

We should obtain the same solution. The known terms are replaced with constants we have the following:

$$K_1 e^{j6\Phi R} + K_2 e^{j5\Phi R} + K_3 = 0$$

$$y = e^{j\Phi R}$$

$$K_1 y^6 + K_2 y^5 + K_3 = 0$$

We have a sixth order equation where a close approximate solution may be had from the previous solution or from the P-DPCA alone or the Q-DPCA alone solution to obtain the solution of the above sixth order equation.

At 1000 HZ the P-DPCA D=5 solution at half the filter is 1.4 degrees, at ¼ of the filter it is 0.7 degrees and at ⅛ of the filter it is 0.35 degrees (Section III D). At 1000 HZ the Q-DPCA D=6 solution at half the filter is −1.4 degrees, at ¼ of the filter it is −0.7 degrees and at ⅛ of the filter it is −0.35 degrees At 750 HZ the Q-DPCA solution at half the filter is −0.35 degrees, at ¼ of the filter it is −0.175 deg. and at ⅛ of the filter it is −0.08 degrees. At 750 HZ the P-DPCA (Section III D) solution at half the filter is 0.35 degrees, at ¼ of the filter it is 0.175 deg. and at ⅛ of the filter it is 0.08 degrees This indicates that clutter detection must be at least approximately ¼ of the filter distant from the peak of clutter to make a significant difference.

One requirement is therefore is to process clutter off its peak to make this significant difference but at same time to detect target to have as large a change as possible.

Another approach would be detecting clutter at its peak, where the change in clutter would be close to zero. Then the approach would be when this condition is met the P-DPCA or Q-DPCA operation would be implemented. The added feature is to have a large a change in target as possible.

B5. Evaluation of equations for P-DPCA and Q-DPCA for $\Delta T$ and removing the approximation $W_{c1}=W_{c2}$ and $Wc1=W_{c2}e^{j\Delta K_{CM}}$ and $W_{M1}=W_{M2}$ at correct $\Phi_R$. $\Delta$ is the estimated difference in x from data point 1 to data point 2 for a nominal determination of s=x. The difference of K would be 0.001 from data point 1 to data point 2 that was determined from real data. Processing at the peak of clutter (s=x) we have the following:

$$Y = [G]e^{j\Delta K_{CM}/2}|\sin((D\Phi_R + \Delta K_{CM})/2)|/|\sin(D\Phi_R/2)||A_R = \quad (G)$$
$$||\sin((D\Phi_R + \Delta K_{CM})/2)|/|\sin(D\Phi_R/2)||$$

For Q-DPCA we have the following:

$$Y = [H]e^{j\Delta \underline{K_{CM}}}|\sin(((D+1)\Phi_R + \Delta \underline{K_{CM}})/2)|/|\sin(((D+1)\Phi_R)/2)| \quad (H)$$
$$A'R = |\sin(((D+1)\Phi_R + \Delta \underline{K_{CM}})/2|/|\sin(((D+1)\Phi_R)/2)|$$

For X and P-DPCA we have the following:

$$X = [I]e^{-j\Delta K_{CM}/2}|\sin(D\Phi_R + \Delta K_{CM}/2)|/|\sin(D\Phi_R/2)| \quad (I)$$

For X and Q-DPCA we the following:

$(J)X=[J]$ $$X = [J] \quad (J)$$
$$e^{-j\Delta \underline{K_{CM}}}|\sin((D+1)\Phi_R + \Delta \underline{K_{CM}}/2)|/|\sin((D+1)\Phi_R/2)|$$

Equation $(K) = (G)/(I) = Y/X = [G]/[I]e^{j\Delta K_{CM}}$

Equation $(L) = (J)/(H) = Y/X = [J]/[H]e^{-j\Delta \underline{K_{CM}}}$

Equation $(K)/(L) = [G]/[I]e^{j\Delta(K_{CM} + \underline{K_{CM}})} = [J]/[H]$

With an estimate of $\Delta K_{CM}$ and $\Delta \underline{K_{CM}}$ being very small and all the parameters are known except $\Phi_R$. This is a solution without knowing the value of X and Y (clutter and target). Processing at s=x for this solution but not necessary but a more complicated solution when s is not equal to x.

The procedure would be as follows:

Each candidate doppler bin ($\Phi_R$) is tested so that when the above equation is satisfied that doppler bin ($\Phi_R$) is the correct one.

Another solution is the following:

Taking the equation (I) and (J) dividing (I) by (J) we have the following:

$$[I]/[J]e^{-j\Delta(K_{CM}-\underline{K_{CM}})} = A_R/A'_R \quad (IJ)$$

With $\Delta$ having a negligible affect on the solution and with s=x everything is known except $\Phi_R$ we substitute all possible candidate solutions. The correct $\Phi_R$ will satisfy the above equation.

After obtaining the above results test equation (G) and (H) substituting all possible candidate solutions $\Phi_R$ and the Y obtained in each equation should be equal or close in value.

Another solution with the aid of determining the clutter peak in a different way then in the previous paragraphs would be as follows:

$$\text{LET } K_A e^{jK_A} = (V'_{11} - \underline{W_{C1}}V'_{12})/(V'_{11} - W_{C1}V'_{12})$$
$$= (1 - \underline{W_{C1}}/\underline{W_{M1}}e^{j(D+1)\Phi_R})/(1 - W_{C1}/W_{M1}e^{jD\Phi_R})$$
$$= e^{j\Phi_R/2}|\text{SIN}((D+1)\Phi_R/2)|/|\text{SIN}(D\Phi_R/2)|$$

Therefore when s=x $W_{C1}=\underline{W_{C1}}$ and $W_{M1}=\underline{W_{M1}}$ and as follows:

$$|K_A| = |\text{SIN}((D+1)\Phi_R/2)|/|\text{SIN}(D\Phi_R/2)|$$
$$e^{jK_A} = e^{j\Phi_R/2} \text{ Therefore } K_A = \Phi_R/2$$

The procedure would be as follows:

Each candidate doppler bin ($\Phi_R$) is tested so that when the above equation is satisfied that doppler bin ($\Phi_R$) is the correct one.

Other doppler bins may be processed in like manner such as on other side of the peak of target to obtain the peak of clutter. Also there are other range bins where the target is detected. They may also be processed and correlated to obtain the best solution.

Employing the same equations as for the previous solution for equating M we will equate C as follows:

$$C = (V'_{11}e^{jD\Phi_R}/W_{M1} - V'_{12})/(e^{jD\Phi_R}/W_{M1} - 1/W_{C1})$$
for $P - DPCA$ $$C = (V'_{11}e^{j(D+1)\Phi_R}/\underline{W_{M1}} - V'_{12})/(e^{j(D+1)\Phi_R}/\underline{W_{M1}} - 1/\underline{W_{C1}})$$
for $Q - DPCA$ At peak of clutter s=x and $W_{C1} \approx \underline{W_{C1}}$ and equating C we have an equation where the only unknown is $\Phi_R$ but of nth order and difficult to solve but solvable since the solution is real and restricted to a range of values. It can also be checked with previous solution equating M.

As in the previous solution other doppler bins may be processed in like manner such as on other side of the peak of target to obtain the peak of clutter. Also there are other range bins where the target is detected. They may all be processed and correlated to obtain the best solution.

Since there a limited number of solutions possible all candidate doppler frequencies are processed in both P-DPCA and Q-DPCA that at the correct frequency C,M,X and Y are equal.

B4. Determine $\phi_R$ by Estimating Y and X

Estimate of $Y_F$, Y and $X_F$, X with P-DPCA and/or Q-DPCA

Taking equation (1) and (12) and solving for C and M we have the following:

$$X_F C = (Y V'_{11} - V''_{11})/(Y - X) \quad X_F C = (Y V'_{11} - V''_{11})/(Y - X)$$

$$Y_F M = (X V'_{11} - V''_{11})/(X - Y) \quad Y_F M = (X V'_{11} - V''_{11})/(X - Y)$$

1. For P-DPCA employ equation (2) and solve for $e^{j5\Phi_R}/W_{M1}$ we have the following: $(2p)e^{j5\Phi_R}/W_{M1}=(V_{12}-X_F C/W_{C1})/Y_F M$ with all parameters on right side of the equation are measured, estimated or calculated therefore known. $W_{M1}$ known since at the correct "$5\Phi_R$" $W_{M1}=A_{CM}e^{j\Psi_{cm}}$ therefore we have a solution for "$5\Phi_R$" and for $\Phi_R$ and $\Phi_A$ and the object of the disclosure.

2. For Q-DPCA employ equation (2) and solve $e^{j6\Phi_R}/W_{M1}$ we have the following:

$$e^{j6\Phi_R}/\underline{W_{M1}} = (\underline{V'_{12}} - X_F C/\underline{W_{C1}})/Y_F M \quad (2q)$$

with all parameters on right side of the equation are measured, estimated or calculated therefore known. $W_{M1}$ and $\underline{W_{M1}}$ are known therefore we have a solution for "$6\Phi_R$" and for $\Phi_R$ and $\Phi_A$ and the object of the disclosure. The solution for P and Q-DPCA should be equal.

3. Estimating Y and X and Combining P-DPCA and Q-DPCA

Dividing equation (2q) by equation (2p) from the two previous sections we have the following:

$$e^{jJ_R} = (\underline{V'_{12}} - X_F C/\underline{W_{C1}})/(V'_{12} - X_F C/W_{C1}) * K_M$$

All parameters on right side of equation are known therefore the object of disclosure is determined. $K_M=\underline{W_M}/W_M$ Another solution or a check on the previous solution would be to process the data in the FRDB that clutter has peaked at (that would be x in the previous solution).

Correlation of the results of the two sets of data taken, all the resulting solutions and parameters should correlate closely.

For example the $D\Phi_R$ and $\Phi_A$ solution should be very closely correlate, the M calculated in both sets of data should be nearly equal and all other parameters should correlate, taken into account they are two sets of data closely spaced in relation to each other.

Note on the B4 Technique: The data processed in the B4 technique was where the target was detected at its peak and the other processed data was where the clutter was determined at its peak. This is special data thought to have significance and ease of processing but in reality any set of data or sets of data may be processed and correlated.

It is thought that to process data where clutter is at its peak may be the more meaningful or best data to process. This may be true due to clutter to be most unaffected by adjacent clutter and processing of data more accurately when clutter is at its peak. Also the target estimation of Y and $Y_F$ should more accurate due to its more determinate nature than clutter.

4. Correlation of Results

On the right side of the equation all the parameters are measured or estimated and therefore are known parameters we shall call it $|K_m|e^{jK_a}$ equal to the right side of the equation and solve for $W_{C1}$ and x as follows:

$$W_{C1} = A_{cm} e^{j[\psi_{CM} + K_{CM}(s-x)]} = |K_m|e^{jK_a} \quad (E)$$

Equating the exponentials of equation (E) and solving for x and setting $x=x_1$ we have the following:

$$(F) x_1 = (K_A - \Psi_{cm} - K_{cm}s)/K_{cm}$$

Setting $x=x_2$ $$x_2 = x_1 + 1 \; FRDB : x_2 = (-K_A + \Psi_{cm} + K_{cm}(s+1))/K_{cm} \quad (F')$$

All the terms on the right side of equation (F) is known or estimated therefore $x_1$ and $x_2$ is solved for. $x_1$ and $x_2$ is the position in number of FRDB the peak of clutter is from the FRDB processed (s) or (s+1).

From $x_1$ $X_{F1}$ is determined and from $x_2$ is determined $X_{F2}$ and $X_F=X_{F2}/X_{F1}$ All terms have been defined in Section III, H.

From $x_1$, is determined $X_{F1}$ of clutter, as in this example the peak of clutter is one FRDB to the right of the processed FRDB(s). FIG. 16 and FIG. 26—Table I shows the value of $X_{F1}$ is $K_{F1}=0.85$ and $\alpha_{F1}=45°$. $K_{F2}=0.70$ and $\alpha_{F2}=-90°$. Therefore $K_F=0.85/0.70=1.214$ and $\alpha_F=-45-(-90)=45$ Employing equation (24) of section III for P-DPCA $\Delta F$ technique we have:

Where $|A_R|$ is approximately equal to 1 (most of the time) and the phase shift is approximately equal to zero (0) (most of the time) and the first filter is detected at the peak of clutter we have the following technique.

$$e^{j5\Phi_R}/W_{M1} = (X_F V'_{12} - T'_{12})/(X_F V'_{11} - T'_{11})$$

where all the parameters on the right side of the above equation are measured or estimated and making it to a known $|A|e^{j5\Phi'_R}$ value.

1. $W_{M1}=A_{CM}EXP^{J(\Psi_{CM}+K_{CM}y)}$ and y is determined by the distance from the peak of mover and $\Psi_{CM}$ and $A_{CM}$ are determined by $\Phi'_R$. This is close enough to $\Phi_R$ to give a good estimate. Rewriting above equation inserting this we have:

$$EXP^{J5\Phi_R} = |A||A_{CM}|EXP^{J(\Psi_{CM}+K_{CM}y+5\Phi'_R)} \text{ where}$$

$$5\Phi_R = \Psi_{CM} + K_{CM}y + 5\Phi'_R \text{ and } |A||A_{CM}| = 1$$

This is a solution to the object of the invention. From $\Phi_R$ $\Phi_A$ is determined and consequently the targets relative radial velocity and azimuth.

C1-2. System Processing the Target in Two Adjacent Filters but at the Same time Employing Q-DPCA Analogous to the above development and the determining of x and $X_F$ we have a parallel development employing equation (19') for Q-DPCA, where p=1, as follows:

$$Y_F = \underline{K}_F e^{jB_F} = (T'_{1,1} - \underline{W}_{C2} T'_{12})/(V'_{1,1} - \underline{W}_{C1} V'_{12}) \text{ and} \quad (19')$$

$$\underline{W}_{C1} = (T'_{11} - Y_F V'_{11})/(e^{j\underline{K}_{CM}} T'_{12} - Y_F V'_{12})$$

Solving in the same manner for equation (19') we have the solution for $\underline{x}$ as follows:

$$\underline{x_1} = (\underline{K}_A - \Psi_{cm} - K_{cm}s)/\underline{K}_{cm}\} \; \underline{x_1} \to X_{F1} \text{ and } \underline{x_2} \to X_{F2} \quad (G)$$

$$\underline{x_2} = \underline{x_1} + 1FRDB\} \; x_F = x_{F2}/x_{F1} \quad (G^1)$$

From $\underline{x}$ is determined $\underline{X}_F$. $x=\underline{x}$ and $X_F=\underline{X}_F$. This should occur or be very close to each other within the accuracy required.

$x_1$—is from P-DPCA compensation $x_2$—is from P-DPCA compensation $\underline{x}_1$—is from T-DPCA compensation $\underline{x}_2$—is from Q-DPCA compensation $X_F$—is from P-DPCA compensation $\underline{X}_F$—is from Q-DPCA compensation This is two different set of equations where the value of x and $X_F$ are the same and are determined and will be a check on each other.

C2. Employing P-DPCA and Q-DPCA and solving for $\Phi_R$

1. Taking EXP(J6$\Phi_R$) equation and divide by EXP(J5$\Phi_R$) equation and solve for $\Phi_R$ Taking equation (24') of section III where EXP(Jp$K_{CM}$) and EXP(Jp$\underline{K}_{CM}$) where the amplitude is approximately equal to one (1) and phase shift is approximately equal to zero (0) we have:

$$EXP(J5J_R)/W_{M1} = (X_F V'_{12} - T'_{12})/(X_F V'_{11} - T'_{11}) \quad (24')$$
This is for *P-DPCA*

$$EXP(J6J_R)/\underline{W}_{M1} = (X_F \underline{V}'_{12} - \underline{T}'_{12})/(X_F V'_{11} - T'_{11}) \quad (\underline{24}')$$
This is for *Q-DPCA*.

Noting that at correct $\Phi_R$ we have $W_{M1}=\underline{W}_{M1}$ and are known for reasons stated previously and $X_F$'s are equal in the above equations at the true candidate $\Phi_R$. A preliminary solution may be obtained for the P-DPCA or Q-DPCA alone technique and a more accurate solution combining them.

Therefore the object of disclosure attained.

2. Equating $X_F$ and Solving for EXP(JD$\Phi_R$).

From equation (21') equating $X_F$ we have the following:

$$X_F = [(T'_{11} EXP(J6J_R) - T'_{12})/(V'_{11} EXP(J6J_R) - V'_{12})] \quad (21')$$

$$X_F = [(T'_{11} EXP(J5J_R) - T'_{12})/(V'_{11} EXP(J5J_R) - V'_{12})] \quad (\underline{21}')(21')$$

Where the following:

$W_{M1}$ and $\underline{W}_{M1}$ are known at the correct $\Phi_R$ for the same reasons stated previously.

Equating the two equations for $X_F$ above and utilizing the equations of section and solving for EXP(J5$\Phi_R$) and EXP (J6$\Phi_R$) and all other parameters as constants we have a sixth order equation with all parameters known except $\Phi_R$.

The most effective way of solving is to obtain a solution as obtained with techniques of Section C1 and/or Section C2 and using this as a solution in the eleventh order equation and solve by candidate solutions and by synthetic division to be exact.

Therefore the object of disclosure is attained.

Correlation of Results

Correlate solutions for all techniques performed may yield better accuracy if that is required. Other FRDBs may be processed and correlate results.

C3. ΔF Processing Employing Estimate of $Y_F$ and $X_F$ For P-DPCA and Q-DPCA

This technique will estimate $Y_F$ and $X_F$ (change in target or clutter from filter 1 (FRDB—$0_0$) to filter 2 (FRDB—$0_1$) and at the same time (Data Point 1) from the procedure in Section IV, C 1-1 and/or C1-2 an estimate of $Y_F$ and $X_F$ for the filters chosen as in FIG. 16, 17, 18 and FIG. 25—Table I, FIG. 26—Table II, FIG. 27—Table III.

We will repeat the ΔF basic conditions as follows:

| Filter #1 - FRDB-$0_0$ (P-DPCA) | Filter #2 - FRDB-$0_1$ (P-DPCA) |
|---|---|
| (1') $V'_{1,1} = C + M$ | (12') $T'_{1,1} = X_F C + Y_F M$ |
| (2') $V'_{1,2} = C/W_{C1} + M/W_{M1} e^{j5\phi R}$ | (13') $T'_{1,2} = X_F C/W_{c2} + Y_F M/W_{m2} e^{j5\phi R}$ |
| Filter #1 - FRDB-$0_0$ (Q-DPCA) | Filter #2 - FRDB-$0_1$ (Q-DPCA) |
| ($\underline{1}'$) $V'_{1,1} = C + M$ | ($\underline{12}'$) $T'_{1,1} = X_F C + Y_F M$ |
| ($\underline{2}'$) $\underline{V}'_{12} = C/\underline{W}_{C1} + M/\underline{W}_{M1} e^{j6\phi R}$ | ($\underline{13}'$) $\underline{T}'_{12} = X_F C/\underline{W}_{C2} + Y_F M/\underline{W}_{M2} e^{j6\phi R}$ |
| where $W_{c2} = W_{c1} e^{jK_{cm}}$ and $W_{M2} = W_{M1} e^{jKCM}$ and | $\underline{W}_{C2} = \underline{W}_{C1} e^{jKCM}$  $\underline{W}_{M2} = \underline{W}_{M1} e^{jKCM}$ | where p=1 is the spacing between filter 1 and filter 2.

All other terms are defined in Section III and IV.

In the previous C2 system, the C3 system employs the same basic equations and filter examples. The only difference when $X_F$ and $Y_F$ are attained as explained and derived in Section IV, C1-1 and/or C1-2 we employ the following equations to attain M and C which are derived from filter 1 and filter 2 equations (1') and (12').

$$M = (X_F V'_{1,1} - T'_{1,1})/(X_F - Y_F)$$

$$C = (Y_F V'_{1,1} - T'_{1,1})/(Y_F - X_F)$$

For filter #1-FRDB-$0_0$ processed the filter response of the target is $\underline{K}_{F1} e^{jBF1}$ (where the target is detected at its peak in $\underline{K}_{F1} e^{jBF1}=1\lfloor 0)$ and for filter #2 FRDB-$0_1$ the target response is $\underline{K}_{F2}=0.85$ and $B_{F2}=-45°$ and therefore $\underline{K}_F e^{jB_F} = \underline{K}_{F2} e^{jBF2}/\underline{K}_{F1} e^{jBF1}=0.85/\lfloor-45°/1.0\lfloor 0 = 0.85\lfloor-45°$.

Performing the same operations for clutter we have the following:

For filter 1-FRDB-$0_0$ processed the filter response of clutter is $K_{F1}e^{j\alpha F1}$ where $K_{F1}=0.85$ and $\alpha_{F1}=45°$ and the for filter 2-FRDB-$0_1$ processed the filter response of clutter is $K_{F2}e^{j\alpha F2}$ where $K_{F2}=1.0$ and $\alpha_{F2}=0°$ and therefore $K_Fe^{\alpha F}=K_{F2}e^{j\alpha F2}/K_{F1}e^{j\alpha F1}=1.0\lfloor 0/0.85\lfloor-45°=0.85\lfloor-45°$.

Taking equation (2') we have the following:

$$e^{j5\Phi_R}/W_{M1} = [(V'_{1,2} - C/W_{c1})/M] = |K_A|e^{jK_A} \qquad (L)$$

where $W_{M1}$ is known at the correct $\Phi_R$ and the parameters on right side of above equation including $W_{M1}$ therefore we have the following:

$$|K_A|=1 \text{ and } \Phi_R=(K_A+\Psi_{CM})/5$$

Therefore the object of disclosure is attained as explained previously.

Analogously we solve for (L') $e^{j6\Phi_R}/\underline{W_{M1}}=(\underline{V'_{12}}-C/\underline{WC1})/M=|K'_A|e^{jK'_A}$ in equation (2') $|K'_A|=1$ and $\Phi_R=(K'_A+\Psi_{CM})/6$ Therefore the object of disclosure is attained as explained previously. The result should agree with the previous result.

Dividing equation (L') by (L) we have the following:

$$e^{jJR} = (\underline{V'_{12}} - C/\underline{W_{C1}})/(V'_{12} - C/W_{C1})$$

that is another solution for $\Phi_R$.

C4. Correlation of Results

All technique and methods in Section IV C may be correlated for better results. Other FRDBs may be processed and other PRFs may be processed and correlated.

D. Employing D and D+1 For a Solution.

D1—Ideal Data Approach $W_C$ and $W_m$ are equal to $1\lfloor 0$.

Ideal solution to D=5 for M P-DPCA is equation (5) of Section III which is the following:

$$M = (V'_{11} - V'_{12})/(1 - e^{j5\Phi_R}) \qquad (1)$$

Applying this same equation to D=6 we have the following:

$$M = (V'_{11} - \underline{V'_{12}})/(1 - e^{j6\Phi_R}) \qquad (2)$$

Equating equation (1) to (2) and solving we have the following:

$$e^{j\phi R/2}\{|\sin(3\Phi_R)/\sin(5\Phi_R/2)|\} = (\underline{V'_{11}} - \underline{V'_{12}})/(V'_{11} - V'_{12}) \qquad (3)$$

Equating the amplitudes on both sides of the vector equation (3) we have the following:

$$\sin(3\Phi_R)/\sin(5\Phi_R/2) = |(V'_{11} - \underline{V'_{12}})/(V'_{11} - V'_{12})|$$

Equating the angles of both sides of the vector equation (3) we have the following:

$$\Phi_R/2 = \text{angle measurement of } (V'_{11}-\underline{V'_{12}})/(V'_{11}-V'_{12})$$

All parameters are measured parameters except $\Phi_R$. Therefore $\Phi_R$ is calculated and determined and therefore the solution and objective of the disclosure. All parameters are defined in Section III.

Since this is performed with the P-DPCA and Q-DPCA operation with the simplification for $W_M$ and $W_C$ there may be a significant error. If this error can be tolerated this would be a solution but with the substitution of $W_{M1}$ and $\underline{W_{M1}}$ are known at the correct $\Phi_R$ and for reasons previously stated and $W_{c1}=\underline{W_{c1}}=|A_{CM}|e^{j\Psi_{cm}}$ where data processed at the peak of clutter obtained by $\Delta T$ and/or $\Delta F$ technique will give a significantly smaller error. This is the result of small errors beyond that which is accounted for.

This also may be performed with D=4 and D=5 or other pairs of "D" values and correlated.

It may be noted that for all values of "D" operation taken at the peak of the target the "M" value are equal and other parameters may be correlated.

D2. Non-Ideal Approach where D=5 and D=6 and $W_m$ and $W_C$ are not ideal will be developed. This is for the P-DPCA operation and the Q-DPCA operation.

Taking equation (16) and (<u>16</u>) of Section III and equating them for D=5 and D=6 we have the following for the P-DPCA and Q-DPCA operation.

$$(V'_{11} - W_{CI}V'_{12})/(1 - (W_{CI}/W_{MI})e^{j5\Phi_R}) = \qquad (30)$$
$$(\underline{V'_{11}} - \underline{W_{CI}V'_{12}})/(1 - (\underline{W_{CI}}/\underline{W_{MI}})e^{j6J_R})$$

Determining $W_{c1}$ and $\underline{W_{C1}}$ by the technique description in the B2 Section where the data is taken at the clutter peak and making $W_{c1}=\underline{W_{c1}}=|A_{CM}|e^{j\Psi_{cm}}$ and noting at the correct $\Phi_R$ making $W_{M1}=\underline{W_{M1}}=|A_{CM}|e^{j\Psi_{cm}}$ therefore equation (30) at the correct $\Phi_R$ we have the following:

$$(\underline{V'_{11}} - \underline{W_{CI}V'_{12}})/(1 - e^{j6\Phi_R}) = (V'_{11} - W_{CI}V'_{12})/(1 - e^{j5\Phi_R}) \qquad (31)$$

$$(1 - e^{j6\Phi_R})/(1 - e^{j5\Phi_R}) = (\underline{V'_{11}} - \underline{W_{CI}V'_{12}})/(V'_{11} - W_{CI}V'_{12}) \qquad (32)$$

All parameters on the right side of equation (32) above are known therefore there is a solution for $\Phi_R$ similar to the ideal solution with additional term $W_{c1}=\underline{W_{c1}}=|A_{CM}|e^{j\Psi_{cm}}$, which is known, and the solution is as follows:

$$\sin(3\Phi_R)/\sin(5\Phi_R/2) =$$
$$\left|(V'_{11} - \underline{W_{CI}V'_{12}})/(V'_{11} - W_{CI}V'_{12})\right|$$
$$(V'_{11} - \underline{W_{CI}V'_{12}})/(V'_{11} - W_{CI}V'_{12})$$

$$\Phi_R/2 = \text{angle measurement of } (V'_{11} - \underline{W_{CI}V'_{12}})/(V'_{11} - W_{CI}V'_{12})$$

The object of the disclosure has been attained as explained previously when $\Phi_R$ has been attained. With this solution the position of the clutter peak is determined. This is assuming that $A_{CM}$ and $\Psi_{CM}$ of the target is the same or close in value to the $A_{CM}$ and $\Psi_{CM}$ of clutter. If not they can be determined and be inserted for the equation for $\Phi_R$ Employing the same equations as for the previous solution for equating M we will equate C as follows:

$$C = (V'_{11}e^{jD\Phi_R}/W_{MI} - V'_{12})/(e^{jD\Phi_R}/W_{MI} - 1/W_{CI}) \text{ for } P-DPCA$$

$$C = (V'_{11}e^{j(D+d)\Phi_R}/\underline{W_{MI}} - \underline{V'_{12}})/(e^{j(D+d)\Phi_R}/\underline{W_{MI}} - 1/\underline{W_{CI}}) \text{ for } Q-DPCA$$

At peak of clutter s=x and $W_{CI}=\underline{W_{CI}}$ and $W_{MI}=\underline{W_{MI}}$ and equating C we have an equation where the only unknown is $\Phi_R$ but of nth order and difficult to solve but solvable since the solution is real and restricted to a range of values. It can also be checked with previous solution equating M.

As in the previous solution other doppler bins may be processed in like manner such as on other side of the peak of target to obtain the peak of clutter. Also there are other range bins where the target is detected. They may all be processed and correlated to obtain the best solution.

Since they're a limited number of solutions possible, all candidate doppler frequency are processed in both P-DPCA and Q-DPCA and at the correct $\Phi_R$ C,M,X and Y are equal in the pairs of delays processed.

Other doppler bins may be processed in like manner such as on other side of the peak of target to obtain another peak of clutter. Also there are other range bins where the target is detected. They may also be processed and correlated to obtain the best solution.

Of course other pairs of D's may be processed and correlated with D=5 and D=6 for this case analyzed. D=4 and D=5 may be processed, etc.

If all pairs of D's are taken at the peak of the target (FRDB-s) will give the same M, relative radial velocity and angular position of the target solution.

D3—Improvement in Mover to Clutter Ratio Illustration

FIG. 35 shows the affect of processing with ΔD technique with the delay equal to one (1) to six (6) (D=1 to D=6) as depicted. The average value of target amplitude of target is 0.98 as shown.

When clutter is processed at its peak all delay values such as D=1 to D=6 and higher can have clutter cancel to zero (0). If the DPCA illustrated example in the disclosure is taken and the following:

If assuming the determination of the clutter peak is within a LRDB and also assuming that the clutter peak has a uniform probability of being plus or minus one halve filter width If $K_{CM}$=1.4 degrees the standard deviation=0.289 at 1.4=0.4 degrees there is a 43 db. Clutter cancellation. If clutter can be determined to 1/10 of this value then the clutter cancellation would be −63 db. and so forth From the multiple D operations shown in FIG. 35 picking the D, which has the maximum amplitude a further M/C gain of more than 6 db. would result.

From the multiple D operation and the more effective DPCA operation 69 db. or more subclutter visibility may be attained. This may be translated into less dwell time on targets and/or smaller antenna and/or smaller transmit power and/or more range.

The other PRF may be processed also with its solution correlated.

E. Low Clutter Processing

Cursory Analysis of Clutter

Clutter is the unwanted return from the ground from which the target has to be detected and its relative radial velocity is to be determined.

a. Clutter Due to Terrain

Clutter ground returns that give large returns to the radar are as follows:

1) Mountains and hills
2) Buildings and other large objects
3) High moving forests, water
4) Other b. Returns that give low clutter amplitude 1) Shadows of mountains, buildings, hills and other shadows
2) Water—lakes, rivers (calm waters)
3) Roads, flat land, deserts, other c. Clutter due to Antenna Patterns and Sidelobes of Filters 1) Clutter appearing in the main beam of the antenna is mostly of large amplitude
2) Clutter appearing in the side lobes of the antenna is of low amplitude (due to low sidelobes of the antenna)
3) Intermediate clutter—in the area between the main beam of the antenna and the sidelobes of the antenna.

Figure 19:
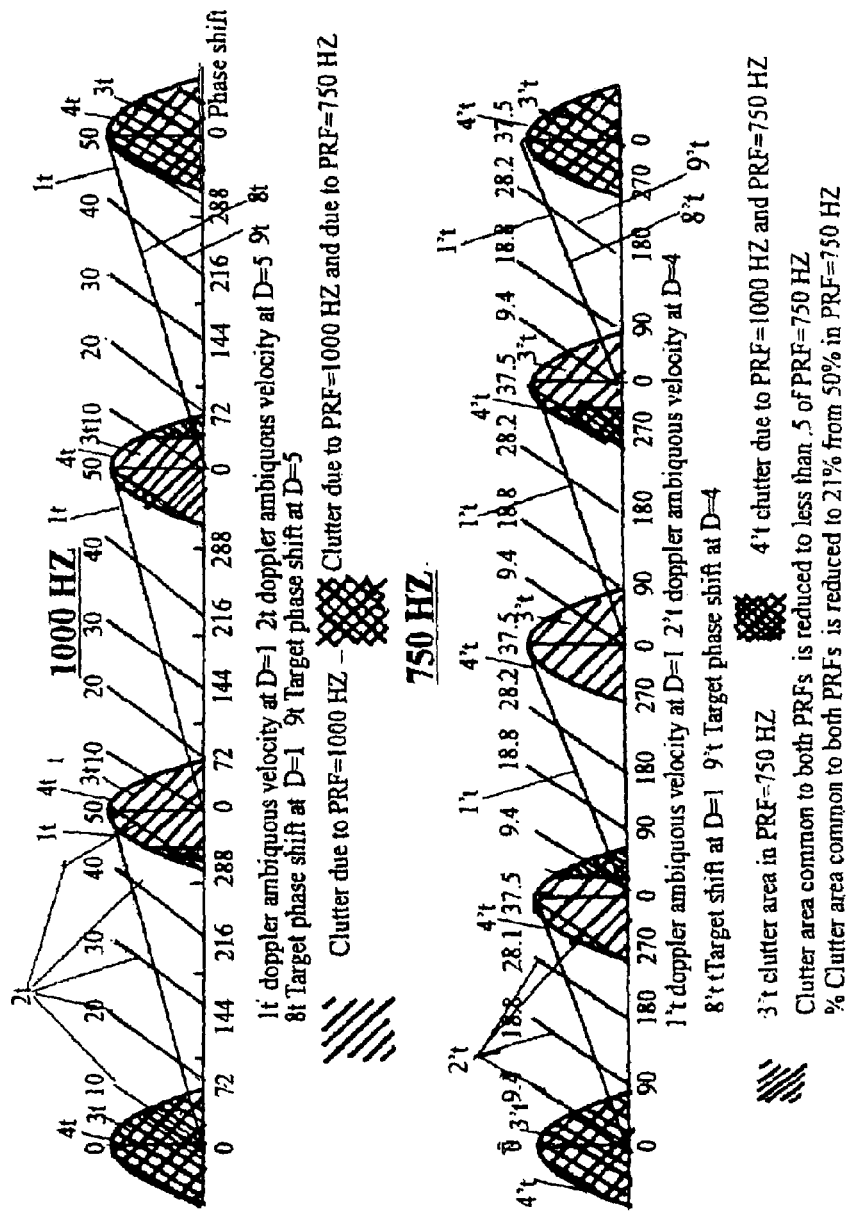
FIG. 19 depicts Doppler Ambiguity and Clutter Analysis

Clutter due to antenna pattern in a second or more PRFs. Clutter may be high in one PRF antenna pattern and may be low in the antenna pattern of the other PRF. This situation depends on the velocity of the target as shown in FIG. 19—Doppler Ambiguity and Clutter Analysis Diagram.

The clutter free areas in each PRF (1000 Hz and 750 Hz) are shown. If a target appears in the clutter free area of either PRF it may be processed as such in that PRF. When both PRFs are processed together the clutter free area in at least in one PRF increases significantly. The significant high clutter area is shown in the main beam and two other relatively small regions of the whole region to process. In the main beam clutter, the clutter is increasing and decreasing within the main beam similarly in the two PRFs. In the other two areas of relatively significant clutter, the clutter is increasing and decreasing in the antenna beam oppositely for the two PRFs.

d. Cartographic and Histographic Maps may be an aid in determining if clutter returns are in high or low clutter area but are not necessary but an aid in processing.

E1. Low Clutter Processing With one Set of Data-(Clutter=0)

1) $V_1^1 = M$

2) $V_2^1 = Me^{jD\Phi_R}/W_{mI}$

If $W_{mI}$ is a small error then the following: (t−y=0 where target detected at peak)

3) $W_{mI} = A_{cm}\lfloor\Psi_{cm}$

4) Nominally $W_{mI} = A_{cm}\lfloor[\Psi_{cm} + K_{cm}(t-y)]$

Where $W_{m1}$ is the mover coefficient based on its angular position where $K_{cm}$ (t−y) is negligible (≈0).

Dividing equation (2) by $W_{m1}$ and solving for $e^{jD\phi_R}$ we have the following:

$$5)\ e^{jD\phi_R} = (V_2'/V_1')(W_{m1})$$
$$= (V_2'/V_1')\ A_{cm}\lfloor\Psi_{cm}$$

Solving for $e^{jD\phi_R}$ by equating the angles of the vector equations we have the following:

6) where $e^{j\phi_R}=e^{j\phi_D}-e^{j\phi_A}$

7) $\phi_D=\phi_R+\phi_A$

8) $D\phi_R=V'_2$ angle$-V'_1$ angle$+\Psi_{cm}$ where $V'_2$ angle=the angular term of the vector $V'_2$
$V'_1$ angle=the angular term of vector $V'_1$ All other terms have been previously defined.

Performing the solution with the full terms of $W_{m1}$ we have equation(s) becoming the following:

$$e^{jD\phi R} = (V_2'/V_1')\ (A_{cm}\lfloor\Psi_{cm} + K_{cm}(t-y)) \qquad (9)$$

Where (t−y) is proportional the angular position of target $\phi_A$, therefore substitute for (t−y), $\phi_D-\phi_R$ and substituting this in equation (9) we have the following:

$$e^{jD\phi R} = (V_2'/V_1')\ (A_{cm}e^{j[\Psi cm + Kcm(t-y)]}) \qquad (10)$$

If $D\phi_R$ is chosen so its correct then t−y=0. This technique may be repeated for the Q-DPCA and should give the same results E2. Low Clutter Processing with Two Sets of Data F or Delay=D and D=1

E2A. Tests for Determining Low or High Clutter with Detection of Targets with Two Sets of Data Measure the Lowest Possible Clutter The measurement of the lowest possible clutter involves measuring the distance from the origin on a line parallel to the $(V_1^1-V_2^1)$ or $(V_1^{11}-V_2^{11})$ vector perpendicular to the perpendicular bisector of either of the two vectors aforementioned and close to origin.

If this vectors amplitude, which is the lowest clutter is low compared the amplitude of the target at this point. The target to clutter ratio (M/C) is measured at this point, if it is less than 10 then it's not a candidate for low clutter processing. If it is a ratio of 10 or more than the $D\Phi_R$ is measured at this point and if $D\Phi_R$ is not a possible $D\Phi_R$ then it is not a candidate for a low clutter processing. If the two conditions are satisfied it may be a candidate for low clutter processing. It will be processed further.

Thus measure each one of the two sets of data as one set of data as described previously and correlates them if they yield good results or if not process as high clutter data.

E3. Measure M/C as in Section IV, B, 3 and/or and Section IV C3 Measure Low Clutter as in Section IV, B, 3 and/or Section IV, C, 3. Determining $D\Phi_R$ by Estimating y and x with $\Delta T$ processing for M/C.

This technique obtains $D\Phi_R$ and also M/C whether clutter is low or high. If clutter is low then low clutter processing may be perform as previously described and correlated with the results of this technique.

E4. Correlates Results

Correlate with results of other FRDBs and with all techniques in this section. This may be also correlated with other PRFs employed.

F PRF 2 (750 Hz) Operation

When operating at 750 Hz-PRF instead of 1000 Hz a number of parameters change and will be enumerated but the basic application of the equations of Section III and the techniques developed in Section IV to attain a solution that is the same. The changes are the values of following parameters:

| Parameter | 1000 Hz | 750 Hz | Reference Figures and/or Table |
|---|---|---|---|
| Ambiguous Range | 83 miles | 111 miles | |
| Ambiguous Velocity at D = 1 | 50 ft/sec | 37.5 ft/sec | FIG. 19 & 28 |
| Ambiguous Velocity | 50/5 ft/sec at D = 5 | 37.5/4 ft/sec at D = 4 | FIG. 19 & 28 |
| LRDB Minimum Phase Change at D = 1 | 360/64 = 5.625° | 5.625° | FIG. 19 & 28 FIG. 28-Table IV |
| FRDB Minimum Phase Change at D = 1 | 360/(64 * 4) = 1.04625° | 1.04625° | FIG. 28-Table IV |
| Maximum P-DPCA error for $W_c$ & $W_m$ | 1.4° at D = 5 | 0.72° at D = 4 | FIG. 11, FIG. 29-Tables V, FIG. 30-Table VI, FIG. 31-Table VII |
| Maximum T-DPCA error for $W_c$ & $W_m$ | 7.28° at D = 5 | 11.6° at D = 4 | FIG. 19 & 28 |
| Minimum radial velocity at D = 1 | ½ ft/sec | ⅜ ft/sec | FIG. 19 & 28 |
| Minimum radial velocity at D = 1 | ½ ft/sec × ⅕ = 1/10 ft/sec at D = 5 | ⅜ ft × ¼ = 3/32 ft/sec at D = 4 | FIG. 19 & 28 |
| $\Psi_{cm}$ & $A_{cm}$ | To be determined in each PRF | To be determined in each PRF | |
| Zero Fill Diagram | | | FIG. 19 |
| Phase change at D = 5 (min filter) | (5.625° × 5) = 28.125° | | FIG. 28 |
| Phase change at D = 4 (min filter) | (5.625 × 4) = | 22.5° | FIG. 28 |

FIG. 19—doppler analysis and clutter analysis diagram where 1t is the variation of velocity as a function of frequency at delay equal one (D=1). 2t is the variation of velocity as a function of frequency at delay equals five (D=5). The X-axis is the velocity, it also represents the phase shift per filter or frequency. 3t is the clutter spectrum and 4t the clutter response. All aforementioned is for a PRF of 1000 Hz. Corresponding terms for the 750 Hz diagram are labeled with primes such as 1', 2' etc. The shaded areas are for clutter at one PRF one way and in the other a different way and clutter in both PRFs are crosshatched.

FIG. 28—TABLE IV is a table for PRF1 of 1000 Hz and PRF2 of 750 Hz with (64LRDB and 256 FRDB) FRDB-vs.-Frequency response and phase change before and after "D" and radial velocity. It is a picture of the target characteristics.

FIG. 29—TABLE V is a table showing FRDB-Vs-θ error for time only DPCA compensation (1000 Hz & 750 Hz) FRDB-Vs-θ error for pulse plus time DPCA compensation (1000 Hz & 750 Hz) and FRDB-Vs-phase and amplitude response and FRDB-Vs-change in filter amplitude and phase response. This table sums up the target and clutter characteristics that make the system viable.

FIG. 30—TABLE VI—Target detection in high clutter region shows the target characteristics possible FIG. 31—TABLE VII—Table of candidate $D\phi_R$-vs.-processing FRDB where the substitution of all possible candidate solutions arrives at the only true solution Therefore the solutions with the same techniques as with the PRF=1000 Hz may be performed and correlated.

In addition the parameters for one PRF may yield better results than other PRF and have a better solution. For instance the P-DPCA for a PRF of 750 Hz may be superior to that of 1000 Hz and that solution would be more accurate.

It may be more effective to process both PRFs at the same time to gain the advantage as stated in the previous paragraph and also correlate the results.

G. Velocity Ambiguity Resolution

G1. 1000 Hz Velocity Ambiguity Resolution

When processing the data in two or more different PRFs the highest unambiguous velocity must be obtained. In attaining the unambiguous velocity of each PRF it is processed to attain its unambiguous velocity to the highest attainable. The maximum unambiguous velocity must then be ascertained by processing the two PRFs.

Processing 1000 Hz data at D=5 the $\Phi_D$, $D\Phi_R$ and $\Phi_A$ will be obtained. In ascertaining $D\Phi_R$ this is proportional to ambiguous velocity. The ambiguous velocity of PRF=1000 Hz is 50'/sec. Due to D=5 processing the ambiguous velocity is 10'/sec (50'/sec/5). The next step is to process this PRF to attain the maximum ambiguous velocity of 50'/sec.

The next step is to process the 1000 Hz data at D=6 to resolve the velocity ambiguity to 50'/second where the ambiguous velocity is 8.33'/second (50'/second/6).

The equation to increase this non-ambiguity at PRF=1000 Hz to the maximum ambiguous velocity is as follows:

$$V_{U1} = (V_{UA} \times V_{UB})/(V_{UA} - V_{UB}) \quad (1)$$

$V_{U1}$ – Maximum ambiguous velocity at 1000 Hz at $D = 1$ $V_{UA}$ – Maximum ambiguous velocity at 1000 Hz at $D = 5$ $V_{UB}$ – Maximum ambiguous velocity at 1000 Hz at $D = 6$ Substituting the values for $V_{UA}$ and $V_{UB}$ we have the following:

$V_{U1} = (10'/\text{second} \times 8.33'/\text{second})/(10'/\text{second} - 8.33'/\text{second})$ $= 50'/\text{second}$ Thus we have obtained the maximum ambiguous velocity at 1000 Hz. To calculate the individual velocity of a particular target we have from the processing attained from D=5 the following:

$$\Phi_D = (D\Phi_R)/D + \Phi_A \quad (2)$$

Where $\Phi_A$ which is proportional to angular position of the target, is the same and is independent of D. This is also true of $\Phi_R$ at D=6 we have the following:

$$\Phi_D = ((D+1)\Phi_R)/(D+1) + \Phi_A \quad (3)$$

When processing for D=5 we have ascertained $\Phi_D$, $D\Phi_R$ and $\Phi_A$, we need only to substitute these values in equation (3) to determine $(D+1)\Phi_R$. From $D\Phi_R$ in the D=5 data we calculate the filter associated with this data and similarly from $(D+1)\Phi_R$ in the D=6 data we calculate the filter associated with this data.

From a priori calculations of the known filters the target is detected in the D=5 and D=6 data it is determined the unambiguous velocity of PRF=1000 Hz up to 50 ft/second.

G2. Velocity Ambiguity Resolution of 750 Hz

Similarly this same technique is applied to the PRF=750 Hz. The maximum unambiguous velocity is 37.5 ft/second. At D=4 the maximum ambiguous is 9.375 ft/second and at D=5 the maximum ambiguous velocity is 7.5 ft/second.

The equation to increase this ambiguity at PRF=750 Hz to the maximum ambiguous velocity is as follows:

$$V_{U2} = (V_{UC} \times V_{UD})/(V_{UC} - V_{UD}) \quad (4)$$

$V_{U2}$ – Maximum ambiguous velocity at 750 Hz at $D = 1$ $V_{UC}$ – Maximum ambiguous velocity at 750 Hz at $D = 4$ $V_{UD}$ – Maximum ambiguous velocity at 750 Hz at $D = 5$ Substituting the values for $V_{UC}$ and $V_{UD}$ we have the following:

$V_{U2} = (9.375 \text{ ft/sec}) \times (7.5 \text{ ft/sec})/(9.375 - 7.5)$ $= 37.5 \text{ feet/second}$ To calculate the particular targets velocity we have from the processing from D=4 the following:

$$\Phi_D^1 = (D\Phi_R^1)/D + \Phi_A^1 \quad (5)$$

Where $\Phi_A$, which is proportional to angular position of the target, is the same whether processing whatever D is processed, at D=5 we have the following:

$$\Phi_D^1 = (((D+1)\Phi_R^1)/(D+1)) + \Phi_A^1 \quad (6)$$

When processing for D=4 we have ascertained $\Phi_D^1$, $D\Phi^{R1}$ and $\Phi_A^1$ we need only to substitute these values in equation (6) to determine $(D+1)\Phi_R$. From $D\Phi_R$ in the D=4 data we calculate the filter associated with this data and similarly from $(D+1)\Phi_R$ in the D=5 data we calculate the filter associated with this data.

From a priori calculation of the known filters the target is detected in the D=4 and D=5 data it is determined the unambiguous velocity of PRF=750 Hz up to 37.5 ft/second.

G3. Velocity Ambiguity Resolution of 1000 Hz and 750 Hz

The calculations of the maximum unambiguous velocity of the two PRFs are as follows:

$$V_{UT} = (V_{U1} \times V_{U2})/(V_{U1} - V_{U2}) \quad (7)$$

$V_{UT}$ – Maximum ambiguous velocity at 750 Hz & 1000 Hz $V_{U1}$ – Maximum ambiguous velocity at 1000 Hz $V_{U2}$ – Maximum ambiguous velocity at 750 Hz -continued Substituting the values for $V_{U1}$ and $V_{U2}$ we have the following:

$V_{UT}$ = (50 ft/sec)×(37.5 ft/sec)/(50 ft/sec − 37.5 ft/sec)

= 150 ft/second

= 90 miles/hour

When processing for D=5 for PRF=1000 Hz and determine the ambiguous velocity up to 50'/second and ascertain the equivalent filter the result would be detected in if D=1.

We also perform the same processing for PRF=750 and determine the ambiguous velocity up to 37.5 ft/second and ascertain the equivalent filter the result would be detected in if D=1.

From a prior calculation of the known filters the target is detected in PRF=1000 Hz at D=5 and PRF=750 Hz at D=4, the unambiguous velocity is determined up to 150 ft/second.

H. Conclusions, Observations, Correlations, Future Work, Reduced Time on Target, Applications, Software Involved in this Work.

1. Correlations

A basic two antenna DPCA system was formulated with the two different PRFs and may be correlated with each other to determine the best solution from the two solutions for each PRF. The PRF with the most accurate solution is the best solution or a combination of both solutions as the most accurate.

2. Hierarchy of Solutions and Accuracy

A solution with the ideal equations without considering $W_m$ and $W_c$ and employing data with a times two (×2) zero-fill will in all probability give the least accuracy. As more consideration of all the variables such as $W_m$ and $W_c$ and employing data with times eight or more zero-fill and with the ΔT solution employing all there techniques according to how much processing and the depth with which the equations of Section III and IV are employed will attain greater and greater accuracy. Correlating all the results from a number of different techniques to achieve greater accuracy.

What else may be employed, if significant advantages may be attained when particular FRDB may be processed on the edge of the antenna beam, to obtain more accuracy in attaining the results.

Meaningful accuracy that could be attained of eight (8) or more times than is required in the relative radial velocity and the azimuth position. This would reduce the dwell time the corresponding eight (8) or more times. For example in the surveillance mode of operation where ±60° is covered at an average of 1° beamwidth which is performed by 1000 Hz and 750 Hz PRF, the time required wit 64 point data would take ≈150MS×120 would take ≈18.0 seconds. With the increased accuracy this could take 2.25 seconds.

3. Applications

This example taken in the disclosure was for detecting and measuring radial velocity and azimuth position of ground targets in the presence of clutter.

The system and techniques may be applied to airborne targets and/or sea-born targets. The airborne target has its own set of problems and techniques that would apply to it.

a) High speed b) Large change in target c) Others

4. Key Elements to a Solution

Clutter $W_c$ not negligible and good technique for estimate

Correlated with $K_F$ and $α_F$ with Filter Response of Clutter

Correlated with K and α-ΔX with Time Change of Target

Target $W_M$ not negligible and good technique for estimate

Correlated with $\underline{K}_F$ and $B_F$—Filter Response of Target

Correlated with $\underline{K}$ and B—ΔY—Time change of Target

Times(×)-Zero Fill of Basic Radar data increases resolution of range doppler data and the number of FRDBs.

The differences in Target and Clutter data when detected in the LRDB target:

a. Targets effect is felt over a number of FRDBs but due to only a single target, no interaction with other targets.

b. Where target detected at its peak=$Φ_D$ is the effect of the two components. First the effect due to angular position $Φ_A$ and second that due to its radial velocity ($Φ_R$).

c. Where the target is detected at its peak is almost always in a different position than where the peak of clutter is detected.

d. The targets, $DΦ_R$ changes with the "D" employed in the processing.

e. The targets $DΦ_R$ ambiguous velocity determination changes with the employed "D" in the processing.

f. The larger the "D" for the target the easier to detect the target and obtain increased detection of the target.

g. Where target peak is detected ($Φ_D$) the angular position is not determined therefore $W_m$ is not determined and $DΦ_R$ is yet not determined. The response of the target filter is where the target is detected.

h. Clutter:

1. Clutter affect is approximately over one LRDB but in the adjoining LRDB the affect of another independent piece of clutter. If there is processing between LRDB in a particular FRDB the affect of adjoining clutter may be felt, while this not true of target (if there is no other target in the area).

2. The peak of clutter is not detected directly and has to be determined, since it is almost never has the same position as the target.

3. The $W_C$ of clutter is by the determination of peak of clutter.

4. The clutter spectrum is the same in each subarray.

Q-DPCA and P-DPCA processing may be performed for correlation of processing techniques to increase the probability of a more accurate solution.

ΔT, ΔF and employing D and D+1 for a solution are all a number of techniques to attain a solution and may be correlated, and also a number of parameters that are common to all solutions such $Φ_D$, $Φ_A$, M, C, etc.

5. Software

Software has been developed to explore various key elements and the affects they have on the accuracy of the solution.

6. Future Work

To explore work in more depth and have software involved in this solution to obtain better accuracy.

V Figure of Merit (FM) System

A. Same Radar Parameters as Employed as in Section III

The transmit and the two receiving subarrays are aligned so that there boresights coincide. The resulting three decibel beam width is that of the transmit antenna since it has half the beamwidth of the receiving arrays. This is the same as stated for section III. In section IV B is the processing system where the target is detected in the same FRDB at two sequential times. Any of the techniques in section IV B may be implemented to get an estimate of (1−K) and α and any order differentials, $\Delta^n K$ and $\Delta^n \alpha$. The solutions in Section IV B only deal with obtaining an estimate of (1−K) and α. In the Figure of Merit System these estimates of minimum (1−K) and α are taken and combined with other parameters to obtain a more accurate solution and an estimate of accuracy. The technique is extended to $n^{TH}$ order differentials such as $\Delta^n K$ and $\Delta^n \alpha$ determination to obtain the objective $D\Phi_R$ and $\Phi_A$.

The $\Delta^n K$ and $\Delta^n \alpha$ are the $n^{th}$ order differentials of K and α. The first order differential would take the difference between the first K and α and the second K and α and measure the difference in K and α and would repeat the same operation between second and third set of data and get its difference and this would be repeated for all sets of data. The second order differential would repeat this process obtaining its differentials from the first order differential data. Using the same methodology as that obtained for first order differential. This could be performed for any order differential as necessary.

The radar data is processed with a Figure of Merit equation to determine radial velocity and hence angular position of the detected target.

B. System Development

1. Minimum (1−K) and α Solution

Employing the Ideal System equations of Section III B2a (processing a target detected in the same filter at two sequential times—ΔT processing). Utilizing the same equations (1 to 11) of Section III and IV and restating equation (10) and (11) we have the following:

$$X = (V_{1,1}^{11} e^{jDJR} - V_{1,2}^{11})/(V_{1,1}^{1} e^{jDJR} - V_{1,2}^{1}) \qquad (1)$$

$$e^{jDJR} = (XV_{1,2}^{1} - V_{1,2}^{11})/(XV_{1,1}^{1} - V_{1,1}^{11}) \qquad (2)$$

$$X = Ke^{j\alpha}$$

Where $X = Ke^{j\alpha}$

The above equations (1) and (2) without the $W_m$ terms are the ideal equations and will be dealt with first.

We will develop a set of equations that illustrate there is a minimum (1−K) and α as follows:

$$G^2 = (1 - K)^2 + \alpha^2 \qquad (3)$$

Assuming the solution for α is much less than one ("1") and that (1−K) is much less than one "1" which is the case in the practical system the simplified form for $Ke^{j\alpha}$ is as follows:

$$Ke^{j\alpha} = K\cos\alpha + jK\sin\alpha \qquad (4)$$

Where α is a small angle, less than three (3) degrees and K≈1 therefore equation (4) is as follows:

$$Ke^{j\alpha} \approx K + j\alpha \qquad (5)$$

A solution may be performed without this approximation but considered not necessary.

Noting in equation (2) that $e^{jD\Phi R}$ has a magnitude (1) and therefore the magnitude of the numerator and denominator on the right side of the equation must have a magnitude of one (1) therefore we have the following:

$$|1|^2 = \frac{|1|^2}{|1|^2} \qquad (6)$$

$$|Ke^{j\alpha}V_{1,2}^{1} - V_{1,2}^{11}|^2 = |1|^2 = \text{Numerator} \qquad (6a)$$

$$|Ke^{j\alpha}V_{1,1}^{1} - V_{1,1}^{11}|^2 = |1|^2 = \text{Denominator} \qquad (6b)$$

Making the following definitions of $V_{1,1}^{1}$, $V_{1,2}^{1}$, $V_{1,1}^{11}$ and $V_{1,2}^{11}$ we have the following:

$$V_{1,1}^{1} = V_{1X}^{1} + jV_{1y}^{1} \qquad (7)$$

$$V_{1,2}^{1} = V_{2X}^{1} + jV_{2y}^{1} \qquad (8)$$

$$V_{1,1}^{11} = V_{1X}^{11} + jV_{1y}^{11} \qquad (9)$$

$$V_{1,2}^{11} = V_{2X}^{11} + jV_{2y}^{11} \qquad (10)$$

Substituting equation (5), (7), (8), (9) and (10) into equation (6a) and (6b) we have the following:

$$\text{Numerator} = |1|^2 = K^2(V_{2X}^{12} + V_{2y}^{12}) - K(2V_{2X}^{1}V_{2X}^{11} + 2V_{1y}^{1}V_{2y}^{11}) + \qquad (11)$$
$$(V_{2X}^{11^2} + V_{2y}^{11^2}) + \alpha^2(V_{2X}^{1^2} + V_{2y}^{1^2}) + \alpha(2V_{2y}^{1}V_{2X}^{11} - 2V_{2X}^{1}V_{2y}^{11})$$

$$\text{Denominator} = |1|^2 = K^2(V_{1X}^{1^2} + V_{1y}^{1^2}) - K(2V_{1X}^{1}V_{1x}^{11} + 2V_{1y}^{1}V_{1y}^{11}) + \qquad (12)$$
$$(V_{1x}^{11^2} + V_{1y}^{11^2}) + \alpha^2(V_{1x}^{1^2} + V_{1y}^{1^2}) + \alpha(2V_{1y}^{1}V_{1x}^{11} - 2V_{1x}^{1}V_{1y}^{11})$$

Noting the following:

$$(V^{1}2M)^2 = V_{2X}^{1^2} + V_{2y}^{1^2} \qquad (13)$$

$$(V^{11}2M)^2 = V_{2X}^{11^2} + V_{2y}^{11^2} \qquad (14)$$

$$(V^{1}1M)^2 = V_{1X}^{1^2} + V_{1y}^{1^2} \qquad (15)$$

$$(V^{11}1M)^2 = V_{1X}^{11^2} + V_{1y}^{11^2} \qquad (16)$$

Equating the numerator and denominator equations (since both are equal to one (1)) and employing equations (13), (14), (15) and (16) we have the following:

$$K^2[(V^{1}2M)^2 - (V^{1}1M)^2] - \qquad (17)$$
$$K2(V_{2X}^{1}V_{2X}^{11} + V_{2Y}^{1}V_{2Y}^{11} - V_{1X}^{1}V_{1X}^{11} - V_{1y}^{1}V_{1y}^{11}) +$$
$$(V^{11}2M)^2 - (V^{11}1M)^2 + \alpha^2[(V^{1}2M)^2 - (V^{1}1M)^2] +$$
$$\alpha 2(V_{2y}^{1}V_{2X}^{11} - V_{2X}^{1}V_{2y}^{11} - V_{1y}^{1}V_{1X}^{11} + V_{1X}^{1}V_{1y}^{11}) = 0$$

Since from equation (4) K=K cos α and α=K sin α therefore $K^2 \cos^2\alpha + K^2 \sin^2\alpha = K^2(\cos^2\alpha + \sin^2\alpha) = K^2$ therefore the following:

$$K^2[(V^{11}2M)^2] + \alpha^2[(V_{2}^{11}M)^2 - (V_{1}^{1}M)^2] = K^2[(V^{11}2M)^2 - (V^{1}1M)^2] \qquad (18)$$

And consolidating the constants into simplified constants we have the following where we have:

$$\overline{K}_1 = (V^1 2M)^2 - (V^1 1M)^2 \tag{19}$$

$$\overline{K}_2 = 2(V^1_{2x} V^{11}_{2x} + V^1_{2y} V^{11}_{2y} - V^1_x V^{11}_{1x} - V^1_{1y} V^{11}_{1y}) \tag{20}$$

$$\overline{K}_3 = 2(V^1_{2y} V^{11}_{2x} - V^1_{2x} V^{11}_{2y} - V^1_{1y} V^{11}_{1x} + V^1_{1x} V^{11}_{1y}) \tag{21}$$

$$\overline{K}_4 = (V^{11} 2M)^2 - (V^1 1M)^2 \tag{22}$$

Rewriting equation (18) we have the following:

$$\overline{K}_1 K^2 + \overline{K}_2 K + \alpha \overline{K}_3 + \overline{K}_4 = 0 \tag{23}$$

Solving for $\alpha$ in equation (23) we have the following:

$$\alpha = -(\overline{K}_1/\overline{K}_3)K^2 - (\overline{K}_2/\overline{K}_3)K - \overline{K}_4/\overline{K}_3 \tag{24}$$

Noting that (25) $G^2 = \alpha^2 + (1-K)^2$ and setting new constants such as the following:

$$\underline{K}_1 = -\overline{K}_1/\overline{K}_3 \text{ and} \tag{26}$$

$$\underline{K}_2 = -\overline{K}_2/\overline{K}_3 \text{ and} \tag{27}$$

$$\underline{K}_3 = -\overline{K}_4/\overline{K}_3 \text{ and setting} \tag{28}$$

$$E = 1 - D = K \text{ and} \tag{29}$$

$$D = 1 - K. \tag{30}$$

Substituting in equation (25) the aforementioned equations (24), (26), (27), (28), (29) and (30) we have the following:

$$G^2 = (1-E)^2 + (\underline{K}_1 E^2 + \underline{K}_2 E + \underline{K}_3)^2 \tag{31}$$

$$G^2 = (1-E)^2 + [f(E)]^2 \tag{32}$$

Differentiating G with respect to E we have the following:

$$d(G)/dE = -2(1-E) + 2f(E)f^1(E) \tag{33}$$

$$= -2(1-E) + 2(\underline{K}_1 E^2 + \underline{K}_2 E + \underline{K}_3)(2\underline{K}_1 E + \underline{K}_2)$$

$$= 4\underline{K}_1^2 E^3 + 6\underline{K}_1 \underline{K}_2 E^2 + (4\underline{K}_1 \underline{K}_3 + 2\underline{K}_2^2 + 2)E + 2\underline{K}_2 \underline{K}_3 - 2$$

$$= aE^3 + bE^2 + cE + d$$

This is a cubic equation and making it equal to zero will give the minimum E solution all parameters except E are constants, which are measured.

Taking equation (33) and setting it equal to zero we have the following:

$$a = 4\underline{K}_1^2 \tag{34}$$

$$b = 6\underline{K}_1 \underline{K}_2 \tag{35}$$

$$c = 4\underline{K}_1 \underline{K}_3 + 2\underline{K}_2^2 + 2 \tag{36}$$

$$d = 2\underline{K}_2 \underline{K}_3 - 2 \tag{37}$$

Where $E \ll 1$ and call it $E_0$, for the solution for equation (33) and by synthetic division on equation (33) we have the following:

$$d - [cE_0 - bE_0^2 + aE_0^3] = 0 \tag{38}$$

Therefore $CE_0 \gg (-bE_0^2 + aE_0^3)$ and a, b and c approx. of the same order of magnitude as a good approximation we have the following:

The uniqueness of the solution of K-a for each $D\Phi_R$. Equation (24) illustrates that with each different value of K there is a different value of $\alpha$ ...

$$d - cE_0 = 0 \tag{39}$$

$$E_0 = d/c = (2\underline{K}_2 \underline{K}_3 - 2)/(4\underline{K}_1 \underline{K}_3 + 2\underline{K}_2^2 + 2) \tag{40}$$

$$E_0 = 1 - D_0 = K_0 \tag{41}$$

The significance of this derivation, it illustrates that we have a minimum for the change in clutter (1−K and $\alpha$). This therefore indicates if there is a minimum for (1−K) and $\alpha$ there is a minimum for $\Delta^n K$ and $\Delta^n \alpha$. The $n^{th}$ order differentials also have a minimum. It also implies for each $D\Phi_R$ there is a unique (1−K) and $\alpha$. This is if there is a change in target. This has also been proven in computer simulation. This is based on if there is a change in target which is almost always.

The non-ideal case has the following equation:

$$e^{jDJ_R}/W_M = (Ke^{jK}V^1_{1,2} - V^{11}_{1,2})/(Ke^{jK}V^1_{1,1} - V^{11}_{1,1})e^{jDJ_R}/W_M = \tag{42}$$

$$(Ke^{jK}V^1_{1,2} - V^{11}_{1,2})/(Ke^{jK}V^1_{1,1} - V^{11}_{1,1})$$

The $W_M$ term, if $|A_{CM}|$ and $\Psi_{CM}$ are considered constant or nearly constant over the range of possible solutions of $\Phi_R$, then it is known, since "y" is known which is the distance from the peak of the target to the processing point "t". If $|A_{CM}|$ and $\Psi_{CM}$ are not nearly constant an average value may be taken and by an iterative process determine $|A_{CM}|$ and $\Psi_{CM}$. Gradual variations may be corrected for. They are depended on $\Phi_R$. This is explained in Section III and IV. Also since $W_M$ varies very slowly from FRDB to FRDB and is low in value it should have a very minimum affect on the minimum value of (1−K) and $\alpha$.

C. The Figure of Merit Main Techniques

The Figure of Merit (FM) Technique depends upon a number of factors as follows:

1. Change in Target is significantly greater than change in clutter.

(1) Change in target multiplied by the amplitude of the target is significantly greater than the change in clutter multiplied by the amplitude of clutter. In equation form it is as follows:

$$|M|[(1-\overline{K})^2 + B^2]^{1/2} / |C|[(1-K) + a^2]^{1/2} >> 1$$

or in general for the $n^{th}$ order differential we have the following:

$$|M|[(\Delta^n\overline{K})^2 + (\Delta^n B)^2]^{1/2} / |C|[(\Delta^n K)^2 + (\Delta^n \alpha)^2]^{1/2} >> 1$$

$|M|$ = Amplitude of the target $|C|$ = Amplitude of the clutter $1 - \overline{K}$ = Change in amplitude of target (1$^{st}$ order change)

$1 - K$ = Change in amplitude of clutter (1$^{st}$ order change)

$B$ = Change in angle of target (1$^{st}$ order change)

$\alpha$ = Change in angle of clutter (1$^{st}$ order change)

$\Delta^n \overline{K} = n^{th}$ order differential change of target $\Delta^n K = n^{th}$ order differential change of clutter $\Delta^n B = n^{th}$ order differential change of target angle $\Delta^n \alpha = n^{th}$ order differential change of clutter angle This has been computer simulated and found as stipulated.

Figure 20:
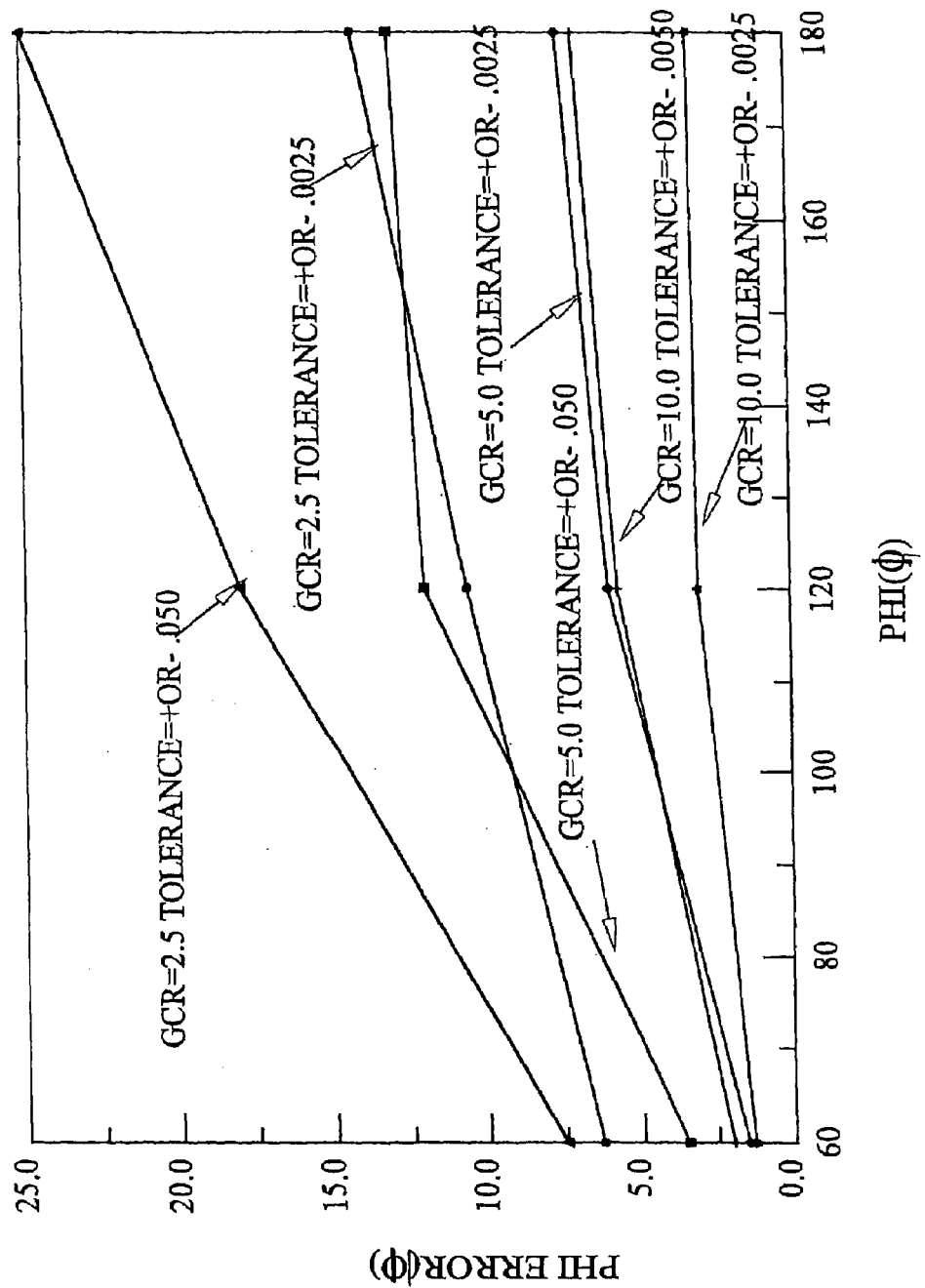
FIG. 20 depicts $D\Phi_R$ Error-vs-PH1 for Different $$GCR = |M/C|(\Delta \overline{K}^2 + \beta^2)/(\Delta K^2 + K^2)$$
Figure 21:
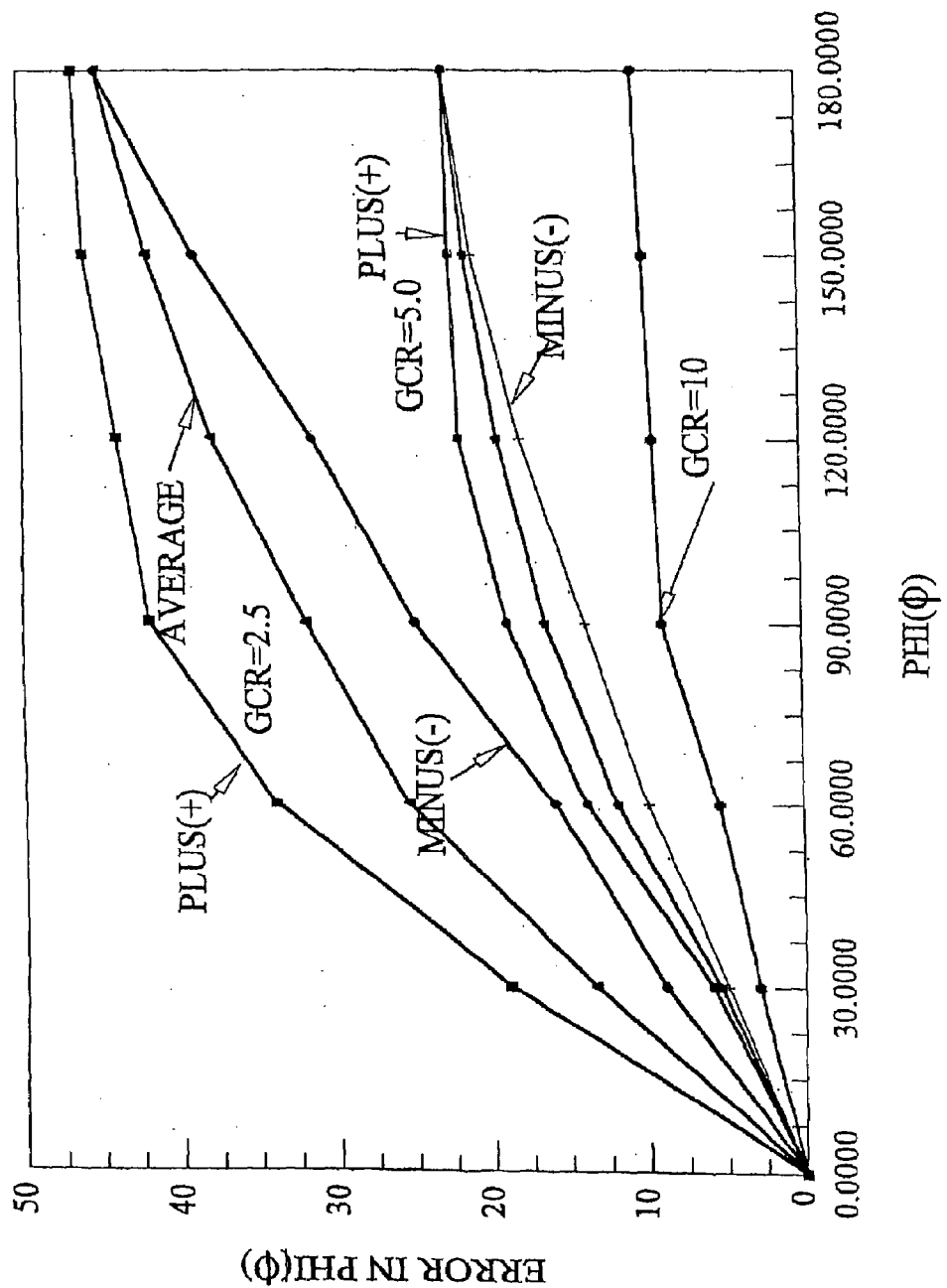
FIG. 21 illustrates $D\Phi_R$ Error-vs-PHI for $\Delta K$ and $\alpha$ Tolerance for Different $$GCR = |M/C|(\Delta \overline{K}^2 + \beta^2)/(\Delta K^2 + K^2)$$

2. Error in $D\Phi_R$ is Proportional to $\sin(D\Phi_R)$ where $D\Phi_R \leq |180|$ The true $D\Phi_R$ of the target. At $D\Phi_R = \pm 180°$ error in determining $D\Phi_R$ is the greatest and as $|D\Phi_R|$ is less than $|180°|$ the error in determining $D\Phi_R$ is less but the percentage error is more. Curves will show this in FIG. 20 and FIG. 21. This also was performed by computer simulation and shown to be true and the results are shown in FIG. 20 and FIG. 21 and FIG. 32 Table VIII.

3. Error in $D\Phi_R$ is Proportional to the Estimate of $(1-K)$ and $\alpha$ or $\Delta^n K$ and $\Delta^n \alpha$.

In the $\Delta T$ processing of Section IV B an estimate of K and $\alpha$ is made to determine $D\Phi_R$ and in $\Delta F$ processing of Section IV C an estimate of $K_F$ and $\alpha_F$ is made to determine $D\Phi_R$.

The estimate of K and $\alpha$ has inaccuracies such as it includes a statistical measurement and its subject to influence of adjacent clutter as well as sources of noise (adjacent sidelobe of filters, etc.) In order to reduce the affect of these sources of inaccuracy a computer simulation was performed with assumed inaccuracies. The closer the estimate is to the true value the better the accuracy. In the real world of radar, the clutter estimate may not be that accurate. It is very important to estimate K and $\alpha$ as close as possible. This would be to process clutter as close to its peak detection as possible.

4. Match Angle (THM) Between Target and Clutter

The rotational angle (ROTA) is the angle between the clutter vector and the perpendicular bisector of the mover vectors. This is also employed to determine the error in $D\Phi_R$. In computer simulation the results are as follows:

$$THM = ROTA + \tan^{-1}(\Delta \overline{K}/B) + B - \tan^{-1}(\Delta K/\alpha) - \alpha \quad (43)$$

$$PHER = \{|(M/C)|[(1-\overline{K})^2 + B^2] / [(1-K)^2 + a^2]\} \times K_{PH} \sin THM \quad (44)$$

THM—is the match angle between the target and clutter (when THM=0 or 180° the PHER=0)

ROTA—is the rotational angle between the clutter vector and the perpendicular bisector of the mover vectors.

$\tan^{-1}(\Delta \overline{K}/B)$—the target change vector angle of its components of $\Delta \overline{K}$ and B.

$\tan^{-1}(\Delta K/\alpha)$—the clutter change vector angle of its components of $\Delta K$ and $\alpha$.

PHER—the error in $D\Phi_R$ $|(M/C)|$—Ratio of amplitude of the target vector to the amplitude of the clutter vector THM—is the match angle between the clutter and target.

B—The change in target angle $\alpha$—The change in clutter angle $\Delta \overline{K} = (1-\overline{K})$—The change in target amplitude $\Delta K = (1-K)$—The change in clutter amplitude $K_{PH}$—Computer simulation determined constant $\approx K_{PH}$ Sin THM With the above equations shows the significance of the parameters to determine the match angle (THM) which will greatly affect the error in $D\Phi_R$ and aid in the data in the determination of $D\Phi_R$. (FIGS. 20 and 21)

Simulation has verified the equations (43) and (44) and determined the constant $K_{PH}$. FIGS. 20 and 21 illustrates the equation and its affect on the error of $D\Phi_R$. It illustrates the importance of GCR being large and the match angle (THM) being low. $D\Phi_R$ being high also lowers the percentage $D\Phi_R$ error.

5. Evaluation of the Figure of Merit Main Techniques

Figure of merit technique and the factors and equations that make up its methodology.

The four (4) factors as mentioned in the previous paragraphs, they have to be utilized to obtain the maximum accuracy in obtaining the $D\Phi_R$.

The basis of the techniques is the $\Delta T$ processing of Section IV B. This is performed in obtaining the following:

$$\text{Maximum } GST = (1 - \overline{K})^2 + B^2 \text{ or} \quad (45)$$
$$GST = (\Delta^n \overline{K})^2 + (\Delta^n B)^2$$

$$\text{Minimum } GSC = (1 - K)^2 + a^2 \text{ or} \quad (46)$$
$$GSC = (\Delta^n K)^2 + (\Delta^n \alpha)^2$$

$$\text{Maximum } |M/C| * (GST/GSC) = GCR \quad (47)$$

$$\text{Best estimate of } (1-K) \text{ and } \alpha \text{ or} (\Delta^n K \text{ and } \Delta^n \alpha) \quad (48)$$

$$\text{Rotation Angle } (ROTA) \text{ measurement} \quad (49)$$

$$\text{Error in } D\Phi_R \text{ in proportional to absolute value} \quad (50)$$
$$\text{of } D\Phi_R \text{ where } D\Phi_R \leq |180|$$

$$\text{All the above (45) to (50) hold for any order} \quad (51)$$
$$\text{differential data as well}$$

$$\text{Applies to other differential parameters such as} \quad (52)$$
$$(\Delta A, A\alpha) \text{ or } (\Delta C_X, \Delta C_Y) \text{ or other}$$
$$(V_{1,1}^1 - W_{C1}V_{1,2}^1)/(V_{1,1}^{11} - W_{C1}V_{1,2}^{11})$$

D. Applying the Figure of Merit (FM) Technique Employing the basic system and making it more effective, the FM technique is implemented.

Employing the Figure of Merit System. To obtain the best results in processing

1. Obtaining the best data to process to get best results.
   a. Finding the FRDB where the location of maximum of the target
   b. Data with the maximum GST and the minimum GSC and the maximum GCR. The target is detected at the maximum amplitude or estimated maximum amplitude in a particular FRDB and FRDB measured from that FRDB.
   b. Finding FRDBs where target change is a maximum and divide by where clutter change is a maximum.

The next step is to move the processing over a number of LRDBs and process this data for the $24^{th}$ to $40^{th}$ data point and check target data for maximum change in target ($\overline{K}e^{jB}$) in the following equation or method stated in Section IV B.

$$\overline{K}e^{jB} \approx (V_{1,1}^1 - W_{C1}V_{1,2}^1)/(V_{1,1}^{11} - W_{C1}V_{1,2}^{11}) \tag{51}$$

Look for sharp change in target around data point 32 plus or minus 8 data points. If none, check another FRDB further away from where target is detected at maximum and follow the same procedure for other FRDB until a sharp change has been found around data point 32. This is on re-circulated data. When this sharp change in the target is found in a particular FRDB, test the clutter at this particular FRDB as in Section IV B and obtain an estimate of K and α. If (1−K) and α are not very small, test adjacent FRDB's until a sharp change in target is obtained and at the same FRDB that (1−K) and α or any order of $\Delta''K$ and $\Delta''\alpha$ data are small. Test these FRDB's to obtain a large change in target with a very low change in clutter. When this occurs, this is the data chosen to process. This may be performed on both side of where the target maximum is detected. This will give approximately the best GCR results.

$\Delta''$ data that indicates where differentials of clutter is at or near its peak will show smooth changes in K and α and will decrease significantly in value with each order of differential. While the target, which has shown a sharp change in that particular FRDB will not show a significant decrease in value with the order of the differential. The clutter will show orders of decrease in value with increasing differential orders, while the target will show little significant decrease in value where there is sharp change in its data. This has been computer simulated and results verify this with re-circulated data. Therefore at higher order of differentials the results should be very good data with excellent results. This has been shown with results from the real data.

c. Best Results with Effectively Picked Data

With the data picked as stated and processed initially as ΔT processing of Section IV B. One can process the data around data point 32 with high order differential data to give the results to the desired accuracy or to process further to obtain more accurate results. The processing of Section IV B enables an estimate (1−K) and α or $\Delta''K$ and $\Delta''\alpha$. The estimates of the differentials of clutter and how accurate they are determine the accuracy of the results. On the other hand if the changes in the target are orders of magnitude greater than that of clutter then the results will be excellent without an estimate of clutter.

d. Low Order Differential Data Employing All Factors to Obtain Best Results

Low order differential are processed to obtain the best results consideration must be given to the following of all the curves of $D\Phi_R$-VS-PHI of FIGS. 20 and 21. When $D\Phi_R$ is low the accuracy increases as shown in the curve but percentage in $D\Phi_R$ decreases. Also shown in these curves are the affect of GCR, it reduces the PHER but also increases the effectiveness (1−K) and α estimates to get good results.

The best results should be obtained at higher order differentials with effectively picking the data to be processed.

Substituting each candidate $D\Phi_R$ where the target is within the beamwidth of the antenna is processing lower order differential data. 256 data points may be processed due to ×4 zero fill data). Then calculate $W_c$ for each set of data or groups of data i.e. 1–16, 16–32, etc. Also calculate $W_m$ for each candidate $D\Phi_R$.

Low order differential data with GCR greater >2 and less than 10. This is taking data two or three FRDBs from the peak of the target but at the peak of clutter detection (small change in clutter).

The logic or technique in processing this data is as follows. From each set of data from "1" to "256" there is a minimum GSC. We know from the previous derivation in equation (41) and the previous development.

The minimum GSC cannot be higher than the true GSC, therefore GSC found with each set of data has to be the true GSC or lower. Therefore the highest GSC of all the sets of data processed should be close to the true GSC and will give the $D\Phi_R$ closest to the true $D\Phi_R$.

If the figure of merit technique is performed with a minimum K−α estimate of a solution at x=0, clutter is at its peak, (K=1, α=0). When finding a minimum solution and is not K=1, α=0 and the next best solution should be taken at K closest to "1" since α varies more than K under these conditions.

The above technique may be performed on a number of sets of data and correlated for the best results.

To check and evaluate this solution, take the $D\Phi_R$ as the closest for the estimate of true $D\Phi_R$, and check its match angle, GCR, $D\Phi_R$, as in equations (45) to (51). This will give the accuracy and evaluation of the solution as shown in FIG. 21 and FIG. 32—Table IX.

Correlate this results with previous result of higher order differential solution. This may be employed to eliminate as many solutions for the higher order solution.

FIG. 21 illustrates the error in $D\Phi_R$ (at low GCR and low order differential processing) as a function of GCR and the allowable tolerance associated with the determination of the error in $D\Phi_R$. As expected the larger the GCR the lower the error in $D\Phi_R$ and also as expected the closer the tolerance in determining the clutter parameters the lower the error in $D\Phi_R$.

A sequel to the above logic is to process data in any order differential if any data has higher than expected values of K and α cannot be a solution and the $D\Phi_R$ which represents that solution is eliminated.

The aforementioned strategy would be also for low order differential data. Combining the two strategies for the best estimate of $D\Phi_R$.

The higher order differentials would find the data that has the highest GCR that correlates with at least two sets of data with high GCR that is the closest estimate of $D\Phi_R$.

The combination of all three strategies should obtain excellent results and attain a close estimate of $D\Phi_R$ and $\Phi_A$.

THE FM TECHNIQUE MAY BE APPLIED TO THE ΔF OPERATION AS STATED IN SECTION III AND IV IN AN ANALOGOUS FASHION.

Least Mean Square Technique

The results may be correlated with other FRDB processed and other techniques as in Section V,2—Least Mean Square Technique The results may be correlated with other FRDB processed and other techniques as in Section V, 2—Lease Mean Square Technique.

E. Low Clutter Processing

In Section IV E 2 picking the data would be described in the FM system and processed as by the FM Technique described in Section V D.

F. Processing 750 Hz Data

Processing of 750 Hz should be analogous to that of 1000 Hz.

G. Resolve Range and Doppler Ambiguity as explained in Section IV G.

H. Conclusions, Observations and Correlations

1. Correlations

Correlate all results from different FRDB's processed and the different PRF's processed and determines the best solution from all the solutions obtained. Correlate FM technique with previous technique.

2. Hierarchy of Solutions and Accuracy

The FM Technique may be employed with the ideal equation for P-DPCA and no zero fill data and pick data that gives large change in target and accept the clutter at that large change in target. There may be a few of these LRDB that will satisfy this criterion. If no $\Delta^n K - \Delta^n \alpha$ data at high $n^{th}$ order that (n=2 to 5) then excellent results may be attained.

The FM technique employed with the non-ideal equations and zero fill data and with the aid of processing as in Section IV B 2 and employing $\Delta^n K - \Delta^n \alpha$ data at high $n^{th}$ order excellent results will be attained.

Meaningful accuracy may be attained of four (4) or more times than is required in the relative radial velocity and the azimuth position. This would reduce the dwell time (time on target) the corresponding four (4) or more times. For example in the surveillance mode of operation where the coverage is ±60° from 90° off boresight With 1° average beamwidth at a PRF of 1000 Hz and 750 Hz and employing 64 point data. The time required would take ≈150 ms×120≈18.0 seconds with the increased accuracy where 16 point data would be sufficient this would take 4.5 seconds.

3. Applications

The same comment as in Section IV H

4. Key Elements to a Solution

With the same comments as in Section IV H4 and in addition we have the large advantage of the ability to pick excellent data to give even better results.

Also the ability for reduced system without zero-fill and only using ideal equations to also attain excellent results.

2. Least Mean Square (LMS) Technique

The least mean square (LMS) technique processes groups of data as in FIG. 8. The group of data chosen is the data that closes on itself This data is continuous in a circular fashion such as when the data is shifted to the right one set of data, the first set of data now becomes the second set of data and so on. The following development will depend on this type of data. This is called "recirculated data".

A. Basic Mathematical Development

The basic difference equations for clutter K-α parameters are as follows:

$$\Delta^m K_L = \Delta^{m-1} K_{L+1} - \Delta^{m-1} K_L \qquad (1)$$

$$\Delta^m \alpha_L = \Delta^{m-1} \alpha_{L+1} - \Delta^{m-1} \alpha_L \qquad (2)$$

$\Delta^m K_L$ - is the $m^{th}$ difference of $K$ of the $L^{th}$ set of data (3)

$\Delta^m \alpha_L$ - is the $m^{th}$ difference of $\alpha$ of the $L^{th}$ set of data (4)

$\Delta^{m-1} K_{L+1}$ - is the $(m-1)$ difference of $K$ of the $(L+1)^{th}$ set of data (5)

$\Delta^{m-1} \alpha_{L+1}$ - is the $(m-1)$ difference of $\alpha$ of the $(L+1)^{th}$ set of data (6)

$\Delta^{m-1} K_L$ - is the $(m-1)$ difference of $K$ of the $L^{th}$ set of data (7)

$\Delta^{m-1} \alpha_L$ - is the $(m-1)$ difference of $\alpha$ of the $L^{th}$ set of data (8)

A similar set of equations may be developed for the X and Y components of clutter ($C_x$ and $C_y$) or other parameters as $\Delta A$ and $\Delta \alpha$ etc. Chosen here is the K–α components of clutter as developed in the previous sections. The K–α components were also chosen since the data chosen—as we will see in the subsequent write up is chosen for low K–α and any high K–α may be eliminated as a possible solution.

The sum of the difference equations is as follows:

$$\sum_{n=1}^{n=256} \Delta^m K = \qquad (9)$$

$$(\Delta^m K_1 - \Delta^m K_2) + (\Delta^m K_2 - \Delta^m K_3) + \ldots + (\Delta^m K_{256} - \Delta^m K_1) = 0$$

$$\sum_{n=1}^{n=256} \Delta^m \alpha = \qquad (10)$$

$$(\Delta^m \alpha_1 - \Delta^m \alpha_2) + (\Delta^m \alpha_2 - \Delta^m \alpha_3) + \ldots + (\Delta^m \alpha_{256} - \Delta^m \alpha_1) = 0$$

$\Delta^m K_1$ - is the $m^{th}$ difference of $K$ for the first set of data $\vdots$ $\Delta^m K_{256}$ - is the $m^{th}$ difference of $K$ for the $256^{th}$ set of data $\Delta^m \alpha_1$ - is the $m^{th}$ difference of $\alpha$ for the first set of data $\vdots$ $\Delta^m \alpha_{256}$ - is the $m^{th}$ difference of $\alpha$ for the $256^{th}$ set of data The above equations (9) and (10) can be easily observed as equal to zero (0). For every positive value there is an equal negative term.

Proof for the least square technique as follows:

The $\Delta^m K$ and $\Delta^m \alpha$ terms are taken as a sequence of number that makes up a random variable, which are orthogonal and linear. This may be indicated by the fact that variable K is along the radial line of clutter amplitude while the variable α is along the angle of clutter and they are perpendicular to each other and K and α for the solution is small.

Employing the variables $C_X$ and $C_Y$ and their differentials $\Delta C_X$ and $\Delta C_Y$ would be more linear and more orthogonal than the K and α variables. The variables A, amplitude of clutter, and $A\alpha$, length of arc of clutter and their differentials are more linear and orthogonal than the K and $\alpha$ variables but not as orthogonal and linear as the variables $C_X$ and $C_Y$ and there differentials. Other sets of variables or a number of sets of variables may be employed. The corresponding set of target variables would be employed. Computer simulation has shown the variables $C_X$ and $C_Y$ and there differentials $\Delta C_X$ and $\Delta C_Y$ more effective in obtaining a more accurate solution.

The LMS technique will be developed further. We have proven the average value of a sequence of $\Sigma\Delta^m K=0$, equation (9), and $\Sigma\Delta^m\alpha=0$, equation (10).

Since $\Delta^m K$ and $\Delta^m\alpha$ is orthogonal and linear within the range of interest and sum of sequences (equation (9) and (10)) are zero we have the well known equation as follows:

$$E\left[\left(\sum \Delta^m K + \sum \Delta^m \alpha\right)^2\right] = E\left[\sum (\Delta^m K)^2\right] + E\left[\sum (\Delta^m \alpha)^2\right] \quad (11)$$
$$= \sigma^2_{K,m} + \sigma^2_{\alpha,m}$$

$\sigma^2_{K,m}$ - is the variance of $m^{th}$ difference of $K$ $\sigma^2_{\alpha,m}$ - is the variance of the $m^{th}$ difference of $\alpha$ $E$ - average value $\Sigma(\Delta^m K)^2$]—sum of the square of $m^{th}$ differential of the 64 sets of data of K.

$\Sigma(E^m\alpha^2$]—sum of the square of $m^{th}$ differential of the 64 sets of data of $\alpha$.

This is the least mean square of K and $\alpha$ components of clutter of the $m^{th}$ order differences.

B. Procedure for the LMS Technique

Method of Choosing Data (A particular FRDB to Process)

Process Data

Evaluate Results

1. Method of Choosing Data

The choice data is extremely important. Choose the FRDB data that has a low differential of clutter the FRDB data that has a low differential of clutter (low change in clutter) and a high change in differential of the target (high change in target). The same basic methodology is employed in Section V, D, 1 with the exception the priority is to pick data that has a low differential of clutter. A number of FRDB's that have this characteristic may be chosen to process.

2. Process Data

After the most effective data has been chosen equation (11) is implemented. The sum of differentials of K and a are obtained for all sets of data and the lowest sum is determined. At the $D\Phi_R$ this lowest sum is obtained is the solution. From $D\Phi_R$ is determined the angular position of the target.

This may performed on any order differential data. The higher order differential data as obtained with good characteristics will give the best results. The higher the order the differential, in general, will give much lower change in clutter than target if data chosen well.

The data processed for the LMS technique may be every set of data or second, third, third, fourth, etc.

Excellent results may be obtained with lower order differentials as well with data such as low clutter, low change in clutter etc.

3. Evaluate Results

The results of processing the data the LMS techniques will give excellent results. This may be correlated with other FRDB, that is chosen well, should be correlated to verity the results and to obtain better results.

C. Comments on LMS Processing

The LMS technique is very similar to the FM technique in that they require very similar data to obtain good results.

A high probability of good FM data will obtain excellent results in the LMS processing. The higher order data should be more effective in both techniques. The LMS data may be more effective in low order data than the FM technique. Since if LMS technique were performed with $\Delta C_X$, $\Delta C_Y$ (the differential of the X and Y components of clutter) which are more linear and more orthogonal than the K–$\alpha$ components of clutter and therefore more accurate results 5. Software Software employing computer simulation has been developed to explore various key elements and the affects they have on the accuracy of the solution.

6. Future Work

To explore the work in more depth computer simulation of the key elements of design would be included in the software employing real radar data. Some of this has been performed but a lot more is desirable.

Statistics of clutter should be developed to further aid in the processing.

Best weighting functions, etc should be explored a host of other affects should be explored and examined.

VI Interleaved data in the same aperture (Clutter and/or Target Correlation System 2 (C-2 System))

A. Same as IV, C, 1 except with Interleaved Pulses Same as IV, C, 1 except "N" data points are divided into a number of interleaved groups of one, two or three, etc. The illustrative example taken in this invention is two (2). Odd and even groups of interleaved pulses are processed as in IV, C, 1 and correlated with each other. The system is similar to IV C1 system. Each group of 32 odd and even group of pulses, is processed analogous to that of IV, C, 1 system with the characteristics as follows:

PRF=1000 Hz (1) 32 odd and even pulses (2) D=2 for P-DPCA (3) 360°/32=11.25° for LRDB (4) Frequency resolution=(500/32)=15.625 Hz B. Calculation for T-DPCA and P-DPCA for the above system:

$$\theta_{EMAX-P} = (\Pi/2N)\frac{1}{2} = [3.14/(2 \times 32)]\frac{1}{2} = 0.71°$$

$f_r$—PRF

D—Number of pulses delayed for DPCA

V—Velocity of the Radar Platform—500'/second

N—Number of pulses—32

PRF=750 Hz (1) 32 odd and even pulses (2) Delay=2

(3) 360/32=11.25

(4) Frequency Resolution=15.625 Hz

Calculation for P-DPCA for the above system:

$$\theta_{EMAX-P} = (\Pi/2N)(1/10)] = 0.005° \text{ radians}$$
$$= 0.28$$

C. Processing Analogous as in Section IV

Process odd and even pulse trains as in the C1 system and get results. Also process the odd and even pulse with the LMS and FM system may also be performed.

D. Resolving the Doppler Ambiguity as in Section IV.

Resolving the doppler ambiguity as with the C1 system.

E. The basic equations are as follows:

$$V'_{1O} = C + M \tag{1}$$

$$V'_{2O} = C/W_{CO} + M/W_{MO} e^{jD\Phi_R} \tag{2}$$

$$V'_{1E} = X_F C + Y_F M \tag{3}$$

$$V'_{1E} = X_F C/W_{CE} + Y_F M/W_{ME} e^{jD\Phi_R} \tag{4}$$

$V_{1O}'$—Measured vector in subarray 1 of odd interleaved pulses $V_{2O}'$—Measured vector in subarray 2 of odd interleaved pulse C—Clutter vector M—Mover vector $W_{CO}$—Clutter weighting function of odd interleaved pulses $W_{CE}$—Clutter weighting function of even interleaved pulses $W_{ME}$—Mover weighting function of odd interleaved pulses $W_{ME}$—Mover weighting function of even interleaved pulses $\Phi_R$—Phase shift proportional to relative radial velocity of the mover $V_{1E}'$—Measured vector in subarray 1 of even interleaved pulses $V_{2E}'$—Measured vector in subarray 2 of even interleaved pulses $X_F$—Clutter change in amplitude and phase from odd interleaved pulses to even pulse $Y_F$—Mover change in amplitude and phase from odd interleaved pulses to even pulse $W_{CE}$-$W_C$—Clutter weighting function of even interleaved pulses $W_{ME}$-$W_M$—Mover weighting function of even interleaved pulses $\Psi$—Phase offset $A_{CM}$—Amplitude offset s-FRDB—fine range bin processed for clutter x—Location of the peak of clutter $K_{CM}$—Phase correction coefficient Target detected at or near its peak, solve for $Y_F$ in the non-delayed and delayed data and solving for $Y_F$ in equations (1) to (4) we have the following:

$$Y_F = (V'_{1E} - W_C V'_{2E})/(V'_{1O} - W_C V'_{2O}) \text{ where} \tag{5}$$

$$W_C = A_{CM} e^{j(\Psi_{CM} + K_{CM} x)}$$

Estimating $Y_F$ from the location of where said target is detected at its peak as a prior calculations and subtracting out $\Phi_D/2$ and determining then $\underline{K}_F = 1$ and $B_F = 0$, if said target is detected at its peak $\underline{K}_F = 1$ and $B_F = 0$ and solving for x, the location of the peak of clutter, may be calculated for any estimated $Y_F$, if $Y_F$ determined at said of said peak of target, $x = (\text{angle of } K_1 - \Psi_{CM})/(-K_{CM})$ Processing at the peak of clutter, x, and solving for $X_F$ in equations (1) to (4) we have the following:

$$X_F = (V'_{1E} e^{jD\Phi_R}/W_M - V'_{2E})/(V'_{1O} e^{jD\Phi_R}/W_M - V'_{2O}) \tag{6}$$

At the peak of clutter $X_F = K_F e^{j\Phi_D/2}$ where $K_F = 1$ and $\Phi_D$ is the phase of the filter where clutter detected at its peak. Subtracting the phase the clutter vector we have $X_F = 1$ at angle equal zero.

Substituting all candidate $\Phi_R$ and from which is determined $\Phi_A$ and $A_{CM}$ and $\Psi_{CM}$ for the term $W_M$, and where the solution is closest to the estimated value of X is the value of $\Phi_R$, the radial velocity and from this the azimuth is found.

Another solution we solve for $e^{jD\Phi_R}/W_M = (V_{11}"X - V_{11}')/(V_{12}"X - V_{12}')$ Substitute X in the above equation and from right side of above equation is known and made equal to $D\Phi'_R$ is determined $A_{CM}$ and $\Psi_{CM}$ at the $\Phi'_A = \Phi_D - \Phi'_R$ where $\Phi'_A$ is close to the true azimuth to give a very good estimate of $A_{CM}$ and $\Psi_{CM}$ VII Same PRF—Different Aperture-Interleaved Data (Clutter and/or Target Correlation System 3-)

A. Basic Concept

This is the same as VI system except when the "N" data points are divided into a number of interleaved groups of two (2) or three (3) or more, the antennas are moved electronically for each interleaved group. Each interleaved group of interleaved pulses are processed where the ratio of the amplitude of target between the interleaved groups of data gives the corresponding antenna positions of target and hence the radial velocity of the target. The interleaved groups of pulses are processed and the ratio of clutter gives the relative radial velocity of target and hence the azimuth position of the target. The clutter and target determinations are correlated.

The example taken for illustrative purposes is two groups of interleaved pulse and at each set of interleaved pulses the antenna arrays are moved half the beamwidth at each interleaved set of pulses the antenna arrays be at the same position.

B. Processing a Target in Area of Interest (Overlapping Half Beamwidth Region D=3)

1. Odd and Even Pulse Sequence Processing

The core of the technique is it allows the detection of targets in the presence of clutter and measure their relative radial velocity and angular position. Simple processing will give reasonably accurate determination of angular position and relative radial velocity. Increased accuracy of the results may be obtained based on the extent of the processing and the development of the equations and the methodology based on the principles involved in this technique.

This is the same data as in the previous Section VI system but the delay that is the matched delay for implementing the DPCA technique involving two subarrays. The matched delay equals three (3) in this case. This is illustrated and developed and calculated in Section VI system.)

The odd set of pulse will correspond to the antenna position subarray one (1) and the even pulses will correspond to antenna position subarray two (2). On the odd pulses the transmit antenna and the two receive subarrays will be pointed at the boresight of the transmit antenna. On the even pulses the transmit antenna and the two receive subarrays will be pointed at a half beamwidth away from the boresight of the odd pulse pointing of the antenna.

A single PRF is transmitted and every other pulse the antenna is positioned a half beamwidth away as illustrated in FIG. 22A, 32 point filter diagram and FIG. 22B, antenna doppler diagram. FIG. 22A illustrates antenna 1 odd sequence of pulses and illustrates the even sequences of pulses at D=1. Since motion compensation is performed relative to the boresight of antenna 1, all filters are referenced to this point. (This is not necessary but simplifies the analysis). Therefore the detection of a target in the antenna one (1) and antenna two (2) position have the same phase characteristics but the amplitude characteristics are determined by its position in the two antenna positions. This is illustrated in FIGS. 23 A) and B) (64 Point Doppler Filter Diagram 1000 Hz) combined odd and even pulse sequences. It is shown based on targets 3x, 4x and 5x position in antenna 1 or antenna 2. The target amplitudes reflect the targets position in antenna 1 and 2. This also illustrates the target may be coherently or non-coherently integrated from the odd and to the even pulse sequences for better detection of targets. The target will appear in the same filter in the odd and even sequence of pulses as illustrated in FIGS. 22 A) and B) Antenna Doppler Diagram (48 feet/sec) and in FIGS. 23 A) and B) Antenna Doppler Diagram (24 feet/sec). FIGS. 22A and 22B is a 32 data point target for interleaved data to illustrate the understanding and fundamental equation employed in the processing. FIG. 34—Table x illustrates further FIG. 22 and should be looked at together. FIG. 23 A) and B) Antenna Doppler Diagram is a 64 data point target for interleaved data to illustrate the understanding and fundamental equation employed in the processing.

All targets, by definition, originate in the overlapped region I (proportional to $\Phi_A$), but are detected in any region ($\Phi_D$). Region I to Region VI of FIG. 23 B), Antenna Doppler Diagram.

As in the previous paragraph it illustrates the ratio of the amplitude of the target is dependent on the position of the target. The clutter ratio depends on where the target is detected ($\Phi_D$). If the clutter were detected in positions 3x, 4x or 5x in FIG. 23 the ratio of clutter would be the same as if the target originates at these positions as illustrated in the previous paragraph.

The regions II to VI of FIG. 23 b) have different ratios of clutter i.e. region IV there is no clutter and $D\Phi_R$ may be measured directly by the phase between mover vectors or by the ratio of the target in the antennas.

FIG. 34—Table X Regions of clutter, depicts the clutters regions I to VI of the FIG. 23, 64 Point Doppler Filter Diagram-1000 Hz.

FIG. 35—Table XI Region of clutter, depicts the clutters regions I to VI of that of FIG. 22 A) and c), 32 Point Doppler Filter Diagram-1000 Hz.

As illustrated in FIG. 22 A) and B), 32 Point Doppler Filter Diagram-1000 Hz, the no clutter region both odd and even sequences (antenna 1 and antenna 2) or for one odd or one even sequence where there is no clutter extends from filter 7–29. In this region $\Phi_R$ may by measured by pulse doppler means directly.

In the other regions I, II and VI the clutter ratio is taken from the ratio of amplitude determined by the antenna 1 and antenna 2 curves. In these regions if the target is detected the processing is more involved.

For the purpose of detailing the operation of the system the detecting and measuring target parameters in these regions will be considered. The odd and even pulses are processed separately and correspond to antenna position 1 and 2 respectively. Each antenna position is processed independently utilizing the DPCA techniques to maximize the cancellation of clutter.

If a target is detected in both the odd and even pulse processing, the ratio of amplitude of the target in the odd and even pulse sequence will give the angular position ($\Phi_A$) of the target and consequently the relative radial velocity ($D\Phi_R$).

The measure of the clutter amplitude ratio in the odd and even pulse sequence where the target is detected will determine the relative radial velocity ($D\Phi_R$) and consequently the angular position of the target ($\Phi_A$).

The ratio of target determination of target parameters is correlated with the target determination of target parameters from the ratio of clutter.

C. Mathematical Development and Description of Operation

The detail description of operation will follow taking the example given including the following:

a) Parameter of Illustrative System
b) The doppler filter diagram (64 point) D=1
c) The doppler filter diagram of odd and even pulse with the DPCA travel (D=3)
d) Clutter bandwidth equation
e) Target parameter equations developed
f) Block diagram of the system (as shown in Section III, G)
g) FIG. 21, FIG. 22, FIG. 23, FIG. 34—Table X, FIG. 35—Table XI,
h) DPCA-Equations developed-DPCA calculations From the system parameters in Section IV A1, the techniques and methodology will be developed to illustrate how the target parameters are measured.

In an electronic scanned array pointing ninety (90°) degrees off the alignment of the platform is as follows:

1.—Clutter Bandwidth (CBW)

$$CBW \approx \{2V_P \cos[(\Psi + \Delta\Psi_2) - \cos(\Psi - \Delta\Psi_1)]\}/(\lambda \sin\Psi)$$

$\Psi$—90°—the pointing angle of electronically scanned array
$V_P$—500 feet/sec—the velocity of the platform on which the electronically scanned array is mounted.
$\Delta\Psi_2$—positive angle of pointing angle
$\Delta\Psi_1$—negative angle of pointing angle
$\Delta\Psi_2 \Delta\Psi_1 = \Delta\Psi$
$2\Delta\Psi$—total angle off pointing angle
CBW—clutter bandwidth (within 3 db of pointing angle of transmit array).
$\lambda$=0.1 ft.—wavelength of transmission frequency Substituting the parameters in the equation for clutter bandwidth we have:

$$CBW = \frac{2 \times 500 \text{ ft/sec}}{0.1} \times \frac{\cos(90 + 0.333) - \cos(90 - 0.333)}{\sin(90°)}$$
$$= 116 \text{ Hz}$$

There are 64 complex data points and 64 filters at a pulse repetition frequency (PRF) of a 1000 Hz. The filter resolution of each of the 64 filters is a 1000 Hz/64=15.625 Hz. The number of filters in the clutter bandwidth is 116 Hz/15.625 Hz=7.4 or ±3.6 filters. The phase shift corresponding for each of the 64 filters are 0, 5.625, 11.25, . . . , 354.375° degrees for filters 1 to 64 respectively. Half beamwidth contains approximately four filters approximately 62.4 Hz bandwidth.

For the equivalent pulse repetition frequency (PRF) of 500 Hz for the odd and even pulse groups and there is thirty-two (32) pulses there is 32 filters of complex data. The filter resolution of each of the 32 filters is a 500 Hz/32=15.625 Hz. The number of filters in the overlap of subarray 1 and 2 beam is 3.6 or ±1.8 filters. The phase shift corresponding for each of the 32 filters are 0, 11.25, 22.5 . . . , 348.75° degrees for filters 1 to 32 respectively. Half beamwidth contains approximately four filters approximately 62.4 Hz bandwidth The displaced phase center travel for odd or even pulse sequence is the distance the subarray 2 has to move to cancel clutter most effectively. The total array length is eleven (11) feet the two subarray lengths are five and half feet (5.5') so the second subarray has to travel 2.75 feet for DPCA action to cancel clutter most effectively.

The travel per odd and even sequence for a match delay D=2.75 ft/(1.0 ft per pulse)>>3.0 ft.−0.15 ft 2.75 ft/(1.0 ft per pulse)>)3.0 ft.−0.15 ft odd and even pulses or three odd or even pulses. The DPCA calculations for D=3 are in Section V.

2. Ideal Set of Equations and Solution a) Target Ratio

The first and simplest technique is to employ the ideal set of equations for the system. The odd sequence of pulses are represented as follows:

$$V_{1,1}^1 = C_1 + M_1 \quad (1)$$

$V_{1,1}^1$—Measured vector in odd sequence of pulse of subarray 1

$C_1$—Clutter vector in subarray 1

$M_1$—Mover vector in subarray 1

The delay (D)=2 of subarray 1, odd sequence of pulses for the ideal system where the target is detected in the same corresponding LRDB as the non-delayed pulses is as follows:

$$V_{1,2}^1 = C_1 + M_1 e^{jD\Phi_R} \quad (2)$$

$V_{1,2}^1$—Measured vector in odd sequence of pulse of subarray 1 delay equal two (2)

$C_1$ and $M_1$—same as equation (1)

$D\Phi_R$—phase shift of mover proportional to velocity of the mover

The even sequence of pulses are represented as follows:

$$V_{1,1}^{11} = C_2 + M_2 \quad (1^1)$$

$V_{1,1}^{11}$—Measured vector in even sequence of pulse of subarray 2

$C_2$—Clutter vector in subarray 2, in same corresponding filter as in subarray 1

$M_2$—Mover vector in subarray 2, in same corresponding filter as in subarray 1

The delay D=2 of subarray 2, even sequence of pulses for the ideal system, where the target is detected in the same corresponding LRDB as the non-delayed pulses is as follows:

$$V_{1,2}^{11} = C_2 + M_2 e^{jD\Phi_R} \quad (2^1)$$

$V_{1,2}^{11}$—Measured vector in even sequence of pulses of subarray 2, delay equal two (2)

$C_2+M_2$—same as in equation ($1^1$)

$D\Phi_R$—same as in equation ($2^1$)

Taking equation (1) and (2) and solving for $M_1$ we have the following:

$$M_1 = (V_{1,1}^1 - V_{1,2}^1)/(1 - e^{jD\Phi_R}) \quad (3)$$

Taking equation ($1^1$) and ($2^1$) and solving for $M_2$ we have the following:

$$M_2 = (V_{1,1}^{11} - V_{1,2}^{11})/(1 - e^{jD\Phi_R}) \quad (3^1)$$

Taking equation ($3^1$) and dividing by equation (3) we have the following:

$$M_2/M_1 = Y_{FP} = \overline{K}_{FP} e^{jB_{FP}} = (V_{1,1}^{11} - V_{1,2}^{11})/(V_{1,1}^1 - V_{1,2}^1) \quad (4)$$

The terms $Y_{FP}$ and $\overline{K}_{FP}$ and $B_{FP}$ have been defined previously but we will define them again as follows:

$\overline{K}_{FP}$—is the ratio of the amplitude of the mover of even sequence of data to the mover amplitude of odd sequences of data.

$B_{FP}$ is the phase change between the mover of even sequences of data to the movers of odd sequences of data.

The solution to equation (4) gives the ratio of the amplitude of the mover as described in the previous paragraph. This ratio gives the location of the mover ($\Phi_A$) in the main beam of the antenna as pictured in FIGS. 23,24 and 25. Then consequently $D\Phi_R$ is determined by the equation as follows:

$$\Phi_D = \Phi_{AP} + (D\Phi_R)/D \quad (5)$$

$\Phi_D$ is the phase (or filter)—FRDB where the mover peak amplitude is detected (same in both odd and even sequences of pulses)

$\Phi_{AP}$ is the phase proportional to the angular position of the mover (same in both sequence of pulses).

$D\Phi_R$ is the phase proportional to the relative radial velocity of the mover (same in both sequences of pulses)

D is the delay between odd and even sequences of data; it is three (3) in this case.

$D\Phi_R$ is the phase proportional to the relative radial velocity of mover when D=3.

This illustrates the ideal equation solution to finding the relative radial velocity of the target and its angular position.

In Section V, A, there is the calculation of the maximum phase due to P-DPCA at 1000 Hz where D=3 for the odd and even sequences of data. It is 0.71°.

The ideal set of equations for Q-DPCA is developed the same way and the resulting equations are as follows:

$$M_2/M_1 = Y_T = \underline{K}_{FT} e^{jB_{FT}} = (V^{11}_{1,1} - V^{11}_{\underline{1,2}})/(V^1_{1,1} - V^1_{\underline{1,2}})$$

Where the definition of terms are the same as previously for the ideal case of the P-DPCA. The only two terms that change are $V_{\underline{1,2}}^{11}$ and $V_{\underline{1,2}}^{1}$ which are different for the Q-DPCA case. The solution would be the same but in the Q-DPCA case the errors are larger.

As an approximation for a more accurate solution the $\underline{K}_{FT}$ solution for Q-DPCA to that of the $\underline{K}_{FP}$ solution for P-DPCA condition is taken and this extrapolated to $\underline{K}_F$ where there would be zero (0) error. This assumes a linear error between $\Phi_{AT}$ and $\Phi_{AP}$ and calculates where $\Phi_{AO}$ is the error in angular position is zero (0).

The equation is as follows:

$$(\Phi_{AT} - \Phi_{AO})/(\Phi_{AP} - \Phi_{AO}) = (\underline{K}_{cm}/K_{cm})$$

and solving for $\Phi_{AO}$ we have the following:

$$\Phi_{AO} = [\Phi_{AT} - (\underline{K}_{cm}/K_{cm})\Phi_{AP}]/[(\underline{K}_{cm}/K_{cm}) - 1]$$

$K_{cm}$ is proportional to error in angle of the P-DPCA
$\underline{K}_{cm}$ is proportional to error in angle of the T-DPCA
$\Phi_{AT}$ is phase proportional to angular position of target due to Q-DPCA
$\Phi_{AP}$ is phase proportional to angular position of target due to P-DPCA
$\Phi_{AO}$ is phase proportional to angular position of target due to extrapolation of zero error b.) Clutter Ratio Taking equation (1) and (2) and solving for C, we have the following:

$$C_1 = (V^1_{1,1} e^{jD\Phi_R} - V^1_{1,2})/(e^{jD\Phi_R} - 1) \quad (6)$$

Taking equation ($1^1$) and ($2^1$) and solving for $C_2$ we have the following:

$$C_2 = (V^{11}_{1,1} e^{jD\Phi_R} - V^{11}_{1,2})/(e^{jD\Phi_R} - 1) \quad (7)$$

Taking equation (7) and dividing by equation (6) we have the following:

$$C_2/C_1 = K e^{j\alpha} \quad (8)$$
$$= X$$
$$= (V^{11}_{1,1} e^{jD\Phi_R} - V^{11}_{1,2})/(V^1_{1,1} e^{jD\Phi_R} - V^1_{1,2})$$

The terms X, K and $\alpha$ have been defined previously but will define them again as follows:

K is the ratio of the amplitude of the clutter of the even sequence of data to the clutter of the odd sequence of data.

$\alpha$ is the phase difference between the clutter of the even sequence to the clutter of the odd sequence of data.

From the FRDB where the target is detected the solution K (ratio of clutter) from the antenna curves—FIG. 25) gives the solution K in equation (8). Only $\alpha$ and $\Phi_R$ are unknown and the equation is solvable. Another solution performed by simulation is to vary $D\Phi_R$, the solution $Ke^{j\alpha}$ gives the K derived from the antenna ratio as described since there is only one true solution. This solution $\Phi_R$ is proportional to the relative radial velocity of the target. Utilizing equation (5) gives the solution $\Phi_A$, which is proportional to the angular position of the target.

The two solutions one derived for the ratio of the movers and that due to ratio at clutter should correlate and give close to same solutions for $\Phi_A$ and $D\Phi_R$.

The previous solution employing the ratio of clutter is performed at 1000 Hz and P-DPCA technique. An analogous solution may be employed using the T-DPCA technique, the resulting equation would be analogous to equation (8) as follows:

$$C_2/C_1 = K_F e^{j\alpha_F} \quad (8^1)$$
$$= X_F$$
$$= (V^{11}_{1,1} e^{jD\Phi_R} - V^{11}_{\underline{1,2}})/(V^1_{1,1} e^{jD\Phi_R} - V^1_{\underline{1,2}})$$

The solution would be as describe for equation (8) but the error would be larger due to the more inaccuracy due to the Q-DPCA technique.

$V_{\underline{1,2}}^{11}$ and $V_{\underline{1,2}}^{1}$ are the only changed parameters as described previously for the ideal solution for K.

As in the target ratio extrapolation of a more accurate determination of reducing the error of the clutter may be performed. This in turn will reduce the error in determining relative radial velocity ($D\Phi_R$) and angular position ($\Phi_A$).

3. Non-Ideal Set of Equations and Solution
a.) Target Ratio

The next solution is the non-ideal solution is to employ equations, which contain the weighting function for clutter ($W_c$) and the weighting function for the target ($W_m$). The sequence of pulses is changing the nomenclature to odd-even represented as follows:

$$V^1_{1O} = C_1 + M_1 \quad (1)$$

This is same equation as (1), the same as for the ideal case. The definition of terms is as follows:

$V_{1O}^1$—Vector in odd sequence of data array 1 for P-DPCA

Other variables as defined previously

The delay (D=3) for P-DPCA of subarray 1, odd sequence of pulses in the FRDB where the target is detected in the same FRDB as the non-delayed pulses is as follows:

$$V^1_{2O} = C_1/W_{CO} + M_1/W_{MO} e^{jDJ_R} \quad (2)$$

$V_{2O}^1$ - Vector in odd sequence of data entry 2 for P-DPCA $W_{CO}$ - Weighting function of clutter for odd data- P-DPCA $W_{MO}$ - Weighting function of target for odd data- P-DPCA Other variables as defined previously This a similar equation to equation (2) but with the added terms $W_{CO}$ and $W_{MO}$, which are terms as explained previously which are correction terms for clutter and target respectively.

The even sequence of pulse equations is a similar set of equations as follows:

$$V^1_{1E} = X_F C_1 + Y_F M_1 \quad (1)$$

$$V^1_{2E} = X_F C / W_{CE} + Y_F M e^{jDJ_R} / W_{ME} \quad (2)$$

$V^1_{1E}$ - Vector in even sequence of data entry 1 for P-DPCA
$V^1_{2E}$ - Vector in even sequence of data entry 2 for P-DPCA
$W_{CE}$ - Weighting function of clutter for even data- P-DPCA
$W_{ME}$ - Weighting function of target for even data- P-DPCA
$X_F$ - Change in filter response for clutter in even data
$Y_F$ - Change in filter response for target in even data Other variables as defined previously The same definition of terms as for equations (1) and (2) and same definition of $W_{CE}$ and $W_{ME}$ as for equations (2) but for the even sequence of pulse.

Similar to ideal set of equations we solve for $M_1$, and $M_2$ we have the following:

$$M = (V^1_{1O} - W_{CO} V^1_{1,2}) / (1 - W_{CO} e^{jDJ_R} / W_{MO}) \quad (3)$$

$$Y_F M = (V^1_{1E} - V^1_{2E} W_{CE}) / (1 - W_{CE} e^{jDJ_R} / W_{ME}) \quad (3)$$

Since odd and even sequence of pulses are of the same data stream and processed at the same filter (FRDB) and the target is common to both data streams the $\Phi_R$ and $\Phi_A$ solution is the same. Also the clutter is very close to the same in both sequence of pulse.

The above discussion illustrates the following:

$$W_{CO} \approx W_{CE} \text{ and } W_{MO} = W_{ME}$$

and also from the derivation in section III

From the result and equations (3) and (3) we have the following:

$$Y_F = \overline{K}_F e^{jbF} \quad (4)$$
$$= (V^1_{1E} - V^1_{2E} W_{CE}) / (V^1_{1O} - V^1_{2O} W_{CO})$$

The above equation (4) is for P-DPCA technique.

Taking the equations for the Q-DPCA technique and as developed for the P-DPCA case we have the analogous equation as follows:

$$Y_F = \overline{K}_F e^{jbF} \quad (4)$$
$$= (V^1_{1E} - \underline{V^1_{2E}} \underline{W_{CE}}) / (V^1_{1O} - \underline{V^1_{2O}} \underline{W_{CO}})$$

The underlined variables represent those that are special to Q-DPCA but are the same as Q-DPCA.

Equating equations (4) and (4) we have the following:

$$(V^1_{1E} - V^1_{2E} W_{CE}) / (V^1_{1O} - V^1_{2O} W_{CO}) = \quad (5)$$
$$(V^1_{1E} - \underline{V^1_{2E}} \underline{W_{CE}}) / (V^1_{1O} - \underline{V^1_{2O}} \underline{W_{CO}})$$

Where $$W_{CO} = A_{CM} e^{jD_0 + K_{cm}(x-x_0)]} \text{ and } \underline{W_{CO}} = A_{CM} e^{jD_0 + \underline{K_{cm}}(x-x_0)]}$$

All the terms in equation (5) are known except x, where x is the position where the peak of amplitude of clutter is located relative to the FRDB-$x_0$ where the filter where the target is processed.

The solution of equation (5) for x will give the solution for $W_{CO}$ and $\underline{W_{CO}}$. The $W_{c1}$ term may now be inserted into equation (4) for $\overline{K}_F e^{j2F}$. The $\overline{K}_F$ solution is then taken to the curve of FIG. 24 that gives the ratio of target at all known angular positions of the target, a match is found and the angular position is determined and therefore $\Phi_R$. All apriory information of $\overline{K}_F$ calculated and angular position can be determined and the match easily performed from FIGS. 16,17 and 18.

b) Clutter Ratio

Similar to the set of equations for $M_1$ and $M_2$ a set of equations are developed for $C_1$ and $C_2$ and employing the result $W_{C1} = W_{C2}$ and $W_{M1} = W_{M2}$.

$$X_F = K_F e^{jK_F} \quad (6)$$
$$= (V^1_{1E} e^{jDJR} / W_{ME} - V^1_{2E}) / (V^1_{1O} e^{jDJR} W_{MO} - V^1_{2O})$$

$$X_F = K_F e^{jK_F} \quad (6)$$
$$= (V^1_{1E} e^{jDJR} / \underline{W_{MO}} - V^{11}_{1,2}) / (V^1_{1,1E} e^{jDJR} \underline{W_{MO}} - V^1_{1,2}) \text{ Where}$$

$$W_{MO} = A_{CM} e^{jD_0 + K_{cm}(y-y_0)]} \text{ and}$$
$$\underline{W_{MO}} = A_{CM} e^{jD_0 + K_{cm}(y-y_0)]}$$

Substituting all candidate $\Phi_R$ and at the $\Phi_R$ where XF'S are closest to equal is the best estimate of $\Phi_R$.

This may be performed for any other delay and should obtain close to the same results.

c.) Correlate Results of Target Ratio and Clutter Ratio Technique

Correlate the solutions for the two techniques on for target ratio and the other for clutter ratio and give the same relative radial velocity ($\Phi_R$) and same angular position ($\Phi_A$).

4. Resolving Doppler Ambiguity

--- a.) Resolve Doppler Ambiguity Within One PRF

32 Odd Pulses

| | | |
|---|---|---|
| D = 1 Doppler Ambiguity | 24 ft/sec | D = 1 MPR = 11.25 |
| D = 2 Doppler Ambiguity | 24/2 = 12 ft/sec | D = 2 MPR = 22.5 |
| D = 3 Doppler Ambiguity | 24/3 = 8 ft/sec | D = 3 MPR = 33.75 |

MPR-Minimum Phase Response at the respective D
$D_{AMB2-3} = (V_{AMB1} V_{AMB2})/(V_{AMB1} - V_{AMB2}) = (12 \times 8)/(12 - 8) = 24$ ft/sec

| 64 Pulses | | | |
|---|---|---|---|
| Doppler Ambiguity | 48 ft/sec | D = 1 | MPR = 5.625 |
| | 24 ft/sec | D = 2 | MPR = 11.25 |
| | 16 ft/sec | D = 3 | MPR = 16.875 |
| | 12 ft/sec | D = 4 | MPR = 22.5 |
| | 9.6 ft/sec | D = 5 | MPR = 28.125 |

MPR-Minimum Phase Response at the respective D

The problem is to resolve doppler ambiguity between 12 ft/sec, 24 ft/sec and 48 ft/sec.

The 32 pulse, D=1, 1000 Hz pulse train (for the odd or even pulse sequences) the velocity ambiguity is 24 ft/sec. The 64 pulse train has a velocity ambiguity of 48 ft/sec twice that of 32 pulse train (24 ft/sec) at D=1.

To resolve further the doppler ambiguity of the 32 pulse train so that it will equal that of 64 pulse train we will process the 64 pulse train to resolve that ambiguity.

First process is to resolve the odd and even pulse sequences at D=1 and D=2 to a doppler ambiguity of 24 ft/second. Processing at the D=2 the doppler ambiguity is 12'/sec, the D$\Phi_R$ and $\Phi_A$ is determined at this condition. The $\Phi_A$ which is proportional to angular position of the target which is constant at D=1 and D=2. The D$\Phi_R$, which is proportional to the relative radial velocity, which is constant.

An illustrative example from FIG. 23 A) and B) will show how the doppler ambiguity is resolved by employing the D=2 and D=1 processing. If the target has a relative radial velocity of 12¾'/sec in the D=1 processing this would have a phase shift D$\Phi_R$=191.25° while at the D=2 processing the phase shift D$\Phi_R$=11.25°. There is a difference in phase equal to 180° indicating that relative radial velocity is not ¾ ft/sec but 12¾ ft/sec. If there were no difference in phase shift for D=2 and D=1, the doppler ambiguous velocity would be ¾ ft/sec. This would resolve the doppler ambiguity within the 32 pulse trains of odd pulse sequences. It is resolved to 24'/sec.

Another illustrative example (analogous to the previous example) will be employed to resolve the doppler ambiguity to 48 ft/sec to that of the doppler ambiguity of the D=1, 64 pulse train of the combined odd and even pulse sequences. (FIG. 23) The illustrative example will be a relative radial velocity of 24¾ ft/sec and a phase shift of 11.25° for D=1 and a phase shift of 22.5° for D=2.

Processing the 64 pulse train, the phase shift of D$\Phi_R$ would be 180°+5.625=185.625 and would determine that relative radial velocity would be 24¾' feet/sec. This would resolve the doppler ambiguity to 48'/sec.

The processing of the 64 pulse train would combine the processing of the odd and even pulses to give greater detect ability and the two groups are coherent phase wise but have different amplitudes (FIG. 23 C)

b.) Resolving Doppler Ambiguity Between Two Different PRFs.

Processing of 750 Hz and Resolving Ambiguity between 1000 Hz and 750 Hz

This would be very analogous to that of the 1000 Hz and resolving its doppler ambiguity. Then the doppler ambiguity of 1000 Hz and 750 Hz would be resolved as stated previously.

Comments on Results:

Results would be correlated between the 750 Hz and 1000 Hz processing and there may be better results under one PRF or other and the results should be weighted appropriately.

Comments on Technique:

The process has been based on only half beamwidth of antenna employed. A significantly greater part of the antenna may be employ such as ¾ or even the full beamwidth.

The processing for target ratio, $\overline{K}_F$, is performed where the target is detected at its peak and the processing of clutter associated with the detection of the target. The processing of clutter may be performed more effectively at the detection of clutter at its peak. This would make $K_F e^{j\alpha_F} = 1 e^{j(0)}$ and make for easy and more effective processing.

5. Comments on Accuracy of Solution

If the ideal system achieves the required accuracy in determining the objective, then further processing, that is, the non-ideal case may not be required. The more the processing of the non-ideal and the correlation between various sets of data and different PRFs and further processing can achieve higher degrees of accuracy.

The discussion and development of the results indicate when employing the times four (×4) spectral processing or greater excellent results can be attained. This may lead to employing as few as 8 data points to attain the required accuracy and a great deal of time saved for dwell time on target. Excellent results at much fewer data points (less dwell time) at any of the modes employed to determine the results on a target.

Processing multiple apertures simultaneously may facilitate better results, due to overlapping antenna data and excellent correlation between results.

VIII Different Aperture with interleaved data-Same PRF-Different Transmission Frequency A. System Definition Same as VII except included accompanying the movement of the antenna arrays, the transmission frequency is changed.

The example taken for illustration is the same as for VII with the frequency of transmission is changed as well as the interleaved pulses.

The example to be taken is the PRF=1000 Hz and the transmission frequency on the first array is 1000 MHz and the transmission frequency for the interleaved pulses of the second array is 1010 MHz. All other parameters are the same except that the beam steering phase shifters for the interleaved pulses or array have to be computed to give the same beamwidth and clutter bandwidth for the arrays. All other parameters are analogous.

The motion compensation is computed relative to the boresight of the first array making all filters relative to the boresight of the first array (this is not have to be performed if not the filters in both arrays have to related to each with this taken into account).

Assumptions:

Clutter—correlates between arrays

Target—correlates between arrays

Since we have interleaved data the correlation should be good.

The beamwidth of arrays are narrower at the XF2=1333 MHz since the spacing of the antenna elements are a λ/2 for 1000 MHz. The main beam antenna beamwidth is ⅔°, the main beam antenna beamwidth at the transmission frequency of 1333 MHz is ¾×⅔°=½°. This is less than that of transmission frequency of 1000 MHz.

The consequence of this is the filters have the same phase resolution but the filters have different velocity per filter and this holds for target as well as clutter as pointed out in Section VII, A. This results in the equations as follows:

$V_{D1,1} = V_{D1,2} = K_1\Phi_{D1,1} = K_2\Phi_{D1,2}$ $V_{A1,1} = V_{A1,2} = K_1\Phi_{A1,1} = K_2\Phi_{A1,2}$ $V_{R1,1} = V_{R1,2} = K_1\Phi_{R1,1} = K_2\Phi_{R1,2}$ $\Phi_{D1,1} = \Phi_{A1,1} + \Phi_{R1,1}$ $\Phi_{D1,2} = \Phi_{A1,2} + \Phi_{R1,2}$ $\overline{K}e^{jB} = [(V_{1,1}^{11} - \underline{W_{C1}}V_{1,2}^{11})/$
$(V_{1,1}^1 - \underline{W_{C1}}\underline{V_{1,2}^1})]/[(1 - (\underline{W_{C1}}/\underline{W_{M1}})e^{jD\Phi R})(1 - (\underline{W_{C1}}/\underline{W_{M1}})e^{jD\Phi R})]$ $K_1\Phi_{D1,1} = K_1\Phi_{A1,1} + K_1\Phi_{R1,1}$ $K_2\Phi_{D1,2} = K_2\Phi_{A1,2} + K_2\Phi_{R1,2}$ $K_1(\Phi_{D1,1} = \Phi_{A1,1} + \Phi_{R1,1})$ $K_2(\Phi_{D1,2} = \Phi_{A1,2} + \Phi_{R1,2})$ $V_{D1,1}$ - is the total velocity of detention of target and clutter of odd pulses $V_{D1,2}$ - is the total velocity of detention of target and clutter of even pulses $\Phi_{D1,1}$ - is the phase velocity of detention of target and clutter of odd pulses $\Phi_{D1,2}$ - is the phase velocity of detention of target and clutter of even pulses $K_1$ - is the constant that relates velocity to phase shift of even 1

$K_2$ - is the constant that relates velocity to phase shift of even 2

$V_{A1,1}$ - is the velocity of the target due to its angular position in array 1

$V_{A1,2}$ - is the velocity of the target due to its angular position in array 2

$\Phi_{A1,1}$ - is the phase of the target due to its angular position in array 1

$\Phi_{A1,2}$ - is the phase of the target due to its angular position in array 2

$V_{R1,1}$ - is the relative radial velocity of the target in array 1

$V_{R1,2}$ - is the relative radial velocity of the target in array 2

$\Phi_{R1,1}$ - is the phase shift due to its relative radial velocity of the target in array 1

$\Phi_{R1,2}$ - is the phase shift due to its relative radial velocity of the target in array 2

Values of This System:
Transmission Frequency of $1^{st}$ Array—1000 MHz
Transmission Frequency of $2^{nd}$ Array—1333 MHz
PRF is 1000 Hz
Wavelength of First transmission frequency is 0.1 feet
Wavelength of Second transmission frequency is 3/40 feet
Each interleaved set of pulses has 32 data points
Velocity Ambiguity of first set of pulses is 24 feet/second
Velocity Ambiguity of second set of pulses is 18 feet/second Unambiguous velocity of two sets of pulses is 72 feet/second The phase resolution of either set of pulses is 11.25° per filter The frequency resolution of either set of pulses is 31.25 Hz The velocity resolution per $1^{st}$ array filter is 24 feet/sec/32 filters=3/4 feet/sec/filter The velocity resolution per $2^{nd}$ array filter is 18 feet/sec/32 filters=9/16 feet/sec/filter Range ambiguity of $1^{st}$ and $2^{nd}$ array is 160 miles.

B. The Ideal System Equation Solution

1. Target (Same as Section IX, B, 3 except this solution is for 32 point data and from array 1 to array 2 as the solution in Section IX, B, 3 are for the 64 point data aperture to aperture. This makes no difference in the computation and equations). The procedure for the solution is in Section IX, B, 3, f), g) and h).

2. Clutter

The clutter ratio is the following:

$$P\text{-}DPCA - K_{FP}e^{j\alpha PF} = C_2/C_1 = \quad (e)$$
$$(V_{1,1}^{11}e^{jD\Phi^1 R} - V_{1,2}^{11})(e^{jD\Phi R} - 1)/(V_{1,1}^1 e^{jD\Phi R} - V_{1,2}^1)(e^{jD\Phi^1 R} - 1) =$$
$$e^{jD/2(\Phi_R^1 - \Phi_R)}[(V_{1,1}^{11}e^{jD\Phi^1 R} - V_{1,2}^{11})\sin(D\Phi_{r/2})]/[$$
$$(V_{1,1}^1 e^{jD\Phi R} - V_{1,2}^1)\sin(D\Phi_{R/2}^1)]$$

$$Q\text{-}DPCA - K_{FT}e^{j\alpha PT} = \quad (f)$$
$$C_2/C_1 = e^{jD/2(\Phi_R^1 - \Phi_R)}[(V_{1,1}^{11}e^{jD\Phi^1 R} - \underline{V_{1,2}^{11}})\sin(D\Phi_{r/2})]/[$$
$$(V_{1,1}^1 e^{jD\Phi R} - \underline{V_{1,2}^1})\sin(D\Phi_{R/2}^1)]$$

The solution is analogous to that in Section IX, B, 3 F), G), and H) for target. It will be stated over for the clutter ratio. The procedure is to obtain the peak FRDB where the target is detected. Consequently measure from the positions in the overlapped beams where the target can originate (FIGS. 23 and 25) at each position of origin the $D\Phi_R$ and $D\Phi^1_R$ are measured and their values substituted in equations (e) and (f), calculate $K_{FP}$ and $K_{FT}$. For each FRDB possible position of origin from FIG. 24 measure $K_{FP}$ and $K_{FT}$ determined by the graph. If it agrees or it is close in value to the calculated values of $K_{FP}$ and $K_{FT}$ then that is the origin of the target.

There would be a highly different position for $K_{FP}$ and $K_{FT}$. This would depend on how significant $W_m$ and $W_c$ are, the weighting function for clutter and target.

As an approximation for a more accurate solution, it would be analogous procedure but for $K_{FP}$ and $K_{FT}$, the clutter ratios instead of target ratios $\overline{K}_{PF}$ and $\overline{K}_{PT}$. This would be as follows:

$$(\Phi_{AT} - \Phi_{AO})/(\Phi_{AP} - \Phi_{AO}) = [\underline{K_{CM}}(x_2 - x_0)/K_{CM}(x_1 - x_0)] \quad (g)$$

$$\Phi_{AO} = [\Phi_{AT} - \underline{K_{CM}}(x - x_0)/K_{CM}(x - x_0)]/ \quad (h)$$
$$(\underline{K_{CM}}(x_2 - x_0)/K_{CM}(x_1 - x_0) - 1]$$

Some definition of terms as in Section VIII, B, 3 except this is for clutter and not target.

This is an approximate solution and will give a smaller error then the simplified ideal solution. This assumes the ratio of the P-DPCA solution to that of the Q-DPCA solution is the same as the ratio of the slope curve for $W_c$ for P-DPCA to the Q-DPCA ($K_{cm}/\underline{K}_{cm}$).

This result is correlated with that of the target ratio determination.

C. The Non-Ideal Solution Technique (Including Weighting Function for Target and Clutter)

The following equation is taken from Section III, G for $\Delta T$ processing 32 point data where $$W_{c1} = W_{c1,1} = W_{c1,2} \text{ and } \underline{W}_{c1} = \underline{W}_{c1,1} = \underline{W}_{c1,2} \text{ and } \overline{W}_{C2} =$$

$$\overline{W}_{C2,1} = \overline{W}_{c2,2} \text{ and } \underline{\overline{W}}_{C2} = \underline{\overline{W}}_{C2,1} = \underline{\overline{W}}_{C2,2} \text{ and }$$

and $\Phi_R$ is equal to $\Phi_R^1$ we have the following

Odd interleaved pulses array 1 - P-DPCA – (A1)
$$\overline{K}e^{jB} = [(V_{1,1}^{11} - W_{C1}V_{1,2}^{11})/$$
$$(V_{1,1}^{1} - W_{C1}V_{1,2}^{1})]/[(1 - (W_{C1}/W_{M1})e^{jDJR})/$$
$$(1 - (W_{C1}/W_{M1})e^{jDJR})]$$

Odd interleaved pulses array 1 - Q-DPCA – (A2)
$$\overline{K}e^{jB} = [(V_{1,1}^{11} - \underline{W}_{C1}\underline{V}_{1,2}^{11})/$$
$$(V_{1,1}^{1} - \underline{W}_{C1}V_{1,2}^{1})]/[(1 - (\underline{W}_{C1}/\underline{W}_{M1})e^{j(D+1)JR})/$$
$$(1 - (\underline{W}_{C1}/\underline{W}_{M1})e^{j(D+1)JR})]$$

Even interleaved pulses array 2 - P-DPCA – (B1)
$$\overline{K}e^{jB} = [(\overline{V}_{1,1}^{II} - \overline{W}_{C2}\overline{V}_{1,2}^{II})/$$
$$(\overline{V}_{1,1}^{1} - \overline{W}_{C2}\overline{V}_{1,2}^{1})]/[(1 - (\overline{W}_{C2}/\overline{W}_{M2})e^{jDJ^1R})/$$
$$(1 - (\overline{W}_{C2}/\overline{W}_{M2})e^{jDJ^1R})]$$

Even interleaved pulses array 2 - Q-DPCA – (B2)
$$\overline{K}e^{jB} = [(\overline{V}_{1,1}^{II} - \underline{\overline{W}}_{C2}\underline{\overline{V}}_{1,2}^{II})/$$
$$(\overline{V}_{1,1}^{1} - \underline{\overline{W}}_{C2}\overline{V}_{1,2}^{1})]/[(1 - (\underline{\overline{W}}_{C2}/\underline{\overline{W}}_{M2})e^{j(D+1)J^1R})/$$
$$(1 - (\underline{\overline{W}}_{C2}/\underline{\overline{W}}_{M2})e^{j(D+1)J^1R})]$$

Odd interleaved pulses array 1 - P-DPCA – (C1)
$$\overline{K}e^{j\alpha} = [(V_{1,1}^{11} - e^{jD\Phi R}/W_{M1} - V_{1,2}^{11})/$$
$$(V_{1,1}^{1}e^{jD\Phi^1 R}/W_{M1} - V_{1,2}^{1})]/[(e^{jD\Phi R}/W_{M1} - 1/W_{C1})/$$
$$(e^{jD\Phi R}W_{M1} - 1/W_{C1})]$$

Odd interleaved pulses array 1 - Q-DPCA – (C2)
$$\overline{K}e^{j\alpha} = [(V_{1,1}^{11} - e^{j(D+1)J_R}/\underline{W}_{M1} -$$
$$\underline{V}_{1,2}^{11})/(V_{1,1}^{1}e^{j(D+1)J_R^1}/\underline{W}_{M1} - V_{1,2}^{1})]/[(e^{j(D+1)J_R}/\underline{W}_{M1} -$$
$$1/\underline{W}_{C1})/(e^{j(D+1)J_R^1}\underline{W}_{M1} - 1/\underline{W}_{C1})]$$

Even interleaved pulses array 2 - P-DPCA – (D1)
$$\overline{K}e^{j\alpha} = [(\overline{V}_{1,1}^{II} - e^{jD\Phi R}/\overline{W}_{M2} - \overline{V}_{1,2}^{II})/$$
$$(\overline{V}_{1,1}^{1}e^{jD\Phi^1 R}/\overline{W}_{M2} - \overline{V}_{1,2}^{1})]/[(e^{jD\Phi^1 R}/\overline{W}_{M2} - 1/\overline{W}_{C2})/$$
$$(e^{jD\Phi^1 R}\overline{W}_{M2} - 1/\overline{W}_{C2})]$$

Even interleaved pulses array 2 - Q-DPCA – (D2)
$$\overline{K}e^{j\alpha} = [(\overline{V}_{1,1}^{II} - e^{j(D+1)J_R}/\underline{\overline{W}}_{M2} - \overline{V}_{1,2}^{II})/$$
$$(\overline{V}_{1,1}^{1}e^{j(D+1)J_R^1}/\underline{\overline{W}}_{M2} - \overline{V}_{1,2}^{1})]/[(\overline{V}_{1,1}^{II} - e^{j(D+1)J_R}/\underline{\overline{W}}_{M2} - \overline{V}_{1,2}^{II})/$$
$$(\overline{V}_{1,1}^{1}e^{j(D+1)J_R^1}/\underline{\overline{W}}_{M2} - \overline{V}_{1,2}^{1})]$$

From Section III, G $\Delta T$ processing equates equation (A1) and (A2) and solves for $W_{c1}$ and $\underline{W}_{c1}$ and similarly equation (B1) and (B2) solves for $\overline{W}_{C2}$ and $\underline{\overline{W}}_{C2}$.

Also from Section III, G, $\Delta T$ processing equates equation (C1) and (C2) and solves for $W_{m1}$ and $\underline{W}_{m1}$ and similarly equation (D1) and (D2) solves for $\overline{W}_{m2}$ and $\underline{\overline{W}}_{m2}$.

We have from the two previous paragraphs solved for $W_{c1}$, $\underline{W}_{c1}$, $\overline{W}_{C2}$, $\underline{\overline{W}}_{C2}$, $W_{m1}$, $\underline{W}_{m1}$, $\overline{W}_{m2}$, $\underline{\overline{W}}_{m2}$. With these known values and the solution for $M_2/M_1 = \overline{K}_{FP}e^{jB_{FP}}$.

P-DPCA - $1^{st}$ Interleaved pulses odd pulses (E1)
$$M_1 = (V_{1,1}^1 - W_{C1}V_{1,2}^1)/[1 - W_{C1}/W_{M1})e^{jD\Phi R}$$

P-DPCA - $2^{nd}$ Interleaved pulses even pulses (E2)
$$M_2 = (\overline{V}_{1,1}^{II} - \overline{W}_{C2}\overline{V}_{1,2}^{1})/[1 - \overline{W}_{C2}/\overline{W}_{M2})e^{jD\Phi^1 R}$$

We have in equation (F1) two unknowns $\overline{K}_{FP}e^{jBfp}$ and $\Phi_R$ and $\Phi_R^1$ is related to $\Phi_R$ by a constant therefore is only one unknown.

The solution may be obtained as in Section IX, B, 3. To repeat the procedure is to try candidate solutions and to determine the peak FRDB where the target is detected. Measure from the places in the region of the overlapped beams where the target can originate ($\Phi_A$) (FIG. 24—Ratio Of Target at Different Positions of Overlapping Half-Beam of Antennas). At each candidate FRDB of origin the $D\Phi_R$ and $D\Phi_R^1$ and $W_{m1}$, $\underline{W}_{m1}$, $\overline{W}_{m2}$, $\underline{\overline{W}}_{m2}$ are determined and these values are substituted in equation (F1), the solution that agrees with $\overline{K}_{FP}$ obtained from FIG. 24.

As in the above analysis, the analogous equations for Q-DPCA is as follows:

$$M_1 = (V_{1,1}^1 - \underline{W}_{C1}\underline{V}_{1,2}^1)/[1 - \underline{W}_{C1}/\underline{W}_{M1})e^{jD\Phi R}] \quad (E1')$$

$$M_2 = (\overline{V}_{1,1}^1 - \underline{\overline{W}}_{C2}\underline{\overline{V}}_{1,2}^1)/[1 - \underline{\overline{W}}_{C2}/\underline{\overline{W}}_{M2})e^{jD\Phi^1 R}] \quad (E2')$$

$$M_2/M_1 = \underline{K}_{FP}e^{B_{FP}} = [(\overline{V}_{1,1}^{II} - \underline{\overline{W}}_{C2}\underline{\overline{V}}_{1,2}^{11}/(V_{1,1}^1 - W_{c1}V_{1,2}^1)]/[1 - (\underline{\overline{W}}_{C2}/\underline{\overline{W}}_{m2})e^{jD\Phi R^1}]/[1 - (\underline{W}_{c1}/\underline{W}_{m1})e^{jD\Phi R}] \quad (F1')$$

The solution has the same procedure for the equations (E1), (E2) and (F2).

Another solution is to equate equations (F1) and (F1') and the only unknown in this equation is $\Phi_R$ and easily solvable and consequently the solutions for relative radial velocity and azimuth position of the target.

D. Doppler Ambiguity

With range ambiguity sufficient in all techniques while doppler ambiguity resolution required it is performed as indicate in Section VII—C4a) and b).

Dividing equation (16″) by equation (16′) and substituting constants for the known values except $e^{jD\Phi R}$ and $M_1$ and $M_2$. Also make the ratio of $M_1/M_2 = M_R$ we have the following:

$$M_R = A^1(1 - B^1)/(1 - C^1 e^{j(D+1)\Phi_R}) \quad (6)$$

solving for $e^{j(D+1)\Phi_R}$ we have the following:

$$e^{j(D+1)\Phi_R} = (A^1 - M_R)/(A^1 B^1 - M_R D^1) \quad (7)$$

Setting equation (5)=(7) and solving for $\Phi_R$ we have the following:

$$Ae^{j(D+1)\Phi_R} + Be^{j(D)\Phi_R} + C = O$$

This is a D+1 order equation easily for $\Phi_R$ and gives D+1 values of $\Phi_R$. The value of $\Phi_R$ gives the value of $M_R$ that derives from FIG. 25 gives a ratio that corresponds to angular position close to that obtain in the previous solution obtained from previous paragraphs from Section III G—$\Delta T$ processing. This solution should correlate very closely. From $\Phi_R$, the value proportional to the relative radial velocity of the target is then determined the azimuth of the target.

There are two solutions one obtained from $\Delta T$ processing of Section III G. Using the value of the target amplitude of aperture two (2) and aperture one (1). This ratio is compared to FIG. 25 for the determination of the solution.

The ideal solution gives a very simple way to a solution and may have sufficient accuracy. Especially the ideal solution with a correction factor may have sufficient accuracy.

If very good accuracy is required the more processing and more involved equations may obtain excellent accuracy.

E. Doppler Ambiguity

Doppler ambiguity would be preformed as in Section VII, C, 4, a) and b).

Taking the resulting equations (28) and (28) developed in Section, III, G for $\Delta T$ processing for P-DPCA=Q-DPCA for aperture one (1) and aperture two (2) we have the following:

$$e^{j(D)\Phi_R}/W_M = (X_1 V_{1,2}^1 - V_{1,2}^{11})/(X_1 \underline{V_{1,2}^1} - \underline{V_{1,2}^{11}}) \text{ aperture 1} \quad (C1)$$

$$e^{j(D)\Phi_R^1}/\overline{W_M} = (X_2 \overline{V_{1,2}^1} - \overline{V_{1,2}^{11}})/(X_2 \overline{\underline{V_{1,2}^1}} - \overline{\underline{V_{1,2}^{11}}}) \text{ aperture 2} \quad (C2)$$

$W_{m1}=W_{\underline{m1}}=W_{m2}=\underline{W_{m2}}$. All are equal due to the same azimuth point for target. Substituting $X_1$ and $X_2$ in equation (C1) and (C2) respectively should give the same solution $\Phi_R$ or very close to same $\Phi_R$ and consequently $\Phi_A$ is determined.

The solution is the for values for $W_{c1}$, $\underline{W_{c1}}$, $W_{c2}$, $\underline{W_{c2}}$ and are substituted in equation (16) and (16) of Section III, G for aperture one (1) and aperture two (2) as follows:

$$M_1 = (V_{1,1}^1 - W_{C1}V_{1,2}^1)/[1 - W_{C1}/W_{M1})e^{jD\Phi_R}] \quad (16)$$

aperture 1 - P-DPCA $$M_2 = (\overline{V_{1,1}^{11}} - \overline{W_{C2}}\overline{V_{1,2}^1})/[1 - \overline{W_{C2}}/\overline{W_{M2}})e^{jD\Phi_R}] \quad (\underline{16})$$

aperture 2 - P-DPCA

Dividing equation (16) by equation (16) and substituting constants for the known values all values except $e^{jD\Phi_R}$, $M_1$ and $M_2$. Also make the ratio of $M_2/M_1=M_R$ we have the following:

$$M_R = A(1 - Be^{jD\Phi_R})/(1 - Ce^{jD\Phi_R}) \quad (4)$$

solving for $e^{jD\Phi_R}$ we have the following:

$$e^{jD\Phi_R} = (A - M_R)/(AB - M_R C) \quad (5)$$

Similarly for Q-DPCA we have the known values as stated in the previous paragraph we have the following:

$$M_1 = (V_{1,1}^1 - \underline{W_{C1}}V_{1,2}^1)/[1 - \underline{W_{C1}}/\underline{W_{M1}})e^{j(D+1)\Phi_R}/\underline{W_{M1}}] \quad (16)$$

aperture 1 - Q-DPCA $$M_2 = (\overline{V_{1,1}^{11}} - \overline{W_{C2}}\overline{V_{1,2}^{11}})/[1 - \overline{W_{C2}}/\overline{W_{M2}})e^{j(D+1)\Phi_R}/\overline{W_{M1}}] \quad (\underline{16})$$

aperture 2 - Q-DPCA $K_{cm}$—is proportional to error in angle of the P-DPCA
$\underline{K_{cm}}$—is proportional to error in angle of the Q-DPCA
All other terms have been defined.

This is an approximate solution and will give a smaller error that the simplified (ideal) solution. This assumes the ratio of the P-DPCA solution to that of the Q-DPCA solution is the same as the ratio of the slope of error curve for $W_m$ for P-DPCA to Q-DPCA.

D. Non-Ideal Solution

Taking the resulting equations developed in Section III, G for $\Delta T$ processing for P-DPCA and Q-DPCA for aperture one (1) and aperture two (2) we have the following:

$$\text{Aperture 2 - } \Delta T - P\text{-}DPCA \overline{K_{FP}} e^{jB_{FP}} = \quad (A1)$$
$$(\overline{V_{1,1}^{11}} - \overline{W_{C1}}\overline{V_{1,2}^{11}})/(\overline{V_{1,1}^1} - \overline{W_{C1}}V_{1,2}^1)$$

where $$\text{Aperture 2 - } \Delta T - Q\text{-}DPCA \overline{K_{FQ}} e^{jB_{FQ}} = \overline{V_{1,1}^{11}} - \overline{W_{C1}}\overline{V_{1,2}^{11}})/ \quad (A2)$$
$$(\overline{V_{1,1}^1} - \overline{W_{C1}}V_{1,2}^1)$$

where $$\overline{W_{C1}} = A_{CM}e^{j(\Psi + \overline{K_{CM}} \times 2)} \text{ and } \overline{W_{C1}} = A_{CM}e^{j(\Psi + \overline{K_{CM}} \times 2)}$$

$$\text{Aperture 1 - } \Delta T - P\text{-}DPCA \overline{K_{FP}} e^{jB_{FP}} = \quad (B1)$$
$$(V_{1,1}^{11} - W_{C1}V_{1,2}^{11})/(V_{1,1}^1 - W_{C1}V_{1,2}^1)$$

$$\text{Aperture 1 - } \Delta T - Q\text{-}DPCA \overline{K_{FQ}} e^{jB_{FQ}} = \quad (B2)$$
$$(V_{1,1}^{11} - \underline{W_{C1}}V_{1,2}^{11})/(\overline{V_{1,1}^1} - \underline{W_{C1}}V_{1,2}^1)$$

where $$W_{C1} = A_{CM}e^{j(\Psi + K_{CM} \times 1)} \text{ and } \underline{W_{C1}} = A_{CM}e^{j(\Psi + \underline{K_{CM}} \times 1)}$$

Section III, G, $\Delta T$ Processing equates equation (A1) and (A2) and solves for $x_2$, hence $X_2$, $\underline{W_{c2}}$ and $\overline{W_{c2}}$ and similarly equates equation (B1) and (B2) and solves for $x_1$, hence $X_1$, $W_{c1}$ and $\underline{W_{c1}}$.

$\underline{V_{1,1}^{11}}$—is the measured vector of aperture 2—Q-DPCA of antenna 1

$\underline{V_{1,2}^{11}}$—is the measured vector of aperture 2—Q-DPCA of antenna 2

$\underline{V_{1,1}^1}$—is the measured vector of aperture 1—Q-DPCA of antenna 1

$\underline{V_{1,2}^1}$—is the measured vector of aperture 1—Q-DPCA of antenna 2

$\overline{K_{FQ}}$ is the amplitude ratio of the target from aperture two (2) to aperture one (1) for Q-DPCA $B_{FQ}$ is the phase difference between the target from aperture two (2) to aperture one (1) for Q-DPCA As an approximation for a more accurate solution the $\overline{K_{FQ}}$ solution for the Q-DPCA condition and the $\overline{K_{FP}}$ solution to P-DPCA condition is taken and this extrapolated to $\underline{K}_F$ where there would be zero error. This assumes a linear error between $\Phi_{AQ}$ and $\Phi_{AP}$ and also assuming that $\Phi_{AO}$ is the angular position where the error is zero. The equation is as follows:

$$(\Phi_{AT} - \Phi_{A0})/(\Phi_{AP} - \Phi_{A0}) = [\underline{K_{cm}}(x_2 - x_0)]/[K_{cm}(x_1 - x_0)] \quad (5)$$

and solving for $\Phi_{A0}$ we have the following:

$$\Phi_{A0} = [\Phi_{AT} - ((\underline{K_{cm}}(x_2 - x_0)/K_{cm}(x_1 - x_0))\Phi_{AP}]/[(\underline{K_{cm}}(x_2 - x_0)/ \quad (6)$$
$$(K_{cm}(x_1 - x_0) - 1]$$

$\Phi_{AP}$ - solution for P-DPCA the $\overline{K_{FP}}$ gives $\Phi_{AQ}$ - solution for T-DPCA the $\overline{K_{FQ}}$ gives $x_2$—(known) clutter location (FRDB-$x_2$) relative to peak clutter location (FRDB-$x_0$) for Q-DPCA $x_1$—(known) clutter location (FRDB-$x_1$) relative to peak clutter location (FRDB-$x_0$) for P-DPCA $x_0$—(known) clutter peak location (FRDB-$x_0$)

Where $\underline{K}_{FP}$ defines the ratio of the target amplitude from aperture two (2) to the target amplitude on aperture one (1) $B_{FP}$ being the phase shift difference of the target at aperture two (2) from the phase shift of the target at aperture one (1).

The $\underline{K}_{FP}$ measured is compared to the curves of FIG. 25 and this will give the angular position $\Phi_{AP}$ (proportional to the angular position of the target) and from this is calculated $D\Phi_R$ (proportional to the relative radial velocity of the target).

$\overline{V}_{1,1}{}^1$—is the measured vector of aperture 2—P-DPCA of antenna 1

$\overline{V}_{1,2}{}^1$—is the measured vector of aperture 2—P-DPCA of antenna 2

$V_{1,1}{}^1$—is the measured vector of aperture 1—P-DPCA of antenna 1

$V_{1,2}{}^1$—is the measured vector of aperture 1—P-DPCA of antenna 2

$K_{FP}$—is the amplitude ratio of the target from aperture two (2) to aperture one (1) for P-DPCA $B_{FP}$—is the phase difference between the target from aperture two (2) to aperture one (1) for P-DPCA $Y_F = Y_{FP} = K_{FP} e^{jB_{FP}}$ An analogous equation to equation (3) for this Q-DPCA conditions is the following:

$$Y_{FQ} = K_{FQ} e^{jB_{FQ}} \quad (4)$$
$$= (\overline{V}_{1,1}{}^{11} - \overline{V}_{1,2}{}^{11})/(V_{1,1}{}^1 - V_{1,2}{}^1)$$

Where $\overline{K}_{FQ}$ is the same as in equation (3) but this is for Q-DPCA and defines the ratio of the target ratio of amplitude from aperture two (2) to aperture one (1). $B_{FQ}$ is the phase shift difference of the target at aperture two (2) from the phase shift of the target aperture one (1).

The $\overline{K}_{FQ}$ measured is compared to curves of FIG. 25 and this will give the angular position $\Phi_{AQ}$ (proportional to the angular position of the target) and from this is calculated $D\Phi_R$ (proportional to the relative radial velocity of the target).

$W_{c2}$—Weighting function for clutter in aperture 1 time 2—Q-DPCA $\overline{W_{c1}}$—Weighting function for clutter in aperture 2 time 1—P-DPCA $\overline{W_{c2}}$—Weighting function for clutter in aperture 2 time 2—P-DPCA $\overline{W_{c1}}$—Weighting function for clutter in aperture 2 time 1—Q-DPCA $\overline{W_{c2}}$—Weighting function for clutter in aperture 2 time 2—Q-DPCA $W_{m1}$—Weighting function for target in aperture 1 time 1—P-DPCA $W_{m2}$—Weighting function for target in scan 1 time 2—P-DPCA $W_{m1}$—Weighting function for target in aperture 1 time 1—Q-DPCA $W_{m2}$—Weighting function for target in aperture 1 time 2—Q-DPCA $\overline{W_{m1}}$—Weighting function for target in aperture 2 time 1—P-DPCA $\overline{W_{m2}}$—Weighting function for target in aperture 2 time 2—P-DPCA $\overline{W_{m1}}$—Weighting function for target in aperture 2 time 1—Q-DPCA $\overline{W_{m2}}$—Weighting function for target in aperture 2 time 2—Q-DPCA C. Ideal System Equations Solution The equation for $M_1$ for P-DPCA aperture 1 is the following:

$$M_1 = (V_{1,1}^1 - V_{1,2}^1)/(1 - e^{jD\Phi_R}) \quad (1)$$

This is the same as equation (3) Section VII with the same definition of terms. The equation for $M_2$ for P-DPCA aperture 2 is the following:

$$M_2 = (\overline{V}_{1,1}^1 - \overline{V}_{1,2}^1)/(1 - e^{jD\Phi_R}) \quad (2)$$

This is the same as equation ($3^1$) Section VII with the exception this for aperture 2, which the bar on top of the terms as indicated.

Taking equation (2) and dividing equation (1) we have the following:

$$Y_{FP} = \overline{K}_{FP} e^{jB_{FP}} \quad (3)$$
$$= (\overline{V}_{1,1}^1 - \overline{V}_{1,2}^1)/(V_{1,1}^1 - V_{1,2}^1)$$
$$= M_2/M_1$$

IX. Different Apertures-Same PRF-SAME XF (Clutter and/or Target Correlation System-5 (CTC-5))

A. System Definition

N data points are processed in aperture 1 and another N points are processed in aperture 2 and etc until the number of apertures required. At each succeeding aperture the antenna is moved a portion of the beamwidth as required. Each set of N pulses is processed where the amplitude ratio of the target from aperture to aperture is determined and gives the angular position.

The example taken for illustrative purposes is two groups of N=64 pulses in two different apertures where the antenna receive arrays are moved a half the beamwidth between apertures and 64 data points with times four (×4) zero fill as described previously.

B. Development of Mathematical Basis for a Solution

1. Assumption Made

Clutter from aperture to aperture does not correlate and is very different and target does correlate therefore we have the following:

(1) $W_{c1} \neq \overline{W}_{c1}$; $\underline{W}_{c1} \neq \underline{\overline{W}}_{c1}$; $W_M = W_{M1} = \underline{W}_{M2} = \underline{W}_{M1} = W_{M2} = \overline{W}_{M1} = \overline{W}_{M2}$ since at the same azimuth;

(2) For $\Delta T$ processing we have the following—reference III: (2) For $\Delta T$ processing within an aperture we have the following:

$W_{c1} = W_{c2}$; $\underline{W}_{c1} = \underline{W}_{c2}$; $\overline{W}_{c1} = \overline{W}_{c2}$; $\underline{\overline{W}}_{c1} = \underline{\overline{W}}_{c2}$ $W_{m1} = W_{m2}$; $\underline{W}_{m1} = \underline{W}_{m2}$; $\overline{W}_{m1} = \overline{W}_{m2}$; $\underline{\overline{W}}_{m1} = \underline{\overline{W}}_{m2}$ $W_{c1}$ – Weighting function for clutter in aperture 1 time 1 – $P$-$DPCA$ $W_{c2}$ – Weighting function for clutter in aperture 1 time 2 – $P$-$DPCA$ $\underline{W}_{c1}$ – Weighting function for clutter in aperture 1 time 1 – $Q$-$DPCA$

X System Definition-Different Aperture-Different PRF-Same Transmission Frequency- The example taken for illustrative purposes is two apertures where antenna arrays are moved a half beamwidth and PRF changed each aperture and the same target detected in both apertures with the same velocity, range and azimuth.

B. Development of a Mathematical Basis for a Solution

1. The Following are Assumptions made Based on Past Sections

Clutter does not look the same from aperture to aperture (PRF 1 to PRF 2) therefore does not correlate and target correlates in the sense it is assumed to have the same angular position and also since it has the same velocity and azimuth.

$W_{c1} \neq \overline{W}_{c1} : \underline{W}_{c1} \neq \underline{\overline{W}}_{c1} : W_{m1} \neq \overline{W}_{m1} : \underline{W}_{m1} \neq \underline{\overline{W}}_{m1}$ (1)

For $\Delta T$ processing within an aperture we have the following $W_{c1} = W_{c2} : \underline{W}_{c1} = \underline{W}_{c2} : \overline{W}_{c1} = \overline{W}_{c2} : \underline{\overline{W}}_{c1} = \underline{\overline{W}}_{c2}$ $W_{m1} = W_{m2} : \underline{W}_{m1} = \underline{W}_{m2} : \overline{W}_{m1} = \overline{W}_{m2} : \underline{\overline{W}}_{m1} = \underline{\overline{W}}_{m2}$ Same definition of terms as in Section IX, B $W_{M1,1} = A_{cm} e^{j[\Psi_{CM} - K_{CM1,1}(y-y_0)]}$ – $P$-$DPCA$ aperture 1 – $PRF1$ $\overline{W}_{M1,2} = A_{cm} e^{j[\Psi_{CM} - K_{CM1,2}(y-y_0)]}$ – $P$-$DPCA$ aperture 2 – $PRF2$ $\underline{W}_{M1,1} = A_{cm} e^{j[\Psi_{CM} - \underline{K}_{CM1,1}(y-y_0)]}$ – $Q$-$DPCA$ aperture 1 – $PRF1$ $\underline{\overline{W}}_{M1,2} = A_{cm} e^{j[\Psi_{CM} - \underline{K}_{CM1,2}(y-y_0)]}$ – $Q$-$DPCA$ aperture 2 – $PRF2$ -continued $W_{C1,1} = A_{cm} e^{j[\Psi_{CM} - K_{CM1,1}(x_1-y_0)]}$ – $P$-$DPCA$ aperture 1 – $PRF1$ $\overline{W}_{C1,2} = A_{cm} e^{j[\Psi_{CM} - K_{CM1,2}(x_2-y_0)]}$ – $P$-$DPCA$ aperture 2 – $PRF2$ $\underline{W}_{C1,1} = A_{cm} e^{j[\Psi_{CM} - \underline{K}_{CM1,1}(x_1-y_0)]}$ – $Q$-$DPCA$ aperture 1 – $PRF1$ $\underline{\overline{W}}_{C1,2} = A_{cm} e^{j[\Psi_{CM} - \underline{K}_{CM1,2}(x_2-y_0)]}$ – $Q$-$DPCA$ aperture 2 – $PRF2$ $W_{M1,1}$ – Weighting function for Target –

$P$-$DPCA$ – aperture 1 – $PRF1$ $\overline{W}_{M1,2}$ – Weighting function for Target –

$P$-$DPCA$ – aperture 2 – $PRF2$ $\underline{W}_{M1,1}$ – Weighting function for Target –

$Q$-$DPCA$ – aperture 1 – $PRF1$ $\underline{\overline{W}}_{M1,2}$ Weighting function for Target –

$Q$-$DPCA$ – aperture 2 – $PRF2$ $W_{C1,1}$ – Weighting function for Clutter –

$P$-$DPCA$ – aperture 1 – $PRF1$ $\overline{W}_{C1,2}$ – Weighting function for Clutter –

$P$-$DPCA$ – aperture 2 – $PRF2$ $\underline{W}_{C1,1}$ – Weighting function for Clutter –

$Q$-$DPCA$ – aperture 1 – $PRF1$ $\underline{\overline{W}}_{C1,2}$ – Weighting function for Clutter –

$Q$-$DPCA$ – aperture 2 – $PRF2$ $A_{cm}$ – Amplitude Offset of Weighting Function $\Psi_{cm}$ – Phase Offset of Weighting Function $K_{cm1,1}$ – Weighting function slope for aperture 1 –

$PRF1$ – $P$-$DPCA$ $K_{cm1,2}$ – Weighting function slope for aperture 2 –

$PRF2$ – $P$-$DPCA$ $\underline{K}_{cm1,1}$ – Weighting function slope for aperture 1 –

$PRF1$ – $Q$-$DPCA$ $\underline{K}_{cm1,2}$ – Weighting function slope for aperture 2 – $PRF2$ – $Q$-$DPCA$ Note: The weighting functions for target all have the same $y_0$ term because the target in both apertures are assumed at the same point ($y_0$) and have the same angular position (y).

The clutter on the other hand for different apertures and the same DPCA has a different point of origin ($x_1$ or $x_2$) but the same detection point The target weighting function difference depends on the target angular position (y).

C. The Ideal System Equation Solution ($W_c$ and $W_m$ are negligible)

From Section III, G equation (5) we have for aperture 1-PRF1-P-DPCA the following:

$$M_1 = (V_{1,1}^1 - V_{1,2}^1)/(1 - e^{jDJ_R}) \quad \text{(a)}$$

From Section III, G equation (6) we have for aperture 2, PRF2-P-DPCA the following:

$$M_2 = (\overline{V}_{1,1}^{11} - \overline{V}_{1,2}^{11})/(1 - e^{jDJ'_R}) \quad (b)$$

Taking the term $(1-e^{jDJ_R})$ and $(1-e^{jDJ'_R})$ and developing it further we have the following:

$$(1 - e^{jDJ_R}) = e^{j(DJ_R)/2}[e^{-j(DJ_R)/2} - e^{j(DJ_R)/2}] \quad (c)$$
$$= e^{j(DJ_R)/2} 2y \sin(D\Phi R/2)$$

$$(1 - e^{jDJ'_R}) = e^{-j(DJ'_R)/2}[e^{-j(DJ'_R)/2} - e^{j(DJ'_R)/2}] \quad (d)$$
$$= e^{j(DJ'_R)/2} 2y \sin(D\Phi' R/2)$$

Dividing equation (b) by equation (a) and substituting the results of equation (c) and (d) we have the following:

$$M_2/M_1 = \quad (e)$$
$$\overline{K}_{FP} e^{jB_{FP}} = e^{j\frac{D}{2}(J_{1R}-J_R)} e^{j\frac{D}{2}(J_{1R}-J_R)}[(\overline{V}_{1,1}^{11} - \overline{V}_{1,2}^{11})\sin(D\Phi_R/2)] / [$$
$$(V_{1,1}^1 - V_{1,2}^1)\sin(D\Phi_{1R}/2)]$$

Analogous equation for the Q-DPCA case is the following:

$$M_2/M_1 = \overline{K}_{FQ} e^{jB_{FQ}} = \quad (f)$$
$$e^{j\frac{D}{2}(J_{1R}-J_R)}[(\overline{V}_{1,1}^{11} - \underline{V}_{1,2}^{11})\sin(D\Phi_R/2)] / [(V_{1,1}^1 - \underline{V}_{1,2}^1)\sin(D\Phi_{1R}/2)]$$

The terms have been previously defined in Section VIII, B, 3.

The procedure is to obtain a candidate solution first to determine the peak FRDB where the target is detected at its peak. Measure from the places in the overlapped beams where the target can originate (FIG. 25—Ratio Of Target At Different Positions Of Overlapping Half Beams Of Antennas). At each candidate FRDB of origin the $D\Phi_R$ and $D\Phi^1_R$ are measured and there values substituted in equations (e) and (f), calculate $\overline{K}_{FQ}$ and $\overline{K}_{FP}$. For each place of origin, measure from FIG. 25 what $\overline{K}_{FQ}$ and $\overline{K}_{FP}$ should be. If it agrees or is close in value to the calculated value of $\overline{K}_{FP}$ and $\overline{K}_{FQ}$ then that is the origin of the target.

Their would be a highly probable a different place for $\overline{K}_{FP}$ and $\overline{K}_{FQ}$. This would depend on how significant ($W_m$ and $W_c$) are the weighting function for clutter and target.

As an approximation for a more accurate solution, it would be analogous procedure as Section VIII, B, 3 and the resulting equation would be the same as follows:

$$(\Phi_{AT} - \Phi_{A0})/(\Phi_{AP} - \Phi_{A0}) = [\underline{K}_{cm}(x_2 - x_0)]/[K_{cm}(x_1 - x_0)] \quad (g)$$

$$\Phi_{A0} = [\Phi_{AT} - \quad (h)$$
$$((\underline{K}_{cm}(x_2 - x_0)/K_{cm}(x_1 - x_0))/[(\underline{K}_{cm}(x_2 - x_0)/(K_{cm}(x_1 - x_0) - 1]$$

Same definition of terms as in Section VIII, B, 3.

This is an approximate solution and will give a smaller error then the simplified ideal solution. This assumes the ratio of the P-DPCA solution to that of the Q-DPCA solution is the same as the ratio of the slope curve for $W_m$ for Q-DPCA to Q-DPCA ($K_{CM}/K_{cm}$).

Note: In the procedure there is only solution for $\overline{K}$, this has been proven by simulation. This is due to very restricted number of pairs of $D\Phi_R$ and $D\Phi^1_R$ since the target can only originated in the half beam overlap of the antennas at the two PRFs. The assumption is the target can only originate there because it would be within the half beamwidth of both antennas.

D. Non-Ideal Solution

Taking the resulting equations developed in Section III, G for $\Delta T$ processing for P-DPCA for aperture one (1) and aperture two (2) we have the following:

Aperture 2 – $\Delta T$ – P-DPCA (A1)
$$\overline{K}_{FP} e^{jB_{FP}} = (\overline{V}_{1,1}^{11} - \overline{W}_{C2}\overline{V}_{1,2}^{11})/(\overline{V}_{1,1}^1 - \overline{W}_{C2}\overline{V}_{1,2}^1)$$

Aperture 2 – $\Delta T$ – Q-DPCA (A2)
$$\overline{K}_{FQ} e^{jB_{FQ}} \overline{K}_{FQ} e^{jB_{FQ}} = (\overline{V}_{1,1}^{11} - \underline{\overline{W}}_{C2}\underline{\overline{V}}_{1,2}^{11})/(\overline{V}_{1,1}^1 - \underline{\overline{W}}_{C2}\underline{\overline{V}}_{1,2}^1)$$

Aperture 1 – $\Delta T$ – P-PDCA (B1)
$$\overline{K}_{FP} e^{jB_{FP}} = (V_{1,1}^{11} - W_{C1}V_{1,2}^{11})/(V_{1,1}^1 - W_{C1}V_{1,2}^1)$$

Aperture 1 – $\Delta T$ – Q-DPCA (B2)
$$\overline{K}_{FQ} e^{jB_{FQ}} = (V_{1,1}^{11} - \underline{W}_{C1}\underline{V}_{1,2}^{11})/(V_{1,1}^1 - \underline{W}_{C1}\underline{V}_{1,2}^1)$$
$$\overline{K}_{FQ} e^{jB_{FQ}} = (V_{1,1}^{11} - \underline{W}_{C1}\underline{V}_{1,2}^{11})/(V_{1,1}^1 - \underline{W}_{C1}\underline{V}_{1,2}^1)$$

Section III, G, $\Delta T$ processing equates equation (A1) and (A2) and solves for $\overline{W}_{c2}$ and $\underline{\overline{W}_{c2}}$ and similarly equates equation (B1) and (B2) and solves for $W_{c1}$ and $\underline{W}_{c1}$.

Taking the resulting equations (28) and (28) developed in Section, III, G for $\Delta T$ processing for aperture one (1) and aperture two (2) we have the following:

$$e^{jD\Phi_R}/W_M = (X_1 V_{1,2}^1 - V_{1,2}^{11})/(X_1 V_{1,2}^1 - V_{1,2}^{11}) \text{ aperture 1} \quad (C1)$$

$$e^{jD\Phi_{1R}}/\overline{W_M} = (X_2 \overline{V}_{1,2}^1 - V_{1,2}^{11})/(X_2 \underline{V}_{1,2}^1 - \underline{V}_{1,2}^{11}) \text{ aperture 2} \quad (C2)$$

Section III, G (AT Processing) equates equation (C1) and (C2) and solves for $X_1$ and $X_2$. $W_{m1} = W_{\underline{m1}} = W_{m2} = \underline{W}_{m2}$. All are equal due to the same azimuth point for target. Substituting $X_1$ and $X_2$ in equation (C1) and (C2) respectively should give the same solution $\Phi_R$ and $\Phi'_R$ very close to same ratio of $\Phi_R$ and $\Phi'_R$ is true.

From Section III, G it is determined a solution for $D\Phi_R$ and $\Phi_A$ (relative radial velocity and angular position of the target).

Another solution is the computed values for $W_{c1}$, $\underline{W}_{c1}$, $W_{C2}$, $\underline{W}_{c2}$ and $W_{m1}$, $W_{\underline{m1}}$, $W_{m2}$ and $\underline{W}_{m2}$ are substituted in equation (16) and (16) of Section III, G for aperture one (1) and aperture two (2) as follows:

$$M_1 = (V_{1,1}^1 - W_{C1} V_{1,2}^1)/[1 - W_{C1}/W_{M1})e^{jD\Phi_R}] \text{ aperture 1 – P-DPCA} \quad (16)$$

$$M_2 = (\overline{V}_{1,1}^{11} - \overline{W}_{C2}\overline{V}_{1,2}^{11})/[1 - \overline{W}_{C2}/\overline{W}_{M2})e^{jD\Phi^1_R}] \text{ aperture 2 – P-DPCA} \quad (16)$$

Dividing equation (16) by equation (16) we have the following:

$$M_2/M_1 = \overline{K}_{S1}e^{jB_{S1}} = [(V^1_{1,1} - W_{C1}V^1_{1,2})/(\overline{V}^{11}_{1,1} - \overline{W}_{C2}\overline{V}^{11}_{1,2})]/[ \quad (g)$$
$$(1-(W_{C1}/W_{M1})e^{jD\Phi}R)/(1-\overline{W}_{C2}/\overline{W}_{M2})e^{jD\Phi_1}R]$$

The equation for Q-DPCA is analogous and the following:

$$M_2/M_1 = \overline{K}_{S2}e^{jB_{S2}} = [(V^1_{1,1} - \underline{W}_{C1}V^1_{1,2})/(\overline{V}^{11}_{1,1} - \overline{W}_{C2}\underline{V}^{11}_{1,2})]/[ \quad (h)$$
$$(1-(\underline{W}_{C1}/\underline{W}_{M1})e^{jD\Phi}R)/(1-\overline{W}_{C2}/W_{M2})e^{jD\Phi_1}R]$$

Figure 24:
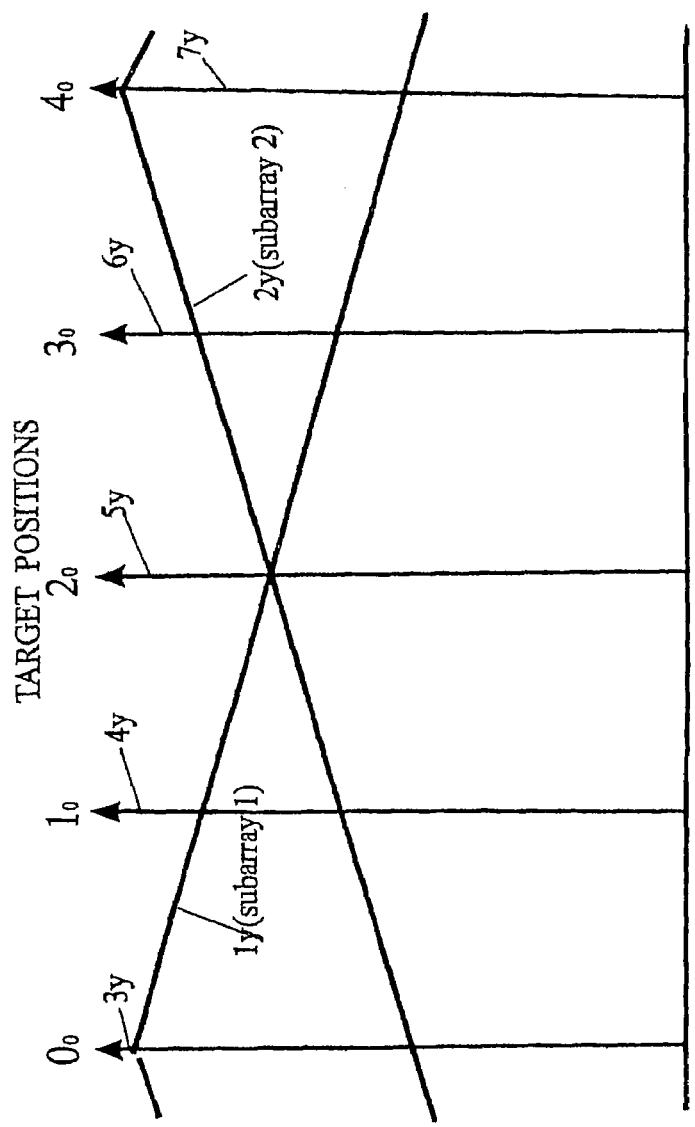
FIG. 24 is a Ratio of Target at Different Positions of Overlapping Half-Beams of Antenna FIG. 25 identified as TABLE I is an Ideal Clutter Filter Response Correlated With Ideal weighting function of clutter ($W_C$) Response and Relative Clutter Change FIG. 26 identified as TABLE II is Target Filter Response Correlated With Relative Target Filter Response and Relative Target Change FIG. 27 identified as TABLE III shows weighting function of Target ($W_M$) Target Determination FIG. 28 identified as TABLE IV shows For pulse repetition frequency1 (PRF1) of 1000 Hz and pulse repetition frequency2 (PRF2) of 750 Hz (64 large range Doppler bins (LRDB) and 256 fine range Doppler bins) (FRDB)-vs-Frequency response and phase change before and after "D" and Radial Velocity.

The procedure is the same as after equation (g). All the parameters in equation (g) and (h) are known except $M_R$ and $\Phi_R$ (since $\Phi^1_R = 3/2 \, \Phi_R$). The procedure is to measure the FRDB where the target is detected in aperture 1 and aperture 2. Consequently measure from the places in overlapped beams where target can originate (its angular position in the beam (FIG. 25). At each possible angular position measure the $D\Phi_R$ and $D\Phi^1_R$ and substitute there values in equation (g) and (h), calculate $\overline{K}_{S1}e^{jB_{S1}}$ and $\overline{K}_{S2}e^{jB_{S2}}$. For each angular position possible, measure from FIG. 24 curves determine the value of $\overline{K}_{S1}e^{jB_{S1}}$ and $\overline{K}_{S2}e^{jB_{S2}}$. The angular position where the calculated $\overline{K}_{S1}e^{jB_{S1}}$ and $\overline{K}_{S2}e^{jB_{S2}}$ agree from $\overline{K}S1e^{jB_{S1}}$ and $\overline{K}_{S2}e^{jB_{S2}}$ from that obtained from the curves of FIG. 24 is the true $\overline{K}_{S1}e^{jB_{S1}}$ and $\overline{K}_{S2}e^{jB_{S2}}$ or the closest correlation. The $\overline{K}_{S1}e^{jB_{S1}}$ would tend to be more accurate than that of $\overline{K}_{S2}e^{jB_{S2}}$ dependent on how significant $W_c$ and $W_m$ is for clutter and target respectively.

A closer true value maybe obtained if significant difference between $\overline{K}_{S1}e^{jB_{S1}}$ and $\overline{K}_{S2}e^{jB_{S2}}$ using the approximate equations of (g) and (h) for there values.

There are a number of solutions for the angular position and the relative radial velocity. There is the simplified solution to the complex solution according to how much processing and development of the equations involved. The simplified solution may be all that is required but if more accuracy is required the more processing and development of the equations is required.

E. Doppler Ambiguity

Doppler ambiguity resolved as in Section VII, C, 4a) and 4b)

XI Clutter and/or Target Correlation System-System 7 (CTC-7)-Transmission Frequency Change or Transmission Frequency Plus PRF Change A. System Definition Same as IX except that instead of a PRF change there is a transmission frequency change or transmission frequency plus a PRF change from aperture to aperture. The example taken for illustrative purposes is two apertures where antenna arrays are moved a half beamwidth per change.

B. Transmission Frequency Change Affect

The affects of transmission frequency change every aperture (same PRF). (Change may be negligible or significant based on the extent of change. If significant it is calculated into the processing).

Affects the beamwidth of the antenna

Affects the beamsteering phase shifts of the antenna

Affects the clutter bandwidth of the antenna

Does not affect DPCA cancellation of clutter

The $K_{cm}$ and $\underline{K}_{cm}$ and not affected for P-DPCA and Q-DPCA

Same frequency width of filters

Same phase shift per filters

Different relative radial velocity per filter

Different receiver front end for different transmission frequencies

Other—more complicated if transmission frequency and PRF change per antenna

The above changes make for a more complex and more processing that has to be considered in the design and implementation of the system.

C. Change in Transmission Frequency and PRF per Aperture

1. Negligible affect of transmission frequency change.

The approach of a negligible change in transmission frequency makes the transmission frequency change per aperture a very small percentage affect. All the terms affected as stated previously in paragraph B are negligible and the solution is the same as only a PRF change and this is the same as Section IX. This technique may be primarily used to reduce the affect of jamming.

2. Approach of significant change in transmission frequency and PRF the same or changing also.

This approach has all the affects of transmission frequency change and the PRF change (if any) calculated. The basic parameters are calculated as in Section IX and the solutions obtained.

Examples:

Parameters:

Transmission frequency (XF1) of $1^{st}$ aperture—1000 MHz—$\lambda_1 = 0.1^1$

Transmission frequency (XF2) of $2^{nd}$ aperture—1100 MHz—$\lambda_2 = 0.909^1$ PRF of $1^{st}$ aperture—1000 Hz PRF of $2^{nd}$ aperture—1000 Hz 64 Data Points Same—all other conditions of Radar Basic Computed Values:

Resolution of filter or phase shift per filter $360°/64 = 5.625°$

Frequency resolution per filter=1000 Hz/64=15.625 Hz

Ambiguous velocity at XF1—$\lambda_1/2 \times$PRF=48 feet/second

Ambiguous velocity at XF2—$\lambda_2/2 \times$PRF=43.2 feet/second

Velocity resolution per filter at XF1=48/64=0.75 feet/second

Velocity resolution per filter at XF2=43.2/64=0.675 feet/second

Unambiguous velocity=$(48\times43.2)/(48-43.2)=432$ feet/sec=260 mile/hr

Q-DPCA=14.5° only dependent on PRF=1000 Hz

P-DPCA=2.8° only dependent on PRF=1000 Hz

As seen from the example how the values change. From these parameters and computed values the analogous processing is involved to obtain the required solutions as in Section IX.

3. Trade-Offs or Approaches to a Solution a. To make the change in frequency negligible to avoid jamming.

b. Pick the transmission frequency change and PRF change for the particular solutions required. Another example is to vary the PRF change as well as transmission frequency change and in only in one transmission frequency and PRF is they're a P-DPCA equal to zero (0) and in the other transmission frequency and PRF is optimized for other requirements for such as velocity or range ambiguity. Another example is the PRF and transmission frequency change as the radar optimization of power utilization, etc. but just except these parameters and process them for best results.

D. Transmission Frequency—PRF Trade-Off Conditions

The condition of the same PRF and same transmission frequency between apertures is treated in Section IX. The condition of the same transmission frequency and different PRFs is treated in Section X.

1. Small Change in Transmission Frequency, no Change in PRF

The small change in transmission frequency and the same PRF between apertures is treated like that of Section IX as Section XI, D, 1.

2. Small Change in Transmission Frequency, Change in PRF

The small change in transmission frequency and different PRFs is treated in Section X.

3. Large Change in Transmission Frequency, No Change in PRF

The large change in transmission frequency and the same PRF between apertures is to perform the analysis and calculation as stated in Section XI, B.

a.) Example

Transmission Frequency—1—1000 MHz
Transmission Frequency—2—1500 MHz
PRF 1=PRF 2-1000 Hz
64 Data Points×4 Zero Fill data
Ambiguous velocity 1=48 feet/sec
Ambiguous velocity 2=33.3 feet/sec
Velocity ambiguous 1 and 2=108.7 feet/second
Ambiguous range—80 miles
Resolution per phase—5.625°
Frequency Resolution—15.625 Hz
DPCA—D=5
Q-DPCA Max=−2.8°
P-DPCA Max=2.8°

From this the mathematical equations and solutions may be applied to get a solution. This technique to arrive at a solution analogous of Section VIII.

4. Large Change in Transmission Frequency, Change in PRF

The large change in transmission and the different PRFs between apertures is to perform the analysis and calculations as stated in Section XI, B. The purpose as stated in Section C, 3 determine the parameters of the radar. This is the most complicated and involved condition. It is similar to Section III, D, 3 but with a PRF change also. It requires all the calculations of PRF change and transmission changes to determine the solution.

5. Modest change in transmission frequency and PRF in a way that the blind speed remains the same. This makes the unambiguous velocity the same and the unambiguous range is approximately the same and with PRF change there is a proportional change in the bandwidth of Doppler filters. Beamwidth of antenna is approximately the same and clutter bandwidth is approximately the same. Hence it may be processed like the same transmission frequency and PRF case.

6. Change in transmission frequency is small and PRF change modest it may be processed similar to same transmission frequency and PRF change case.

7. Change in PRF is small and transmission frequency change modest it may be processed similar to same PRF and change of transmission frequency case.

XII. Conclusive Statement on Invention

A. Mathematical Development and Application of Radar Principles

The basic mathematical development and the application of radar principles in this invention may be analyzed and with people familiar in the state of the art come up with derived techniques employing them.

B. Hierarchy of Accuracy Required

The ten (10) techniques developed were based on times four (×4) technology to obtain better phase precise filters while the resolution of the filters remain the same. The accuracy of the results suffer with a times 1 (×1) application-vs.-a times sixteen (×16) application. The latter would obtain much better accuracy but the processing would be roughly sixteen times as much. A compromise may exist to combine interpolation techniques with the times $n^{th}$ application to obtain the best results.

The techniques involved have to match the application for best results.

Many Range-Doppler Bins may be processed to obtain the results required and correlated with each other.

Simplified techniques may be applied with appropriate approximations to attain acceptable or very good results. On the other hand extensive processing taken advantage of the principles and equation stated therein or developing them father and implementing them may result in a system with much better accuracy.

C. Modes

1. Surveillance Mode

In the implementation of a system, many modes of operation may be involved.

First a surveillance mode or early warning mode is considered. It is a wide angle and range coverage where the target resolution in range and azimuth are not very accurate (dwell time would be relatively low). This mode is determining the number of targets in a given area quickly and efficiently for later action if desired.

This mode is very time consuming. The techniques proposed in this invention would save time by at least two (2) or more to one (1) and as with better accuracy of range, angular position and radial velocity.

The techniques employed for this mode would be any of the following:

(1) Basic Technique
  a) Delta T technique
  b) Delta F technique
  c) Delta D technique
(2) FM Technique
(3) LMS Technique
(4) Interleaved Pulses—Same PRF Technique
(5) Aperture to aperture—Same PRF
(6) Aperture to aperture—Different PRF and/or Transmission Frequency All techniques or any one technique may be applied 2. Tracking Mode In the generic mode of tracking, on a detected target of interest a track is developed. This mode requires a dedicated coverage such that time is spent to develop successive detection of range, angular position and relative radial velocity so that a track may be developed. The accuracy of determining these parameters is high. Dwell time and successive detection is high.

Any or all of the techniques developed in this invention may be employed.

3. Weapon Delivery Mode

The weapon delivery mode of operation is where very good accuracy is required. Precision tracking and location accuracy is required. Dwell time is relatively large and very accurate range, angular position and relative radial velocity are required.

The techniques in this invention may be employed stand alone or in conjunction with other techniques may be such that an adaptive or flexible system may be employed to fit the situation.

D. Air, Land and Sea Moving Targets

This invention takes as an example land moving targets. It is also applicable to air or sea moving targets. It can be applied to any combination of all three or all three. It may be applied to all moving targets and be utilized as a surveillance radar.

1. Airborne Moving Targets

Detecting airborne moving targets and accurately determining range, azimuth position and range has its own set of capabilities required. Some of these are as follows:
(a) High speed targets
(b) Doppler ambiguity determination
(c) Doppler and range walk
(d) Look down capability in clutter
(e) Other 2. Seaborne Moving Targets Detecting sea targets and accurately determining range, azimuth position and range has its own set of capabilities as required. Some of these are as follows:
(a) Slow speed targets
(b) Very large targets
(c) Sea state
(d) Other 3. Land Moving Targets Detecting land targets and accurately determining range, azimuth position and range has its own set of capabilities as required. Some of these are as follows:
(a) Slow speed targets
(b) Small targets
(c) Land clutter
(d) Other 4. All or Combination of Any Above Radar were to be required for all these capabilities, it would have to perform all these modes and compromises to attain best results possible, not sacrificing much of any of the capabilities.

E. System Description and Operation

The essential basic elements of the system are shown in FIG. 14. These include the following that are written up in the detail description of the invention as follows:
(1) Antenna Look Angle
(2) Antenna Configuration
(3) Processing Groups
(4) Weighting Function Plus Spectral Processing
(5) Error Corrections
(6) Clutter Statistics as Related to the Clutter and/or Target Correlation Technique
(7) Other Techniques Employed
(8) The system has to be configured to be compatible with its hardware configuration and all these basic elements to function for optimum operation. This has to be performed within the hardware The system has to know its hardware configuration and all these basic elements to control and employ for the most optimum operation. This is to be performed in hardware and the time constraint required in a real system.

The system management section controls the operational parameters for as near optimum a system as possible such as the following:

1—The number of apertures per angular coverage employed. More than one aperture is required only for the clutter and target correlation technique but is very desirable for the other techniques also. It is also required to reduce or eliminate blind speeds and/or doppler and/or range ambiguity when employed with different pulse repetition frequencies.

2—The number of pulse repetition frequencies per angular coverage employed. It is very desirable to have at least two apertures with at least two different pulse repetition frequencies. This greatly enhances the attaining of the objective much more effectively.

3—The angular coverage of interest and the movement of the antennas together with the different apertures and pulse repetition frequencies are implemented for an effective system (as illustrated in this invention for a two and three aperture system).

4—The antenna beamwidth and platform velocity and pointing angle of the antenna determine the width of the high and low clutter regions (FIG. 7). If this region could be reduced as low as possible it makes attaining the objective much more effective. The objective will still be attained even when the main beam clutter region overlaps slightly with the adjacent main beam clutter.

5—Dwell time increase with the accompanying increase in range resolution especially makes the figure of merit and the least mean square technique a great deal more effective (as explained in this invention).

6—Range resolution is usually approximately the same as doppler resolution in linear measurement such as feet, meters, etc. Usually both are increased or decreased comparably. Therefore the comment for range resolution as for dwell time is very similar.

7—Range swath is the difference between the maximum and minimum range of interest. This is determined by the application and mode of operation.

The system may be a hardwired system, if applied to a simple straight forward known application.

If the system is to applied to many modes and/or applications then what is most likely is a implementation requiring general purpose computer(s) and signal processor(s) for the control of the system and to perform the large amount of signal processing all under software control.

F. Computer Simulation Employing Real Data

Extensive computer simulation employing real data was implemented with many of the results indicated in the patent invention. Especially the least mean square technique was tested extensively with real data and with excellent results obtained. Also simulation of errors in clutter and target were simulated with still very good results.

The figure of merit technique was extensively tested also with very good results.

The clutter and/or target correlation technique was not tested with real data, the radar data required was not available but was tested extensively simulating a real system.

G. Overall Comments

Many techniques have been described and the techniques proposed have advantages and disadvantages. Any technique may be implemented by itself or combination with any other or with any number of others.

An example is the multiple delay technique to obtain the maximum power detected from a target, this approach that of a full antenna obtains maximum clutter cancellation to be a most effective system. The ability to reduce transmission power and to reduce the effect of clutter will produce a low cost system with increased accuracy as well, especially with airborne systems. Another effect is to reduce dwell time, which is very essential in obtaining more information per unit time.

Another example is the interleave pulse system to have a very simple system with very good results.

What is claimed is:

1. In a transmission array with a dual receiving array, synthetic aperture radar system, a method for detecting the position of a moving target, clutter and target vectors being indeterminate, comprising the steps of:
   a) positioning a first and second receiving array apart from the transmission array in a spaced relationship upon a moving platform;
   b) utilizing a displaced phase center antenna methodology to detect a moving target, and measuring data including but not limited to its range, relative radial velocity, and azimuth, wherein said data measured of said array 1 and said array 2 is delayed at least once for at least one interval in becoming a newly recorded data set,
   c) determining a correction factor $w_c$ and $w_m$ for imperfections of measurements of Displaced Phase Center Antenna in said first array and said second array, which vary with azimuth for clutter and target;
   d) providing a phase correction, due to inexact match of platform travel to the pulse repetition time, for said second delay pulses in comparison with said first delay pulses and subtracting second array corresponding filters from said first array;
   e) utilizing a clutter change value to determine a phase change of the target due to its relative radial velocity,
   f) determining said phase change of said target proportional to its angular position off bore sight of the transmission array;
   g) multiplying said filters by the conjugate of the phase shift corresponding to said filter; and,
   h) calculating the position of a true azimuth and radial velocity as a result of the determination of the change in amplitude and phase of clutter.

2. A method for locating a moving target by processing radar signals from a transmit array and dual receive arrays mounted on a moving platform in line with said platform motion relative to terrain, wherein a DPCA system is employed, said Displaced Phase Center Antenna (DPCA) system simulating an antenna to be receiving signals as if stationary while said antenna is in fact mounted on a moving carrier; said Displaced Phase Center Antenna (DPCA) system selectively using a cancellation of clutter signals determining a target azimuth measurement from two spaced-apart array measurements of a moving target; said method comprising the steps of:
   a) transmitting signals from said transmit array toward a moving target;
   b) receiving signals from said first receive array and said second receive array at delay equal $D_j$;
   c) multiplying said received signals of said first and delayed said second receive arrays by a weighting function to reduce affects of adjacent clutter and spectral leakage of said signals;
   d) calculating a correction factor of $W_C$ and $W_M$ for imperfections in said first array and said second array which vary with azimuth for clutter and target;
   e) providing a phase correction due to inexact match of platform travel to the pulse repetition time and a phase correction for said second delay pulses in comparison with said first delay pulses and subtracting second array corresponding filters from first array filters;
   f) processing data determined to be of low clutter area by measuring a phase between resultant vectors as phase proportional to radial velocity and from said azimuth of target is determined;
wherein the improvement comprises:
   g) if a test for low clutter shows significant clutter is detected as in the previous paragraphs, then processing significant clutter;
   h) determining whether said first array and said second array data are delayed one said data point, wherein said first array data becomes said second data point to said data point N, to said first data point, said second array data becomes said data point D+1 to said data point N, to said data point 1, to said data point D;
   i) processing said data of paragraph h) as in paragraph c) to paragraph e) and multiplying said filters by the conjugate of the phase shift corresponding to the filter processed;
   j) subtracting said corresponding filters of said second array from the corresponding filters of said first array and determining a result, where said target is detected at or near its peak, and solving for mover change in amplitude and phase from a first time to a second time, in said non-delayed and delayed data;
   k) estimating over change in amplitude and phase from said first time to said second time from a location where said moving target is detected at its peak as a prior calculation and determining a phase correction coefficient, if said moving target is detected at its peak and solving for x, determining the location of a peak of clutter, and calculating for any estimated mover change in amplitude and phase from said first time to said second time, if said amplitude and phase is determined at said peak of target;
   l) determining clutter change in amplitude and phase from said first time to said second time from the prior calculation of paragraphs "a" through "k";
   m) solving Clutter change in amplitude and phase from said first time to said second time;
   n) substituting values of phase shift relative to radial velocity, substituting mover weighting function in determining clutter change;
   o) determining phase shift relative to radial velocity and phase shift relative to azimuth; assuming values of clutter;
   p) substituting clutter change to determine amplitude offset and phase offset;
   q) measuring said phase shift relative to said radial velocity and said amplitude offset from the position of said clutter at said azimuth;
   r) calculating a special filter, calculate change in phase corresponding or very close to said position and insert and process at this position where X=1 at an angle equal zero;
   s) performing these operations for other pairs of times, such as said second time and a third time;
   t) performing these operations for other range Doppler bins where the target is detected and the results correlated;
   u) correlating with performing same operations with other delay=D+1 or D−1, and obtaining close to same results; and,
   v) correlating with other PRFs at the same antenna position.

3. A method for locating a moving target by processing radar signals from a transmit array and dual receive arrays mounted on a moving platform in line with said platform motion relative to terrain, wherein a DPCA system is employed, said Displaced Phase Center Antenna (DPCA) system simulating an antenna to be receiving signals as if stationary while said antenna is in fact mounted on a moving carrier; said Displaced Phase Center Antenna (DPCA) system selectively using a cancellation of clutter signals determining a target azimuth measurement from two spaced-apart array measurements of a moving target;

a) transmitting signals from said transmit array toward a moving target;

b) receiving signals from said first receive array and said second receive array at delay equal D;

c) multiplying said received signals of said first and delayed said second receive arrays by a weighting function to reduce affects of adjacent clutter and spectral leakage of said signals;

d) calculating a correction factor of Wc and Wm for imperfections in said first array 1 and 2 said second array which vary with azimuth for clutter and target;

e) due to inexact match of platform travel to the pulse repetition time determining a phase correction for said second delay pulses in comparison with said first delay pulses and subtracting second array corresponding filters from first array filters;

f) processing data determined to be of low clutter area by measuring phase between resultant vectors as phase proportional to radial velocity and from that azimuth of target is determined;

wherein the improvement comprises:

g) if a test for low clutter shows significant clutter is detected as in previous paragraphs "a" through "f", then proceeding to clutter processing;

h) said first array data and said second array data are delayed one said data point, said first array data becoming said second data point to said data point N to said first array data point, said second array data becoming said data point D+1 to said data point N, to said first data point, to said data point D;

i) processing said data of paragraph h), as in paragraph c) to paragraph e) and multiplying said filters by the conjugate of the phase shift corresponding to processed filter;

j) subtracting corresponding filters of said second array from corresponding filters of said first array and said filter where said target is detected at or near its peak, solving for Y in said non-delayed data and said delayed data where $$Y = (V''_{11} - W_c V''_{12})/(V'_{11} - W_c V'_{12})$$

$$W_c = A_{CM} E^{j(\psi + K_{CM} X)}$$

k) estimating Y from the location of where said target is detected at its peak as a prior calculation illustrated in the disclosure and determining $\underline{K}=1$ and B=0, if said target is detected at its peak $\underline{K}=1$ and B=0 and solving for x, the location of the peak of clutter, may be calculated for any estimated Y, if Y determined at said of said peak of target, x=(angle of $K_1 - \Psi_{CM})/(-K_{CM})$;

l) from calculation of x, determining the value of $X = K e^{ja}$ m) from a solution in solving for X in the previous equation according to the following equation:

$$X = (e^{jD\Phi_R}/W_M V_{11} - V_{12})/(e^{jD\Phi_R} W_M V_{11} - V_{12})$$

n) substituting all candidate $\Phi_R$ and from which is determined $\Phi_A$ and $A_{CM}$ and $\Psi_{CM}$ for the term $W_M$, and where the solution is closest to the estimated value of X is the value of $\Phi_R$, the radial velocity and from this calculation said azimuth is calculated;

o) solving another solution for $e^{jD\Phi_R}/W_M = (V''_{11} X - V'_{11})/(V''_{12} X - V'_{12})$ p) substitute X in the above equation and from right side of above equation is known and made equal to $D\Phi_R$ is determined $A_{CM}$ and $\Psi_{CM}$ at the $\Phi'_A = \Phi'_D - \Phi'_R$ where $\Phi'_A$ is close to the true azimuth to give a very good estimate of $A_{CM}$ and $\Psi_{CM}$;

q) $A_{CM}$ and $\Psi_{CM}$ being measured from the position of clutter at said azimuth of paragraph "p";

r) for the best mode, processing at peak of said clutter, at the x position of said clutter by calculating a special filter, a change in phase corresponding or very close to said position and insert and process at this position where X=1 at an angle equal zero;

s) performing these operations for other pairs of times, such as T2 and T3 and obtaining sane results therefrom;

t) performing these operations for other range Doppler bins where the target is detected and the results correlated;

u) correlating by performing said aforesaid operations with other delay=D+1 or D−1, obtain close to same results; and, u) correlating with other PRFs at same antenna position, where:

| | |
|---|---|
| $V'_{11}$ | Measured vector in subarray 1 at time 1 |
| $V'_{12}$ | Measured vector in subarray 2 at time 1 |
| C | Clutter vector |
| M | Mover vector |
| $W_{C1}$ | Clutter weighting function for time 1 data |
| $W_{M1}$ | Mover weighting function for time 1 data |
| $\Phi_R$ | Phase shift proportional to relative radial velocity of the mover |
| $V'_{11}$ | Measured vector in subarray 1 at time 2 |
| $V'_{12}$ | Measured vector in subarray 2 at time 2 |
| X | Clutter change in amplitude and phase from time 1 to time 2 |
| Y | Mover change in amplitude and phase from time 1 to time 2 |
| $W_{c2} - W_c$ | Clutter weighting function for time 2 data |
| $W_{M2} - W_M$ | Mover weighting function for time 2 data |
| $\Psi_{CM}$ | Phase offset |
| $A_{CM}$ | Amplitude offset |
| S-FRDB | fine range bin processed for clutter |
| X | Location of the peak of clutter |
| $K_{CM}$ | Phase correction coefficient |

4. A method for locating a moving target by processing radar signals from a transmit array and dual receive arrays mounted on a moving platform in line with said platform motion relative to terrain, wherein a DPCA system is employed, said Displaced Phase Center Antenna (DPCA) system simulating an antenna to be receiving signals as if stationary while said antenna is in fact mounted on a moving carrier; said Displaced Phase Center Antenna (DPCA) system selectively using a cancellation of clutter signals determining a target azimuth measurement from two spaced-apart array measurements of a moving target; said method comprising the steps of:

a) transmitting signals from said transmit array toward a moving target;

b) receiving signals from said first receive array and said second receive array at delay equal $D_j$;

c) multiplying said received signals of said first and delayed said second receive arrays by a weighting function to reduce affects of adjacent clutter and spectral leakage of said signals;

d) calculating a correction factor of $W_C$ and $W_M$ for imperfections in said first array and said second array which vary with azimuth for clutter and target;

e) providing a phase correction due to inexact match of platform travel to the pulse repetition time and a phase correction for said second delay pulses in comparison with said first delay pulses and subtracting second array corresponding filters from first array filters;

f) processing data determined to be of low clutter area by measuring a phase between resultant vectors as phase proportional to radial velocity and from said azimuth of target is determined;

wherein the improvement comprises:

g) if a test for low clutter shows significant clutter is detected as in the previous paragraphs, then processing significant clutter;

h) determining whether said first array and said second array data are delayed one said data point, wherein said first array data becomes said second data point to said data point N, to said first data point, said second array data becomes said data point D+1 to said data point N, to said data point 1, to said data point D;

i) processing said data of paragraph h) as in paragraph c) to paragraph e) and multiplying said filters by the conjugate of the phase shift corresponding to the filter processed;

j) subtracting said corresponding filters of said second array from the corresponding filters of said first array and determining a result, where said target is detected at or near its peak, and solving for mover change in amplitude and phase from a first time to a second time, in said non-delayed and delayed data;

k) estimating over change in amplitude and phase from said first time to said second time from a location where said moving target is detected at its peak as a prior calculation and determining a phase correction coefficient, if said moving target is detected at its peak and solving for x, determining the location of a peak of clutter, and calculating for any estimated mover change in amplitude and phase from said first time to said second time, if said amplitude and phase is determined at said peak of target;

l) determining clutter change in amplitude and phase from said first time to said second time from the prior calculation of paragraphs "a" through "k";

m) solving Clutter change in amplitude and phase from said first time to said second time;

n) substituting values of phase shift relative to radial velocity, substituting mover weighting function in determining clutter change;

o) determining phase shift relative to radial velocity and phase shift relative to azimuth; assuming values of clutter;

p) substituting clutter change to determine amplitude offset and phase offset;

q) measuring said phase shift relative to said radial velocity and said amplitude offset from the position of said clutter at said azimuth;

r) calculating a special filter, calculate change in phase corresponding or very close to said position and insert and process at this position where X=1 at an angle equal zero;

s) performing these operations for other pairs of times, such as said second time and a third time; and t) performing these operations for other range Doppler bins where the target is detected and the results correlated.

5. The method of claim 4 further comprising steps:

u) correlating with performing same operations with other delay=D+1 or D−1, and obtaining close to same results; and v) correlating with other PRFs at the same antenna position.

* * * * *